TELEPHONE SYSTEM FOR REPERTORY DIALING

Filed Aug. 5, 1957 46 Sheets-Sheet 1

INVENTORS W. A. MALTHANER
H. E. VAUGHAN
BY Kenneth B. Hamlin
ATTORNEY

Sept. 6, 1960 W. A. MALTHANER ET AL 2,951,908

TELEPHONE SYSTEM FOR REPERTORY DIALING

Filed Aug. 5, 1957 46 Sheets-Sheet 2

INVENTORS W. A. MALTHANER
H. E. VAUGHAN

BY Kenneth B. Hamlin

ATTORNEY

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B Hamlin
ATTORNEY

INVENTORS W. A. MALTHANER
H. E. VAUGHAN
BY Kenneth B. Hamlin
ATTORNEY

Sept. 6, 1960 W. A. MALTHANER ET AL 2,951,908

TELEPHONE SYSTEM FOR REPERTORY DIALING

Filed Aug. 5, 1957

46 Sheets-Sheet 7

INVENTORS W. A. MALTHANER
H. E. VAUGHAN

BY Kenneth B. Hamlin

ATTORNEY

INVENTORS W. A. MALTHANER
H. E. VAUGHAN
BY Kenneth B Hamlin
ATTORNEY

SWITCHING INFORMATION DISPATCHER (REG) -3

INVENTORS W. A. MALTHANER
H. E. VAUGHAN
BY Kenneth B Hamlin
ATTORNEY

INVENTORS W A MALTHANER
H. E. VAUGHAN
BY Kenneth B Hamlin
ATTORNEY

INVENTORS W. A. MALTHANER
H. E. VAUGHAN
BY Kenneth B Hamlin
ATTORNEY

Sept. 6, 1960 W. A. MALTHANER ET AL 2,951,908

TELEPHONE SYSTEM FOR REPERTORY DIALING

Filed Aug. 5, 1957

46 Sheets-Sheet 12

INVENTORS W. A. MALTHANER
H. E. VAUGHAN

BY Kenneth B. Hamlin

ATTORNEY

DIALING ASSEMBLER - 3

INVENTORS W. A. MALTHANER
H. E. VAUGHAN
BY Kenneth B Hamlin
ATTORNEY

INVENTORS W. A. MALTHANER
H. E. VAUGHAN
BY Kenneth B. Hamlin
ATTORNEY

TELEPHONE SYSTEM FOR REPERTORY DIALING

Filed Aug. 5, 1957 46 Sheets-Sheet 15

INVENTORS W. A. MALTHANER
H. E. VAUGHAN

BY Kenneth B Hamlin

ATTORNEY

Sept. 6, 1960 W. A. MALTHANER ET AL 2,951,908

TELEPHONE SYSTEM FOR REPERTORY DIALING

Filed Aug. 5, 1957 46 Sheets-Sheet 16

INVENTORS W. A. MALTHANER
H. E. VAUGHAN

BY Kenneth B. Hamlin

ATTORNEY

INVENTORS W. A. MALTHANER
H. E. VAUGHAN
BY Kenneth B Hamlin
ATTORNEY

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B Hamlin
ATTORNEY

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B Hamlin
ATTORNEY

Sept. 6, 1960 W. A. MALTHANER ET AL 2,951,908

TELEPHONE SYSTEM FOR REPERTORY DIALING

Filed Aug. 5, 1957 46 Sheets-Sheet 22

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B. Hamlin
ATTORNEY

Sept. 6, 1960 W. A. MALTHANER ET AL 2,951,908

TELEPHONE SYSTEM FOR REPERTORY DIALING

Filed Aug. 5, 1957 46 Sheets-Sheet 24

INVENTORS W. A. MALTHANER
H. E. VAUGHAN

BY Kenneth B. Hamlin

ATTORNEY

INVENTORS W. A. MALTHANER
H. E. VAUGHAN
BY Kenneth B Hamlin
ATTORNEY

INVENTORS W. A. MALTHANER
H. E. VAUGHAN
BY Kenneth B Hamlin
ATTORNEY

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B Hamlin
ATTORNEY

Sept. 6, 1960 W. A. MALTHANER ET AL 2,951,908

TELEPHONE SYSTEM FOR REPERTORY DIALING

Filed Aug. 5, 1957 46 Sheets-Sheet 31

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B. Hamlin
ATTORNEY

Sept. 6, 1960 W. A. MALTHANER ET AL 2,951,908

TELEPHONE SYSTEM FOR REPERTORY DIALING

Filed Aug. 5, 1957 46 Sheets-Sheet 33

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B. Hamlin
ATTORNEY

Sept. 6, 1960 W. A. MALTHANER ET AL 2,951,908

TELEPHONE SYSTEM FOR REPERTORY DIALING

Filed Aug. 5, 1957 46 Sheets-Sheet 35

INVENTORS W. A. MALTHANER
H. E. VAUGHAN

BY Kenneth B. Hamlin

ATTORNEY

TELEPHONE SYSTEM FOR REPERTORY DIALING

Filed Aug. 5, 1957

INVENTORS W. A. MALTHANER
H. E. VAUGHAN
BY Kenneth B. Hamlin
ATTORNEY

INVENTORS W. A. MALTHANER
H. E. VAUGHAN

BY Kenneth B Hamlin

ATTORNEY

INVENTORS W. A. MALTHANER
H. E. VAUGHAN
BY Kenneth B Hamlin
ATTORNEY

TELEPHONE SYSTEM FOR REPERTORY DIALING

Filed Aug. 5, 1957 46 Sheets-Sheet 39

INVENTORS W.A. MALTHANER
H.E. VAUGHAN
BY Kenneth B. Hamlin
ATTORNEY

Sept. 6, 1960 W. A. MALTHANER ET AL 2,951,908

TELEPHONE SYSTEM FOR REPERTORY DIALING

Filed Aug. 5, 1957

46 Sheets-Sheet 40

INVENTORS W. A. MALTHANER
H. E. VAUGHAN

BY Kenneth B Hamlin

ATTORNEY

INVENTORS W. A. MALTHANER
H. E. VAUGHAN
BY Kenneth B. Hamlin
ATTORNEY

Sept. 6, 1960 W. A. MALTHANER ET AL 2,951,908

TELEPHONE SYSTEM FOR REPERTORY DIALING

Filed Aug. 5, 1957

46 Sheets-Sheet 42

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B. Hamlin
ATTORNEY

INVENTORS W. A. MALTHANER
H. E. VAUGHAN
BY Kenneth B. Hamlin
ATTORNEY

SWITCHING INFORMATION DISPATCHER REGISTERS

DIALING ASSEMBLER

DIALED INFORMATION DISPATCHER

INVENTORS W. A. MALTHANER
H. E. VAUGHAN

BY Kenneth B. Hamlin
ATTORNEY

OUT TRUNK SELECTOR

SWITCHING INFORMATION DISPATCHER - TRUNKS

REPERTORY TRANSLATION CONSULTOR

REPERTORY TRANSLATION DISPATCHER

REPERTORY VERIFICATION REGISTER TRUNK

REPERTORY CHANGE REGISTER TRUNK

INVENTORS W. A. MALTHANER
H. E. VAUGHAN
BY Kenneth B Hamlin
ATTORNEY

United States Patent Office 2,951,908

Patented Sept. 6, 1960

2,951,908

TELEPHONE SYSTEM FOR REPERTORY DIALING

William A. Malthaner, New Providence, and Henry E. Vaughan, Chatham, N.J., assignors to Bell Telephone Laboratories, Incorporated, New York, N.Y., a corporation of New York

Filed Aug. 5, 1957, Ser. No. 676,321

54 Claims. (Cl. 179—18)

This invention relates to automatic telephone systems and more particularly to such systems arranged for repertory dialing.

The average telephone subscriber has a repertory of persons and business establishments to whom calls are made at frequent intervals. These repertories may vary from a few persons, a dozen perhaps, for a residental subscriber, to many individuals or business establishments, perhaps 75 to 100, for business subscribers. Where subscribers are connected to an automatic telephone exchange it is necessary for a calling subscriber to go through the time-consuming operation of manipulating a calling dial successively a number of times to transmit the directory number of a called party to the automatic exchange.

The continued growth of metropolitan areas has necessitated the expansion of telephone switching systems serving these areas to the extent that where originally subscribers' directory numbers consisted of four digits, now in most cases directory numbers consist of a total of seven digits. This increase in the number of digits in telephone subscribers' directory numbers has of course also increased the number of successive manipulations of a calling dial which a subscriber must make to transmit the directory number of a called party to an automatic exchange. Correspondingly, this has increased the time required for the establishment of calls and the possibility of errors in the manipulation of the calling dial. Furthermore, as the number of digits in subscribers' directory numbers are increased it is becoming increasingly more difficult for subscribers to remember the directory numbers of the parties in his repertory whom he frequently calls. This may require that a subscriber, desiring to call a particular party in his repertory, look up the party's directory number in a telephone directory. In metropolitan areas where telephone directories are of substantial size it may take the subscriber considerable time to find the directory number of the desired party.

Devices have been proposed heretofore for simplifying the establishment of telephone calls to certain more frequently called parties and for minimizing errors in the establishment of such calls. These devices, known generally as repertory dialers, include mechanisms adapted to be attached to and cooperate with a telephone subscriber's station subset or these devices may be separate mechanisms adapted to be connected directly to a telephone subscriber's line. Presently known repertory dialers are constructed and arranged with built-in memory or storage so that the directory numbers of a series of frequently called parties (a repertory) may be permanently set up in the mechanism. A telephone subscriber having such a device and desiring to place a call to a party in his repertory need only operate a single pushbutton or key corresponding to the desired party and the repertory dialer will automatically transmit dial pulses to the automatic exchange corresponding to the called party's directory number.

Presently known repertory dialing devices, although advantageously utilized to assist telephone subscribers in originating calls to frequently called parties, all have several disadvantages and limitations. Because these devices are adapted to be attached to a telephone subscriber's station equipment or are separate mechanisms connected to a telephone subscriber's line, a subscriber who desires repertory dialing service must have such a device at each telephone and extension telephone in his home. Without this arrangement a subscriber from the upstairs bedroom desiring to place a call to a party in his repertory must go to the telephone in his home where the repertory dialing device is located or must dial the desired party's directory number in the usual manner. Accordingly, to take full advantage of the repertory dialing service, a subscriber must have a repertory dialing device installed at each telephone and extension telephone in his home and because of the cost of present repertory dialing devices, this may be prohibitive.

Furthermore, because present repertory dialing devices contain built-in memory or storage in which a subscriber's repertory is recorded, there is a practical limitation upon the number of parties which can be included in a subscriber's repertory. Not all telephone subscribers will desire to have a repertory of the same number of subscribers. Some subscribers may desire only a few listings in their repertory whereas others may require a great many listings. With present-day repertory dialing devices no provision is made for varying the number of parties which can be included in a subscriber's repertory.

A further disadvantage of the present-day repertory dialing devices is that such devices are relatively complex and require periodic maintenance by trained maintenance personnel. Because these devices must be located in the telephone subscriber's home or business establishment, trained personnel must call at the home of the subscriber or at his business establishment in order to service the devices.

A still further disadvantage of some present-day repertory dialing devices is that changes which a subscriber desires to make in his repertory require the assistance of trained personnel. In many cases the subscriber must forward his repertory dialing device or a portion thereof to a central location where these changes are made. In other cases a trained person must call at the subscriber's home in order to effect the desired changes in the subscriber's repertory.

Because present-day repertory dialing devices must be located at a subscriber's home or place of business and because these devices are either attached to a subscriber's station equipment or are separate units connected to the subscriber's line, a space problem is presented. In other words, the subscriber desiring to utilize a repertory dialing device must have the device located upon a desk or a table associated with his telephone, and in many instances this is objectionable because of space or appearance considerations.

It is an object of the present invention to improve repertory dialing service for subscribers connected to an automatic telephone system whereby the above-mentioned disadvantages and limitations are eliminated.

It is a further object of the present invention to provide repertory dialing service for subscribers connected to an automatic telephone system whereby the requirement of special equipment or devices at the subscriber's station other than the normally required station equipment is eliminated.

It is another object of the present invention to improve repertory dialing service for subscribers connected to an automatic telephone system whereby changes in, and the verification of, entries in individual subscriber's repertories may be readily accomplished by individual subscribers with greater facility and without assistance.

It is still another object of the present invention to provide repertory dialing service for subscribers connected to an automatic telephone system wherein the number of entries in individual subscriber's repertories may vary in accordance with the individual subscriber's requirements.

Other objects of the present invention are to improve the reliability, efficiency and economy of repertory dialing service for subscribers connected to automatic telephone systems.

These and other objects of the present invention are attained in one specific illustrative embodiment wherein a common centralized repertory memory is provided in an automatic telephone system for recording the repertories of all subscribers who desire repertory dialing service. Each telephone subscriber who desires repertory dialing service is assigned an individual area on this repertory memory in which to record his repertory. The number of entries in each repertory recorded on the repertory memory, and hence the size of each individual area, varies in accordance with the requirements of the individual subscribers desiring the repertory dialing service. Each individual subscriber's register area in the repertory memory is identifiable and locatable by utilizing the line equipment number assigned to the subscriber's line in the automatic telephone system.

When a subscriber desires to use the repertory dialing service and call one of the parties of his repertory he merely lifts the handset of his telephone subset and dials two digits. The two digits dialed by the subscriber will correspond to the code in his repertory for the desired party. For example, if a subscriber has assigned the code 21 in his repertory to the Joneses living next door, whose telephone directory number is Crestview 3–9569, it is only necessary for the subscriber to dial 21 in order to establish a call to the Joneses.

When the two digit repertory code is detected and registered in the automatic telephone system a path is completed to the common repertory memory in the automatic telephone system. By utilizing the line equipment number of the calling subscriber's line, the subscriber's repertory is located in the common repertory memory. The two digits (21 in this illustration) dialed by the subscriber are then matched against his individual repertory codes recorded in the common repertory memory, and when a match is found the telephone directory number associated therewith (in this illustration Crestview 3–9569) is read from the repertory memory and pulsed into the automatic telephone system and a call is automatically established to the Joneses.

In accordance with another aspect of the present invention, each telephone subscriber having subscribed to the repertory dialing service establishes and maintains his own repertory in the common repertory memory in the automatic telephone system. The subscribers may make additions to or changes in their respective repertories without consulting anyone or without assistance from anyone. To accomplish a change or addition to his repertory, a repertory dialing subscriber dials a special repertory change code. This is recognized in the automatic telephone switching system as a call from a repertory dialing subscriber who desires to make a change in his repertory in the common repertory memory. The register area in this repertory memory assigned to the subscriber is then located by utilizing the line equipment number of the calling subscriber's line. When the subscriber's repertory area is located in the repertory memory a special tone is returned to the subscriber to give an indication that he may proceed to make the desired change or addition in his repertory. For example, if he desires to remove the Jones' number (Crestview 3–9569) from his repertory code 21 and in its place put the Browns' number (Murdock 5–2450), it is only necessary for the repertory dialing subscriber after dialing the repertory change code to dial the repertory code 21 when he receives the special tone and then immediately dial the Browns' number (Murdock 5–2450). The calling subscriber's repertory code 21 is matched against the codes recorded in his repertory area on the repertory medium. When this code is found the Browns' number (Murdock 5–2450) is then recorded in the repertory memory in place of the Jones' number previously recorded therein. In this manner the subscriber may make additions or changes in his repertory simply by dialing the desired changes from his telephone subset and thus will not require the assistance of anyone at the automatic telephone system office.

In accordance with another aspect of the present invention, repertory dialing subscribers may verify their repertories without the assistance of anyone. To accomplish this a repertory dialing subscriber dials a special repertory verification code which is recognized in the automatic telephone system as a verification request from a repertory dialing subscriber, and again by utilizing the line equipment number of the calling subscriber's line his repertory area on the common repertory memory is located. A special tone is returned to the subscriber who thereupon dials the two digit code in his repertory which he desires to verify. For example, if a repertory dialing subscriber has forgotten whose telephone directory number is associated with his repertory code 29 he may, after receiving the special tone from the automatic telephone switching system, dial the two digit number 29. This two digit number 29 will then be matched against his repertory code in the common repertory memory until the number 29 is found. When this occurs the telephone directory number associated with the subscriber's repertory code 29 is read from the repertory memory and is utilized to contol gating and steering circuits which apply the output from a voice-recorded announcement drum to the calling subscriber's line whereby the directory number recorded in the subscriber's repertory for his repertory code 29 is audibly transmitted to the calling subscriber.

It is a feature of the present invention to record the repertories of repertory dialing subscribers connected to an automatic telephone system on a common recording medium.

More specifically, it is a feature of the present invention to record the repertories of repertory dialing subscribers connected to an automatic telephone system on a magnetic drum common to all such subscribers.

It is a further feature of the present invention that telephone directory numbers comprising the repertories of repertory dialing subscribers connected to an automatic telephone system be recorded in a common memory in areas individual to each of such subscribers and that such subscribers be able to establish calls through the automatic telephone system to parties whose telephone directory numbers are included in their respective recorded repertories by dialing predetermined repertory codes into the automatic telephone system.

It is also a feature of the present invention that the repertories of repertory dialing subscribers recorded in a memory common to all such subscribers connected to an automatic telephone system be identifiable and locatable by means of the line equipment number of the subscribers' lines in the automatic telephone system.

It is another feature of the present invention that repertory dialing subscribers whose individual repertories are recorded on a common recording medium in an automatic telephone system be able to remotely make changes in or additions to their respective repertories recorded on the common recording medium.

More specifically, it is a feature of the present invention that repertory dialing subscribers whose repertories are recorded on a common magnetic drum in an automatic telephone system be able to remotely make changes in or additions to their respective repertories recorded on the magnetic drum by dialing into the automatic telephone system a predetermined repertory change code followed by the dialing of the repertory code for which a change is desired and in turn the dialing of the new telephone directory number to be associated with the dialed repertory code.

It is a further feature of the present invention that repertory dialing subscribers whose individual repertories are recorded on a common recording medium in an automatic telephone system be able to remotely determine and verify the telephone directory numbers associated respectively with the individual repertory codes in their respective repertories recorded on the common recording medium.

More specifically, it is a feature of the present invention that repertory dialing subscribers whose repertories are recorded on a common recording medium in an automatic telephone system be able to receive an automatic audible announcement of the telephone directory numbers associated respectively with the individual repertory codes in their respective repertories by dialing into the automatic telephone system a predetermined repertory verification code followed by the dialing of the repertory code for which a verification is desired.

A still further feature of the present invention relates to means including a voice-recorded announcement drum for audibly transmitting telephone directory numbers recorded in a common memory to telephone subscribers connected to an automatic telephone system.

A complete understanding of this invention and of the various objects and features thereof may be gained from the consideration of the following description of an illustrative embodiment thereof and the accompanying drawing in which.

Figure 1:
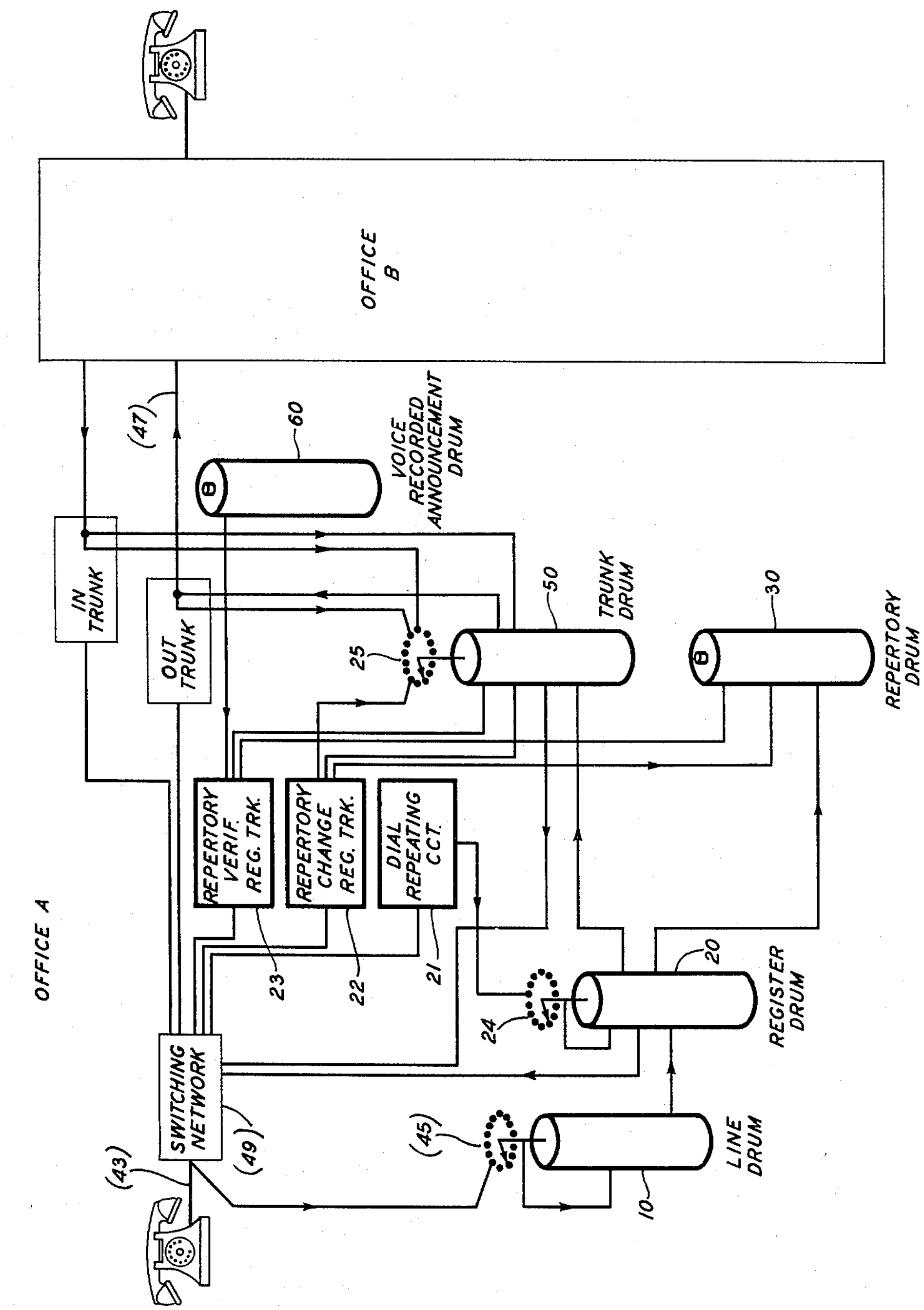
Fig. 1 is a simplified block diagram representation of one illustrative embodiment of this invention.
Figure 6:
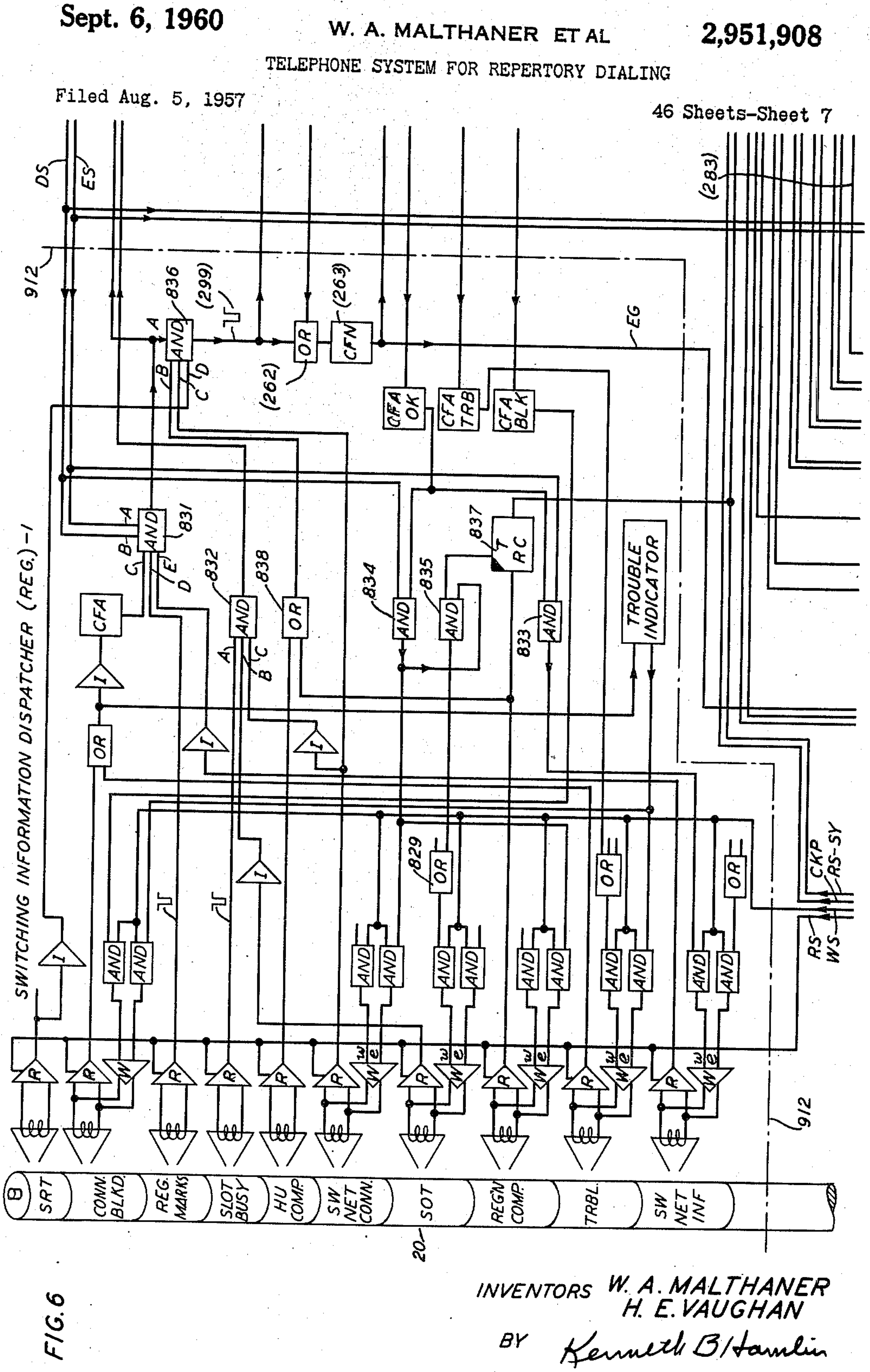
Figure 7:
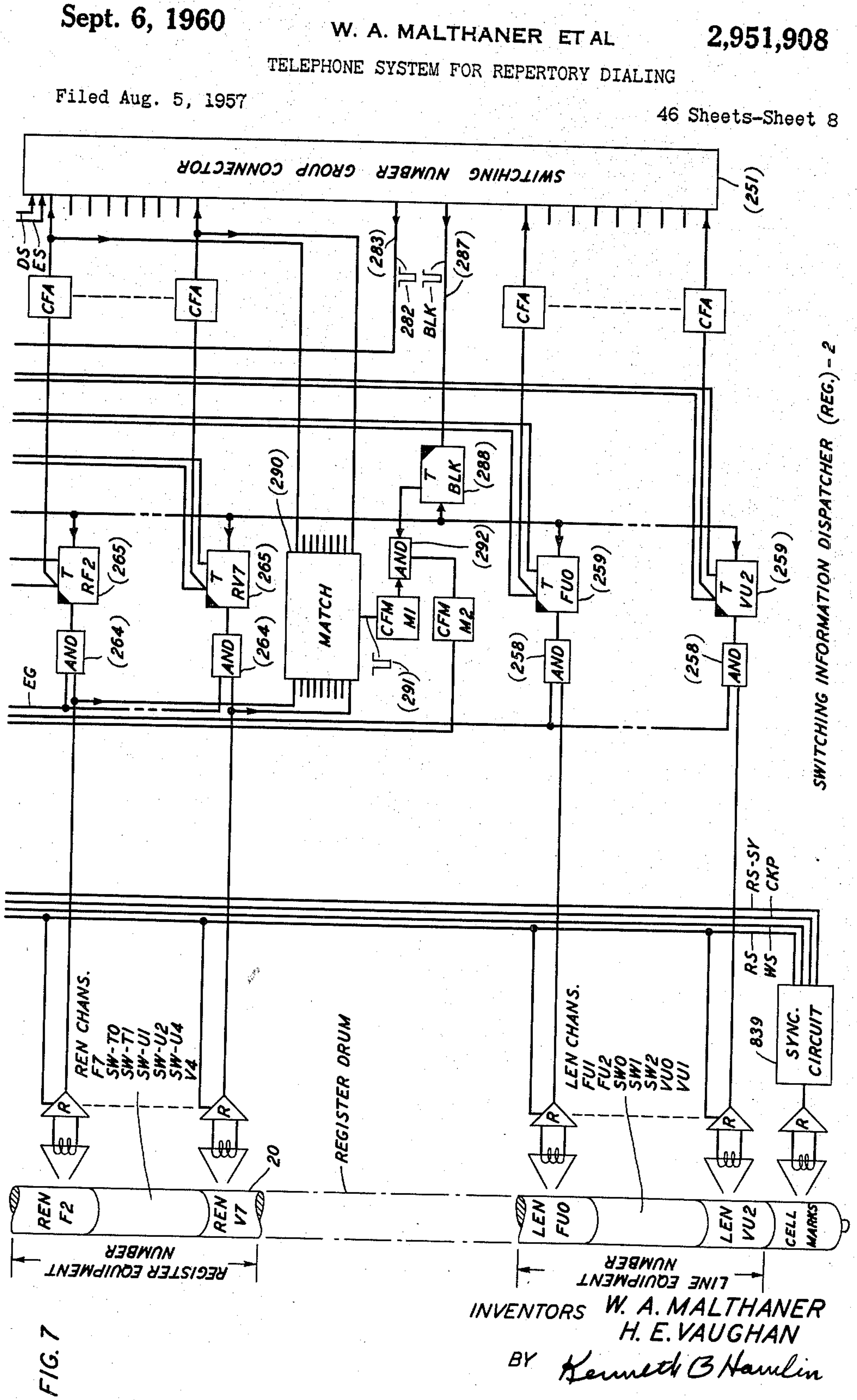
Figure 8:
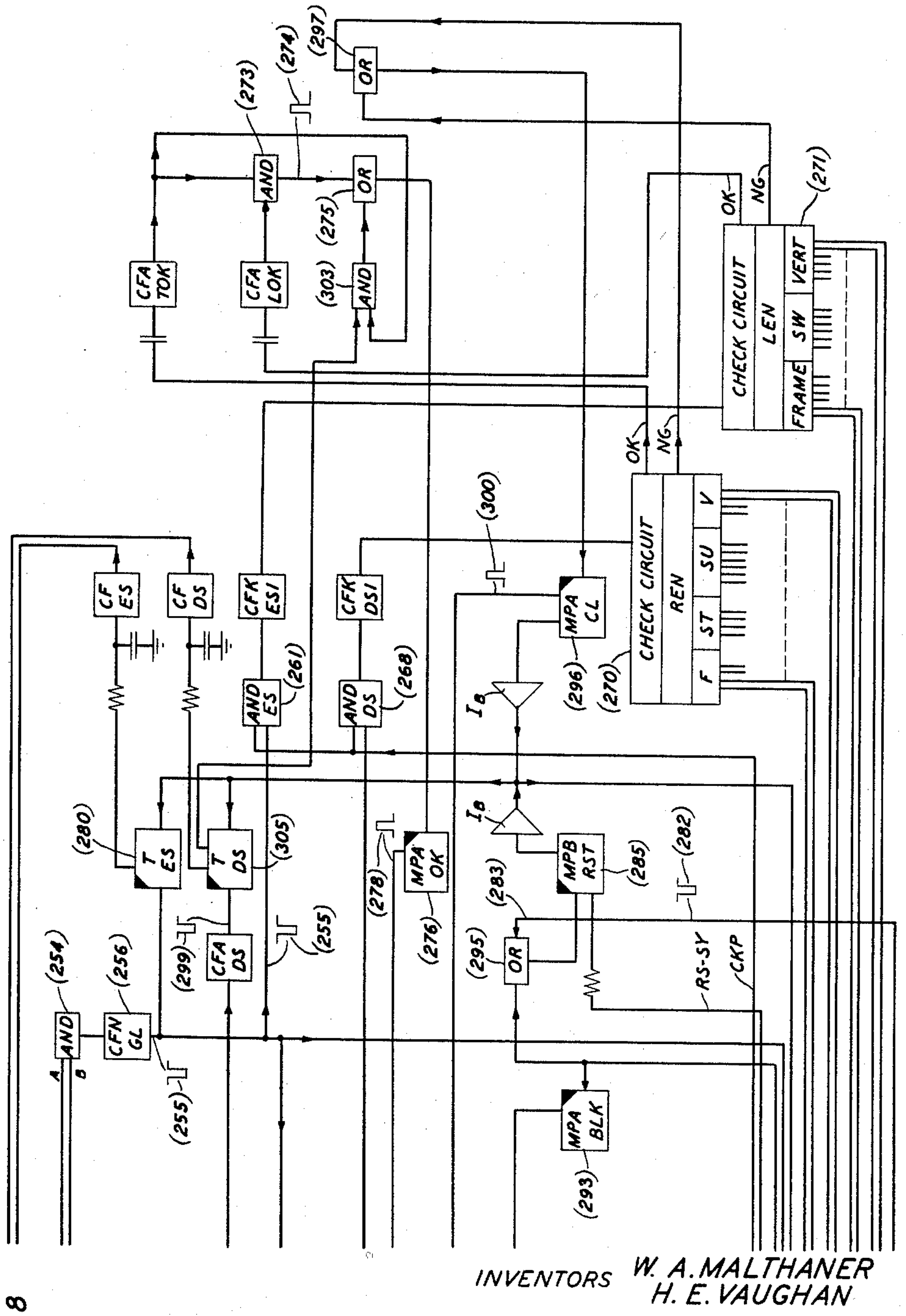
Figure 9:
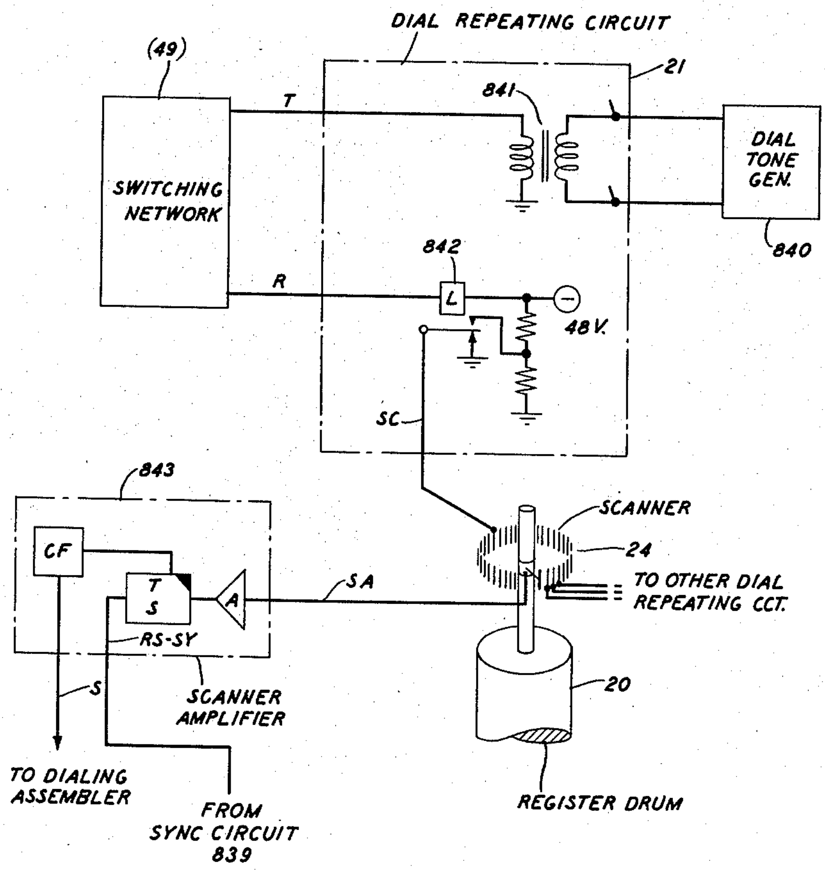
Figure 19:
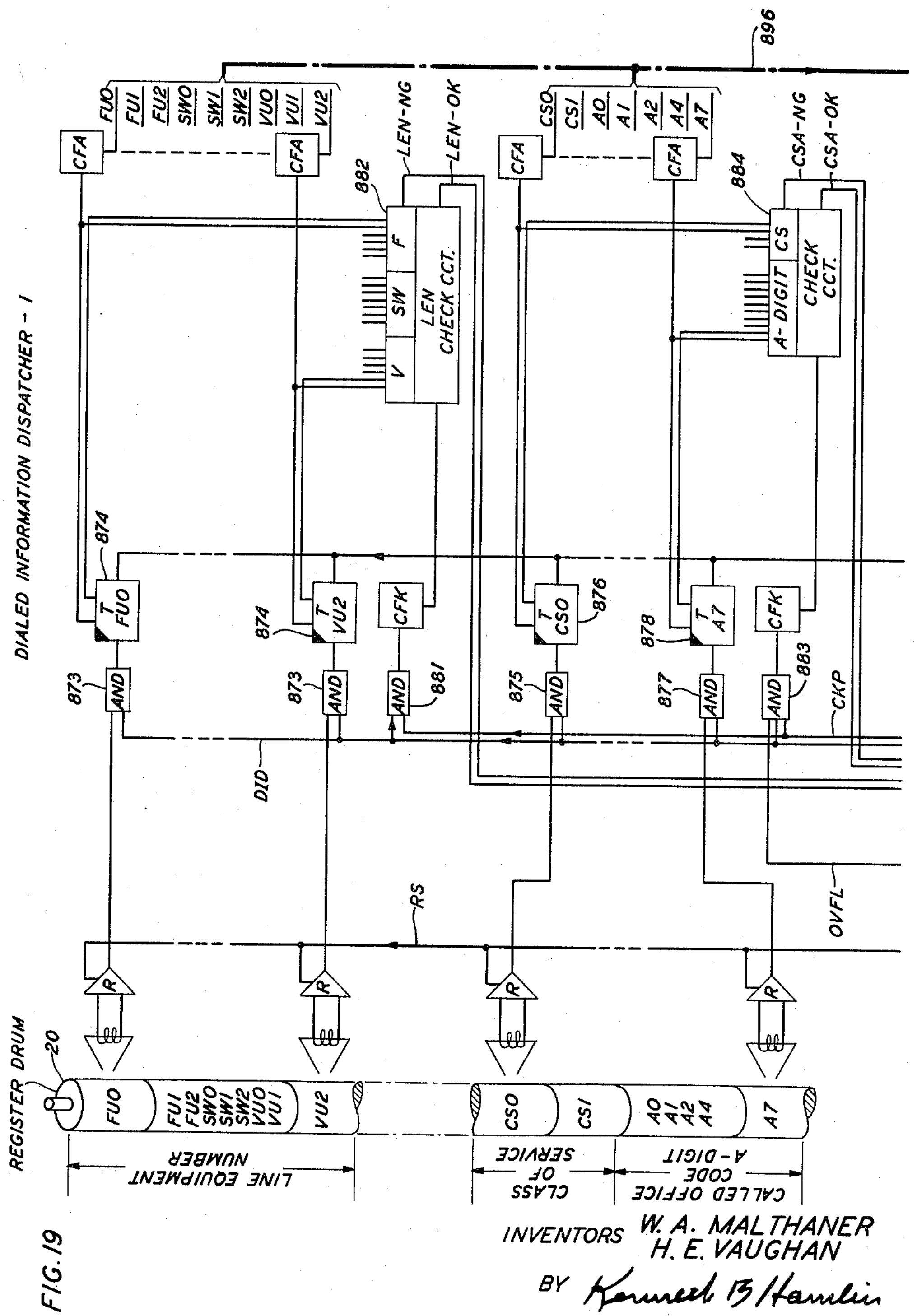
Figure 20:
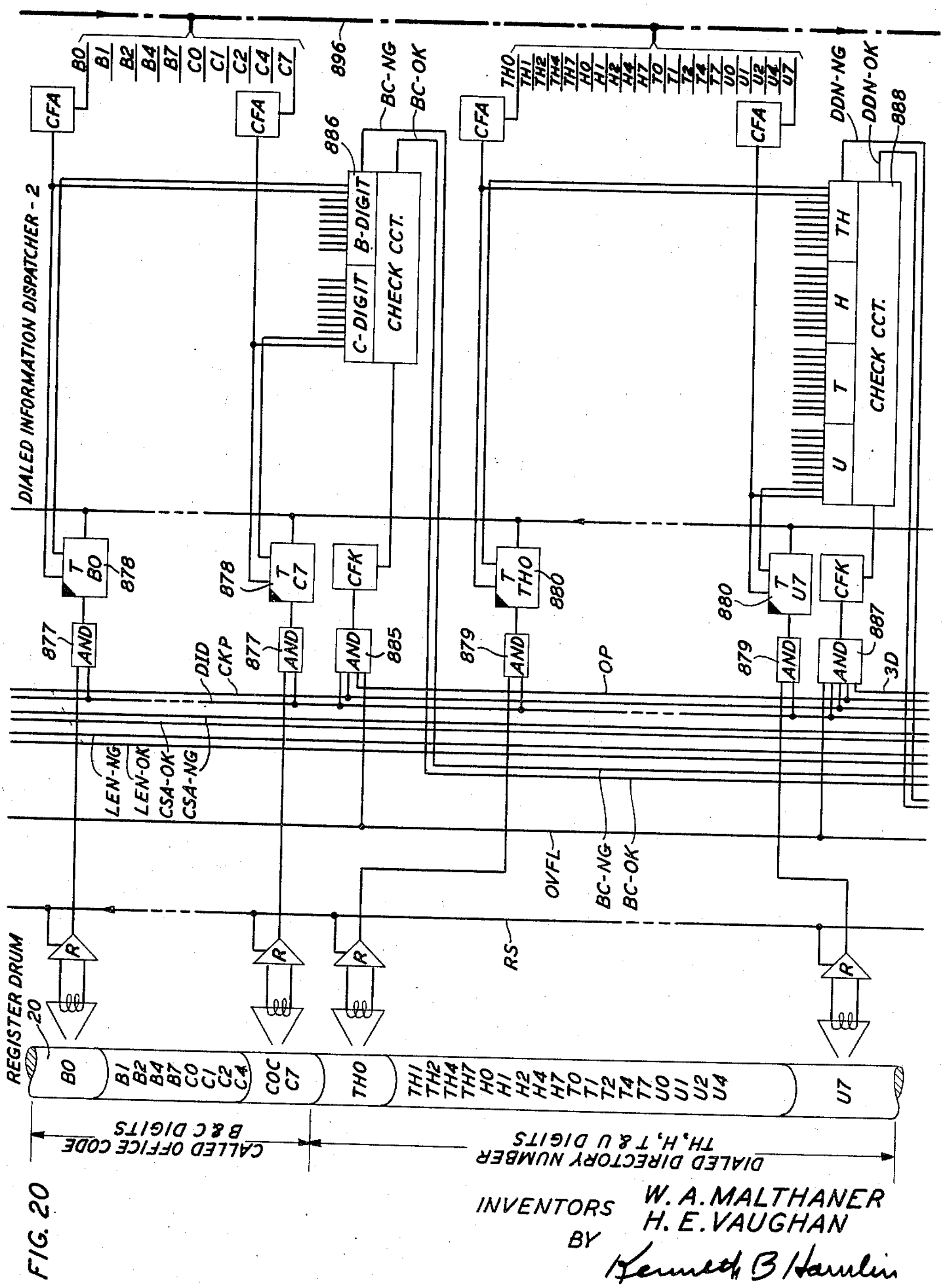
Figure 21:
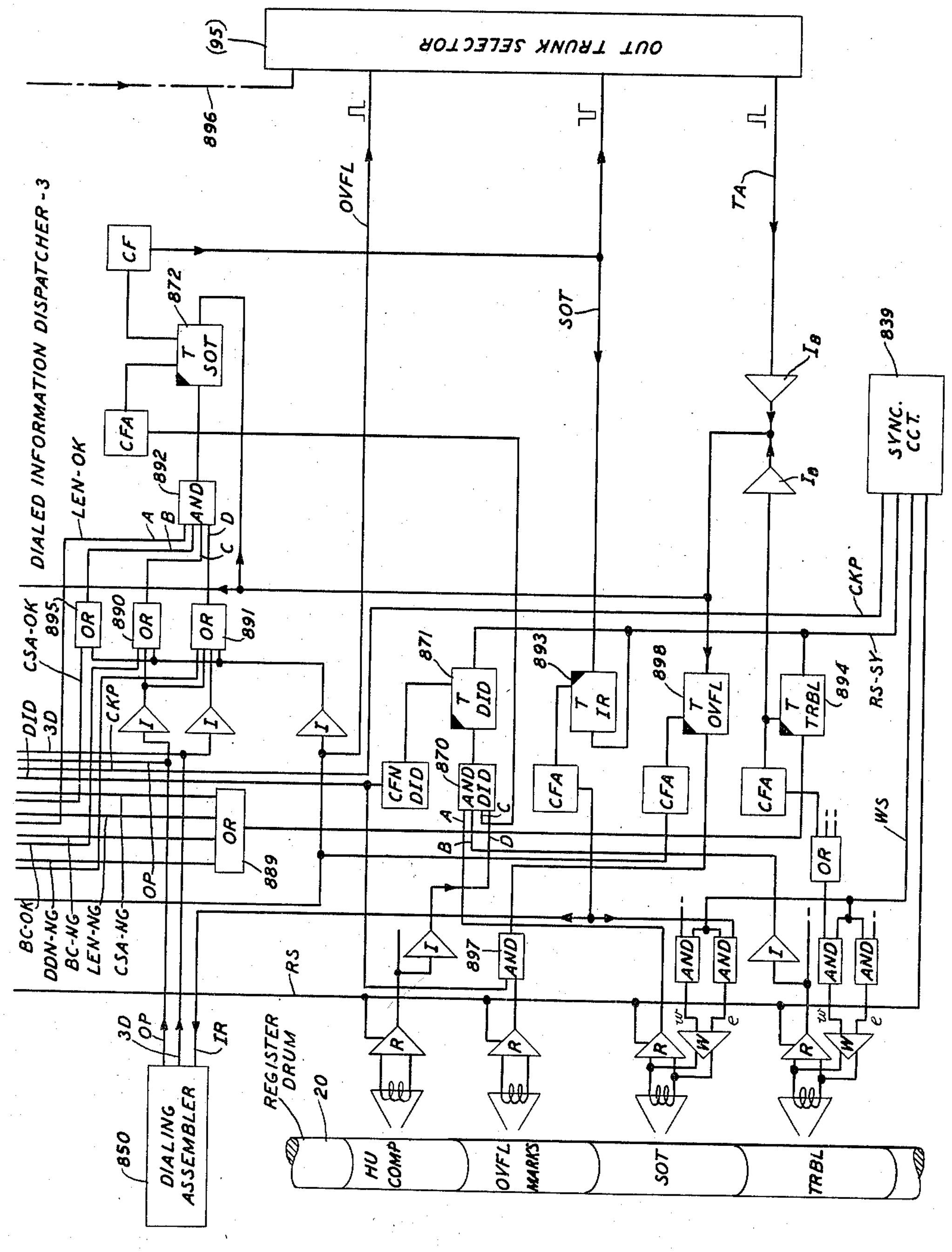
Figure 22:
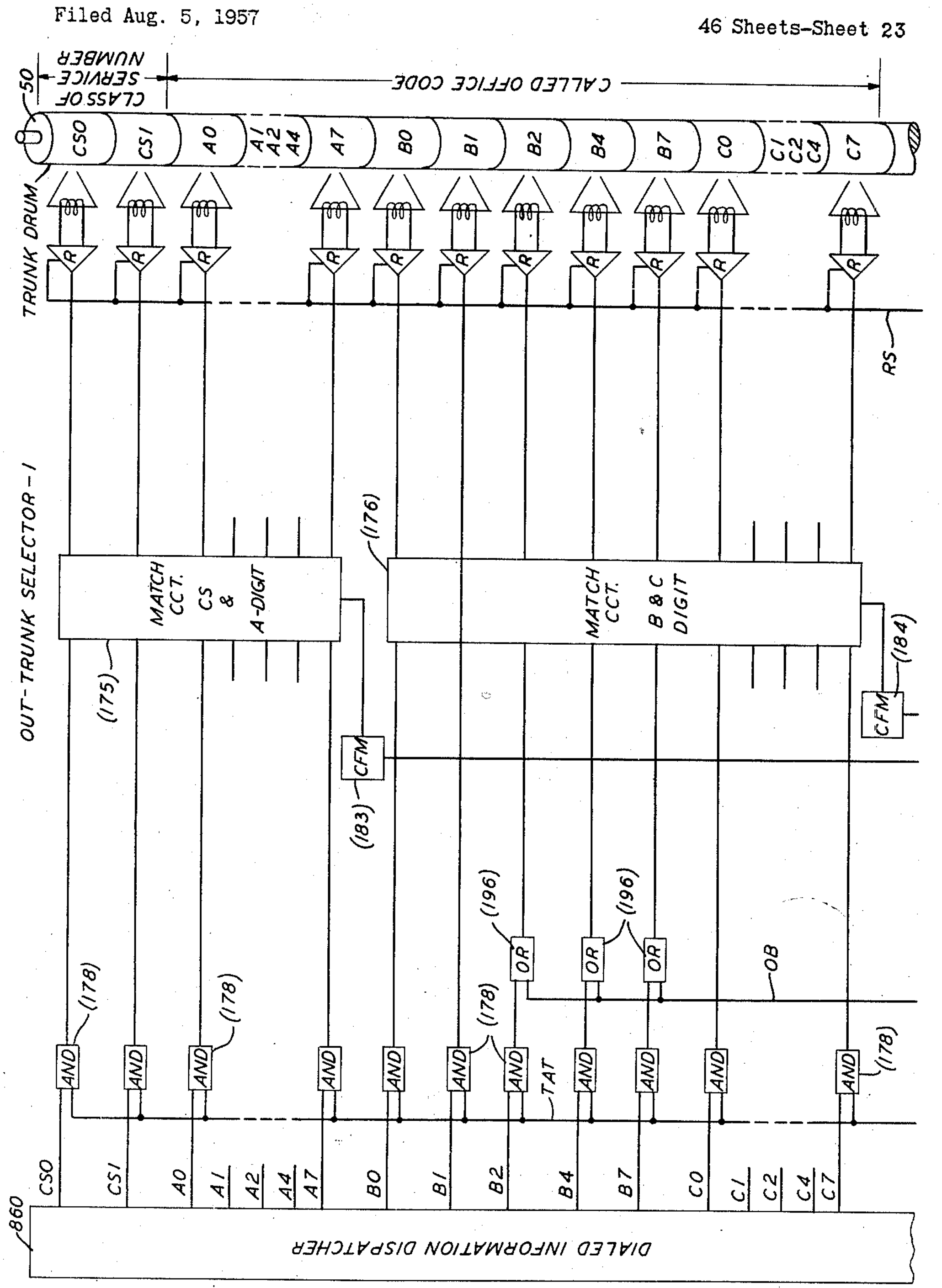
Figure 23:
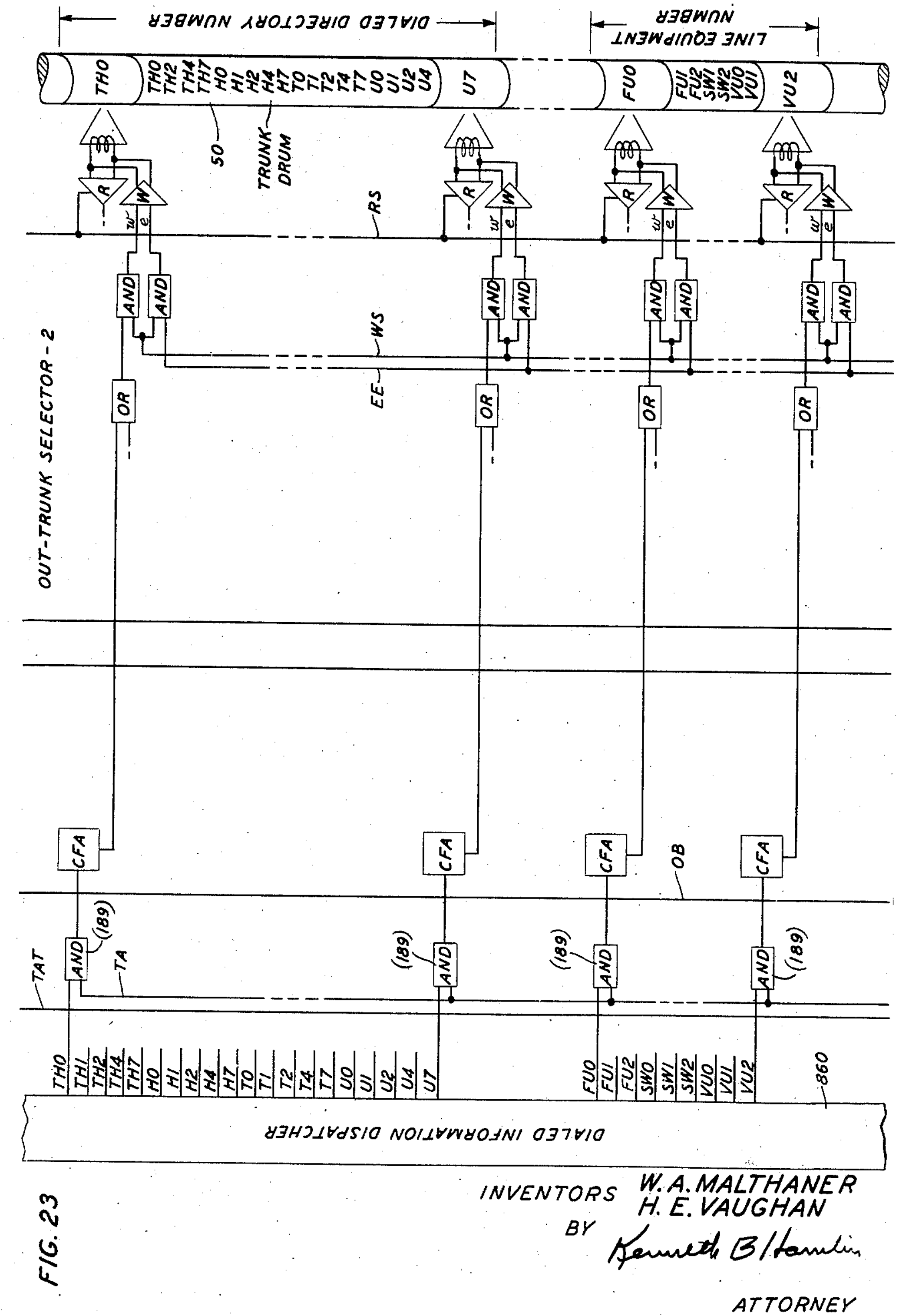
Figure 24:
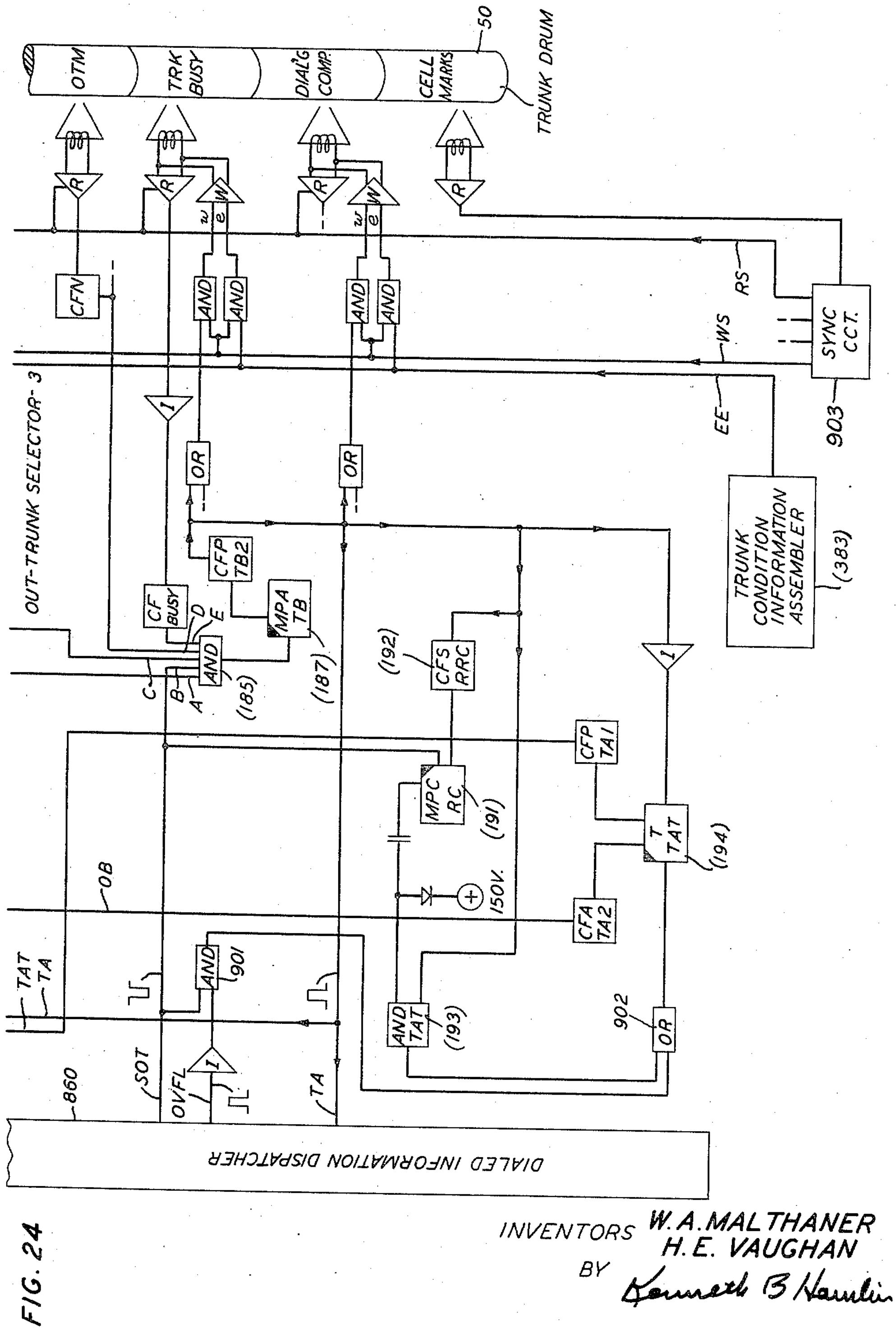
Figure 25:
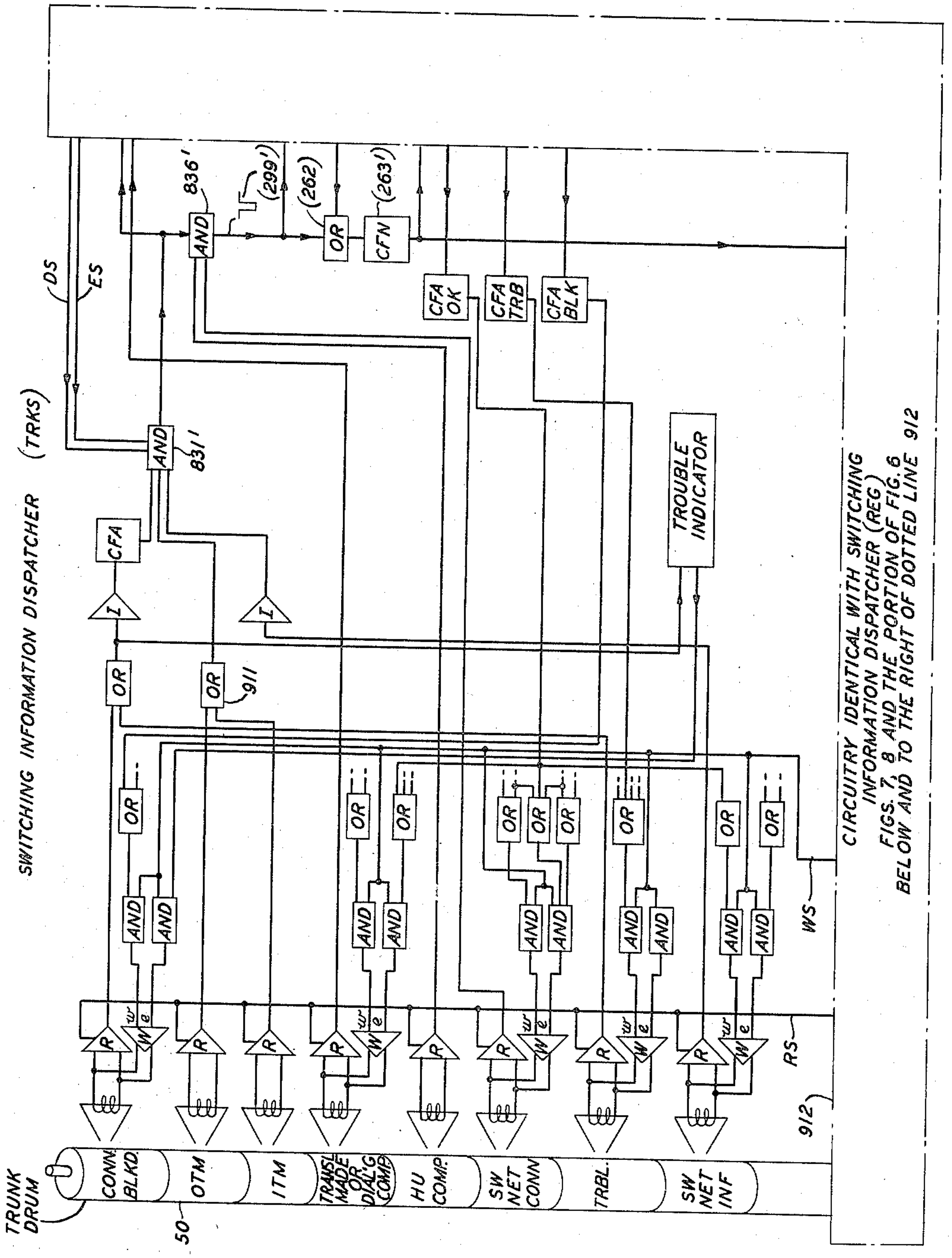
Figures 30, 32:
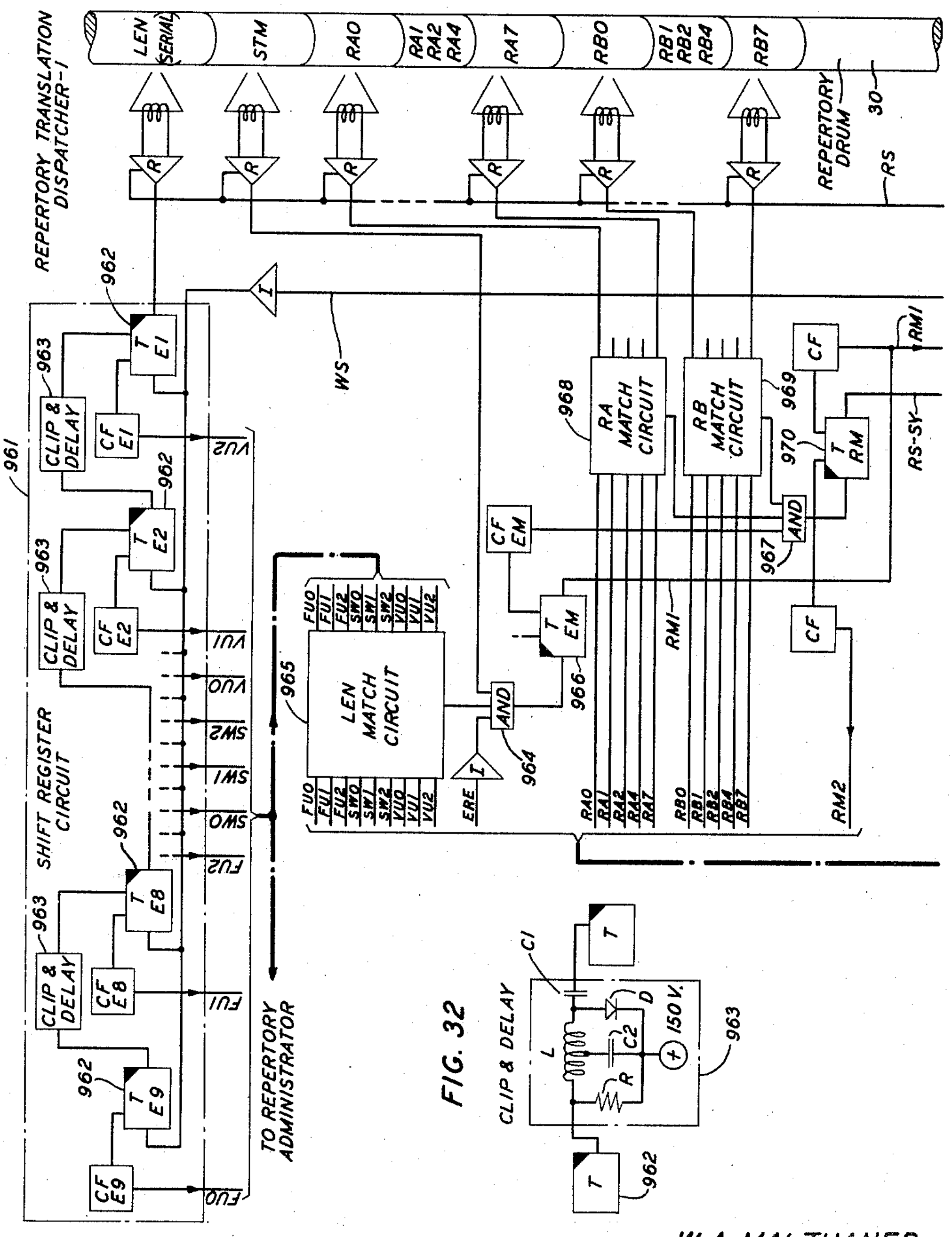
Figure 31:
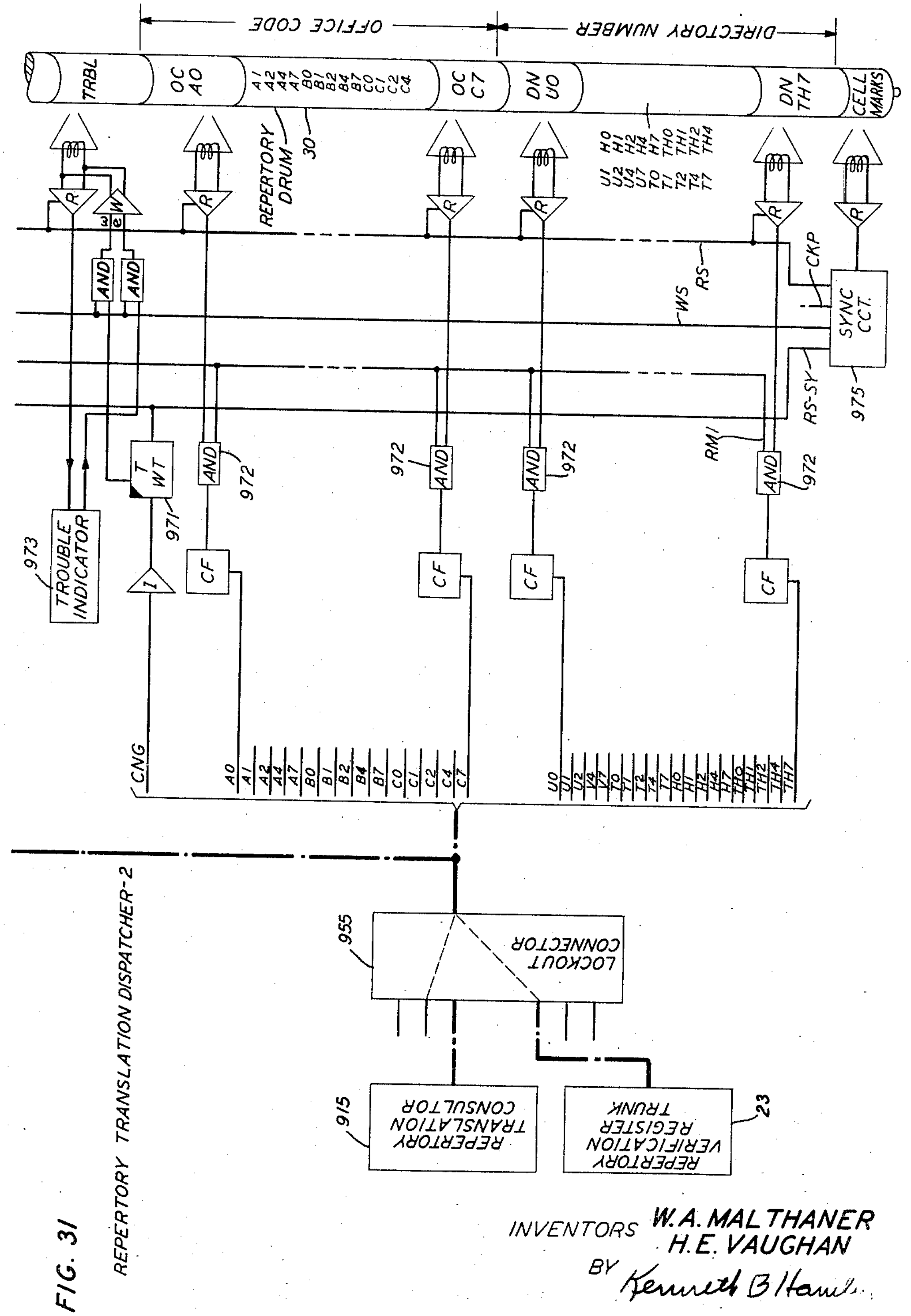
Figure 33:
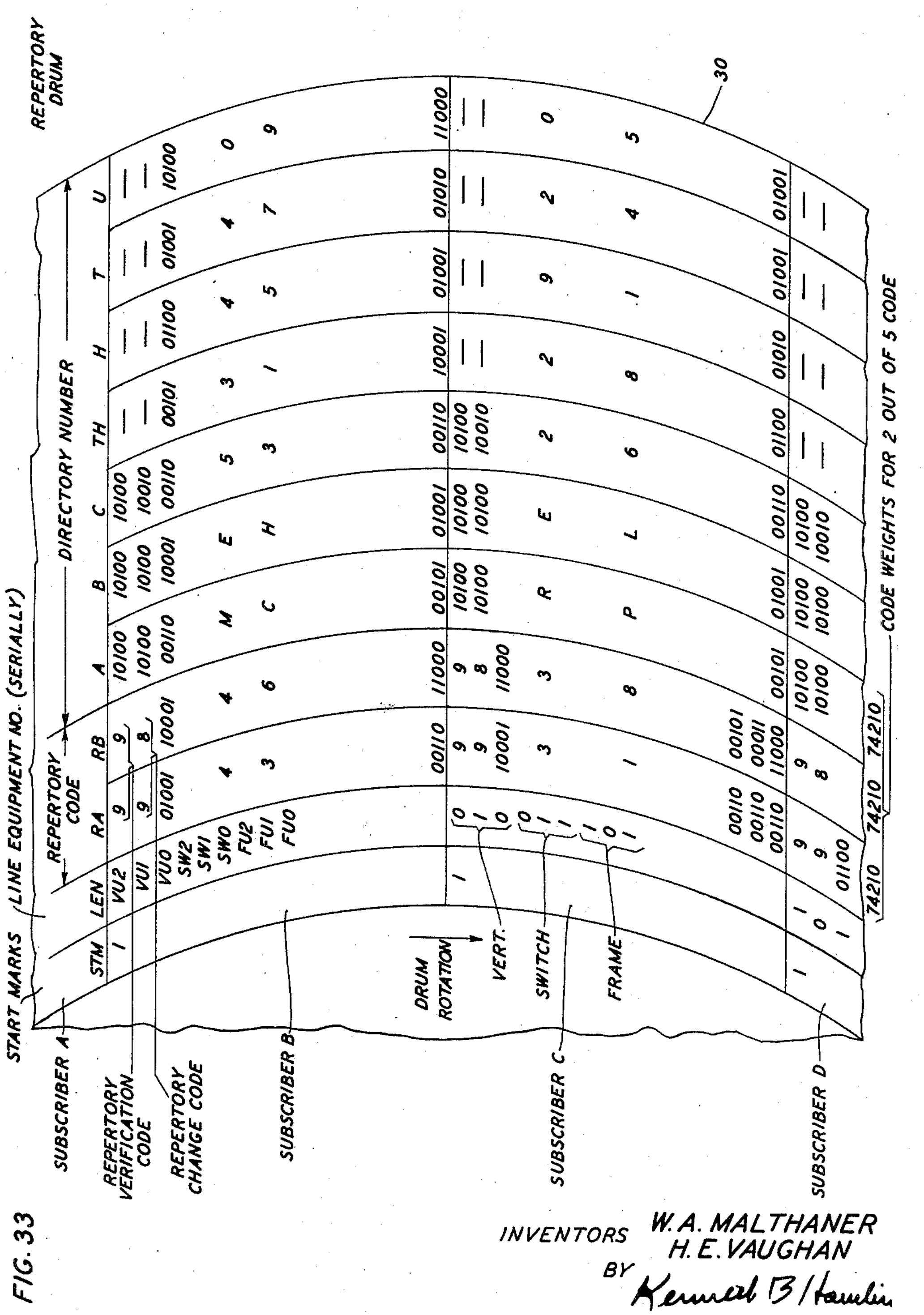
Figure 39:
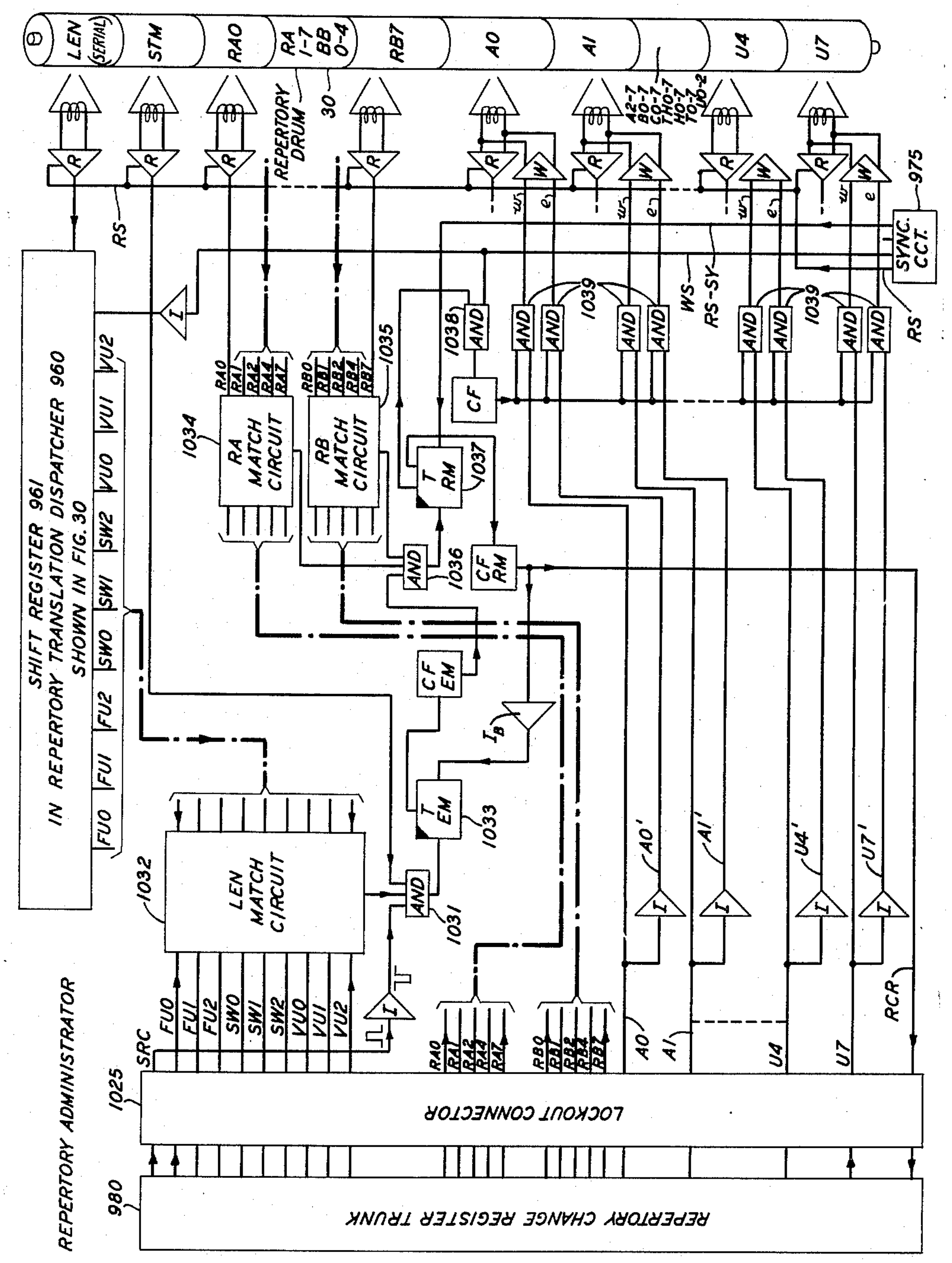
Figure 45:
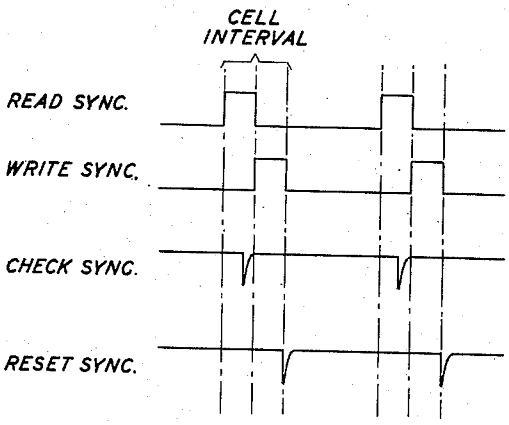
Figure 46:
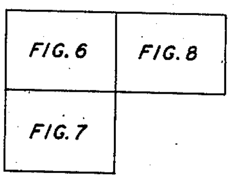
Figure 47:
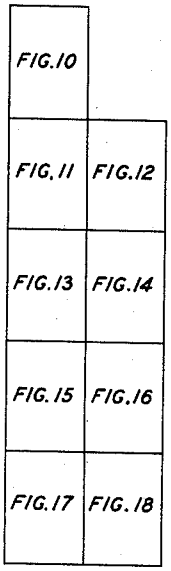
Figure 48:
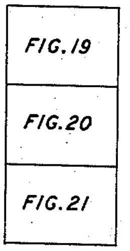
Figure 49:
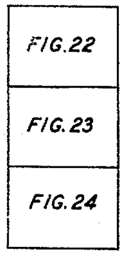
Figure 50:
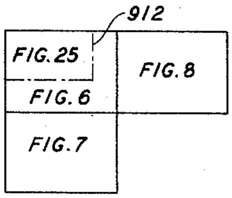
Figure 51:
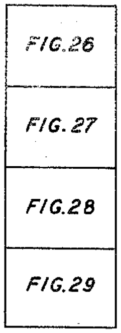
Figure 52:
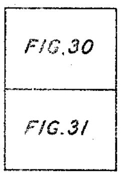
Figure 54:
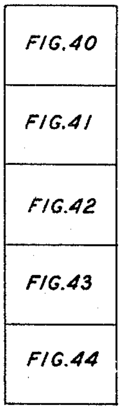
Figure 53:
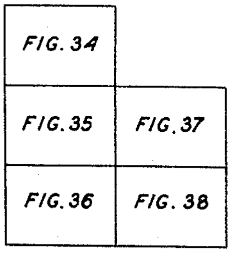

Figs. 6 through 8 are schematic representations of one specific illustrative embodiment of a Switching Information Dispatcher (Register) that may be employed in the embodiment of Figs. 1 and 2, Fig. 46 being the key diagram showing the arrangement of Figs. 6 through 8;

Fig. 9 is a schematic representation of one specific illustrative embodiment of a Dial Repeating Circuit that may be employed in the embodiment of Figs. 1 and 2;

Figs. 10 through 18 are schematic representations of one specific illustrative embodiment of a Dialing Assembler that may be employed in the embodiment of Figs. 1 and 2, Fig. 47 being the key diagram showing the arrangement of Figs. 10 through 18;

Figs. 19 through 21 are schematic representations of one specific illustrative embodiment of a Dialed Information Dispatcher that may be employed in the embodiment of Figs. 1 and 2, Fig. 48 being the key diagram showing the arrangement of Figs. 19 through 21;

Figs. 22 through 24 are schematic representations of one specific illustrative embodiment of an Out-Trunk Selector that may be employed in the embodiment of Figs. 1 and 2, Fig. 49 being the key diagram showing the arrangement of Figs. 22 through 24;

Fig. 25 is a schematic representation of a portion of a Switching Information Dispatcher (Trunks) that may be employed in the embodiment of Figs. 1 and 2, the remaining portions of the Switching Information Dispatcher being disclosed in Figs. 6, 7, and 8 which are associated with the schematic representation shown in Fig. 25 as shown in the key diagram of Fig. 50;

Figs. 26 through 29 are schematic representations of one specific illustrative embodiment of a Repertory Translation Consulter that may be employed in the embodiment of Figs. 1 and 2, Fig. 51 being the key diagram showing the arrangement of Figs. 26 through 29;

Figs. 30 and 31 are schematic representations of one specific illustrative embodiment of a Repertory Translation Dispatcher that may be employed in the embodiment of Figs. 1 and 2, Fig. 52 being the key diagram showing the arrangement of Figs. 30 and 31;

Fig. 32 is a schematic representation of one specific illustrative embodiment of a clip and delay circuit utilized in the Repertory Translation Dispatcher shown in Fig. 30;

Fig. 33 is a pictorial representation of a portion of a repertory drum employable in the embodiment of Figs. 1 and 2;

Figs. 34 through 38 are schematic representations of one specific illustrative embodiment of a Repertory Change Register Trunk that may be employed in the embodiment of Figs. 1 and 2, Fig. 53 being the key diagram showing the arrangement of Figs. 34 through 38;

Fig. 39 is a schematic representation of one specific illustrative embodiment of a Repertory Administrator that may be employed in the embodiment of Figs. 1 and 2;

Figs. 40 through 44 are schematic representations of one specific illustrative embodiment of a Repertory Verification Register Trunk that may be employed in the embodiment of Figs. 1 and 2, Fig. 54 being the key diagram showing the arrangement of Figs. 40 through 44;

Fig. 45 shows a graphic representation of the synchronizing pulses utilized in the embodiment of the invention shown in Figs. 1 and 2 to synchronize the reading and writing functions of the reading and writing amplifiers and the reset and check functions of the logic circuitry.

The repertory dialing arrangements of the present invention may be advantageously incorporated into a common control automatic telephone system wherein magnetic drums are employed for storage of the permanent and temporary information utilized to control switching functions in the establishment of calls through a switching network. One such system is disclosed in Patent 2,723,311 of W. A. Malthaner and H. E. Vaughan granted November 8, 1955. It is to be understood, however, that the present invention is not limited to use with an automatic telephone system of this type but may be advantageously utilized with other types of automatic telephone systems and specifically that the present invention is not limited to any particular common storage medium.

The automatic telephone system disclosed in the Malthaner-Vaughan Patent 2,723,311 includes two offices, Office A and Office B. Each office comprises a switching network, a "line" magnetic drum, a plurality of out-trunks, an out-trunk magnetic drum, a plurality of in-trunks and an in-trunk magnetic drum. The subscriber lines in each of the offices are terminated on the switching network thereat and each line is assigned a slot on the surface of the line drum. The line equipment number, the class of service number and directory number of each line are recorded in the slot assigned thereto on the line drum. The out-trunks in each of the offices are terminated on the switching network thereat and each is assigned an individual slot on the out-trunk drum. The equipment number defining the termination location of each out-trunk on the switching network is recorded in the slot assigned thereto on the out-trunk drum. Each "out-trunk" extends to and terminates at an associated "in-trunk" in the other office. Similarly, the in-trunks in each of the offices are terminated in the switching network thereat and each is assigned an individual slot on the in-trunk drum. The equipment number defining the termination location of each in-trunk is recorded in the slot assigned thereto on the in-trunk drum.

As described in the above-cited Malthaner-Vaughan patent, subscriber dialing is detected by directly scanning one conductor of each subscriber line. The first three digits dialed by a calling subscriber are accumulated in the slot assigned thereto on the line drum and these digits are used to select and assign to the calling subscriber's line a slot on the out-trunk drum associated with an idle trunk to the destination designated by the three dialed digits. The establishment of the path from the calling subscriber's line through the switching network via the out-trunk to the terminating office and establishment of the connection in the terminating office to the called subscriber are completed in the manner described in the above Malthaner-Vaughan patent by utilizing the information permanently and temporarily stored on magnetic drums.

The embodiment of the automatic telephone system in which the illustrative embodiment of the present invention is incorporated differs from that disclosed in the cited Malthaner-Vaughan patent. Before proceeding with a general description and a detailed description of the repertory dialing arrangements of the present invention, the differences between the automatic telephone system disclosed in the above cited Malthaner-Vaughan patent and that disclosed hereinafter will be described. It will be understood that the repertory dialing arrangements of the present invention may advantageously be incorporated in the automatic telephone system as disclosed in the cited Malthaner-Vaughan patent and the modifications herein described in this system are not necessary to the functioning of the repertory dialing arrangement of the present invention.

In the automatic telephone system disclosed in the Malthaner-Vaughan patent, considerable amount of magnetic drum memory is provided on a per line basis for the registration of digits dialed by a subscriber. Dialing is detected by directly scanning one conductor of each subscriber line. In the embodiment of the automatic telephone system, described hereinafter, subscriber dialing is assembled on a separate register drum which appears at the trunk side of the switching network. A line scanner is used only to detect the initial "off-hook" signal as a "request for register" and the "on-hook" hangup signal when the call is abandoned or terminated. Accordingly, the line drum in the embodiment disclosed and described hereinafter is utilized solely for the detection of request for service and hangup conditions. In the present embodiment, once a request for service is detected, the subscriber's line will be connected to a dial repeating circuit which transmits dial tone to the calling subscriber and which is scanned by a scanner associated with the register drum to detect the dial pulses of the directory number dialed by the subscriber. The openings and closures of the subscriber's loop are detected and accumulated in a register slot on the register drum in the same manner as the dial pulses were detected and registered in a line slot on the line drum as disclosed in the Malthaner-Vaughan patent. A further modification of the automatic telephone system as disclosed in the Malthaner-Vaughan patent includes the elimination of one trunk drum. In the embodiment of the automatic telephone system disclosed hereinafter both in-trunks and out-trunks are assigned slots on the same trunk drum.

In the subsequent description terminology employed in the cited Malthaner-Vaughan patent and employed generally in the art will be utilized. Specifically, a cell will refer to a single magnetic spot on a magnetic drum in which information may be recorded. Each group of cells which pass under a single magnetic reading-writing head as a magnetic drum rotates, is called a track or channel and each group of cells along a magnetic drum which appear simultaneously under the various heads on the magnetic drum is called a slot.

*Explanation of circuit components and conventions*

In the detailed description of specific illustrative embodiments of circuits employable in the general combination of this invention, certain circuit components of constructions known in the art have been depicted in block schematic form to simplify both the drawing and the description. These components include cathode followers, toggles, inverters, monopulsers, and logic circuits.

The cathode followers employed are all of types known to the art and are identified on the drawing as CF, CFA, CFP, CFB, CFN, CFM, CFK or CFS. Cathode followers CF and CFA may be low power output circuits including one-half of a 2C51 twin-triode. Cathode followers CFP are for higher power loads and may employ one-half of a 5687 twin-triode. CF, CFA and CFP cathode followers have direct current circuit inputs. CFB cathode followers are the same as CFA cathode followers but with alternating current circuit inputs and with a varistor in series with the output terminal poled to permit the passage of negative pulses only, so that a number of such output terminals can be connected in parallel and a negative pulse produced on the output by any of the paralleled CFB cathode followers. A CFN circuit is a compound cathode follower, may employ both halves of a 5687 twin-triode, and may advantageous be of the type described in an application Serial No. 322,991 of W. A. Malthaner, filed November 28, 1952. CFN cathode followers are used to repeat negative pulses to loads requiring high power while maintaining a sharp leading edge in the negative voltage transition. CFM circuits are advantageously low power output cathode followers including clipper diodes, such as varistors, in their input circuit and are advantageously employed with the match circuits. CFK circuits may be cathode followers with the cathode returned to a positive bias so that if the cathode follower is cut off completely, a positive bias will appear on the output lead. A CFS cathode follower circuit is one which is normally nonconducting and when rendered conducting allows conduction of a heavy current. It is employed with the cathode connected to a grid of a monopulser tube so that the timing capacitor in the monopulser circuit may be rapidly discharged to reset the monopulser circuit.

The toggles may advantageously be conventional double stability twin-triode vacuum tube stages. In the drawing these toggles are represented by blocks designated "T" in which one of the upper corners is shown shaded; in accordance with a convention employed in the drawing, the shaded corner indicates the plate of the normally conducting triode of the toggle. Further the plate output leads are depicted as emanating only from the top of the block schematics representing toggles while the tripping and resetting signals are applied to the sides of the block schematics.

The inverters employed in the circuit description are of two types, identified on the drawing as I and $I_B$. Inverters I may advantageously be conventional single triode inverters, with direct current coupled inputs. Inverters $I_B$ may advantageously be conventional single triode inverters normally biased to cut-off and with the input alternating-current-coupled through a capacitor.

The monopulsers are single stability twin-triode circuits in which a negative pulse extinguishes the conduction in the conducting triode and causes conduction to occur in the normally non-conducting triode for some period of time, determined by the constants of the monopulser circuit, after which time the monopulser will automatically reset itself to its normal state. The conventions used for the toggle block schematics are also used for the monopulser schematics wherein the shaded corner indicates the plate of the normally conducting triode of the monopulser with the plate output leads depicted as emanating from the top of the schematic monopulser block and with tripping signals applied to the side of the block. The different kinds of monopulsers employed in the various circuits to be described differ only in the length of time the monopulser is on; these different monopulsers include those designated in the drawing MPA, which remain on about six microseconds; MPB, which remain on about 100 microseconds but which are advantageously reset by a positive pulse after about five slots of the drum have been read; and monopulsers MPC which remain on for periods of one or two revolutions of the drum.

The logic circuits employed include AND and OR circuits, which may comprise diodes, such as vacuum tubes, varistors, or oxide rectifiers, connected together so as to allow passage of a positive or negative signal voltage only when that potential appears on all the input leads to the circuit or when that potential appears on any one input lead, as is known in the art.

The magnetic drums and associated magnetic heads and reading-writing amplifiers utilized in the embodiment of the present invention described hereinafter may advantageously be of the type utilized in the cited Malthaner-Vaughan patent.

In the illustrative embodiment of the present invention, the reading, writing, checking and resetting of information are synchronized so that all marks present in a slot of a magnetic drum are read simultaneously, so that all marks to be written in a slot on a magnetic drum are written at an exact point within the slot after previous enablement by a functional circuit, so that the registration of information read from a drum slot may be checked at a fixed time after being read, and so that a reset of registers occurs only during the interval when information is being neither read nor written. This is attained by employing synchronizing pulses, RS for read sync, WS for write sync, CKP for check sync and RS–SY for reset sync obtained from synchronizing circuits of the type disclosed in the above-cited Malthaner-Vaughan patent. The relative phasing and polarity of these various synchronizing pulses are shown in Fig. 45.

In the description which follows, reference will be made to "positive signal voltage," "negative signal voltage," "positive signal pulse" and "negative signal pulse." In the illustrative embodiment of the present invention a "positive signal voltage" may, for example, be a potential level of the order of +150 volts and a "negative signal voltage" may, for example, be a potential level of the order of +75 volts. Similarly, a "positive signal pulse" may, for example, be a positive 75 volt pulse from a +75 voltage level and a "negative signal pulse" may, for example, be a negative 75 volt pulse from a +150 volt level.

It is to be understood that this invention is not to be considered as limited to the particular circuit, particular circuit components or voltages employed in the specific illusrative embodiments described or discussed above. The type of circuits employed and the votlage conditions and circuit conventions utilized have been described solely to facilitate an understanding of the description and the drawing.

*General description*

Referring now to the drawing, the operation of one specific illustrative embodiment of the repertory dialing arrangements of the present invention will be described in a general way with respect to the greatly simplified block diagram schematic shown in Fig. 1.

The blocks shown in light lines in Fig. 1 of the drawing correspond to the blocks shown in Fig. 1 of the Malthaner-Vaughan Patent 2,723,311 referred to above and carry the same designation in parentheses. For example, Switching Network (49) corresponds to the Switching Network (49) shown in the block diagram schematic in Fig. 1 of the Malthaner-Vaughan patent. In the discussion which follows, reference will be made to circuits and apparatus disclosed and described in the Malthaner-Vaughan patent. The designation utilized in the Malthaner-Vaughan patent for the particular circuits or apparatus to which reference is made will also be utilized herein but will be included in parentheses. The blocks shown in heavy lines in Fig. 1 represent circuits and apparatus to be disclosed and described in detail hereinafter.

The automatic telephone system shown in Fig. 1 of the drawing includes two offices, Office A and Office B. The circuits and apparatus comprising Office A are shown in block diagram schematic form whereas the circuits and apparatus included in Office B are indicated in the block so labeled. Office A corresponds to the Office A shown in Fig. 1 of the drawing of the cited Malthaner-Vaughan patent and is modified in the manner described hereinbefore. Office B may be advantageously modified in the same manner as Office A or may include the unmodified circuits and apparatus utilized in Office B of the cited Malthaner-Vaughan patent.

Line Drum 10 is similar to Line Drum (40) of the cited Malthaner-Vaughan patent except that the associated dial pulse detecting and accumulating circuits have been relocated to Register Drum 20. Each subcriber's line, of which only line (43) is shown in Fig. 1, terminates in Switching Network (49) and is assigned an individual slot on Line Drum 10. Each line such as line (43) is also connected to the terminal of scanner (45) associated with the assigned slot on Line Drum 10. The line equipment number defining the termination of the line in Switching Network (49), the class of service of the line and the directory number of the line are recorded in the slot on Line Drum 10 assigned thereto.

Register Drum 20 comprises a plurality of register slots. Each register slot is associated with a Dial Repeating Circuit 21 by way of Scanner 25. The digits dialed by a subscriber are detected and accumulated in one of these register slots on Register Drum 20. Each Dial Repeating Circuit 21 terminates in Switching Network (49) and the equipment number defining the termination of each Dial Repeating Circuit 21 is recorded on Register Drum 20 in the register slot associated therewith.

Trunk Drum 50 is similar to the two trunk drums, In-trunk drum (41) and Out-trunk drum (42), disclosed in the cited Malthaner-Vaughan patent. Certain slots on Trunk Drum 50 are designated out-trunk slots and other slots are designated in-trunks slots. The out-trunk slots are associated with out-trunks which connect via interoffice trunk conductors to Office B. The in-trunk slots are associated with in-trunks which also connect via interoffice trunk conductors to Office B. Other types of trunks such as information trunks, repair service trunks and operator assistance trunks may also be assigned individual slots on Trunk Drum 50. The Repertory Verification Register Trunks 23 and Repertory Change Register Trunks 22 in the illustrative embodiment of present invention are also assigned individual slots on Trunk Drum 50. The trunk equipment numbers defining the termination in Switching Network (49) of the out-trunks, in-trunks, special trunks such as information trunks, repair service trunks and operator assistance trunks and the Repertory Verification Register Trunks 23 and Repertory Change Register Trunks 22 are recorded in the respective slots on Trunk Drum 50 assigned to these trunks.

Repertory Drum 30 is utilized in the illustrative embodiment of the present invention to store the repertories of the repertory dialing subscribers. Each repertory dialing subscriber is assigned an individual area on Repertory Drum 30. The number of slots included in this area will vary in accordance with the size of the individual subscriber's repertory. The line equipment number of each repertory dialing subscriber's line is recorded on Repertory Drum 30 in the repertory area individually assigned thereto. These numbers are utilized in the illustrative embodiment of the present invention to identify and locate the individual repertories recorded on Repertory Drum 30. In the illustrative embodiment of the present invention, two digit repertory codes are utilized to designate and identify the individual directory numbers in each repertory dialing subscriber's repertory. Each two digit repertory code for each subscriber is recorded in a separate slot in the subscriber's repertory area on Repertory Drum 30 along with the directory number assigned thereto. It is to be understood that the present invention is not limited to the use of a magnetic drum for the recording and storage of the repertories of repertory dialing subscribers. Other types of memory or storage, such as magnetic tapes, magnetic cores, relay registers, or photographic memory can be utilized as well.

Repertory Change Register Trunks 22 which terminate in Switching Network (49) are utilized in the illustrative embodiment of the present invention to permit repertory dialing subscribers to make changes in their individual repertories recorded on Repertory Drum 30. Repertory Verification Register Trunks 23 are utilized in the illustrative embodiment of the present invention in conjunction with voice-recorded Announcement Drum 60 and Repertory Drum 30 to enable repertory dialing subscribers to receive an audible verification of the individual directory numbers recorded in their respective repertories on Repertory Drum 30.

*General description—non-repertory call*

Opens and closures of subscribers' lines connected to Switching Network (49) are detected by line scanner (45) associated with Line Drum 10. When the subscriber on line (43), for example, desires to originate a call and removes the handset from the telephone cradle, the closed loop condition of line (43) will be detected by line scanner (45). When this closed loop condition is detected, timing circuits associated with Line Drum 10 will time the duration of the closed loop condition. If this condition persists for a predetermined number of revolutions of Line Drum 10, these circuits recognize that the closed loop condition is a result of a valid request for service from a calling subscriber. The detection of the request for service by these circuits causes an idle register slot on Register Drum 20 to be selected. When an idle register slot on Register Drum 20 is selected, the line equipment number and class of service number of the calling subscriber's line are dispatched from Line Drum 10 and recorded in the selected register slot on Register Drum 20. As soon as an idle register slot is selected on Register Drum 20 and the line equipment number and class of service number of the calling subscriber's line are recorded therein, the line equipment number of the calling subscriber's line and the register equipment number of the Dial Repeating Circuit 21 associated with the selected register slot on Register Drum 20 are displatched to Switching Network (49) where these two numbers are utilized by control circuits associated with Switching Network (49) to establish a connection through Switching Network (49) between the calling subscriber's line and the selected Dial Repeating Circuit 21. When this connection has been completed through Switching Network (49), Dial Repeating Circuit 21 will return dial tone to the calling subscriber to indicate that he may dial the directory number of the called party.

The opens and closures of the calling subscriber's line loop resulting from the operation of the subscriber's dial are repeated by a relay in Dial Repeating Circuit 21 and passed through scanner 24 to Register Drum 20. Scanner 24 associated with Register Drum 20 is similar to scanner (45) associated with Line Drum 10. The digits dialed by the subscriber are detected and accumulated in the selected register slot on Register Drum 20 in much the same manner as digits were detected and accumulated on Line Drum (40) in the Malthaner-Vaughan patent referred to hereinbefore. On a normal call, when the calling subscriber has completed dialing, circuits associated with Register Drum 20 will recognize that dialing is completed and will dispatch the register equipment number of the Dial Repeating Circuit 21 associated with the selected register slot on Register Drum 20 to Switching Network (49) along with a signal to the control circuits associated therewith to release the connection between the calling subscriber's line and the Dial Repeating Circuit 21. At the same time, the line equipment number of the calling subscriber's line and the directory number dialed by the calling subscriber will be dispatched from Register Drum 20 to Trunk Drum 50. The first three digits of the directory number dialed by the calling subscriber are utilized to select an idle out-trunk slot on Trunk Drum 50 which is associated with an out-trunk to the office corresponding to the office code represented by first three digits dialed. When an idle out-trunk slot on Trunk Drum 50 has been selected, the line equipment number of the calling subscriber's line and the dialed directory number of the called subscriber's line will be recorded therein. Circuits associated with Trunk Drum 50 will then dispatch the line equipment number of the calling subscriber's line and the trunk equipment number of the selected out-trunk to Switching Network (49) where these two numbers are utilized by control circuits associated therewith to establish a path through Switching Network (49) from the calling subscriber's line to the selected out-trunk. In the manner described in detail in the Malthaner-Vaughan patent referred to hereinbefore, when this network path has been established, interoffice signaling equipment which has been seized by the marks recorded in the selected out-trunk slot on Trunk Drum 50, is connected to the selected out-trunk, and the called subscriber's directory number is dispatched to the called office (Office B as indicated in Fig. 1) where the connection to the called subscriber's line is established.

Returning again to the operation of the circuits as described above, where the origination of a call from a subscriber has been recognized by line scanner (45) and the circuits associated with Line Drum 10 and have been utilized to select an idle register slot on Register Drum 20 and where a connection from the calling subscriber's line and a Dial Repeating Circuit 21 has been established, the operation of the circuits for different types of calls will be described. In the process of detecting and accumulating dial pulses in the selected register slot on Register Drum 20, the completion of dialing may be detected under several different circumstances. If a subscriber dials "0" for an operator, dialing will be completed after the dialing of one digit. If the calling subscriber dials a three digit code, for example "411" for repair service or information, the completion of dialing will be recognized after three digits have been dialed. In either case the operation of the circuits described above is the same. The connection between the calling subscriber's line and the Dial Repeating Circuit 21 through Switching Network (49) is released by dispatching the register equipment number of the Dial Repeating Circuit 21 associated with the selected register slot on Register Drum 20 to Switching Network (49) along with a signal to the control circuits associated therewith to release the connection.

At the same time if a single digit "0" has been dialed, an idle out-trunk slot on Trunk Drum 50 associated with an operator assistance trunk will be selected and the line equipment number of the calling subscriber's line will be dispatched from Register Drum 20 and recorded in the selected idle out-trunk slot on Trunk Drum 50. If a three digit code for information or repair service has been dialed, an idle out-trunk slot on Trunk Drum 50 which is associated respectively with either information trunks or repair service trunks will be selected and the line equipment number of the calling subscriber's line will be dispatched from Register Drum 20 and recorded in the selected out-trunk slot on Trunk Drum 50. The connection from the calling subscriber to an operator for assistance or information and to repair service will be established in the manner described in detail in the Malthaner-Vaughan patent referred to hereinbefore.

*General description—repertory call*

As indicated hereinbefore repertory dialing subscribers may complete connections to parties in their repertories by dialing a two digit repertory code associated with the particular party desired. The circuits described hereinbefore operate in the same manner for the origination of a repertory call as for a non-repertory call. Line scanner (45) and the circuits associated with Line Drum 10 will recognize a request for service and will select an idle register slot on Register Drum 20. The line equipment number and the class of service number of the calling subscriber's line are recorded in the selected register slot and a connection between a Dial Repeating Circuit 21 and the calling subscriber's line through Switching Network (49) is completed as described above. When a repertory dialing subscriber dials a two digit repertory code, the circuits associated with Register Drum 20 will detect an end of dialing after the two digits have been dialed by the subscriber. When the end of dialing is detected, these circuits check the class of service number of the calling subscriber to determine if the subscriber is entitled to repertory dialing service. If it is determined that the calling subscriber is a repertory dialing subscriber, then the fact that only two digits have been dialed gives an indication that the calling subscriber is dialing a repertory code. The circuits associated with Register Drum 20 will release the connection between the calling subscriber's line and the Dial Repeating Circuit 21 associated with the selected register slot on Register Drum 20 in the manner described hereinbefore. Other circuits associated with Register Drum 20 will dispatch the line equipment number of the calling subscriber's line and the two digit repertory code dialed by the subscriber from the selected register slot on Register Drum 20 to circuits associated with Repertory Drum 30. These circuits associated with Repertory Drum 30 will compare the line equipment number of the calling subscriber's line with the line equipment numbers recorded on Repertory Drum 30, and when a match is found an indication is thus given that the calling subscriber's repertory on Repertory Drum 30 has been located. The two digit repertory code dialed by the subscriber is then matched against the two digit codes recorded in the subscriber's repertory area on Repertory Drum 30 until the dialed code is located. The directory number recorded in the same slot on Repertory Drum 30 with the dialed repertory code is then extracted from Repertory Drum 30 and dispatched to Register Drum 20. The originally selected register slot on Register Drum 20 is located and the complete directory number is recorded in the selected register slot on Register Drum 20 just as though the subscriber had dialed the directory number himself. The directory number recorded in the selected register slot on Register Drum 20 is then dispatched to Trunk Drum 50 along with the line equipment number of the calling subscriber's line and a connection to the called office and the called party in that office is established in the same manner as described hereinbefore as though the directory number of the called party had been dialed by the calling subscriber.

*General description—repertory change call*

In the illustrative embodiment of the present invention, repertory dialing subscribers maintain their own repertories on Repertory Drum 30. The repertory dialing subscribers have a two digit repertory code which is reserved for repertory changes. When a repertory dialing subscriber dials this repertory change code (for example 98), it gives an indication to the circuits and apparatus that the calling subscriber desires to make a change in his repertory recorded on Repertory Drum 30. In this case when Register Drum 20 consults Repertory Drum 30 with the special two digit code, instead of returning to Register Drum 20 with a seven digit directory number corresponding to a party in the subscriber's repertory it returns with a special repertory change code which may, for example, be a three digit code such as 998. When this three digit code is recorded in the selected register slot on Register Drum 20, it is then dispatched to Trunk Drum 50, and will cause the selection of a slot associated with an idle Repertory Change Register Trunk 22. The trunk equipment number of the selected Repertory Change Register Trunk 22 and the line equipment number of the calling subscriber's line are then dispatched to Switching Network (49) where these two numbers are utilized by control circuits associated therewith to establish a connection through Switching Network (49) between the calling subscriber's line and the selected Repertory Change Register Trunk 22. When this connection is established, the Repertory Change Register Trunk 22 will return a special dial tone to the calling subscriber to give an indication that he may then proceed to make the desired change in his repertory. The calling subscriber will dial the two digit repertory code for which he desires a change and follow this immediately by the new seven digit directory number which he desires to be associated with the dialed repertory code. The dialed repertory code and the new directory number to be associated therewith are accumulated in Repertory Change Register Trunk 22 and then dispatched to Repertory Drum 30. When all nine digits have been received, registered and dispatched to Repertory Drum 30, Repertory Change Register Trunk 22 then utilizes its own trunk equipment number to locate the slot on Trunk Drum 50 associated therewith. When the associated slot on Trunk Drum 50 is located, the line equipment number of the calling subscriber's line recorded therein is dispatched back to the Repertory Change Register Trunk 22 and the Repertory Change Register Trunk 22 in turn dispatches this line equipment number to Repertory Drum 30. The calling subscriber's repertory area on Repertory Drum 30 is then located in the manner described hereinbefore. When the calling subscriber's repertory area is located on Repertory Drum 30 the slot in which the repertory code for which the subscriber desires a change is then located and the new directory number which the subscriber has just dialed and which was accumulated in the Repertory Change Register Trunk 22 is recorded in the slot associated with the dialed two digit repertory code in place of the previous directory number recorded therein. When this entry has been made in Repertory Drum 30 the Repertory Change Register Trunk 22 will return a new dial tone to the calling subscriber to indicate that subsequent changes may be made if desired. If no additional changes are desired the calling subscriber may hang up and have the connection released.

*General description—repertory verification call*

In the illustrative embodiment of the present invention, repertory dialing subscribers may receive an audible verification of the directory numbers recorded in their respective repertories on Repertory Drum 30. The repertory dialing subscribers have a two digit repertory code which is reserved for repertory verifications. When a repertory dialing subscriber dials this repertory verification code (for example 99) it gives an indication to the circuits and apparatus that the calling subscriber desires to verify an entry in his recorded repertory on Repertory Drum 30. In this case when Register Drum 20 consults Repertory Drum 30 with the special two digit code, instead of returning to Register Drum 20 with a seven digit directory number corresponding to a party in the subscriber's repertory it returns with a special repertory verification code which may, for example, be a three digit code such as 999. When this three digit code is recorded in the selected register slot on Register Drum 20 the information is then taken from the selected register slot on Register Drum 20 to Trunk Drum 50 and will cause the selection of a slot associated with an idle Repertory Verification Register Trunk 23. The trunk number of the selected Repertory Verification Register Trunk 23 and the line equipment number of the calling subscriber's line are dispatched to Switching Network (49) where these two numbers are utilized by control circuits associated therewith to establish a connection through Switching Network (49) between the calling subscriber's line and the selected Repertory Verification Register Trunk 23. When this connection is established the Repertory Verification Register Trunk 23 will return a special dial tone to the calling subscriber to give an indication that he may proceed to make the desired verification in his repertory. The calling subscriber will dial the two digit repertory code for which he desires a verification. This repertory code is registered in the Repertory Verification Register Trunk 23 and the Repertory Verification Register Trunk 23 then utilizes its own trunk equipment number to locate the slot on Trunk Drum 50 associated therewith. When the associated slot on Trunk Drum 50 is located the line equipment number of the calling subscriber's line recorded therein is dispatched to the Repertory Verification Register Trunk 23 and this trunk in turn dispatches this line equipment number along with the dialed repertory code to Repertory Drum 30. The calling subscriber's repertory area on Repertory Drum 30 is then located in the manner described hereinbefore. When the calling subscriber's repertory area is located on Repertory Drum 30 the slot in which the repertory code for which the calling subscriber desires a verification is then located and the directory number found therein is dispatched back to the Repertory Verification Register Trunk 23. This seven digit directory number is then used to control gate circuits associated with Voice-Recorded Announcement Drum 60 so that an audible announcement of the directory number for which the calling subscriber desires verification is transmitted to the subscriber. Voice-Recorded Announcement Drum 60 comprises a plurality of channels. In each of the channels a plurality of audible recordings representing various digits are recorded, for example one channel will have a succession of audible voice recordings of "one," "one," "one," et cetera. Another channel will have a succession of audible voice recordings of "two," "two," "two" recorded and et cetera for all ten digits 0 through 9. After the complete directory number has been audibly transmitted to the calling subscriber, Repertory Verification Register Trunk 23 will return a new dial tone to the calling subscriber to indicate that a subsequent verification may be made if desired. If no subsequent verification is desired by the subscriber, the calling subscriber may hang up and have the connection released.

For all of the types of calls described above, hangup or termination of the call is recognized by the associated circuit either by the scanner or by the trunks, and a hangup indication is sent to the corresponding drum to which the circuits are connected which in turn dispatches the proper disconnect order to Switching Network (49) and erases all of the temporary information stored on the drums with respect to the the particular call terminated.

*Detailed description*

Figure 2A:
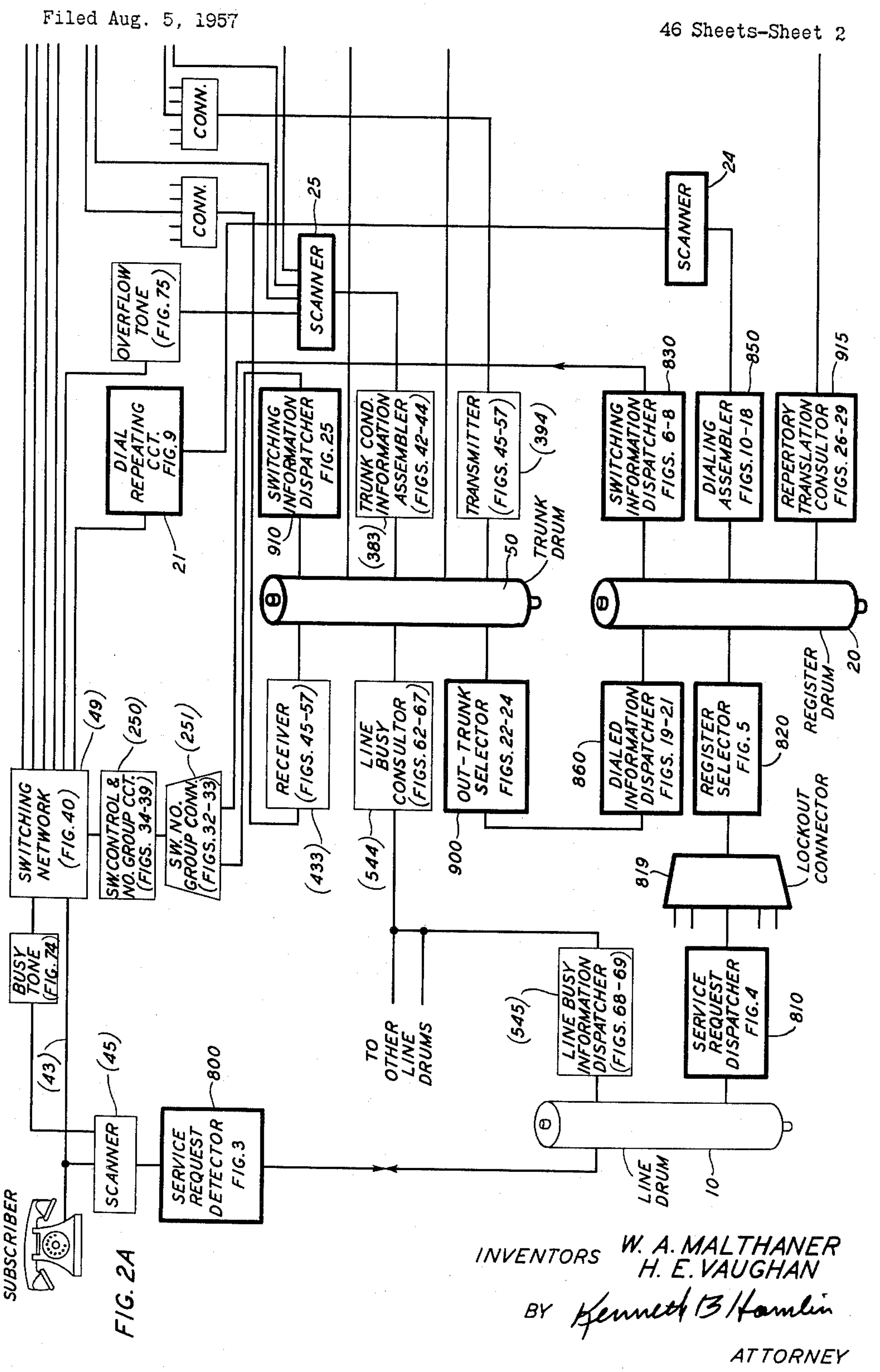
Figs. 2A and 2B are more detailed block diagram schematic representations of the illustrative embodiment of this invention depicted in Fig. 1.
Figure 2B:
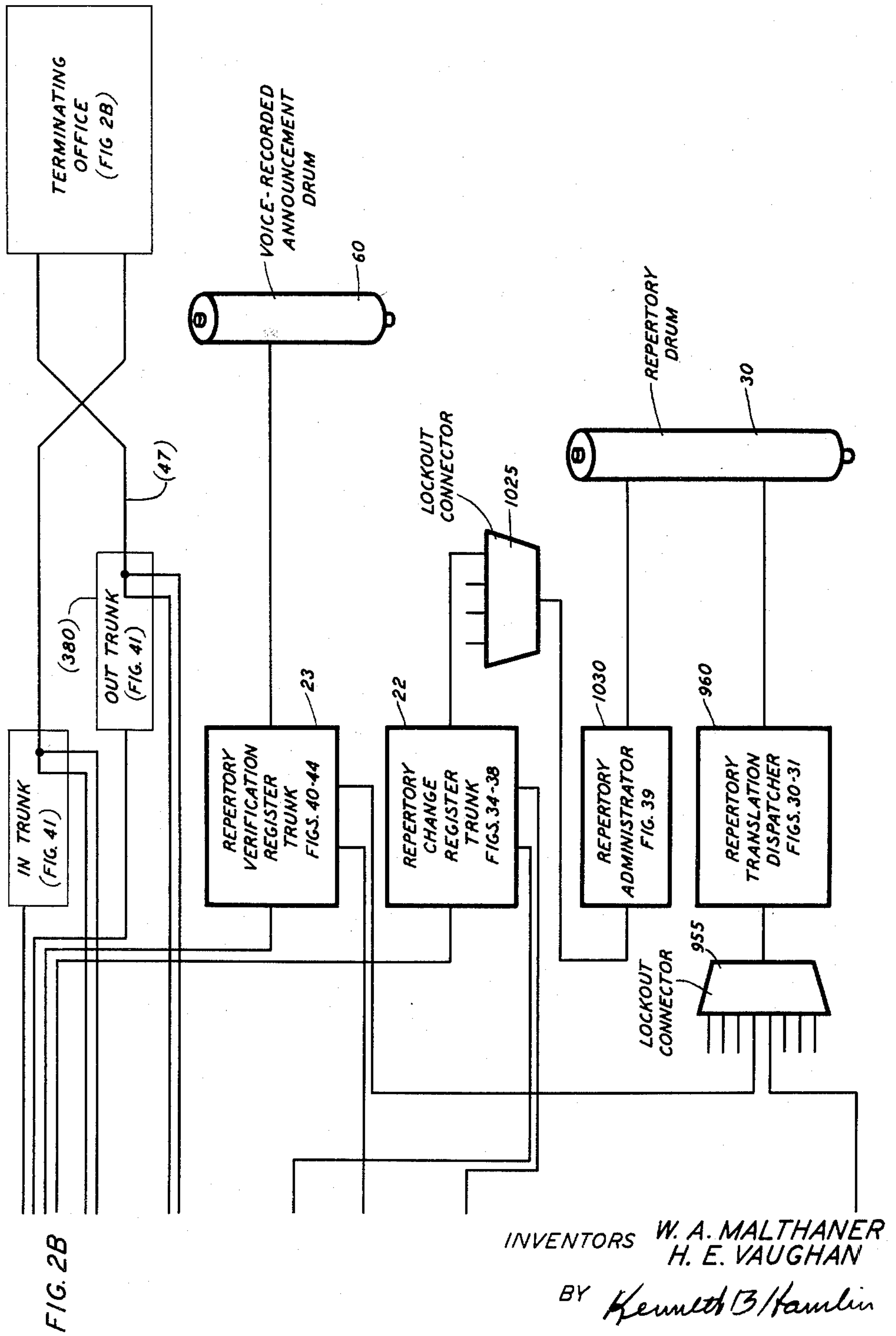

Turning now again to the drawing, the operation of the specific embodiment of the present invention shown in Fig. 1 of the drawings will be described in greater detail with respect to the more detailed block diagram schematic shown in Figs. 2A and 2B. To facilitate an understanding of the operation of the system as a whole, while at the same time describing the operation of the component circuit elements and their cooperation in the combination of the system in accordance with this specific embodiment of the invention, the following description will be of the system as depicted in Figs. 2A and 2B and the component circuits will be described in detail with reference to the other figures as they are met in the operation of the system. In this manner it is believed that one can keep before him during this description, certain of the broad and general aspects of the invention as depicted in the specific embodiment illustrated in Figs 2A and 2B while at the same time considering details of one specific illustrative embodiment.

As in the general description with respect to Fig. 1 of the drawing given hereinbefore, the blocks shown in light lines in Figs. 2A and 2B of the drawing correspond to the blocks shown in Figs. 2A and 2B of the Malthaner-Vaughan Patent 2,723,311 and carry the same designation in parenthesis. In the description which follows reference will be made to circuits and apparatus disclosed and described in detail in the cited Malthaner-Vaughan patent. The designation utilized in the Malthaner-Vaughan patent for the particular circuits or apparatus to which reference is made will also be utilized herein but will be included in parenthesis. The figure numbers in parenthesis within the blocks shown in light lines in Figs. 2A and 2B indicate the figures of the drawing in the Malthaner-Vaughan patent which disclose in detail the respective circuits and apparatus. The blocks shown in heavy lines in Figs. 2A and 2B represent circuits and apparatus not specifically disclosed and described in the cited Malthaner-Vaughan patent and which will be shown and described herein.

*Detailed description—nonrepertory call*

When a subscriber desires to place a call and removes the handset from the telephone cradle, the resulting closed loop condition will be detected by line scanner (45) shown in Fig. 2A. The outputs of line scanner (45) are applied to Service Request Detector 800 which utilizes these signals in conjunction with a timing circuit to recognize service requests and hangup conditions on subscribers' lines. Two course timing channels designated CT1 and CT2 on line drum 10 are utilized with the outputs of the timing circuit to time the duration of the off-hook and on-hook conditions detected by line scanner (45) in order to distinguish a valid service request from momentary switchhook fumbling and to distinguish on-hook conditions of a valid termination or abandonment of a call from momentary closures of a subscriber's line due to dial pulses. When a valid off-hook condition is detected indicating a request for service, Service Request Detector 800 will dispatch a signal to Service Request Dispatcher 810 indicating that a calling subscriber desires to establish a call and that a register on Register Drum 20 is required.

*Service request detector*

Figure 3:
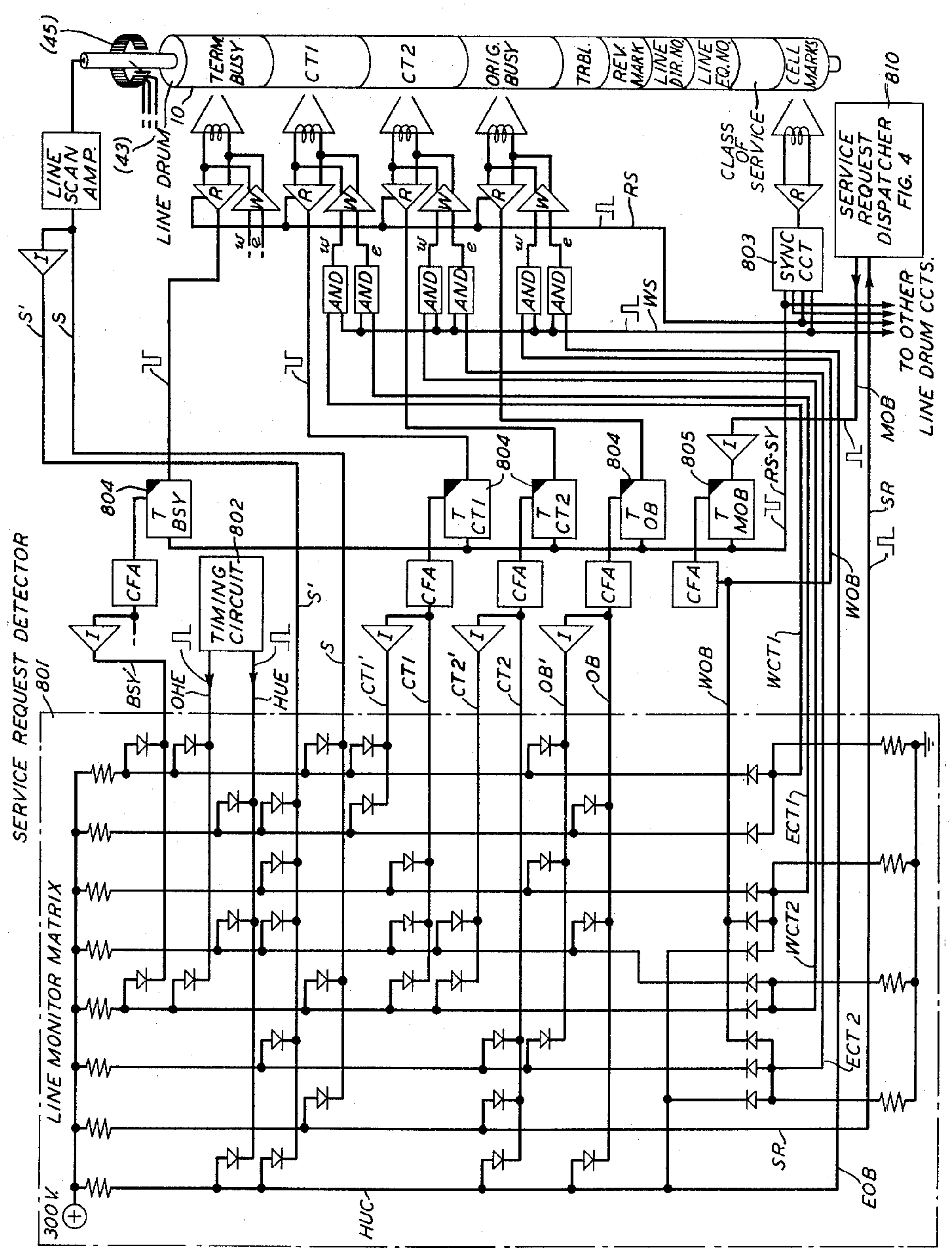
Fig. 3 is a schematic representation of one specific illustrative embodiment of a Service Request Detector that may be employed in the embodiment of Figs. 1 and 2.

One specific illustrative embodiment of a Service Request Detector 800 employable in the combination of this invention is depicted in Fig. 3 to which reference will now be made for a more detailed description of the circuit.

As described above the signal outputs from line scanner (45) and the signal outputs from two course timing channels CT1 and CT2 on Line Drum 10 are utilized in conjunction with a timing circuit to recognize service requests and hangup conditions on subscriber's lines. In addition signals from the outputs of the TERM BUSY and the ORIG BUSY channels on Line Drum 10 are utilized in these determinations.

Timing circuit 802 shown in Fig. 3 is utilized to time the length of off-hook and on-hook conditions of the subscribers' lines in order to distinguish off-hook conditions of a valid service request from momentary switchhook fumbling and to distinguish on-hook conditions of a valid termination or abandonment of a call from momentary closures of a subscriber's line. Timing circuit 802 supplies two positive enabling signal voltages, one over the off-hook enablement lead OHE and one over the hangup enablement lead HUE. Timing circuit 802 is synchronized with the rotation of Line Drum 10 and provides an off-hook enablement signal voltage over the OHE lead which lasts for one complete revolution of Line Drum 10. This is followed by an absence of a signal voltage on the OHE lead for approximately 0.15 second. After this interval another off-hook enablement signal voltage is supplied over the OHE lead which lasts for one complete revolution of Line Drum 10. Similarly, timing circuit 802 provides a hangup enablement signal voltage over the HUE lead for one complete revolution of Line Drum 10. This is followed by the absence of any signal voltage on the HUE lead for approximately 0.5 second. After this interval another hangup enablement signal voltage is supplied over the HUE lead which lasts for one complete revolution of Line Drum 10. The timing circuit utilized in the above-cited Malthaner-Vaughan patent and disclosed in detail in a patent of W. A. Malthaner, 2,782,256, granted February 19, 1957, may advantageously be utilized for timing circuit 802 shown in Fig. 3.

The signal voltage outputs from the reading amplifiers associated with Line Drum 10 are regenerated by electron tube toggle circuits 804 which are reset by reset sync pulses on the RS–SY lead from the sync circuit 803 after each possible writing interval. The function of these toggles is to extend or "remember" what has just been read until the necessary writing actions have taken place. Two polarities of signal from the various channels of Line Drum 10 are supplied to line monitor matrix 801. For example, if a mark is read in the CT1 channel a positive signal pulse will be applied to line monitor matrix 801 over the CT1 lead and a negative signal pulse will be applied to the line monitor matrix 801 over the CT1' lead. If no mark is read in the CT1 channel a positive signal voltage will be applied to the line monitor matrix 801 over the CT1' lead and a negative signal voltage will be applied over the CT1 lead. In a similar fashion signal pulses and signal voltages are applied to line monitor matrix 801 over the CT2', CT2, OB', OB, and BSY' leads. The BSY' lead is connected to the output of the TERM BUSY channel in Line Drum 10 and a positive signal voltage will be applied over the BSY' lead if there is no mark present in this channel, and a negative signal pulse will be applied if a mark is present. The TERM BUSY channel on Line Drum 10 is the terminating busy channel and marks are written in this channel by a Line Busy Information Dispatcher (545) when calls are terminated at the lines on Line Drum 10 in the manner described in the above-cited Malthaner-Vaughan patent.

Marks are written in and read from the various channels on Line Drum 10 by magnetic heads and associated reading and writing amplifiers in the manner described in the above-cited Malthaner-Vaughan patent. The reading and writing operations are synchronized by synchronizing pulses over the read sync lead RS and the write sync lead WS from synchronizing circuit 803.

Two polarities of signal from the output of scanner (45) through the associated scanner amplifier and inverter are applied to the inputs of line monitor matrix 801 over the S and S' leads. If a subscriber's loop is closed when his line is scanned by scanner (45), a positive signal pulse will be applied over the S lead to line monitor matrix 801. If a subscriber's loop is open when his line is scanned by scanner (45), a positive signal voltage will be applied to line monitor matrix 801 over the S' lead.

Line monitor matrix 801 comprises eight logical AND circuits and four logical OR circuits which combine the signals on the various input leads to provide signals on the six output leads designated EOB, SR, ECT2, WCT2, ECT1, WCT1. On the first revolution of Line Drum 10 after a subscriber lifts the handset of his telephone, when the slot on Line Drum 10 associated with the calling subscriber's line is under the read-write heads, the output of scanner (45) through the associated scanner amplifier will cause a positive signal pulse to be applied over the S lead to line monitor matrix 801. This signal will be combined in an AND circuit with signals on the BSY' lead, CT1' lead, and OB' lead and with a signal on the off-hook enablement lead OHE, when this enablement signal occurs, to apply a signal over the WCT1 lead to cause a mark to be written in the CT1 channel of Line Drum 10. Lead BSY' will have a signal voltage applied thereto unless the particular line has been marked busy on a terminating call. The CT1' lead will have a signal voltage applied to it because of the absence of a mark in the CT1 channel. Similarly, the OB' lead will have a signal voltage applied to it because of an absence of a mark in the ORIG BUSY channel. Assuming that the calling subscriber is legitimately placing a request for service, then on the second occurrence of the off-hook enabling signal from timing circuit 802 the following input leads to line monitor matrix 801 will have signal voltages or signal pulses applied thereto: BSY', OHE, S, CT1 and CT2'. The signals on these leads will be combined in an AND circuit in line monitor matrix 801 and will apply a signal over the WCT2 lead to cause a mark to be written in the CT2 channel on Line Drum 10. On the next revolution of Line Drum 10 with the calling subscriber's telephone still off-hook and still requesting service, the signals on the S lead and the CT2 lead are combined in an AND circuit in line monitor matrix 801 and cause a signal to be applied over the SR lead to Register Request Dispatcher 810. A signal on the SR lead to the Register Request Dispatcher 810 indicates to this circuit that a subscriber's line is requesting service. It will be noted that the signal applied over the SR lead did not occur until the subscriber's line was in an off-hook condition for two successive off-hook enablement signals. Therefore the line monitor matrix 801 can distinguish valid service requests from momentary switchhook fumbling.

In the manner described hereinafter, Register Request Dispatcher 810 will read the line equipment number and class of service number of the line requesting service and will dispatch these through Register Selector 820 to Register Drum 20. When this operation has been completed and in the manner to be described hereinafter, Register Request Dispatcher 810 will provide a signal over the mark originating busy lead MOB. The signal on the MOB lead passes through an inverter and triggers the MOB toggle 805. When MOB toggle 805 is triggered a signal is applied through a cathode follower to the WOB lead. The signal on the WOB lead will cause a mark to be written in the ORIG BUSY channel on Line Drum 10 to indicate that the subscriber's line is busy on an originating call. The signal on the WOB lead is also applied through two OR circuits in line monitor matrix 801 to cause signals to be applied over the ECT1 and ECT2 leads which will erase the marks written in the CT1 and CT2 channels, respectively, on Line Drum 10.

When the calling subscriber completes his call and hangs up the handset of his telephone, the on-hook or open condition of the subscriber's line will be detected by scanner (45) when the line is scanned and a positive signal voltage will be applied over the S' lead to line monitor matrix 801. When the signal on the S' lead occurs during the interval that the hangup enablement signal from timing circuit 802 is being supplied to line monitor matrix 801, the signal on the HUE lead and the S' lead will be combined with the signals on the CT1' lead and the OB lead in an AND circuit in line monitor matrix 801 to apply a signal over the WCT1 lead to cause a "1" to be written in the CT1 channel of Line Drum 10. CT1' lead will have a signal applied to it because a mark will not be read in the CT1 channel. The OB lead will have a signal applied to it because of the mark read in the ORIG BUSY channel of Line Drum 10. If the hangup condition persists until the second occurrence of the hangup enablement signal from timing circuit 802, the signals on the HUE lead, the S' lead, the CT1 lead, the CT2' lead, and the OB lead will be combined in an AND circuit in line monitor matrix 801 to apply a signal over the WCT2 lead to cause a mark to be written in the CT2 channel on Line Drum 10. On the next revolution of Line Drum 10 after marks have been written in the CT1 and CT2 channels following the termination of a call on a subscriber's line, the signals on the HUE lead, the S' lead, the CT2 lead, and the OB lead will be combined in an AND circuit in line monitor matrix 801 to apply a signal to the hangup complete lead HUC which in turn applies signals to the EOB lead, through an OR circuit to the ECT2 lead and through an OR circuit to the ECT1 lead. The signals on the EOB, the ECT2, and the ECT1 leads will cause the erasure of the marks in the CT1, CT2 and ORIG BUSY channels on Line Drum 10, thus erasing all of the marks in the slot on Line Drum 10 associated with the subscriber who has terminated the call. The slot on Line Drum 10 is thereby clear and is ready to be utilized by the line monitor matrix 801 to detect a subsequent service request from the subscriber.

Returning again to Fig. 2A, when Service Request Detector 800 detects a valid request for service as described above, it signals the Service Request Dispatcher 810 indicating that a calling subscriber desires to establish a call and that a register slot on Register Drum 20 is required. In response to this signal, Service Request Dispatcher 810 will read the line equipment number and class of service number of the calling subscriber's line which are recorded in the slot on Line Drum 10 assigned thereto. These two numbers are registered in temporary registers in Service Request Dispatcher 810. After the registration of this information the information is checked to determine its plausibility, and if found to be plausible Service Request Dispatcher 810 will transmit a signal to Lockout Connector 819 which in turn will establish a connection between Service Request Dispatcher 810 and Register Selector 820.

Only one Register Selector 820 and one Register Drum 20 are provided in the illustrative embodiment of the present invention while several line drums such as Line Drum 10 and their associated Service Request Dispatchers 810 may be provided. Accordingly, Lockout Connector 819 is provided to establish a connection from a particular Service Request Dispatcher 810 to the Register Selector 820, and in establishing this connection will prevent the establishment of a similar connection from other Service Request Dispatchers 810 until Register Selector 820 is idle.

After checking the line equipment number and class of service number read from the slot on Line Drum 10, Service Request Dispatcher 810 transmits a signal back to Service Request Detector 800 which results in the placing of a mark in the originating busy channel on Line Drum 10 as described hereinbefore. The line equipment number and class of service number of the calling subscriber's line are dispatched through Lockout Connector 819 to Register Selector 820 and will be recorded by the latter circuit in the selected idle register slot on Register Drum 20.

*Service request dispatcher*

Figure 4:
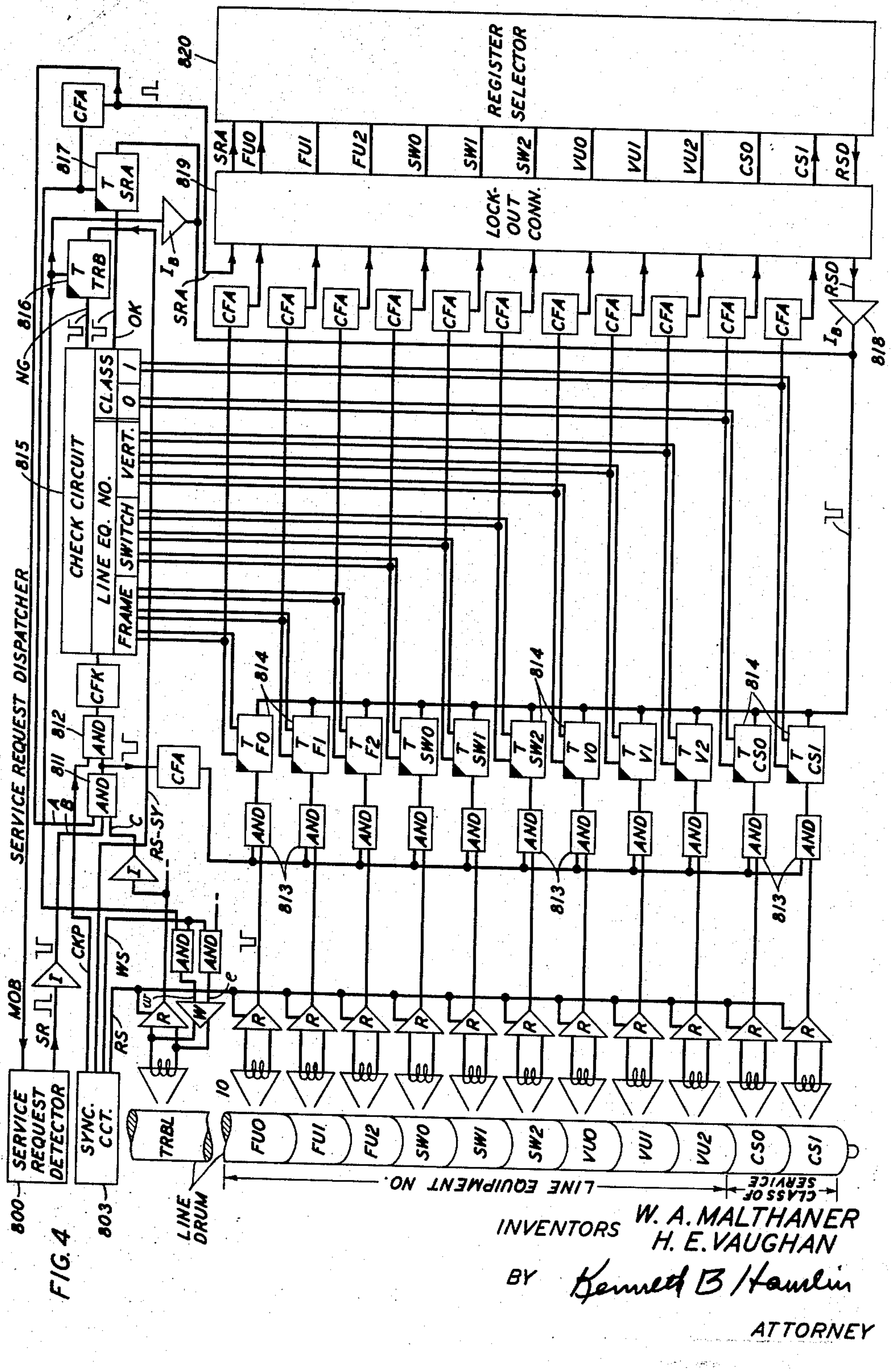
Fig. 4 is a schematic representation of one specific illustrative embodiment of a Service Request Dispatcher that may be employed in the embodiment of Figs. 1 and 2.

One specific illustrative embodiment of a Service Request Dispatcher 810 employable in the combination of this invention is depicted in Fig. 4 to which reference will now be made for a more detailed description of the circuit.

As indicated hereinbefore, the class of service number defining the type of service to which each subscriber is entitled and the line equipment number defining the location of each subscriber's line in Switching Network (49) are recorded in an individual slot assigned thereto on Line Drum 10. The line equipment number comprises a frame number, a switch number and a vertical number defining the location of the termination of a subscriber's line in Switching Network (49) and is permanently assigned to the subscriber's line when the office is set up or when the subscriber subscribes for service. This number is therefore advantageously permanently recorded in the LEN line equipment number channels on Line Drum 10. Similarly, the class of service number is permanently recorded in the CS class of service channels on Line Drum 10. No writing amplifiers are required as the line equipment numbers and class of service numbers are not erased or written as long as the subscriber is connected to the office. On the occasion of the writing of the line equipment number and the class of service number in the slots on Line Drum 10, when the subscribers are first connected into the office, the reading heads associated with the chanels may be employed.

As described hereinbefore, when Service Request Detector 800 detects a request for service from a calling subscriber, a positive signal pulse is applied over the SR lead to Service Request Dispatcher 810. This positive signal pulse is applied through an inverter which in turn applies a negative signal pulse to input B of AND gate 811. Input C of AND gate 811 is obtained from the output of the trouble channel TRBL on Line Drum 10. If there is no mark recorded in the trouble channel the output of the reading amplifier will be a positive signal voltage and this signal is inverted in an inverter which applies a negative signal voltage to input C of AND gate 811. Similarly, input A of AND gate 811 is obtained from an output of the SRA select register toggle 817. When SRA toggle 817 is normal, a negative signal voltage is applied to input A of AND gate 811. Thus with the two enabling voltages applied to inputs A and C of AND gate 811, AND gate 811 will be actuated when a signal is applied to the SR lead.

The actuation of AND gate 811 applies a negative signal pulse through a cathode follower to an input of each of the AND gates 813 associated with the line equipment number channels LEN and class of service channels CS on Line Drum 10. Therefore the marks written in these channels are read and registered in associated toggles 814. The output of toggles 814 is applied to inputs of check circuit 815. The information applied to the inputs of check circuit 815 from toggles 814 is advantageously recorded and registered in a checkable code, e.g., an X-out-of-N code and accordingly a check is made of each item of information registered in the toggles 814. Check circuit 815 may advantageously be of the type described in Patent 2,675,538 of W. A. Malthaner and D. H. Ring, issued April 13, 1954, or in Patent 2,675,539 of J. H. McGuigan, issued April 13, 1954.

The output of AND gate 811 is also applied to an input of AND gate 812 and when a negative signal pulse is applied over the check sync lead CKP from synchronizing circuit 803, AND gate 812 will be actuated to in turn control check circuit 815 to effect a check of the line equipment number and class of service number recorded in the toggles 814. If the information recorded in toggles 814 is in a plausible and proper form, check circuit 815 will apply a negative signal pulse from its output over the OK lead. If the information is in an improper or implausible form, check circuit 815 will apply a negative signal pulse from its output over the NG lead.

If the information recorded in toggles 814 is proper and a negative signal pulse is applied over the OK lead from the output of check circuit 815, the SRA toggle 817 will be triggered. The triggering of this toggle will cause a positive signal voltage to be applied to the A input of AND gate 811. This is an inhibiting voltage and will prevent AND gate 811 from being actuated by a subsequent signal over the SR lead in response to a request for service from another subscriber's line.

The output of SRA toggle 817 is also applied through a cathode follower to the MOB lead which extends back to Service Request Detector 800, and in the manner described hereinbefore causes a mark to be written in the originating busy channel ORIG BUSY on Line Drum 10 to mark the slot on Line Drum 10 as being busy on an originating call. The positive-going signal from the output of the SRA toggle 817 is also applied over the SRA lead through Lockout Connector 819 to Register Selector 820.

Lockout Connector 819 allows Register Selector 820 to be utilized by more than one Service Request Dispatcher 810. This lockout function may be accomplished in any of several ways known in the art. One circuit that may be employed utilizes a group of gates for each item of information to be dispatched from the Service Request Dispatcher 810, i.e., a group of gates for the line equipment number, a group of gates for the class of service number and gates for the SRA and RSD leads. The control signal applied to Lockout Connector 819 to cause it to enable the gates associated with a particular Service Request Dispatcher 810 is the positive signal pulse on the SRA lead. The gates associated with only one Register Request Dispatcher 810 will be enabled regardless of the number of control signals applied, as is known in lockout circuits. When Lockout Connector 819 is actuated by the positive signal pulse on the SRA lead, it completes a circuit for the transmission of a positive signal pulse on the SRA lead to Register Selector 820 and operates gate circuits for transmission of signal voltages over the FUO, FU1, FU2, SW0, SW1, SW2, VU0, VU1, VU2, CS0, CS1 and RSD leads between Service Request Dispatcher 810 and Register Selector 820.

In a manner to be described hereinafter the positive signal pulse on SRA lead to Register Selector 820 will cause this circuit to select an idle register slot on Register Drum 20. When this selection has been completed, Register Selector 820 will cause the line equipment number and class of service number of the calling subscriber's line as dispatched through Lockout Connector 819 to be written in the selected register slot on Register Drum 20. Register Selector 820 will then transmit a positive signal pulse over the RSD lead through Lockout Connector 819 and inverter 818 of the $I_B$ type to reset the SRA toggle 817 and to reset the toggles 814 associated with the line equipment channels LEN and the class of service channels CS on Line Drum 10.

In the event that check circuit 815 determined that the information registered in toggles 814 was improper, a negative signal pulse from the output of check circuit 815 is applied over the NG lead to trigger TRB trouble toggle 816. The output of the TRB toggle 816 applies a positive signal pulse to an input of the AND gate connected to the writing amplifier associated with the trouble channel TRBL on Line Drum 10. When this AND gate is actuated by the occurrence of the write sync pulse from sync circuit 803, a mark will be written in the trouble channel of this line slot on Line Drum 10 to indicate that the line equipment number or class of service number information on Line Drum 10 was improperly read when the request for service signal on the SR lead was received. The output of TRB toggle 816 also applies a positive signal pulse through an inverter of the $I_B$ type which inverts this to a negative signal pulse. This negative signal pulse is applied to the resetting input of toggles 814 thus resetting these toggles. The TRB toggle 817 is reset by the reset sync pulse on the RS–SY lead from sync circuit 803. The mark written in the TRBL channel on Line Drum 10 will be subsequently read by trouble indicator circuits of the type utilized in the above-cited Malthaner-Vaughan patent to bring in an alarm to indicate a trouble condition.

Returning once again to Fig. 2A, when Service Request Dispatcher 810 dispatches the line equipment number and class of service number of a calling subscriber's line through Lockout Connector 819 to Register Selector 820, Register Selector 820 must then in response to the select-register order signal transmitted simultaneously from Service Request Dispatcher 810 locate an idle register slot on Register Drum 20. Register Drum 20 contains a plurality of register slots, each being associated with a Dial Repeating Circuit 21. The register equipment number defining the termination of each Dial Repeating Circuit 21 is recorded in the associated register slot on register drum 20. In addition to register slots, Register Drum 20 contains a plurality of overflow slots which are utilized in case an overflow condition exists as will be described.

When Register Selector 820 is notified that a calling subscriber desires to originate a call, Register Selector 820 will select an idle register slot on register drum. When an idle register slot is located, Register Selector 820 will record the line equipment number and class of service number obtained from the Service Request Dispatcher 810 in the selected register slot. At the same time Register Selector 820 will write a mark in a SLOT BUSY channel in the selected register slot on Register Drum 20 to prevent selection of this register slot on a subsequent call by the Register Selector and to give an indication to Switching Information Dispatcher 830 to dispatch the line equipment number of the calling subscriber's line and the register equipment number of the Dial Repeating Circuit 21 associated with the selected register slot through Switching Number Group Connector (251) to Switching Control and Number Group Circuit (250) which will establish a connection between the calling subscriber's line and the selected Dial Repeating Circuit 21 through Switching Network (49).

If no idle register slot is available on Register Drum 20, Register Selector 820 will select an overflow slot and a mark will be written in the SOT select out-trunk channel on Register Drum 20 in the selected overflow slot. A mark in the SOT channel prevents Switching Information Dispatcher 830 from establishing a connection between the calling subscriber's line and a Dial Repeating Circuit 21, and notifies Dialed Information Dispatcher 860 to proceed with the selection of a slot on Trunk Drum 50 associated with an overflow tone circuit. In this manner overflow tone will be returned to the calling subscriber to indicate that circuits are not available to receive the digits of his call.

*Register selector*

Figure 5:
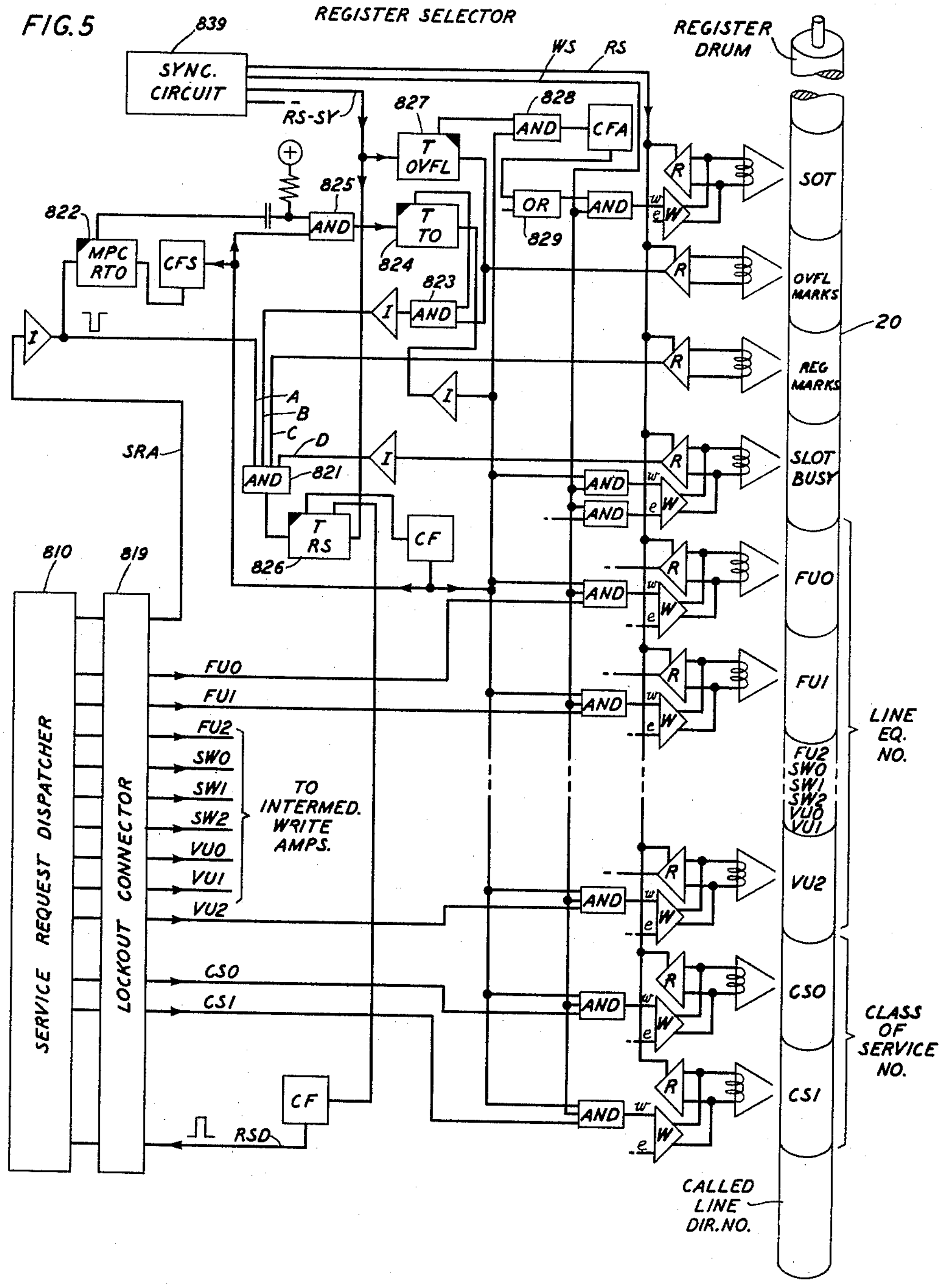
Fig. 5 is a schematic representation of one specific illustrative embodiment of a Register Selector that may be employed in the embodiment of Figs. 1 and 2.

One specific illustrative embodiment of a Register Selector 820 employable in the combination of this invention is depicted in Fig. 5 to which reference will now be made for a more detailed description of the circuit.

As indicated hereinbefore, the class of service number and the line equipment number of a calling subscriber's line is dispatched from Line Drum 10 through Service Request Dispatcher 810 and Lockout Connector 819 to Register Selector 820 when a request for service is detected. The positive signal pulse on the SRA lead from the Service Request Dispatcher 810 through Lockout Connector 819 is inverted in an inverter and applied to input A of AND gate 821 as shown in Fig. 5. This negative signal pulse is also applied to the input of the RTO register timeout monopulser 822. The RTO monopulser 822 is of the MPC type which will remain operated for one complete revolution of Register Drum 20 after it is triggered by the negative signal pulse from the output of the inverter in the SRA lead. During the interval that RTO monopulser 822 is in its operated condition, the Register Selector 820 will attempt to locate and select an idle register slot on Register Drum 20 in which to record the line equipment number and class of service number of the calling subscriber's line. As will be described, if during the interval that the RTO monopulser 822 is operated, an idle register slot is not located, Register Selector 820 will then attempt to locate an idle register slot designated "overflow."

Returning to AND gate 821, it will be noted that input B of this AND gate is connected to an inverter in the output of AND gate 823. The lower input of AND gate 823 is connected to the reading amplifier associated with the overflow marks channel OVFL MARKS on Register Drum 20. The upper input of AND gate 823 is connected to the output of TO time-out toggle 824. When TO toggle 824 is normal a negative signal voltage is applied to the upper input of AND gate 823. When a mark is read in the overflow marks channel OVFL MARKS a negative signal pulse will therefore cause the actuation of AND gate 823 if TO toggle 824 is normal. The negative signal pulse out of AND gate 823 is inverted and a positive signal pulse is applied to input B of AND gate 821 thus preventing its actuation. When a register slot is read which has no mark in the OVFL MARKS channel a positive signal voltage is applied to the lower input of AND gate 823 and prevents its actuation. The positive voltage at the output of unactivated AND gate 823 is inverted in an inverter and a negative enabling signal voltage is applied to input B of AND gate 821. Input C of AND gate 821 is connected to the output of the reading amplifier associated with the register marks channel REG MARKS on Register Drum 20. The presence of a mark in a slot in the REG MARKS channel gives an indication that the particular slot is a register slot. Accordingly, Register Drum 20 may include not only register slots but other slots such as trunk slots if desired. The presence of a mark in the REG MARKS channel in Register Drum 20 will cause a negative signal pulse to be applied to input C of AND gate 821. Input D of AND gate 821 is connected through an inverter to the output of the reading amplifier associated with the slot busy channel SLOT BUSY on Register Drum 20. Therefore, if an idle register slot is located, there will be an absence of a mark in the SLOT BUSY channel and the positive potential from the output of the reading amplifier associated therewith will be inverted and a negative signal voltage will be applied to input D of AND gate 821. Accordingly, when a signal is applied over the SRA lead to Register Selector 820, AND gate 821 therein will be actuated if a register slot is located which is idle and which contains no overflow mark. The actuation of AND gate 821 will apply a signal to the RS register select toggle 826 to trigger this toggle. The actuation of the RS toggle 826 will apply a positive signal pulse through a cathode follower to an input of each of the AND gates associated with the LEN line equipment number channels and CS class of service number channels on Register Drum 20. This signal pulse on these AND gates, when in coincidence with the write sync pulse on the WS write sync lead from sync circuit 839, will cause the line equipment number and class of service number or dispatched over the FU0, FU1, FU2, SW0, SW1, SW2, VU0, VU1, VU2, CS0 and CS1 leads from Service Request dispatcher 810 through Lockout Connector 819 to be written in the selected slot on Register Drum 20. The positive signal pulse from the output of RS toggle 826 is also applied to an AND gate connected to the writing amplifier associated with the slot busy channel SLOT BUSY on Register Drum 20 to cause a mark to be written in this channel. This mark in the SLOT BUSY channel signifies that the selected register slot is busy and prevents it from being seized for another call and, as will be described in detail hereinafter, the mark in the SLOT BUSY channel also signals the Switching Information Dispatcher 830 to proceed with the establishment of a connection between the calling subscriber's line and the Dial Repeating Circuit 21 associated with the selected register slot on Register Drum 20.

The positive signal pulse from the output of RS toggle 826 is also applied through a CF cathode follower and a CFS follower to the resetting input of RTO monopulser 822 thus forcing this monopulser to be reset prior to the end of its normal operate interval. After the writing interval the RS toggle 826 will be reset by the reset sync pulse over the RS–SY lead from the sync circuit 839 and the resetting of the RS toggle 826 will cause a positive signal pulse to be applied through a cathode follower to the RSD lead which extends through Lockout Connector 819 to Register Request Dispatcher 810. In the manner described hereinbefore the positive signal pulse on the RSD lead will cause the resetting of the circuit in Register Request Dispatcher 810.

If during the interval that RTO monopulser 822 is in its operated condition, an idle register slot is not located on Register Drum 20, Register Selector 820 will then proceed to locate an idle overflow register slot. When RTO monopulser 822 releases after its normal interval it will apply a negative signal pulse to the upper input of AND gate 825. The lower input of AND gate 825 will be negative because the RS toggle 826 is normal and a negative signal voltage will be applied from its left-hand output through a cathode follower to the lower input of AND gate 825. The actuation of AND gate 825 in turn applies a triggering pulse to TO timeout toggle 824. The operation of TO toggle 824 in response to this signal applies a positive signal voltage from its output to the upper input of AND gate 823. This positive voltage insures that input B of AND gate 821 will be enabled for both overflow and regular register slots. Register Drum 20 continues to rotate and Register Selector 820 will select the first idle register slot, either overflow or regular, to pass under the magnetic heads on Register Drum 20.

The negative signal voltage from the output of the OVFL MARKS channel on Register Drum 20 is also applied to the OVFL overflow toggle 827. The operation of this toggle causes a positive signal voltage to be applied to the upper input of AND gate 828. When AND gate 821 is actuated in the manner described hereinbefore, RS toggle 826 will be actuated as described before and will apply a positive signal voltage pulse to enable the AND gates connected to the writing amplifiers associated with the LEN line equipment number channels, the CS class of service number channels, and the SLOT BUSY channel on Register Drum 20. In addition, this positive signal pulse is also applied to the lower input of AND gate 828. AND gate 828 will therefore be actuated and will apply a positive signal through a cathode follower and OR gate 829 to the AND gate connected to the writing amplifier associated with the select out-trunk channel SOT on Register Drum 20. In this manner a mark is written in the SOT select-out trunk channel on Register Drum 20 which, as will be described in detail hereinafter, notifies the Dialed Information Dispatcher 860 to proceed with the selection of an out-trunk on Trunk Drum 50 connected to an overflow-tone circuit. The placing of a mark in the SOT channel prevents Switching Information Dispatcher 830 from establishing a connection between the calling subscriber's line and a Dial Repeating Circuit 21. The positive signal pulse from the output of RS toggle 826 is also applied through an inverter to the resetting input of TO toggle 823 thus resetting this toggle to normal. The OVFL toggle 827 and the RS toggle 826 are reset to normal by the rest sync pulse on the RS–SY lead from sync circuit 839.

It will therefore be observed that if Register Selector 820 fails to find an idle register during the first revolution of Register Drum 20 it will then attempt to locate an overflow register slot or a recently idled regular register slot on the next revolution of Register Drum 20. If an overflow register slot is selected, there is no necessity for permitting the calling subscriber to dial as there are no facilities available on the Register Drum 20 for accumulating the called subscriber's directory number, and therefore a mark is written in the SOT channel to tell the Dialed Information Dispatcher 860 to immediately select a slot on Trunk Drum 50 associated with an overflow-tone trunk so that overflow tone will be returned to the calling subscriber. In this event the Switching Information Dispatcher 830 will not establish a connection between the calling subscriber's line and a Dial Repeating Circuit 21.

As indicated above, Switching Information Dispatcher 830 as shown in Fig. 2A performs two functions in the illustrative embodiment of the present invention, that being to transmit the line equipment number of a calling subscriber's line and the register equipment number of the Dial Repeating Circuit 21 associated with the selected register slot on Register Drum 20 to the Switching Control and Number Group Circuit (250) through Switching Number Group Connector (251) so that a connection may be established between the calling subscriber's line and the Dial Repeating Circuit 21. After the completion of dialing by the calling subscriber as will be described hereinafter, or after the termination or abandonment of a call by the calling subscriber, Switching Information Dispatcher 830 will dispatch the register equipment number of the Dial Repeating Circuit 21 associated with the selected register slot on Register Drum 20 to the Switching Control and Number Group Circuit (250) along with a signal to have the established connection between the calling subscriber's line and the selected Dial Repeating Circuit 21 disconnected. After the completion of dialing by a calling subscriber has been detected and after the release of an established connection through Switching Network (49) has been effected, Switching Information Dispatcher will cause a mark to be written in a SOT select out-trunk channel of the register slot on Register Drum 20 to indicate to Dialed Information Dispatcher 860 to proceed with the selection of an out-trunk to the dialed office in the manner to be described.

*Switching information dispatcher (register)*

One specific illustrative embodiment of a Switching Information Dispatcher 830 employable in the combination of this invention is depicted in Figs. 6 through 8 when arranged as shown in Fig. 46 to which reference will now be made for a more detailed description of the circuit. This circuit is similar to the Switching Information Dispatcher-Out shown in Figs. 26 through 31 of the Malthaner-Vaughan patent referred to hereinbefore.

As described above, after the line equipment number and class of service number have been recorded in a selected idle register slot on Register Drum 20, Switching Information Dispatcher 830 dispatches the line equipment number of the calling subscriber's line and the register equipment number of the Dial Repeating Circuit 21 associated with the selected register slot on Register Drum 20 through Switching Number Group Connector (251) to Switching Control and Number Group Circuit (250). These two numbers are utilized by the Switching Control and Number Group Circuit (250) to establish a path through Switching Network (49) between the calling subscriber's line and the selected Dial Repeating Circuit 21. After completion of dialing or if a hangup condition is detected, Switching Information Dispatcher 830 also dispatches the register equipment number to the Switching Number Group Connector (251) which in turn controls the disconnection of a previously established path between a calling subscriber's line and a Dial Repeating Circuit 21.

As indicated hereinbefore, when Register Selector 820 has selected an idle register slot on Register Drum 20 and has recorded the line equipment number and class of service number of the calling subscriber's line in the selected register slot, a mark is also recorded in the SLOT BUSY channel on Register Drum 20. This mark in the SLOT BUSY channel is a signal to the Switching Information Dispatcher 830 that the required equipment numbers should be dispatched through the Switching Number Group Connector (251) to the Switching Control and Number Group Circuit (250). If Switching Information Dispatcher 830 is idle, the ES toggle (280) and the DS toggle (305) shown in Fig. 8 will be in their normal unoperated condition and will apply negative signal voltages over the ES and DS leads, respectively, to inputs A and B of AND gate 831 shown in Fig. 6. Input C of AND gate 831 will have a negative signal pulse applied thereto if there is no mark in the connection blocked channel CONN BLKD or in the trouble channel TRBL on Register Drum 20. The absence of a mark in these two channels will cause positive signal voltages to be applied through an OR gate, an inverter and a cathode follower to input C of AND gate 831. Input D of AND gate 831 is connected to the output of the register marks channel REG MARKS and will have a negative signal pulse applied thereto when register slots on Register Drum 20 are being read. Input E of AND gate 831 is connected through an inverter to an output of the switching network informed channel SW NET INF. The absence of a mark in the switching network informed channel indicates that the switching network has not yet been informed of the equipment numbers required to establish a connection.

The actuation of AND gate 831 as described applies a negative signal pulse to input A of AND gate (254) shown in Fig. 8. If there is a mark present in the slot busy channel SLOT BUSY, and if there is an absence of a mark in the select out-trunk channel SOT and an absence of a mark in the switching network connected channel SW NET CONN in the register slot on Register Drum 20, AND gate 832 shown in Fig. 6 will be actuated. The actuation of AND gate 932 will apply a negative signal pulse to input B of AND gate (254).

The actuation of AND gate (254) produces a pulse (255) in the output of cathode follower (256). Pulse (255) enables the line equipment number gates (258) shown in Fig. 7 so that read pulses in the LEN line equipment number cells cause the line equipment number toggles (259) shown in Fig. 7 to operate. In this manner the line equipment number recorded in the selected slot on Register Drum 20 is recorded in the associated line equipment number toggles (259).

The pulse (255) from the output of cathode follower (256) also enables the ES AND gate (261) shown in Fig. 8. Pulse (255) also passes through OR gate (262) shown in Fig. 6 and a cathode follower (263) over lead EG to enable the register equipment number gates (264) shown in Fig. 7. The read pulses from the register equipment number REN cells thus cause the operation of the register equipment number toggles (265) shown in Fig. 7. In this manner the register equipment number of the Dial Repeating Circuit 21 associated with selected register slot on Register Drum 20 is recorded in the associated register equipment number toggles (265) shown in Fig. 8.

The signal pulse out of cathode follower (263) shown in Fig. 6 also enables DS AND gate (268) shown in Fig. 8. A very short time after the line equipment number and register equipment number toggles operate, a check pulse from the synchronized train of pulses on the CKP lead from sync circuit 839 shown in Fig. 7 passes through both the ES AND gate (261) and DS AND gate (268) to the check circuits (270) and (271) which are advantageously of the type referred to hereinbefore. If the registration contained in the register equipment number toggles (265) and the line equipment number toggles (259) is plausible, an OK pulse occurs on the output of each check circuit. These pulses combine in an AND gate (273) to produce a pulse (274) which passes through an OR circuit (275) to cause the operation of an OK monopulser (276). The pulse (278) from OK monopulser (276) which may be a six microsecond pulse is passed through the OK cathode follower shown in Fig. 6 and provides an enabling input to AND gates 834 and 833.

The pulse (255) out of cathode follower (256) also causes the operation of the ES toggle (280) shown in Fig. 8. The operation of ES toggle (280) causes a positive potential to be applied over the ES lead to input A of AND gate 831. This potential is a disabling potential and indicates to subsequent register slots on Register Drum 20 that Switching Information Dispatcher 830 is busy. The positive signal pulse on the ES lead is also applied to the Switching Number Group Connector (251) along with the positive signal voltages resulting from the operation of the register equipment number toggles (265) and the line equipment number toggles (259).

These potentials thereby transmit the register equipment number and the line equipment number to the Switching Number Group Connector (251) along with the signal on the ES lead to enable this circuit to control the establishment of a connection between the calling subscriber's line and the Dial Repeating Circuit 21 associated with the selected register slot on Register Drum 20.

The positive potential on the ES lead is also applied to the lower input of AND gate 833 shown in Fig. 6. As indicated above, the upper input of AND gate 833 was enabled when the OK monopulser (276) operated indicating that the register equipment number and the line equipment number checked OK. The actuation of AND gate 833 in turn causes a mark to be written in the switching network informed channel SW NET INF on Register Drum 20. This mark gives an indication that Switching Network (49) has been informed of the register equipment number and line equipment number for the desired connection.

When the connection is established through Switching Network (49) by Switching Control and Number Group Circuit (250), an OK signal (282) is returned on lead (283) as shown in Fig. 7. This signal is applied through OR gate (295) shown in Fig. 8 to cause the operation of RST reset monopulser (285). When reset monopulser (285) returns to normal after approximately six cell intervals, all the register toggles (259) and (265) shown in Fig. 7 and ES toggle (280) shown in Fig. 8 are reset and the circuit is ready to serve another call.

If an idle path through Switching Network (49) between the calling subscriber's line and the selected Dial Repeating Circuit 21 cannot be found, a block signal BLK is returned to Switching Information Dispatcher 830 from the Switching Number Group Connector (251) over lead (287). This signal causes the operation of the BLK toggle (288) shown in Fig. 7. In the meantime, a match is sought between the register equipment number registered in toggles (265) and the register equipment number read from Register Drum 20 by match circuit (290) shown in Fig. 7. When a match occurs the resulting match pulse (291) passes through an AND gate (292) which is enabled by the operation of the BLK toggle (288) and operates the BLK monopulser (293) seen in Fig. 8. The operation of the BLK monopulser (293) in turn causes a mark to be written in the connection blocked channel CONN BLKD on Register Drum 20. The pulse from AND gate (292) also passes through OR gate (295) shown in Fig. 8 and causes the operation of the RST monopulser (285) which as described hereinbefore causes the resetting of the register toggles (259) and (265) shown in Fig. 7 and ES toggle (280) shown in Fig. 8.

If the data as initially registered in the line equipment number and register equipment number toggles (259) and (265) respectively is implausible, an NG signal out of either check circuit (271) or (270) passes through an OR gate (297) shown in Fig. 8 and causes the operation of CL monopulser (296). A positive pulse (300) from CL monopulser (296) causes a mark to be written in the trouble channel TRBL on Register Drum 20. When the CL monopulser (296) returns to normal after approximately 6 microseconds, a positive signal from the output of CL monopulser (296) applied through an inverter also resets all the register toggles (259) and (265) shown in Fig. 7 and the ES toggle (280) shown in Fig. 8 and restores the circuit to normal.

After a path between the calling subscriber's line and a Dial Repeating Circuit 21 has been established, Dialing Assembler 850 will cause a mark to be written in the switching network connected channel SW NET CONN and the erasure of the mark in the SW NET INF switching network informed channel on Register Drum 20 in a manner to be described hereinafter. Dialing Assembler 850 then accumulates and counts the dial pulses, as will be described, and records the dialed digits in the selected register slot on Register Drum 20. When the registration of the complete number dialed by the calling subscriber is detected, Dialing Assembler 850 places a mark in the registration complete channel REG'N COMP on Register Drum 20. As will be described in detail hereinafter, if the calling subscriber is entitled to repertory dialing service and has dialed a two digit repertory code, Repertory Translation Consulter 915 will obtain the directory number associated with the dialed repertory code from the calling subscriber's repertory area on Repertory Drum 30 and will record this directory number in selected register slot on Register Drum 20. In this case Repertory Translation Consulter 915 will cause a mark to be written in the REG'N COMP channel of the selected register slot on Register Drum 20. Furthermore, if during the process of dialing the subscriber hangs up and does not complete his dialing this will be detected by Dialing Assembler 850 and a mark will be made in the hangup complete channel HU COMP on Register Drum 20. In either case Switching Information Dispatcher 830 must then proceed to control the disconnection of the established path between the calling subscriber's line and the Dial Repeating Circuit 21 through Switching Network (49). AND gate 831 shown in Fig. 6 will be actuated if Switching Information Dispatcher 830 is not busy and if no marks are present in the CONN BLKD channel or TRBL channel, and a mark is present in the REG MARKS channel.

The actuation of AND gate 831 applies a negative signal pulse to input A of AND gate 836. If there is a mark either in the HU COMP channel or the REG'N COMP channel on Register Drum 20, OR gate 838 will be actuated to apply a negative signal pulse to input B of AND gate 836. Input C of AND gate 836 is connected to the output of the reading amplifier associated with the SW NET CONN channel. This is an indication that a path through Switching Network (49) has been established between a calling subscriber's line and a Dial Repeating Circuit 21. Input D of AND gate 836 is connected through an inverter to the reading amplifier associated with the SRT start repertory translation channel on Register Drum 20. If no mark is present in the SRT channel indicating that a repertory translation is not in progress a negative signal voltage will be applied to input D of AND gate 836 and accordingly this AND gate will be actuated. The actuation of AND gate 836 at this time initiates the necessary action in Switching Information Dispatcher 830 for the disestablishment of the path between the calling subscriber's line and the selected Dial Repeating Circuit 21 by applying a pulse (299) through a cathode follower to operate DS toggle (305) shown in Fig. 8. The operation of DS toggle (305) causes the disablement of AND gate 831 shown in Fig. 6 in the manner described hereinbefore through the disabling positive signal voltage applied to input B thereof over the DS lead. The positive signal voltage applied to the DS lead from the output of DS toggle (305) is also applied to the Switching Number Group Connector (251) to signal that circuit that the established path through Switching Network (49) should be disconnected. The pulse (299) from the output of AND gate 836 is also applied through OR gate (262) and cathode follower (263) over lead EG to enable gates (264) associated with the register equipment number REN channels on Register Drum 20. Enablement of gates (264) shown in Fig. 7 will permit the read pulses from the register equipment number channels to operate the associated register toggles (265).

The negative signal pulse from output of cathode follower (263) is also applied to the lower input of DS AND gate (268) shown in Fig. 8. A very short time after the register equipment number toggles (265) operate, a check pulse CKP from the train of synchronizing pulses on the CKP lead from sync circuit 839 is applied to DS AND gate (268) causing the actuation of this AND gate. The actuation of DS AND gate (268) in turn applies a signal to check circuit (270) to effect a check of the plausibility of the registration of the register equipment number in toggles (265) in the manner described hereinbefore. If the registration is plausible, an OK pulse out of check circuit (270) passes through AND gate (303) which is enabled by the operation of the DS toggle (305). The actuation of AND gate (303) causes a signal pulse to be applied through OR gate (275) to trigger OK monopulser (276). The operation of OK monopulser (276) applies a pulse (278) through an OK cathode follower to the lower input of AND gate 834 shown in Fig. 6. The upper input of AND gate 834 is enabled by the positive signal voltage on the DS lead and the actuation of AND gate 834 applies a signal pulse to the lower input of the AND gate connected to the writing amplifier associated with the SW NET CONN channel on Register Drum 20 to cause the erasure of the mark therein and through an AND gate connected to the writing amplifier associated with the REG'N COMP channel to cause the erasure of a mark found therein. The output of AND gate 834 is also applied to the lower input of AND gate 835 which is enabled by the operation of the RC toggle 837. RC toggle 837 was operated when the mark was read in the REG'N COMP channel. The actuation of AND gate 835 in turn actuates OR gate 829 which is the same OR gate disclosed in Fig. 5 and controls the writing of a mark in the select out-trunk channel SOT on Register Drum 20. The writing of the mark in the SOT channel gives a signal to the Dialed Information Dispatcher 860 to proceed with the selection of an out-trunk to the dialed office in the manner to be described. The RC toggle 837 will be reset by the reset sync pulse on the RS–SY lead from sync circuit 839. The transmittal of the register equipment number and the signal over the DS lead to the Switching Number Group Connector (251) causes the release of the connection between the calling subscriber's line and the Dial Repeating Circuit 21 associated with the selected register slot on Register Drum 20.

When the connection is released Switching Number Group Connector (251) will return pulse (282) over lead (283) in the manner described hereinbefore, to cause the operation of RST monopulser (285). The operation of RST monopulser (285) resets the circuits as described above and Switching Information Dispatcher 830 is now ready to be utilized for another call.

In the event that OR gate 838 shown in Fig. 6 is actuated by the reading of a mark in the HU COMP channel on Register Drum 20 and not by a mark read in the REG'N COMP channel as described above, RC toggle 837 will be normal and accordingly the upper input of AND gate 835 will not be enabled. The disabling voltage applied to the upper input of AND gate 835 will prevent its activation when AND gate 834 is actuated as described above. The disablement of AND gate 835 will prevent the writing of a mark in the SOT select out-trunk channel on Register Drum 20, and the circuits of Switching Information Dispatcher 830 are cleared following the detection of the hangup condition in the same manner as the circuits are cleared following the detection of a registration complete condition. Because a hangup condition has been detected an out-trunk need not be selected and accordingly a mark is not written in the SOT channel on Register Drum 20.

If a hangup condition is detected by Dialing Assembler 850 while a repertory translation is in progress and a mark is written in the HU COMP channel on Register Drum 20, Switching Information Dispatcher 830 will be prevented from releasing the established connection between the calling subscriber's line and the selected Dial Repeating Circuit 21 until after the repertory translation is completed. The presence of a mark in the SRT start repertory translation channel on Register Drum 20 gives an indication to Switching Information Dispatcher 830 that a repertory translation is in progress. The reading of a mark in the SRT channel causes a negative signal voltage to be applied to input D of AND gate 836 which will prevent its actuation when a hangup condition is detected. After the repertory translation is completed the Repertory Translation Consulter 915 will cause the erasure of the mark in the SRT channel as will be described hereinafter, and Switching Information Dispatcher may then proceed to control the release of the connection between the calling subscriber's line and the Dial Repeating Circuit 21 as described above. The above-described disablement of Switching Information Dispatcher 830 while a repertory translation is in progress thus assures that the selected register slot on Register Drum 20 will be available for receiving the digits of a repertory translation so that Repertory Translation Consulter 915 can be cleared of all information prior to the release of all of the circuits when a hangup condition is detected.

Switching Number Group Connector (251), Switching Control and Number Group Circuit (250), and Switching Network (49) shown in block diagram form in Fig. 2A are disclosed and described in detail in the Malthaner-Vaughan patent referred to hereinbefore. The manner in which the Switching Control and Number Group Circuit (250) utilizes the line equipment number of a calling subscriber's line and the equipment number of a Dial Repeating Circuit 21 to establish a connection through Switching Network (49) between the calling subscriber's line and a trunk or register such as Dial Repeating Circuit 21 is described in detail in the Malthaner-Vaughan patent.

As indicated hereinbefore, when a connection has been established between a calling subscriber's line and a selected Dial Repeating Circuit 21, dial tone will be transmitted to the subscriber to indicate that he may commence dialing. The dial pulses are repeated by the Dial Repeating Circuit 21 and the line opens and closures thereof are detected by scanner 24 and passed to Dialing Assembler 850.

*Dial repeating circuit*

One specific illustrative embodiment of a Dial Repeating Circuit 21 employable in the combination of this invention is depicted in Fig. 9 to which reference will now be made for a more detailed description of the circuit.

After a connection has been established through Switching Network (49) between a calling subscriber's line and the Dial Repeating Circuit 21 associated with the selected register slot on Register Drum 20, the L relay 842 in the Dial Repeating Circuit 21 will operate over the subscriber's loop. Dial tone from Dial Tone Generator 840 is applied to transformer 841 and in this manner dial tone transmitted to the calling subscriber. L relay 842 is a dial repeating relay and will follow the opens and closures of the subscriber's loop. When the subscriber's loop is closed L relay 842 will be operated and will apply a negative voltage from the —48 volt supply over lead SC to scanner 24. When the subscriber's loop is open L relay 842 will be released and ground potential will be applied over lead SC to scanner 24. When the segment of scanner 24 connected to the particular Dial Repeating Circuit 21 is scanned during the rotation of Register Drum 20, the negative voltage or the positive voltage (ground potential) applied to lead SC by L relay 842 are transmitted over the SA lead to scanner amplifier 843. A negative voltage on the SA lead resulting from a closed loop condition of the subscriber's line is amplified in the A amplifier and applied to operate the S toggle in scanner amplifier 843. The operation of the S toggle in turn applies a positive signal voltage over the S lead to the Dialing Assembler 850. Similarly, a positive voltage (ground potential) on the SA lead resulting from an open condition of the subscriber's line is applied through the A amplifier to the S toggle which is not actuated in response to this signal, and accordingly the S toggle applies a negative signal voltage over the S lead to Dialing Assembler 850. The S toggle in scanner amplifier 843 is reset after the scanning of each Dial Repeating Circuit 21 by reset sync pulses applied over the RS–SY from the synchronizing circuit 839 associated with Register Drum 20.

Dialing Assembler 850 shown in Fig. 2A accumulates the dial pulses of the digits dialed by a calling subscriber and steers these digits into proper storage channels in the selected register slot on Register Drum 20 assigned to the calling subscriber. Dialing Assembler 850 detects permanent signal and hangup conditions and recognizes the completion of stages in the dialing sequence which require actions by other circuits. When completion of dialing by a calling subscriber is detected, Dialing Assembler 850 places a mark in a REG'N COMP registration complete channel in the selected register slot on Register Drum 20. In response to this mark, Switching Information Dispatcher 830 is seized to carry out its function of effecting the release of the connection through Switching Network (49) between the calling subscriber's line and the selected Dial Repeating Circuit 21 and the writing of a mark in the SOT select out-trunk channel on Register Drum 20 as described hereinbefore.

In the embodiment of the present invention as disclosed herein, the completion of dialing may occur after a single digit 0 (for operator assistance) has been dialed, after a three digit code (for information, long distance, et cetera) has been dialed, or after a seven digit complete number has been dialed. In addition, Dialing Assembler 850 will recognize the completion of dialing after a two digit repertory code has been dialed provided the subscriber dialing the two digit code is entitled to repertory service as indicated by the class of service number recorded in the selected register slot on Register Drum 20. If a two digit repertory code has been dialed by a qualified subscriber, Dialing Assembler 850 will place a mark in the SRT start repertory translation channel on Register Drum 20. For all other conditions, however, the detection of the completion of dialing by Dialing Assembler 850 will result in the placing of a mark in the REG'N COMP channel on Register Drum 20.

*Dialing assembler*

One specific illustrative embodiment of Dialing Assembler 859 employable in the combination of this invention is depicted in Figs. 10 through 18 when arranged as shown in Fig. 47 to which reference will now be made for a more detailed description of the circuit. This circuit is similar to the Dialing Assembler (51) shown in Figs. 3 through 10 of the Malthaner-Vaughan patent referred to hereinbefore.

As described hereinbefore, the request for service by a calling subscriber has been recognized, a register slot on Register Drum 20 has been selected, and a connection has been established through Switching Network (49) from the calling subscriber's line to the Dial Repeating Circuit 21 associated with the selected register slot. Subsequent opens and closures of the subscriber's line by the operation of the dial on his telephone set, are repeated by the relay in Dial Repeating Circuit 21 as described hereinbefore to scanner 24 associated with Register Drum 20. These conditions are then transmitted by scanner 24 to Dialing Assembler 850. When the subscriber dials, the sequences of line closures and openings caused thereby representing the dialed digits are detected and recorded in the DC1 and DC2 channels of the selected register slot on Register Drum 20 shown in Fig. 11 by Dialing Assembler 850. The outputs from these channels, together with the output from scanner 24 and the outputs of various other channels on Register Drum 20, are utilized by Dialing Assembler 850 to interpret and record various time sequences and line conditions in all of the lines scanned. Functionally, Dialing Assembler 850 serves to accumulate the digits dialed by a subscriber assigned to a Dial Repeating Circuit 21, steer these digits to proper storage channels A–, B–, C–, TH–, H–, T–, and U– in the selected register slot on Register Drum 20 shown in Figs. 13 and 15, detect permanent signal and hangup conditions, recognize the completion of stages in the dialing sequence which require actions by other control circuits, and records marks in the selected register slot on Register Drum 20 which will initiate action by other control circuits. Channels DC1 and DC2 on Register Drum 20 shown in Fig. 11 together with the Dialing Assembler 850 provide a record of the scanned condition just previously detected and of the still earlier scanned condition. The DC1 and DC2 channels are the dial pulse control channels, and the information stored in these channels at any time together with the scanned condition of the Dial Repeating Circuit 21 applied over the S and S' leads from scanning amplifier 843 are fed to a dial control matrix 54 shown in Fig. 12. The outputs of dial control matrix 54 control changes in the dial control channels DC1 and DC2 of the selected register slot on Register Drum 20 and also indicate continued line closure conditions, continued line open conditions, and completion of dial pulses.

Figure 17:
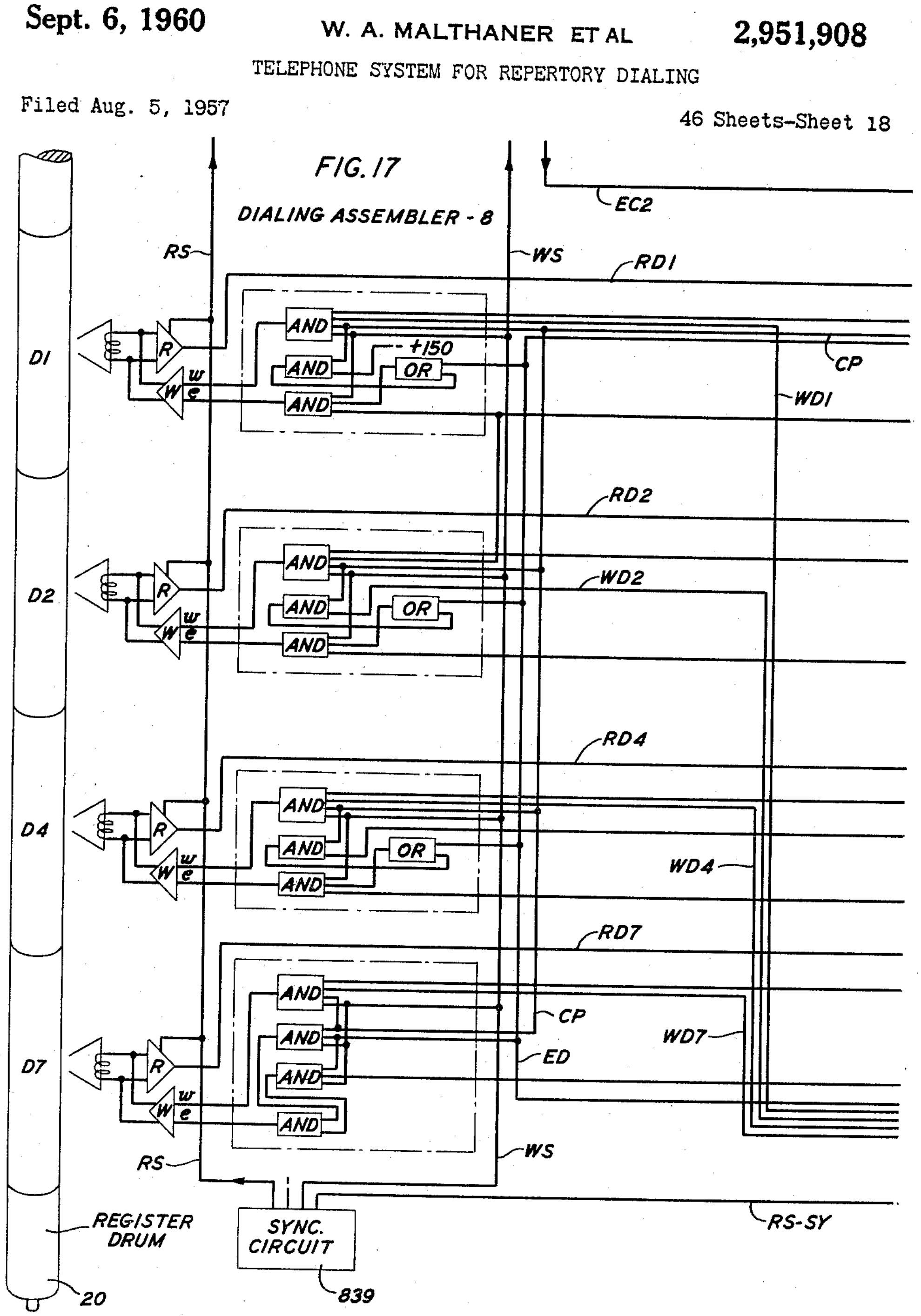

Each completed dial pulse of a train of dial pulses representing a single digit is added to the pulses of the same digit previously accumulated in the four latest digit channels D1, D2, D4 and D7 of the selected register slot on Register Drum 20 shown in Fig. 17. The interdigital interval and continued line closure condition following a train of dial pulses is measured by counting revolutions of Register Drum 20 in a binary code in a group of three timing channels FT1, FT2 and FT4 in the selected register slot on Register Drum 20 shown in Fig. 11. When the interdigital timing channels indicate that an interdigital interval has occurred, the digit value accumulated in the latest digit channels D1, D2, D4 and D7, must be disposed of before the next train of pulses starts.

Figure 13:
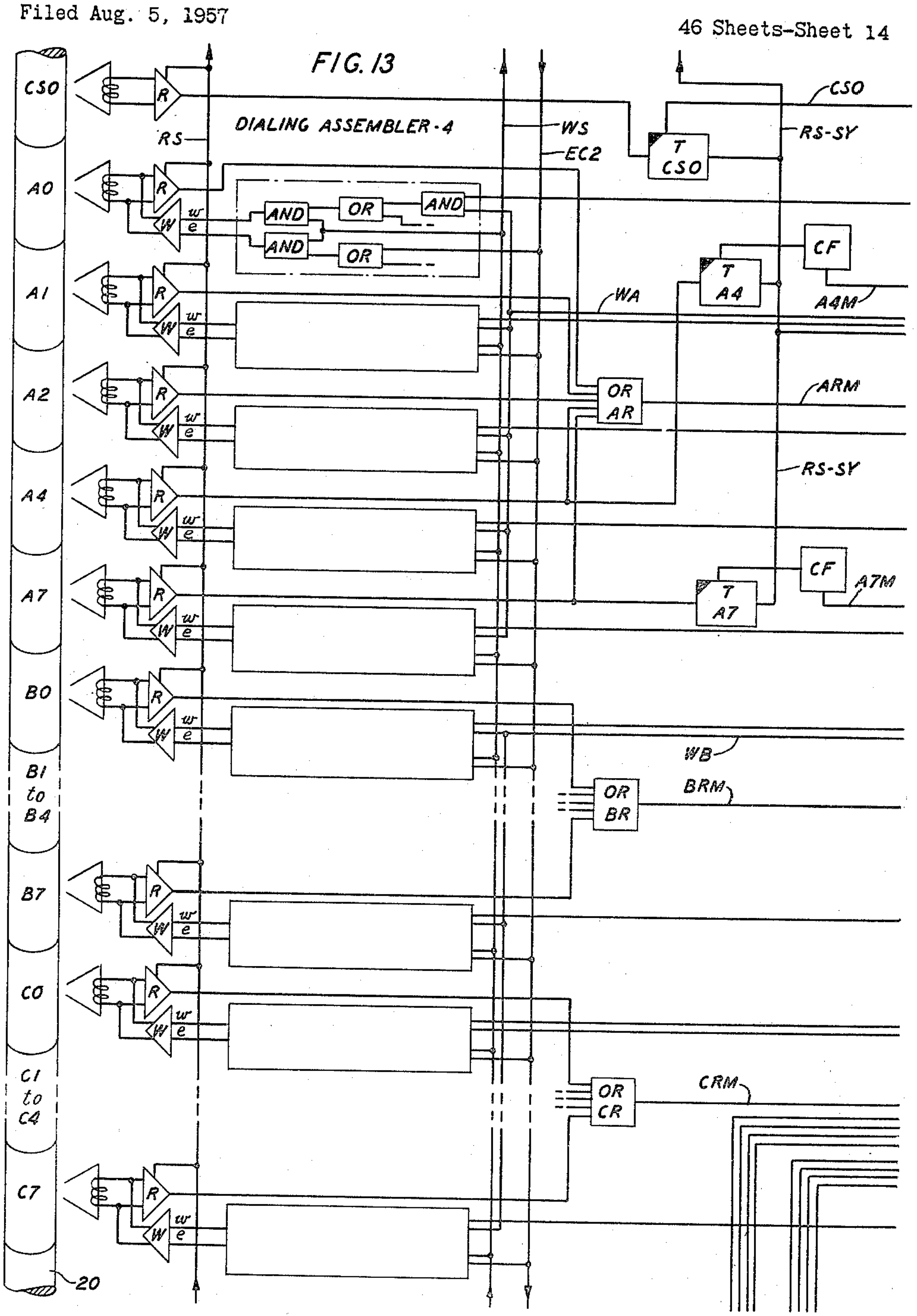

On initiation of a call the latest digit accumulated represents the first digit of the office code of the party called by the calling subscriber, and it is recorded in the A group of channels, A0, A1, A2, A4 and A7 in the selected register slot on Register Drum 20 shown in Fig. 13. When the first digit accumulated by the latest digit channels D1, D2, D4 and D7, is transferred to the A– group channels shown in Fig. 13, the D– channels are erased in preparation for accumulating the pulses of the second digit. The dial pulses of the second digit of the office code are accumulated in the same manner in the D– channels and transferred to the B– group channels B0, B1, B2, B4 and B7 in the selected register slot on Register Drum 20 shown or indicated in Fig. 13. Similarly, the dial pulses of the C digit of the office code, and the thousands, hundreds, tens and units digits of the directory number are accumulated in the D channels, D1, D2, D4 and D7, in the selected register slot on Register Drum 20 and transferred to the corresponding C–, TH–, H–, T–, and U– groups of channels on Register Drum 20 shown in Figs. 13 and 14.

Figure 10:
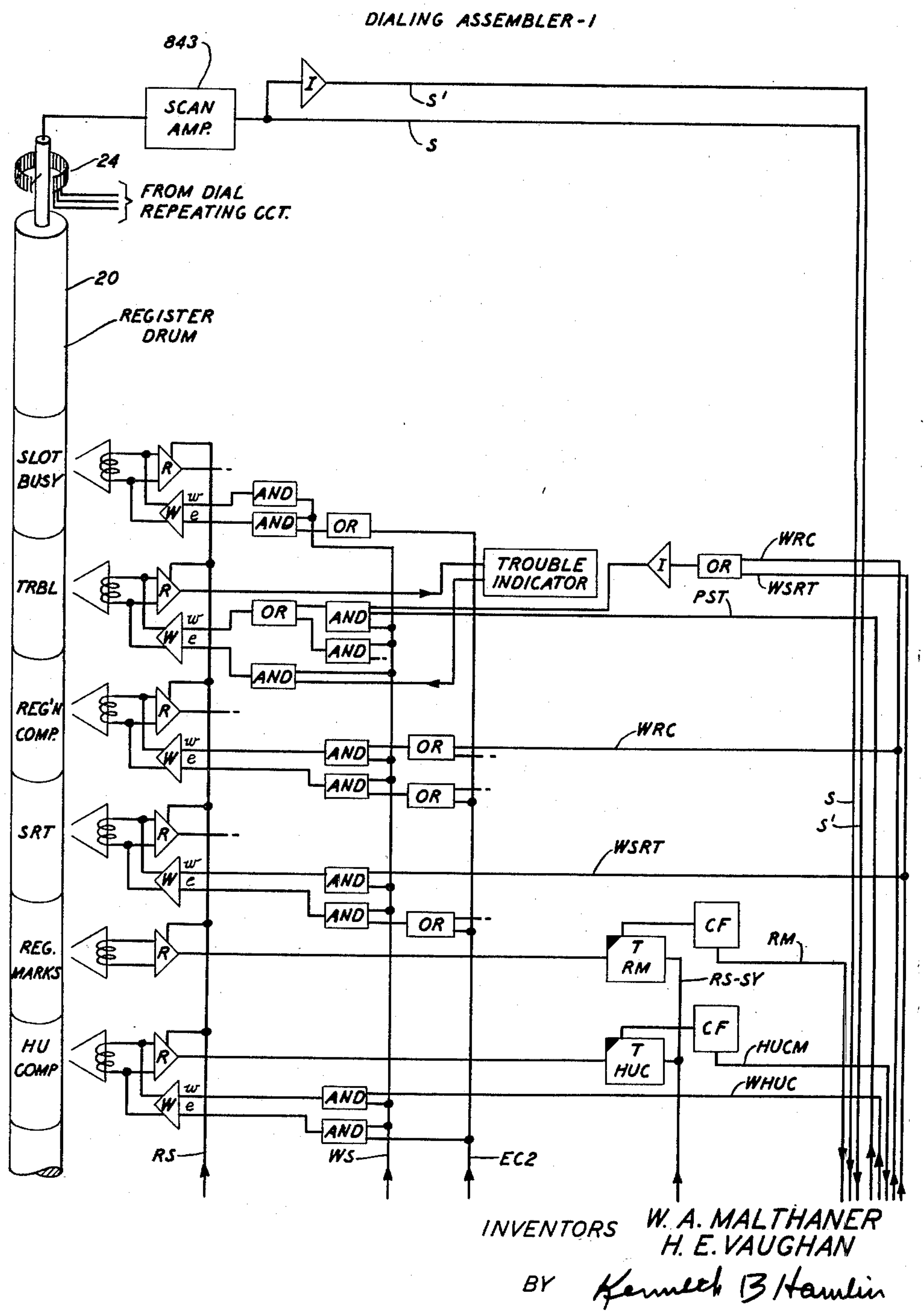

If the first digit dialed by a subscriber is a "0" indicating that the assistance of an operator is desired, a mark is immediately written in the REG'N COMP registration complete channel in the selected register slot on Register Drum 20 shown in Fig. 10 indicating that operations by subsequent control circuits are desired. Initial dialing of a digit "1" is advantageously disregarded by Dialing Assembler 850 in that the D– channels are cleared without further action as this is an erroneous code designation in conventional telephone switching systems which may result from switchhook fumbling.

The completion of dialing is recognized by Dialing Assembler 850 under two other conditions in addition to the dialing of a "zero" or the dialing of a complete seven digit number. If the calling subscriber dials a three digit code such as 211, 311, etc., for information or repair service, et cetera, the completed registration of the three dialed digits in A–, B–, and C– groups of channels in the selected register slot on Register Drum 20, together with a continued line closure condition from dial control matrix (54), will result in timing action in conjunction with the CT1 and CT2 timing channels on Register Drum 20 shown in Fig. 10. When this timing action has been completed, Dialing Assembler 850 will record a mark in the REG'N COMP channel on Register Drum 20 shown in Fig. 10 so that the other control circuits may be called in to establish a desired connection. The other case where less than the complete seven digits are dialed occurs when the calling subscriber is entitled to repertory dialing service and has dialed a two digit repertory code. In this case the completed registration of two digit repertory code in the A– and B– group of channels in the selected register slot on Register Drum 20, together with the proper class of service indication as stored in the selected register slot on Register Drum 20 in the CS0 class of service channel shown in Fig. 13, and a continued line closure condition from dial control matrix (54) will again result in timing action on the CT1 and CT2 channels of Register Drum 20. In this case the completion of the timing action will result in the writing of a mark in the SRT start repertory translation channel in the selected register slot on Register Drum 20 shown in Fig. 10. The mark in SRT channel indicates that sufficient information has been accumulated on Register Drum 20 to make a repertory translation. Accordingly, the successful completion of dialing by a subscriber will result in a mark being written in the selected register slot on Register Drum 20 in either the REG'N COMP registration complete channel or the SRT start repertory translation channel. With a mark in either of these channels on Register Drum 20 other control circuits are alerted to take proper action for the completion of the desired call.

As indicated hereinbefore, the signals from the output of scanner amplifier 843 which indicate the closed and open loop condition of the calling subscriber's line are as follows:

When the subscriber's line loop is closed, a positive signal pulse is applied to the S lead from scanner amplifier 843, and when the subscriber's loop is open, a positive signal pulse is applied to the S' lead from the output of the inverter connected to scanner amplifier 843.

Figure 11:
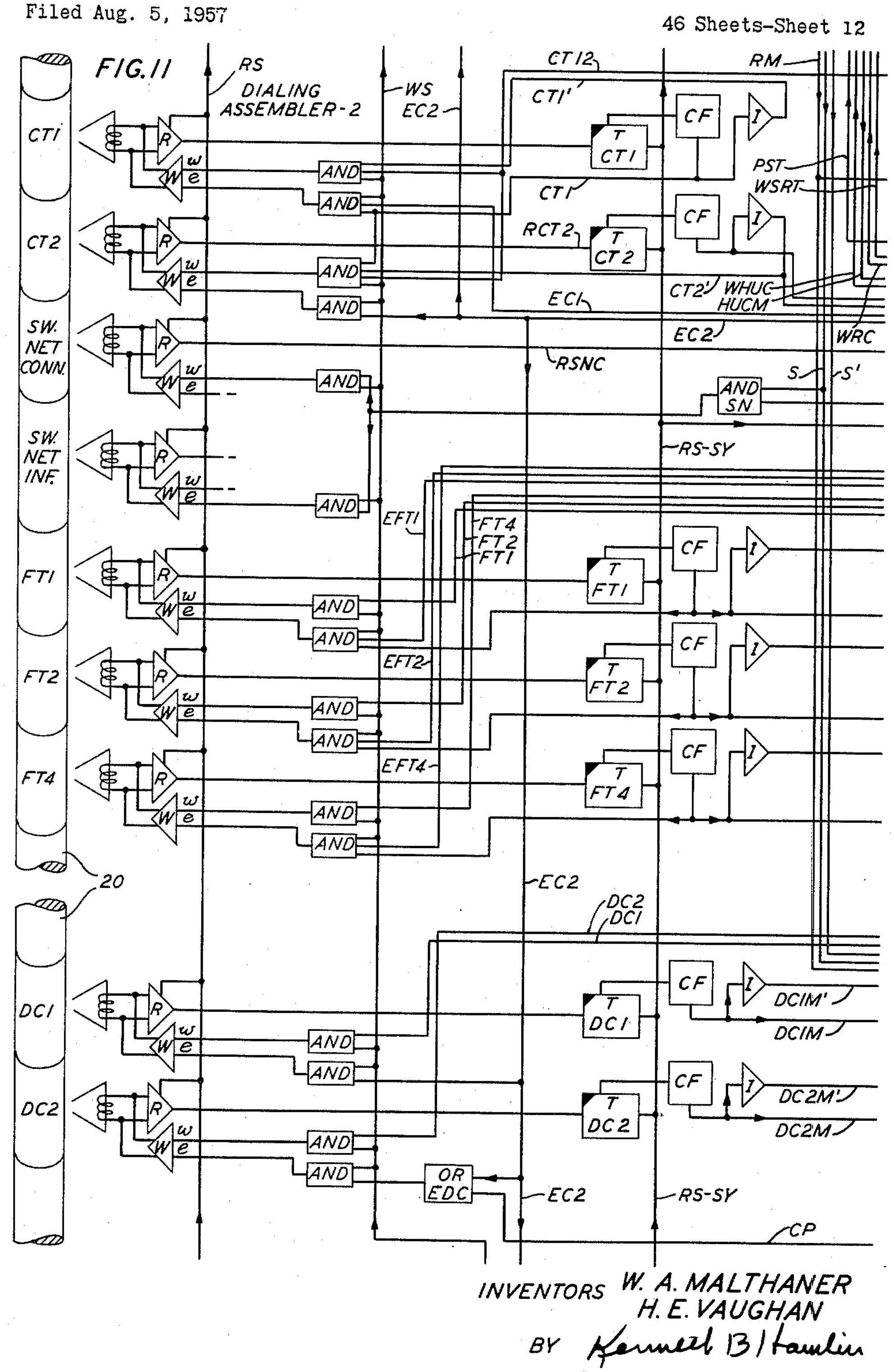

As described above, the outputs of the scanner and the two dial control channels DC1 and DC2 on Register Drum 20 are required to correctly recognize and record the significance of a sequence of line closed and line open conditions. These signal outputs as well as other signal outputs from the reading amplifiers on Register Drum 20 are regenerated at their point of entry into the circuits by electron tube toggle circuits which are reset by synchronizing pulses immediately after each possible writing interval. For example, the output of the read amplifier associated with the DC1 channel on Register Drum 20 shown in Fig. 11 is applied to the input of the corresponding DC1 toggle. If a mark is read in the DC1 channel, the DC1 toggle will be operated and a positive signal pulse will be applied to the DC1M output lead. If no mark is read in the DC1 channel, the DC1 toggle will be normal and a positive signal voltage will be applied to the DC1M' output lead. The DC1 toggle if operated is reset on the next reset sync pulse which occurs on the RS–SY lead from sync circuit 839 shown in Fig. 17. Similarly, the reading amplifiers associated with the other channels on Register Drum 20 are also applied to the input of corresponding toggle circuits. The function of these toggle circuits is to extend or remember what has been read until any necessary writing action has taken place.

When the Switching Information Dispatcher 830 dispatched the necessary information to Switching Network (49) for the establishment of the connection between the calling subscriber's line and the Dial Repeating Circuit 21 associated with the selected register slot on Register Drum 20, this circuit caused a mark to be written in the switching network informed channel SW NET INF on Register Drum 20. When this connection is established and when scanner 24 scans the dial repeating relay in the Dial Repeating Circuit 21, a positive signal voltage will be applied over the S lead because the relay in the Dial Repeating Circuit 21 will be operated through the established connection in Switching Network (49) and the subscriber's loop. The positive signal pulse on the S lead is applied to one input of the SN AND gate shown in Fig. 11. The other input of the SN AND gate is connected to the left-hand output of the SNC toggle shown in Fig. 12. The input of SNC toggle is connected by way of the RSNC lead to the reading amplifier associated with the SW NET CONN switching network connected channel on Register Drum 20 shown in Fig. 11. SNC toggle will be normal because at this time no mark will be present in the switching network connected channel and, accordingly, a positive signal voltage will be applied from the left-hand output of SNC toggle to the lower input of the SN AND gate. The actuation of SN AND gate applies a positive signal pulse to the AND gate connected to the writing amplifier associated with the SW NET CONN switching network connected channel on Register Drum 20 and causes a mark to be written in this channel. Similarly, the actuation of SN AND gate causes a positive signal pulse to be applied to the AND gate connected to the writing amplifier associated with the SW NET INF switching network informed channel on Register Drum 20 and causes the erasure of the mark in this channel.

The positive signal voltages over the S and S' leads from scanner amplifier 843 indicating the line closures and opens respectively together with the outputs of the dial control channels, DC1 and DC2 over the DC1M, DC1M', and DC2M and DC2M' leads, and the output of the REG MARKS register marks channel are applied as inputs to the dial control matrix (54). These inputs are combined in various combinations in five logical AND gates in dial control matrix (54) to produce five outputs. During the on-hook condition of the subscriber's line there is no output signal from scanner 24 and accordingly a positive signal voltage is applied to dial control matrix (54) over the S' lead. There are no marks present in the DC1 and DC2 channels, and accordingly a positive signal voltage is present on the DC1M' and DC2M' input leads to dial control matrix (54). Each time a register slot is read on Register Drum 20 a positive signal voltage will be applied to the RM lead from the output of the RM toggle shown in Fig. 10. On the first revolution of Register Drum 20, after a subscriber has been connected to a Dial Repeating Circuit 21 and has not yet commenced to dial, the presence of the positive signal voltage on the S lead, on the RM lead and the DC1M' lead will cause the actuation of the DC1 AND gate in dial control matrix (54). The actuation of this AND gate causes a positive signal voltage to be applied over the DC1 lead which extends to the AND gate connected to the writing amplifier associated with the DC1 channel on Register Drum 20 and causes a mark to be written in the DC1 channel. On the next revolution of Register Drum 20 with the subscriber's line still closed and before dialing has started, the positive signal voltage on the S lead, the RM lead, the DC1M lead and the DC2M' lead will cause the actuation of the OHC AND gate in dial control matrix (54) which applies a positive signal voltage to the OHC lead indicating an off-hook continued condition. The positive signal voltage on the OHC lead is applied through a cathode follower circuit to the PSI AND gate shown in Fig. 12 and starts the action in a timing circuit which times for permanent signal conditions on the line as will be described hereinafter. The positive signal voltage on the OHC lead from the output of dial control matrix (54) is also applied to the FTE AND gate shown in Fig. 12 which when completely enabled will start the timing of an interdigital interval between trains of dial pulses as will be described hereinafter.

When the subscriber dials a digit, the removal of the positive signal voltage from the S lead and the application of a positive signal voltage to the S' lead during the first dial open interval is combined with the output of the DC1 channel to provide an output from dial control matrix (54) which causes a mark to be written in the DC2 cell. The positive signal voltage on the S' lead, the RM lead, the DC1M lead and the DC2M' lead are combined in the DC2 AND gate in dial control matrix (54) to cause a positive signal voltage to be applied to the DC2 lead. This positive signal voltage is applied to the AND gate connected to the writing amplifier associated with the DC2 channel on Register Drum 20 and causes a mark to be written in the DC2 channel.

The subsequent dial closed interval indicating the completion of a dial pulse is detected by scanner 24 and the positive signal voltage on the S lead from the output of scanner 24 is combined with the outputs of the DC1 and DC2 channels to produce a positive signal voltage on the CP output lead from dial control matrix (54). The positive signal voltage on the S lead is combined with the positive signal voltage on the RM lead, the DC2M lead and the DC1M lead in the CP AND gate in dial control matrix (54) to provide a positive signal voltage on the CP output lead. This positive signal voltage is applied over the CP lead to the lower input of the EDC OR gate shown in Fig. 11 which in turn is actuated and applies a positive signal voltage to the AND gate connected to the writing amplifier associated with the DC2 channel on Register Drum 20 to cause the erasure of a mark in this channel. The CP lead also extends through Figs. 14, 16, and 18, and the positive signal voltage applied thereto enables the writing gates of the latest digits channels D1, D2, D4, and D7, on Register Drum 20 shown in Fig. 17 to record the pulse of the dialed digit in these channels as will be described.

The fifth output of dial control matrix (54) is produced by a continued line open condition following a line closed condition. The removal of the positive signal pulse from the S lead and the application of the positive signal voltage to the S' lead at a time when there are marks in both the DC1 and DC2 channels on Register Drum 20 produces a hangup indicated output on the HUI lead from dial control matrix (54). A positive signal voltage on the S' lead is combined with the positive signal voltage on the RM lead, the DC2M lead and the DC1M lead in the HUI AND gate in dial control matrix (54) to provide a positive signal voltage on the HUI output lead. As will be described hereinafter the positive signal voltage on the HUI lead is used after a timing cycle to clear Register Drum 20 of any accumulated call data.

As mentioned above, at the completion of each dial pulse detected by dial control matrix (54) a positive signal voltage is applied to the CP lead to enable the writing amplifiers associated with the D1, D2, D4, and D7 channels on Register Drum 20 shown in Fig. 17. The first such positive signal pulse on the CP lead causes a mark to be written in the D1 channel of the selected register slot and the second such positive signal pulse causes the mark in the D1 channel to be erased and a mark to be written in the D2 channel of the selected register slot. When the third CP pulse occurs, a mark is again written in the D1 channel. This process is continued through the train of dial pulses in such a manner that the dialed digit is accumulated in the group of four channels, D1, D2, D4, and D7 on Register Drum 20 in a 1-or-2-out-of-4 code. The standard 2-out-of-5 code is used except the D0 channel is omitted. Which channels are to have marks written in them and which are to have marks erased depends upon which channels already have marks present in them when a positive signal pulse is applied to the CP lead.

Figure 18:
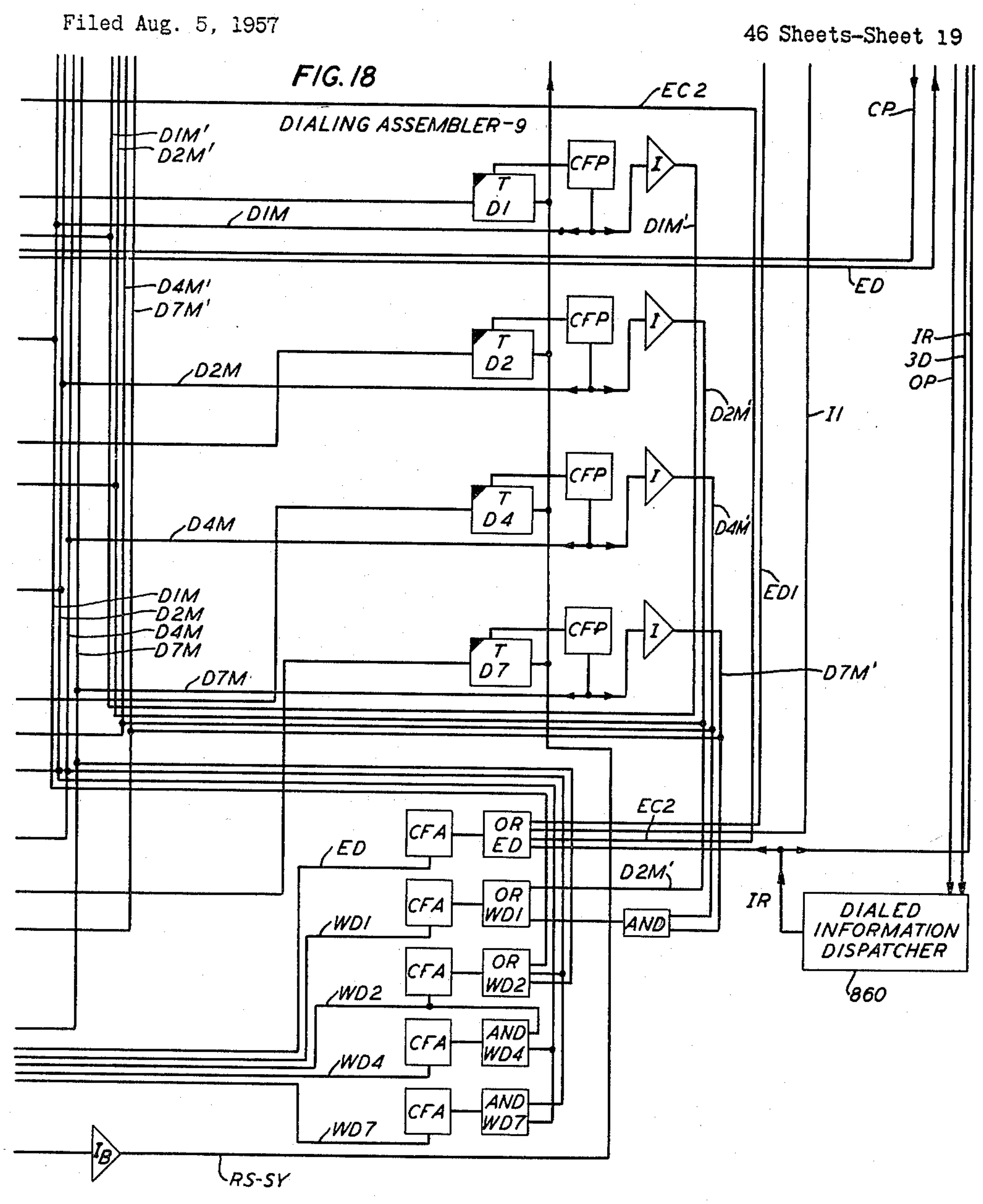

The control of these alterations in the D– channel is partially in the various AND gates connected to the writing amplifiers associated with these channels and partially in the ED, WD1, WD2, WD4, and WD7 OR gates shown in Fig. 18 which determine the presence of conditions for writing or erasing in these channels. The general condition for writing in a D– channel is the simultaneous occurrence of a positive signal pulse on the CP lead and a special prior condition in the D– channels and nothing priorly written in the particular D– channel in which information is to be written. For example, a mark is written in the D1 channel when a positive signal pulse is applied to the CP lead and there is nothing present in the D1 channel and either nothing in the D2 channel or nothing in both D4 and D7 channels. A mark is written in the D2 channel when there is nothing in the D2 channel and a mark in the D1 channel. A mark is written in the D4 channel when there is nothing in D4 and a mark in either the D1 or D7 channels and a mark in the D2 channel. A mark is written in the D7 channel when there is a mark in the D2 and D4 channels and nothing in the D7 channel.

Similarly, a D– channel is erased when there is something in the channel to be erased, a positive signal pulse applied to the CP lead, and a special prior condition in the D– channels. Erasure can also occur under control of a positive signal voltage applied over the ED lead from the output of the ED OR gate shown in Fig. 18. For example, a mark read in the D1 channel will be erased each time a positive signal pulse is applied to the CP lead. A mark read in the D2 channel will be erased when a positive signal pulse is applied to the CP lead provided a mark is also read in the D1, D4, or D7 channels. A mark read in the D4 channel will be erased when a positive signal pulse is applied to the CP lead provided that a mark is also read in the D2 channel. A mark read in the D7 channel is erased only by the application of a positive signal voltage to lead ED from the output of the ED OR gate when actuated.

Figure 12:
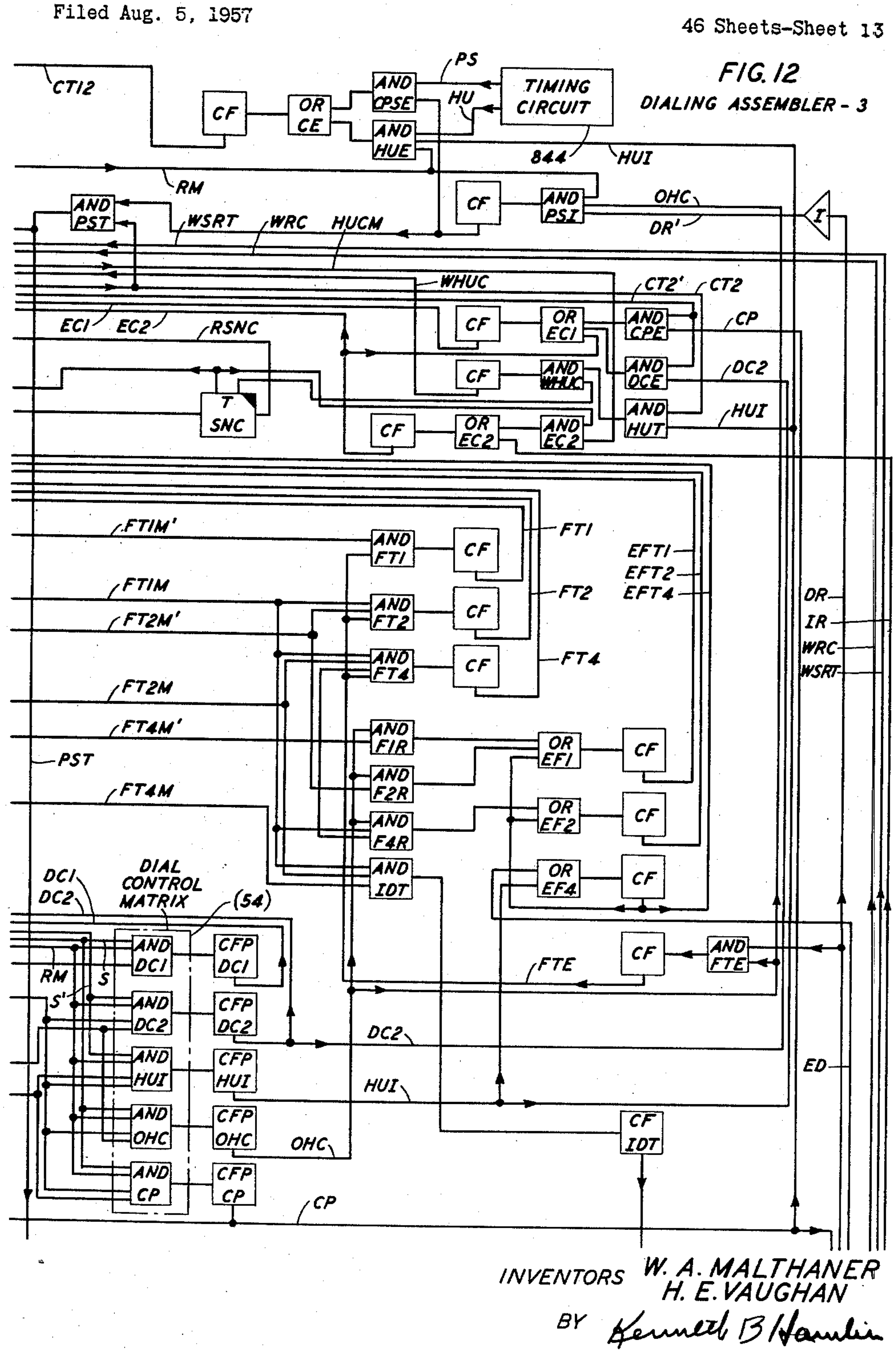

At the end of a train of dial pulses constituting a single digit, the off-hook continued output over the OHC lead from dial control matrix (54) shown in Fig. 12 is present each time the dial repeating circuit is scanned for several drum revolutions during which the subscriber is preparing to dial the next digit. During this interval a fine timing circuit, including fine timing channels FT1, FT2 and FT4 on Register Drum 20, is enabled, which counts seven revolutions of Register Drum 20 as an indication that an interdigital interval has elapsed. If a line open condition occurs before completion of this timing cycle the timing circuit is reset. Such a partial timing cycle will occur with slow dials in which a long dial pulse closure may start the timing cycle. The presence of some registration in the D– channels is indicated by the output of the DR OR gate shown in Fig. 16. The inputs of the DR OR gate are connected to the D1M, D2M, D4M and D7M leads which extend to the toggles associated with the D1, D2, D4 and D7 channels on Register Drum 20. If a partial digit has been accumulated in these channels, a positive signal voltage will be applied over one of these leads, and accordingly DR OR gate will be actuated to apply a positive signal voltage to the DR lead. The simultaneous occurrence of a positive signal voltage on the DR lead and a positive signal voltage on the off-hook continued output OHC lead from dial control matrix (54) produces a fine timing enablement signal at the output of fine timing enablement FTE AND gate shown in Fig. 12. The positive signal voltage on the FTE lead from the output of FTE AND gate is combined with voltage conditions indicating the presence and absence of marks in the FT1, FT2 and FT4 fine timing channels on Register Drum 20 to control the writing of marks in these channels. In addition, because the FT1, FT2, and FT4 channels are used to count seven revolutions in a binary scale, the off-hook continued condition (the positive signal voltage on the OHC lead) is combined on each revolution of Register Drum 20 with the present count in these timing channels to write and/or erase the marks in the FT1, FT2 and FT4 channels as required. Erasure of all accumulated timing marks takes place when a dialed digit is transferred from the D1, D2, D4 and D7 channels over leads D1M, D2M, D4M and D7M to the A–, B–, C–, TH–, H–, T–, U– directory number registration channels in the selected register slot on Register Drum 20 shown in Figs. 13 and 14. This occurs when a positive signal voltage is applied to the ED lead from the output of ED OR gate shown in Fig. 18 after completion of the timing cycle as will be described.

Erasure of all timing marks in the FT1, FT2 and FT4 channels also takes place immediately upon premature interruption of the timing cycle as indicated by the occurrence of a positive signal voltage on the hangup indicated lead HUI as mentioned hereinbefore. As shown in Fig. 12, the positive signal voltage on the HUI lead will cause the actuation of EF4 OR gate which in turn will cause the actuation of EF1 OR gate and EF2 OR gate, and positive signal voltages will be applied to the EFT1, EFT2, and EFT4 leads which extend to the AND gates connected to the writing amplifiers associated with the FT1, FT2 and FT4 channels on Register Drum 20, and in this manner causes the erasure of the timing marks in these channels.

When seven revolutions of Register Drum 20 have occurred during the time that the off-hook continued condition from the output of dial control matrix (54) has remained, the simultaneous occurrence of the positive signal voltages on the FT1M, FT2M, and FT4M will cause the actuation of the IDT AND gate shown in Fig. 12. The actuation of this AND gate applies a positive signal pulse to the IDT lead and is an indication that an interdigital timeout has been completed and that the dial pulses accumulated in the D1, D2, D4 and D7 channels on Register Drum 20 represent the dial pulses of one complete dialed digit, and this digit must therefore be transferred to the directory number registration channels A–, B–, C–, et cetera, in the selected register slot on Register Drum 20 so that the D1, D2, D4 and D7 channels can be cleared to accumulate subsequent dial pulses as described above.

The first digit dialed by the subscriber is transferred to cells in the A– channels, A0, A1, A2, A4 and A7 shown in Fig. 13 in the selected register slot on Register Drum 20 with one exception which will be described below. The second digit is transferred to the cells in the B– channels B0, B1, B2, B4 and B7 shown in Fig. 13 in the selected register slot, and the third and subsequent digits dialed by the subscriber are transferred to cells in the C–, TH–, H–, T–, and U– channels shown in Figs. 13 and 15 in the selected register slot on Register Drum 20.

In accordance with usual telephone system design, an initial digit "1" which may be inadvertently dialed in the removal of the handset from the telephone cradle, is discarded. In Dialing Assembler 850 any number of initial "1" digits are absorbed as will be described. The selection of or the steering to the A–, B–, C– and other digit storage channels on Register Drum 20 is controlled by a steering circuit. The reading output from each of the A channels is connected to the AR OR gate shown in Fig. 13. The AR OR gate will provide a negative signal pulse on the ARM lead from its output if there is a registration in any A– channels of the selected register slot. Similar OR gates are provided for the B channel, the C channel, and the other digit register channels to produce B registered, C registered, or digit registered output signals (negative signal pulses) from their respective outputs if there is a registration contained in the associated channels. A negative signal pulse from the output of AR OR gate shown in Fig. 13 on the ARM lead causes the operation of the AR toggle shown in Fig. 14, and in a similar manner the output from the BR OR gate will cause the operation of the BR toggle shown in Fig. 14. Thus for each digit registration group of channels, A–, B–, C–, TH–, H–, T–, and U– there is an associated toggle which indicates whether or not the cell in the selected register slot in the associated group of channels has information registered in it. These toggles together with an associated group of AND gates form a steering circuit to determine to which group of channels, A–, B–, C–, TH–, et cetera, the latest digit accumulated in the D1, D2, D4 and D7 channels on Register Drum 20 is to be transferred. For example, the WA AND gate shown in Fig. 14 will be actuated upon the simultaneous occurrence of a positive signal voltage on the IDT lead, indicating a completion of an interdigital timeout, a positive signal voltage on the AR′ lead from the inverter connected to the output of the AR toggle, and a positive signal voltage on its lower input connected to the I1′ lead. If AR toggle is normal indicating that nothing is registered in the A channels, the negative voltage from its output is inverted in an inverter and applied to the AR′ lead connected to the center input of the WA AND gate. As will be described hereinafter, the third input over the I1′ lead to the WA AND gate will have a positive signal voltage applied thereto if the first digit dialed by the subscriber is not a "1." If this digit is a "1" a disabling signal voltage will be applied over the I1′ lead to the WA AND gate and thus prevent its actuation. When WA AND gate shown in Fig. 14 is actuated it provides a positive signal voltage over the WA lead to enable all of the AND gates connected to the amplifier associated with the A– group of channels shown in Fig. 13 on Register Drum 20.

The enablement of the AND gates connected to the writing amplifiers associated with A– group of channels by the positive signal voltage on the WA lead will permit the digit accumulated in the D1, D2, D4 and D7 channels to be transferred to the A– group of channels. The marks read in the D– channels will cause the operation of the associated D– toggles shown in Fig. 18. The operated ones of the D– toggles D1, D2, D4 and D7 will in turn apply positive signal voltages to the D1M, D2M, D4M and D7M leads respectively, whereas the normal ones of the D1, D2, D4 and D7 toggles will apply positive signal voltages to the D1M′, D2M′, D4M′ and D7M′ leads. Accordingly the A– group of channels in which the writing amplifier AND gates are actuated to cause marks to be written in the associated A– channels A0, A1, A2, A4, and A7 will be determined by the operated ones of the D1, D2, D4 and D7 toggles associated with the D– channels. For example, assume that the first digit accumulated at the D1, D2, D4 and D7 channels on Register Drum 20 was the digit 5. Accordingly, positive signal voltages will be applied from the outputs of the D1 toggle and D4 toggle shown in Fig. 18 over the D1M lead and the D4M lead which extend to the AND gates connected to the writing amplifiers associated with the A1 and A4 channels on Register Drum 20. Accordingly, when the enabling pulse is applied over the WA lead to these AND gates the writing amplifiers in channels A1 and A4 will be actuated to cause marks to be written in the corresponding A1 and A4 channels.

When a dialed digit is transferred from the D1, D2, D4 and D7 channels to one of the A–, B–, C–, TH–, H–, T–, or U– groups of channels on Register Drum 20, the stored digit code is amended to a true 2-out-of-5 code by recording a mark in the zero channel cell if necessary. This translation to provide a true 2-out-of-5 code is accomplished by the D0 matrix (71) shown in Fig. 16. The read outputs of the D1, D2, D4 and D7 channels are connected as inputs to this matrix, and a positive signal pulse will be applied on the D1 output from the D0 matrix (71) if there is a mark recorded in only the D1 cell. In addition, a positive signal pulse will be applied to the DOM output of D0 matrix (71) if there is a mark in one and only one of the four D1, D2, D4 and D7 cells. The detected one output on the D1 lead from D0 matrix (71) is connected to an initial one AND gate designated I1 shown in Fig. 14. A positive signal output pulse is obtained from the I1 AND gate if a dialed one is detected at the time that a positive signal pulse is applied to the IDT lead indicating an interdigital timeout and no recording is present in the cells of the A– group of channels. The output of I1 AND gate in addition to disabling the WA AND gate shown in Fig. 14 also produces an output at the ED OR gate shown in Fig. 18 to cause the erasure of the digit accumulated (in this case a 1) in the D cells on Register Drum 20 so that this initial 1 is disregarded.

Figure 14:
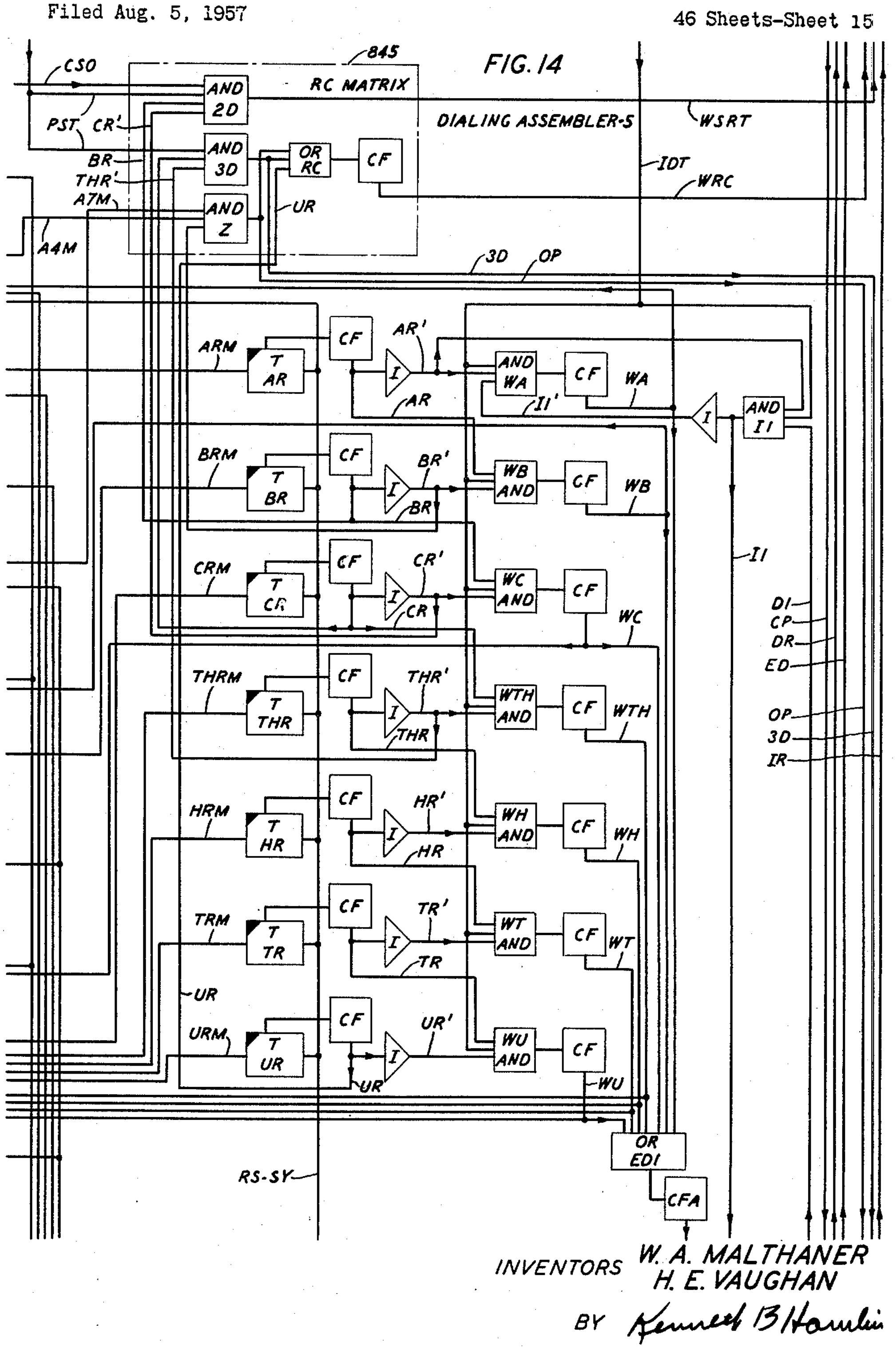
Figure 15:
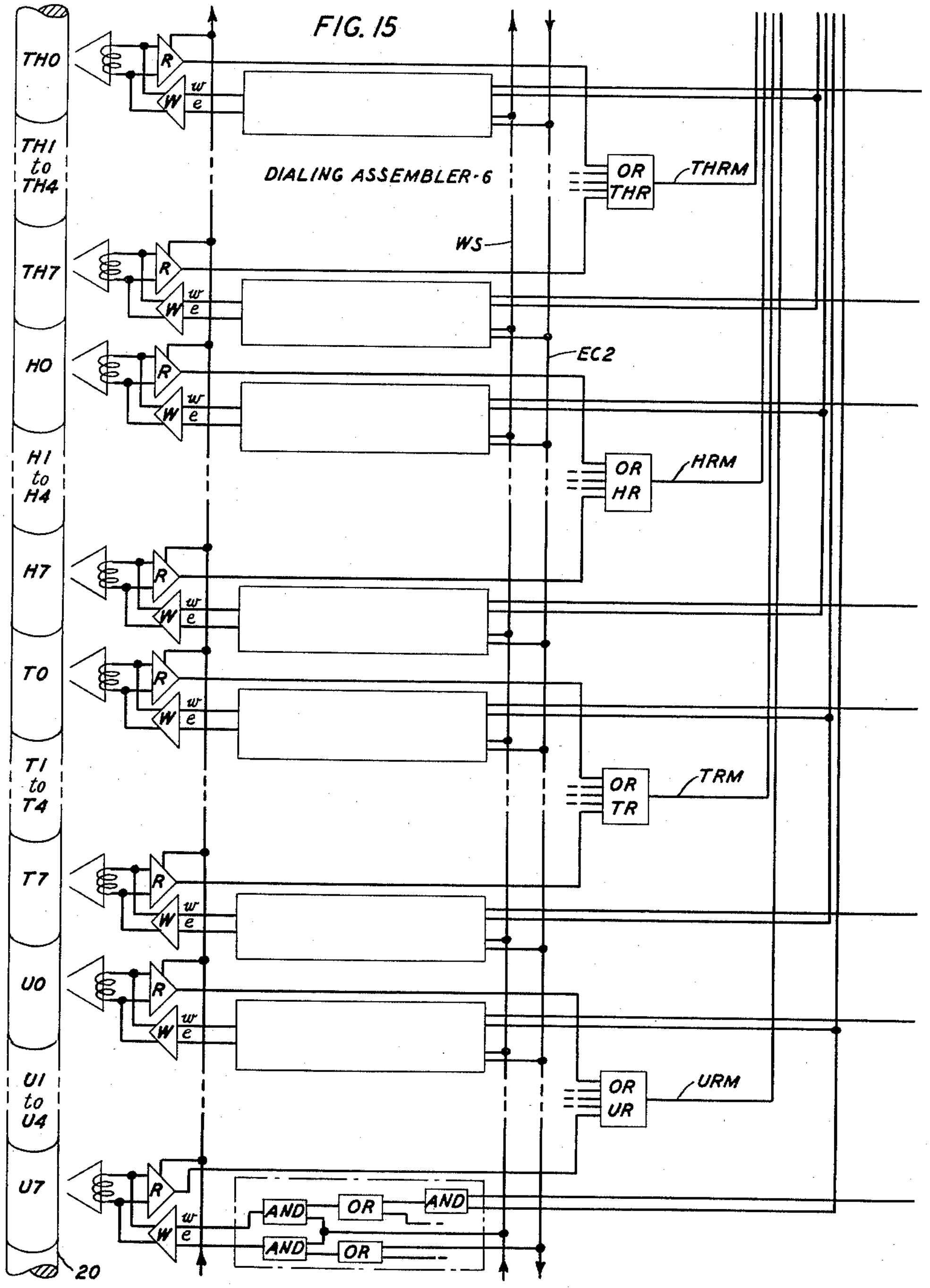
Figure 16:
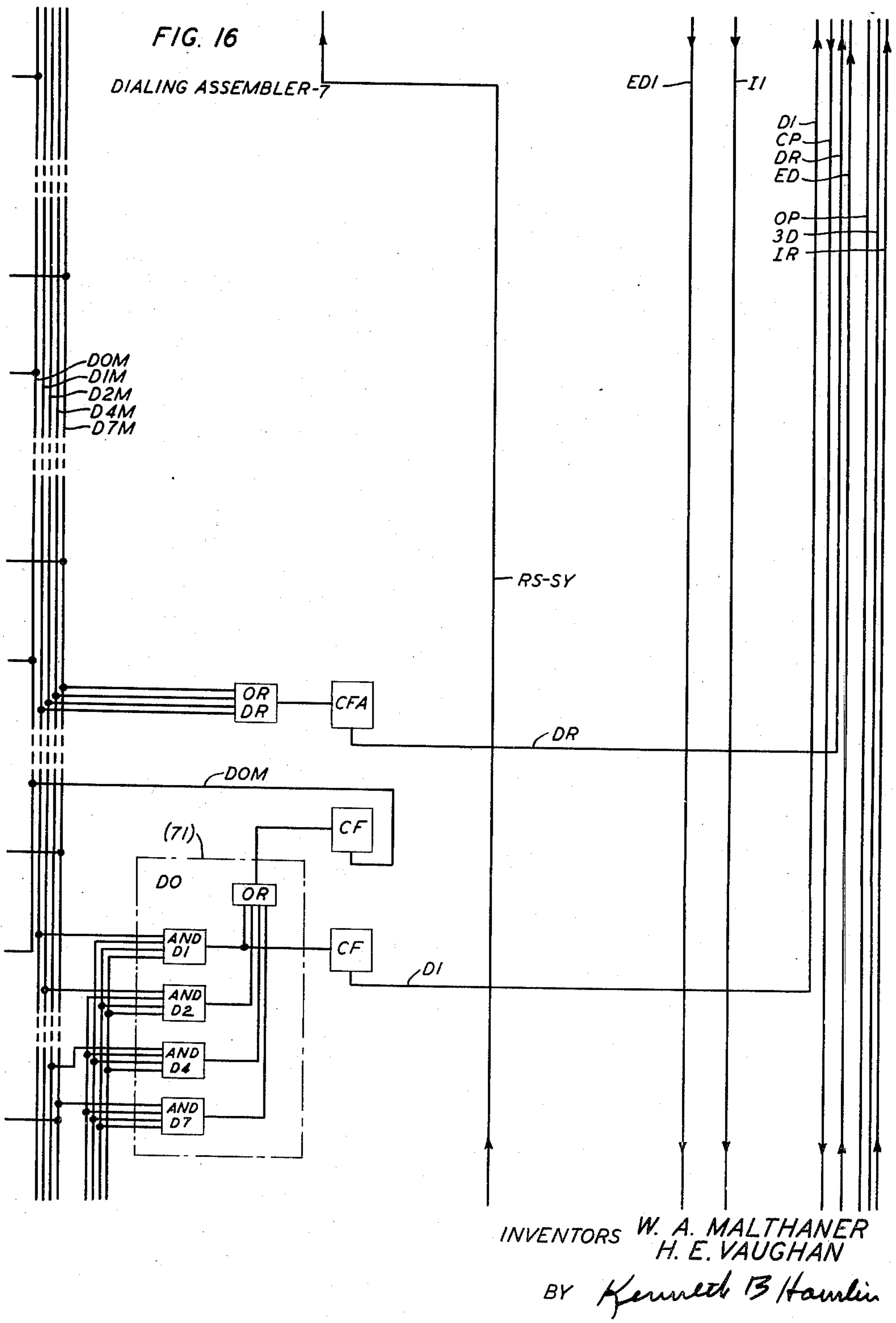

When the pulses of the second digit dialed by the subscriber are accumulated in the D cells on Register Drum 20 and an interdigital timeout is detected, a positive signal pulse on the IDT lead will cause the actuation of the WB AND gate shown in Fig. 14. The upper input of the WB AND gate is connected to the AR output lead from the AR toggle and because a digit is registered in the A group of channels, the AR toggle will be operated and will in turn apply a positive signal voltage to the AR lead. If there is no registration in the B digit channels on Register Drum 20, the lower input of WB AND gate connected to the BR′ lead will be at a positive signal voltage. Accordingly WB AND gate will be actuated to provide a positive signal voltage over the WB lead which will enable the AND gates connected to the writing amplifiers associated with the B– group of channels on Register Drum 20. The positive signal voltage on the WB lead is combined with the outputs from the D1, D2, D4 and D7 channels as applied over the D1M, D2M, D4M and D7M leads and the output from the D0 matrix (71) over the DOM lead to cause the writing of marks in the B0, B1, B2, B4 and B7 channels on Register Drum 20 corresponding to the digit accumulated in the respective D1, D2, D4 and D7 channels. In a similar manner, the remaining master write enabling AND gates, WC AND gate, WTH AND gate, WH AND gate, WT AND gate, and WU AND gate, are successively enabled upon the successive occurrence of a positive signal voltage on the IDT lead to cause the transfer of the latest digit accumulated in the D cells to the next unused group of digit storage cells in the selected register slot on Register Drum 20. In addition, whenever an output pulse is generated by a master write AND gate such as the WA AND gate or WB AND gate, the ED1 OR gate shown in Fig. 14 is actuated to apply a positive signal voltage to the ED1 lead. The positive signal voltage on the ED1 lead is applied to an input of the ED OR gate shown in Fig. 18. The ED OR gate shown in Fig. 18 causes the erasure of the marks present in the D1, D2, D4 and D7 and the FT1, FT2, and FT4 channels on Register Drum 20.

As indicated hereinbefore, the presence of a mark in the registration complete REG'N COMP channel on Register Drum 20 is an indication to the Switching Information Dispatcher to proceed to release the connection through Switching Network (49) between the calling subscriber's line and the Dial Repeating Circuit 21, and as described hereinbefore the presence of a mark in the SRT start repertory translation channel on Register Drum 20 is an indication for the Repertory Translation Consulter 915 to start a repertory translation. These marks are written on Register Drum 20 under control of RC matrix 845 shown in Fig. 14. A positive signal voltage will be applied to the WRC lead from the output of RC matrix 845 for three combinations of input conditions, and a positive signal voltage will be applied to the WSRT lead for a fourth input condition. If the first digit dialed by a subscriber is zero, a mark must be written in the REG'N COMP registration complete channel as the call is to be routed directly to an operator without further dialing. If marks are registered in both the A4 and A7 channels on Register Drum 20 after the first digit has been accumulated in the D1, D2, D4 and D7 channels and transferred to the A channels, when the selected register slot is read on the next revolution of Register Drum 20 the A7 toggle and the A4 toggle shown in Fig. 13 will be operated. The operation of these toggles will in turn cause positive signal voltages to be applied to the A4M and A7M leads which extend to inputs of the Z AND gate in RC matrix 845. The third input of Z AND gate is connected to the BR′ lead and will have a positive signal voltage applied thereto if the BR toggle shown in Fig. 14 is normal, indicating that there is no registration in the B digit channels on Register Drum 20. The actuation of Z AND gate in RC matrix 845 causes a positive signal voltage to be applied through the RC OR gate in RC matrix 845 to the WRC lead. The positive signal voltage on the WRC lead is applied to the AND gate connected to the writing amplifier associated with the REG'N COMP registration complete channel on Register Drum 20 and causes a mark to be written in this channel.

The actuation of the Z AND gate in RC matrix 845 as described above when a zero or operator call is originated also causes the application of a positive signal voltage to the OP output lead from the RC matrix 845. The OP lead extends through Figs. 14, 16 and 18 directly to Dialed Information Dispatcher 860 and the positive signal voltage thereon will control circuit in Dialed Information Dispatcher 860 as will be described hereinafter. The OP lead will have a negative signal voltage applied thereto for all types of call except a single digit zero or operator call. If a full seven digit number is dialed by a calling subscriber and is detected by Dialing Assembler 850, the UR toggle shown in Fig. 14 will be operated when the selected register slot on Register Drum 20 is read following transfer of the last digit from the D– channels D1, D2, D4 and D7 on Register Drum 20 to the U– channels, U0, U1, U2, U4 and U7 on Register Drum 20. The operation of the UR toggle will in turn apply a positive signal voltage on the UR lead which extends directly to the RC OR gate in RC matrix 845. The actuation of this OR gate will apply a positive signal voltage to the WRC lead and will as described above cause a writing of a mark in the REG'N COMP registration complete channel on Register Drum 20.

If the calling subscriber places a call in which only three digits of an office code are required, for example a 211 call for long distance or 411 for repair department, et cetera, these three digits will be registered in the A–, B– and C– groups of channels on Register Drum 20 and will be followed by a long continued off-hook condition output from dial control matrix (54) on the OHC lead. The course timing actions which ensue will result, in the manner to be described in detail hereinafter, in the eventual placing of a mark in the CT2 channel in the selected register slot on Register Drum 20. A positive signal voltage will be applied by the CT2 toggle associated with this channel to the CT2 lead when the mark is read. The positive signal voltage on the CT2 lead will be combined with a positive signal voltage on the CR lead and a positive signal voltage on the THR′ lead in the 3D AND gate in RC matrix 845. The actuation of the 3D AND gate will in turn cause the actuation of the RC OR gate and the application of a positive signal voltage to the WRC lead which, as described above, will cause the writing of a mark in the REG'N COMP channel on Register Drum 20. After the three digits dialed by the calling subscriber have been registered in the A, B and C groups of channels on Register Drum 20, when the selected register slot is read following the transfer of the third digit to the C– group of channels, the CR toggle shown in Fig. 14 will be operated and will cause a positive signal voltage to be applied over the CR lead to the center input of the 3D AND gate in RC matrix 845. If there is no registration in the TH– group of channels in Register Drum 20, THR toggle shown in Fig. 14 will not be operated when the selected register slot is read, and a positive signal voltage will be applied to the THR′ lead extending to the lower input of the 3D AND gate in RC matrix 845.

The actuation of the 3D AND gate in RC matrix 845 as described above when a three digit call is originated also causes the application of a positive signal voltage to the 3D output lead from RC matrix 845. The 3D lead extends through Figs. 14, 16 and 18 directly to Dialed Information Dispatcher 860, and the positive signal voltage thereon will control circuits in Dialed Information Dispatcher 860 as will be described hereinafter. The 3D lead will have a negative signal voltage applied thereto for all types of calls except a valid three digit call for information, repair service, et cetera.

In the event that the calling subscriber is entitled to repertory dialing service and has dialed a two digit repertory code, when the selected register slot on Register Drum 20 is read following the transfer of the second digit of the dialed repertory code to the B– group of channels on Register Drum 20, the course timing actions which follow, as will be described in detail hereinafter, will again cause the placing of a mark in the CT2 channel on Register Drum 20. When the mark in the CT2 channel is read a positive signal voltage from the output of the CT2 toggle shown in Fig. 11 will cause a positive signal voltage to be applied to the CT2 lead. The positive signal voltage on the CT2 lead will be combined with a positive signal voltage on the CR′ lead from the output of the inverter connected to the CR toggle, a positive signal voltage on the BR lead connected to the output of the BR toggle, and a positive signal voltage on the CSO lead connected to the CSO toggle shown in Fig. 13 in the 2D AND gate in RC matrix 845. The actuation of the 2D AND gate will in turn apply a positive signal voltage to the WSRT lead which extends to the AND gate shown in Fig. 10 connected to the writing amplifier associated with the SRT start repertory translation channel on Register Drum 20 and causes a mark to be written in this channel. A positive signal voltage will be present on the CR′ lead when the selected register slot on Register Drum 20 is read following the transfer of the two digits of the dialed repertory code to the A and B groups of channels provided there is no registration in the C– group of channels in the selected register slot. Similarly, the BR lead from the output of BR toggle shown in Fig. 14 will have a positive signal voltage applied thereto provided the B– group of channels on Register Drum 20 has a registration contained therein. If the calling subscriber is entitled to repertory dialing service a mark will be present in the CSO channel on Register Drum 20 which when read will cause the operation of the CSO toggle shown in Fig. 13. The operation of the CSO toggle will apply a positive signal voltage to the CSO lead extending to the 2D AND gate in RC matrix 845. Accordingly, it will be observed that RC matrix 845 controls the writing of the marks in the REG'N COMP registration complete channel and the SRT start repertory translation channel on Register Drum 20.

The course timing channels CT1 and CT2 on Register Drum 20 shown in Fig. 11 are utilized with timing circuit 844 shown in Fig. 12 to time continued off-hook conditions and continued hangup indicated conditions. A continued off-hook condition may result from a permanent signal trouble condition on a subscriber's line or from the failure of the subscriber to dial as many digits as are required for the completion of a call. As indicated above, a timeout of the continued off-hook condition also provides the means for determining that a two digit repertory code or a valid three digit information or repair service code has been dialed by a calling subscriber.

Timing circuit 844 shown in Fig. 12 supplies two enabling signals, one over the permanent signal enablement lead, PS, and the other over the hangup enablement lead, HU. Timing circuit 844 is synchronized with the rotation of Register Drum 20 and provides a permanent signal enablement signal over the PS lead which lasts for one complete revolution of Register Drum 20. This is followed by the absence of a signal on the PS lead for approximately 0.15 second. After this interval another permanent signal enablement signal is supplied over the PS lead which lasts for one complete revolution of Register Drum 20. Similarly, timing circuit 844 provides a hangup enablement signal over the HU lead for one complete revolution of Register Drum 20. This is followed by the absence of any signal on the HU lead for approximately 0.5 second. After this interval another hangup enablement signal is supplied over the HU lead which lasts for one complete revolution of Register Drum 20. The timing circuit utilized in the above-cited Malthaner-Vaughan patent and disclosed in detail in the W. A. Malthaner Patent 2,782,256, granted February 19, 1956, may advantageously be utilized for timing circuit 844 shown in Fig. 12.

If a calling subscriber removes his handset from the telephone cradle and does not dial, or having started to dial does not continue to dial a full seven digit number, or if an accidental short circuit on the subscriber's line simulates such a removal, a positive signal voltage will be applied to the OHC output lead from dial control matrix (54) each time the selected register slot assigned to the subscriber is read. The positive signal voltage on the OHC lead is applied to an input of the PSI AND gate shown in Fig. 12. The upper input of the PSI AND gate is connected to the RM lead which will have a positive signal voltage applied thereto each time a register slot on Register Drum 20 is read. The lower input of the PSI AND gate is connected to the DR′ lead which is obtained from the output of an inverter connected to the DR lead. The DR lead is in turn connected to the output of DR OR gate shown in Fig. 16. If there is no registration contained in the D1, D2, D4 and D7 channels on Register Drum 20, the DR OR gate will not be actuated and accordingly the DR lead will have a negative signal voltage applied thereto. This negative signal voltage is inverted in the inverter shown in Fig. 12 and a positive signal voltage is applied to the DR′ lead and the PSI AND gate. The actuation of the PSI AND gate in turn applies a positive signal voltage to the PSI lead which is connected to the lower input of the CPSE AND gate shown in Fig. 12. When a permanent signal enablement pulse is obtained from timing circuit 844, CPSE AND gate will be actuated and will in turn actuate the CE OR gate which in turn will apply a positive signal voltage to the CT12 lead. The first such positive signal voltage applied to the CT12 lead will cause a mark to be written in the CT1 channel on Register Drum 20. The second such positive signal voltage applied to the CT12 lead will cause a mark to be written in the CT2 channel on Register Drum 20. The presence of a mark in the CT2 channel after the timing period indicates that a course timing period has elapsed. Thus a positive signal voltage output on the CT2 lead from the CT2 toggle, together with a positive signal voltage on the PSI lead indicates the completion of a permanent signal timeout.

As described hereinbefore, if at the completion of a permanent signal timeout the subscriber has previously dialed a two digit repertory code, the WSRT output lead from RC matrix 845 will have a positive signal voltage applied thereto and a mark will be written in the SRT start repertory translation channel on Register Drum 20, or if at the completion of a permanent signal timeout the subscriber has previously dialed a three digit code for information or repair service, et cetera, the WRC output lead from RC matrix 845 will have a positive signal voltage applied thereto which in turn will cause a mark to be written in the REG'N COMP registration complete channel on Register Drum 20. The occurrence of a permanent signal timeout condition under any other circumstances, however, will cause the writing of a trouble mark in the TRBL trouble channel on Register Drum 20. The positive signal voltages on the PSI lead and the CT2 lead indicating the completion of a permanent signal timeout are combined in the PST AND gate shown in Fig. 12. The output of the PST AND gate is connected to the writing amplifier associated with the TRBL channel on Register Drum 20 shown in Fig. 10. As shown in Fig. 10, the upper input of this AND gate is connected through an inverter to an OR gate whose inputs are connected respectively to the WRC and WSRT leads. Accordingly, if a permanent signal timeout is detected following the dialing of a two digit repertory code or a valid three digit information or repair service code, either the WSRT or the WRC leads will have a positive signal voltage applied thereto. This positive signal voltage is inverted in the inverter which in turn applies a negative signal voltage to the upper input of the AND gate connected to the writing amplifier associated with the TRBL channel. This negative signal voltage will disable this AND gate and prevent the writing of a mark in the TRBL channel on Register Drum 20. The occurrence of a permanent signal timeout condition under any other circumstances, however, will cause the writing of a mark in the TRBL channel on Register Drum 20 because neither the WRC or the WSRT leads will have a positive signal voltage applied thereto, and accordingly the output of the inverter connected to the upper input of the AND gate connected to the writing amplifier associated with the TRBL channel will have an enabling positive signal voltage. This enabling positive signal voltage will be combined in this AND gate with the positive signal voltage on the PST lead, and the WS lead to cause a mark to be written in the TRBL channel on Register Drum 20.

If a partially timed permanent signal condition exists and a positive signal voltage is applied to the DC2 lead from the output of dial control matrix (54) indicating a resumption of dialing, the positive signal voltage on the DC2 lead is combined in the DCE AND gate shown in Fig. 12 with a positive signal voltage on the CT2' lead which results because a mark is not present in the CT2 channel on Register Drum 20. The actuation of the DCE AND gate by these two positive voltages will in turn cause the actuation of the EC1 OR gate shown in Fig. 12 which in turn applies a positive signal voltage to the EC1 lead to cause the erasure of the mark in the CT1 channel on Register Drum 20 placed there by the start of a permanent signal condition timeout.

As described hereinbefore, a positive signal voltage will be applied to the HUI lead from the output of dial control matrix (54) when a hangup condition is detected. The positive signal voltage on the HUI lead is applied to an input of the HUE AND gate shown in Fig. 12. A positive signal voltage is also applied to the HUE AND gate from the RM lead each time a register mark is read in a register slot on Register Drum 20. The upper input of the HUE AND gate is connected via the HU lead to timing circuit 844. On the first hangup enablement signal from timing circuit 844 while the positive signal voltage is present on the HUI lead, HUE AND gate will be actuated and in turn cause the actuation of the CE OR gate. The actuation of the CE OR gate will apply a positive signal voltage to the CT12 lead. The first such positive signal voltage applied to the CT12 lead will cause a mark to be written in the CT1 channel on Register Drum 20 in the manner described hereinbefore. The second such positive signal voltage applied to the CT12 lead upon the occurrence of a second hangup enablement signal from timing circuit 844 will cause a mark to be written in the CT2 channel on Register Drum 20. The presence of a positive signal voltage on the CT2 lead resulting from the reading of a mark in the CT2 channel on Register Drum 20 with a positive signal voltage on the HUI lead indicates the completion of a hangup timeout. The positive signal voltages on the CT2 lead and the HUI lead are combined in the HUT AND gate shown in Fig. 12. The actuation of this AND gate will in turn apply a positive signal voltage to the upper input of the WHUC AND gate also shown in Fig. 12. The lower input of the WHUC AND gate is connected to the right-hand output of the SNC toggle. This toggle will be operated because a mark will be read in the SW NET CONN channel on Register Drum 20. The actuation of the WHUC AND gate will in turn apply a positive signal voltage to the WHUC lead. The positive signal voltage on the WHUC lead will cause a mark to be written in the HU COMP hangup complete channel on Register Drum 20. The mark present in the HU COMP channel on Register Drum 20 gives an indication to Switching Information Dispatcher 830 that a hangup condition exists, and this circuit in response to the reading of the mark in the HU COMP channel controls the release of the established connection through Switching Network (49) between the calling subscriber's line and the Dial Repeating Circuit 21 associated with the selected register slot on Register Drum 20. When the connection between the calling subscriber's line and the selected Dial Repeating Circuit 21 has been released, Switching Information Dispatcher 830 causes the erasure of a mark present in the SW NET CONN switching network connected channel on Register Drum 20. On the next subsequent revolution of Register Drum 20 with the hangup indicated condition present on the HUI lead, and with the mark erased from the SW NET CONN channel, the EC2 AND gate shown in Fig. 12 will be actuated. As shown in Fig. 12 the upper input of this AND gate is connected to the left-hand output of the SNC toggle which will now be normal because of the absence of a mark in the SW NET CONN channel. The lower input of the CT2 AND gate is connected to the HUCM lead which will have a positive signal voltage applied thereto because a mark will be read in the HU COMP channel on Register Drum 20. The actuation of the EC2 AND gate by these two positive signal voltages will in turn apply a positive signal voltage to actuate the EC2 OR gate shown in Fig. 12 which in turn applies a positive signal voltage to the EC2 lead. This positive signal voltage is applied to the lower input of the EC1 OR gate shown in Fig. 12 which upon actuating applies a positive signal voltage to the EC1 lead. The positive signal voltage present on the EC1 lead causes the erasure of a mark on the CT1 channel on Register Drum 20. The positive signal voltage applied to the EC2 lead causes the erasure of all of the call information in the selected register slot on Register Drum 20 so that the register slot is cleared for subsequent use by another subscriber.

If a partially timed hangup condition exists and a positive signal pulse is applied to the DC2 lead from the output of dial control matrix (54) indicating a reclosure of the subscriber's loop, the positive signal voltage on the DC2 lead is combined with a positive signal voltage on the CT2' lead indicating the absence of a mark in the CT2 channel in the CPE AND gate shown in Fig. 12. The actuation of the CPE AND gate in turn causes the actuation of the EC1 OR gate which in turn applies a positive signal voltage to the EC1 lead which extends to the AND gate connected to the writing amplifier associated with the CT1 channel on Register Drum 20 and causes the erasure of the mark in the CT1 channel placed there by the start of a hangup condition timeout.

As will be described hereinafter, when Dialed Information Dispatcher 860 reads the call information from the selected register slot on Register Drum 20 and dispatches this information to Out Trunk Selector 900, Dialed Information Dispatcher 860 will apply a positive signal voltage over the IR lead to Dialing Assembler 850. The positive signal voltage on the IR lead will cause the actuation of the ED OR gate shown in Fig. 18 which in turn will apply a positive signal voltage to the ED lead. The positive signal voltage on the ED lead will cause the erasure of the marks in the D1, D2, D4, and D7 channels on Register Drum 20 shown in Fig. 17 and the actuation of the EF4 OR gate shown in Fig. 12 which in turn causes the actuation of the EF2 and EF1 OR gates also shown in Fig. 12. The actuation of the EF1, EF2 and EF4 OR gates causes the erasure of the marks in the FT1, FT2, and FT4 channels on Register Drum 20. The positive signal voltage on the IR lead is also applied to the lower input of the EC2 OR gate shown in Fig. 12, and the actuation of this OR gate will in the manner described hereinbefore cause the erasure of all the call information present in the selected register slot on Register Drum 20 thus clearing the slot for use on a subsequent call.

*Dialed information dispatcher*

One specific illustrative embodiment of a Dialed Information Dispatcher 860 employable in the combination of this invention is depicted in Figs. 19 through 21 when arranged as shown in Fig. 48 to which reference will now be made for a more detailed description of the circuit.

As described hereinbefore, when Dialing Assembler 850 recognizes the end of dialing and the dialed digits have been recorded in the selected register slot on Register Drum 20, Switching Information Dispatcher 830 will control the release of the established connection between the calling subscriber's line and the Dial Repeating Circuit 21 used for the call. Switching Information Dispatcher 830 will cause a mark to be written in the SOT select out-trunk channel on Register Drum 20. A mark present in the SOT channel gives an indication to Dialed Information Dispatcher 860 to dispatch the line equipment number and class of service number of the calling subscriber's line, the called office code and dialed directory number to Out Trunk Selector 900 which may then proceed with the selection of an appropriate trunk on Trunk Drum 50. If Dialed Information Dispatcher 860 is idle, the SOT toggle 872 shown in Fig. 21 will be normal and will apply a negative signal voltage to input C of AND gate 870. If there is no mark in the TRBL trouble channel on Register Drum 20 in the selected register slot, a negative signal voltage will be applied to input B of AND gate 870, and if a mark is read in the SOT channel in the selected register slot on Register Drum 20 a negative signal pulse will be applied to input A of AND gate 870 and if there is no mark present in the HU COMP hangup complete channel a negative signal voltage will be applied to input D of AND gate 870. The actuation of AND gate 870 by these four signal voltages will in turn cause the actuation of DID toggle 871. The actuation of DID toggle 871 will in turn apply a negative signal pulse through a CFN type cathode follower to the DID lead.

In the event that a hangup condition is detected by Dialing Assembler 850 there is no need to dispatch the dialed information to Out Trunk Selector 900. In this event the recording of a mark in the HU COMP hangup complete channel on Register Drum 20 will cause a positive signal pulse to be applied to input D of AND gate 870 and will thus prevent its actuation.

As shown in Figs. 19 and 20, the negative signal pulse on the DID lead will enable the line equipment number AND gates 873 shown in Fig. 19 so that read pulses in the LEN line equipment number cells will cause the line equipment number toggles 874 to operate. In this manner the line equipment number recorded in the selected register slot on Register Drum 20 is recorded in the associated line equipment number toggles 874. Similarly, the negative signal pulse on lead DID will enable the class of service AND gate 875 so that the read pulses in the CS class of service number cells will cause the class of service number to be recorded in the associated class of service number toggles 876. In this manner the class of service number recorded in the selected register slot on Register Drum 20 is recorded in the associated class of service number toggles 876. If the directory number dialed by the calling subscriber and recorded in the selected register slot on Register Drum 20 is a full seven digit number, there will be digits recorded in the called office code channels and the dialed directory number channels on Register Drum 20. The negative signal pulse on the DID lead will in a similar manner cause the actuation of the called office code AND gates 877 shown in Figs. 19 and 20 associated with the called office code channels on Register Drum 20 and the dialed directory number AND gates 879 shown in Fig. 20 associated with the dialed directory number channels on Register Drum 20. The enablement of these AND gates will permit the read pulses in the called office code cells and dialed directory number cells or Register Drum 20 to operate the associated toggles 878 and 880 respectively. In this manner the called office code and directory number dialed by the calling subscriber is recorded in the associated toggles.

The line equipment number, the class of service number, the called office code and dialed directory number recorded in these toggles is checked in associated check circuits 882, 884, 886 and 888 respectively, shown in Figs. 19 and 20 in the manner described hereinbefore. The negative signal pulse applied to the DID lead from the output of DID toggle 871 is also applied to respective AND gates 881, 883, 885 and 887 associated with these check circuits. A short time after the operation of the toggles as described above, a check pulse from the synchronizing train of pulses on the CKP lead from sync circuit 839 is applied to the above listed AND gates. When the check pulse on the CKP lead occurs, AND gate 881 will be actuated to in turn cause the actuation of the line equipment number check circuit 882. If the line equipment number recorded in toggles 874 is plausible, check circuit 882 will apply a negative signal pulse from its output to the LEN–OK lead. If the line equipment number is implausible, the check circuit 882 will apply a negative signal pulse to the LEN–NG lead.

In addition to the inputs over the DID and CKP leads, AND gate 883 associated with check circuit 884 shown in Fig. 19 also has an input connected to the OVFL lead. The OVFL lead is connected through a cathode follower to the output of OVFL toggle 898 shown in Fig. 21 and when this toggle is normal a negative signal voltage is present on the OVFL lead. As shown in Fig. 21, the upper input of AND gate 897 is connected to the DID lead which has a negative signal pulse applied thereto when DID toggle 871 is actuated. The lower input of AND gate 897 is connected to the output of the reading amplifier associated with the OVFL MARKS channel on Register Drum 20. If no mark is present in the OVFL MARKS channel a positive signal voltage will be applied to the lower input of AND gate 897 thus preventing its actuation. As shown, the output of AND gate 897 triggers OVFL toggle 898, and accordingly the toggle will remain normal until a mark is read in both the OVFL MARKS and SOT channels in a selected register slot on Register Drum 20 as will be described hereinafter. The negative signal voltage on the OVFL lead in conjunction with the negative signal pulses on the DID and CKP leads will enable AND gate 883 which in turn will cause check circuit 884 to check the class of service number and the A digit of the called office code as recorded in toggles 876 and 878. Appropriate signals over the CSA–NG and CSA–OK leads indicating an improper check or an OK check are supplied by check circuit 884.

In addition to the signals applied over the DID, CKP and OVFL leads, AND gate 885 associated with check circuit 886 shown in Fig. 20 also has an input supplied over the OP lead. The OP lead extends from the output of Dialing Assembler 850 and as described hereinbefore if the dialed number recorded in the selected register slot on Register Drum 20 is a full seven digit number, a negative signal voltage will be applied over the OP lead from Dialing Assembler 850. However, should the call be a single digit "0" for operator, the OP lead will have a positive voltage applied thereto from Dialing Assembler 850. As assumed above, the call here is a full seven digit call and therefore the OP lead will have a negative signal voltage applied thereto and will cause the actuation of AND gate 885. The actuation of AND gate 885 in turn causes check circuit 886 to check the plausibility of the B and C digits of the called office code recorded in toggles 878. Check circuit 886 in turn applies appropriate signals over the BC–OK or BC–NG leads indicating the plausibility or implausibility of the B and C digits.

AND gate 887 associated with check circuit 888 shown in Fig. 20, in addition to having signals applied over the DID, CKP, OVFL and OP leads, has an input connected to the 3D lead which extends from Dialing Assembler 850. As described hereinbefore, if the dialed number recorded in the selected register slot on Register Drum 20 is a full seven digit number a negative signal voltage will be applied over lead 3D from Dialing Assembler 850. However, should the dialed number be a three digit code for information or repair service (for example 411), Dialing Assembler 850 will apply a positive signal voltage to the 3D lead. However, as assumed above, the dialed number recorded in the selected register slot on Register Drum 20 is a full seven digit number and accordingly a negative signal voltage is applied to the 3D lead. This will cause the actuation of AND gate 887 which in turn will actuate check circuit 888. Check circuit 888 checks the plausibility of the thousands, hundreds, tens and units digits of the dialed directory number recorded in associated toggles 880. Check circuit 888 will in turn apply appropriate signals to the DDN–NG or DDN–OK leads depending upon the outcome of the check.

If all the check circuits determine that the codes recorded in the associated toggles are plausible, negative signal pulses will be applied to the appropriate OK leads. As shown in Fig. 21 negative signal pulse on the LEN–OK lead is applied to input A of AND gate 892. The negative signal pulse on the CSA–OK lead is applied to an input of OR gate 895. The actuation of this OR gate in turn applies a negative signal pulse to input B of AND gate 892. The negative signal pulse applied to the BC–OK lead is applied to an input of OR gate 890, and the actuation of OR gate 890 in turn applies a negative signal pulse to input C of AND gate 892. Similarly, the negative signal pulse applied to the DDN–OK lead is applied to an input of OR gate 891, and the actuation of OR gate 891 in turn applies a negative signal pulse to input D of AND gate 892.

The actuation of AND gate 892 in turn causes a negative signal pulse to be applied to the SOT select out trunk toggle 872. The actuation of SOT toggle 872 applies a positive signal voltage to input C of AND gate 870. This voltage is a disabling voltage and prevents the actuation of AND gate 870 in response to a reading of a mark in the SOT channel of a subsequent register slot on Register Drum 20. The actuation of SOT toggle 872 also causes the application of a negative signal voltage to the SOT lead which extends to Out Trunk Selector 900 to signal this circuit to proceed with the selection of an appropriate trunk on Trunk Drum 50. The outputs of the register toggles 874, 876, 878 and 880 are applied through associated cathode followers over Cable 896 to Out Trunk Selector 900. In this manner the line equipment number and the class of service number of the calling subscriber's line, the called office code and directory number dialed by the calling subscriber, are dispatched to the Out Trunk Selector 900.

The negative signal pulse applied to the SOT lead is also applied to the input of the IR information removed toggle 893. The actuation of IR toggle 893 causes a positive signal pulse to be applied through a cathode follower to the AND gate connected to the writing amplifier associated with the SOT channel on Register Drum 20 to cause the erasure of the mark in the SOT channel. The actuation of IR toggle 893 also applies a positive signal pulse over the IR lead back to the Dialing Assembler 850 which as described hereinbefore causes the Dialing Assembler 850 to erase all of the marks recorded in the selected register slot on Register Drum 20, clearing this register for use on a subsequent call. After the completion of their respective functions as described above, IR toggle 893 and DID toggle 871 are reset by a reset sync pulse on the RS–SY lead from sync circuit 839.

As will be described in detail hereinafter, when Out Trunk Selector 900 has completed its function and has selected an appropriate out trunk on Trunk Drum 50, and when the line equipment number and dialed directory number have been recorded in the selected trunk slot on Trunk Drum 50, Out Trunk Selector 900 will return a positive signal pulse over the TA lead to Dialed Information Dispatcher 860. This pulse is inverted in an inverter and is applied to the resetting input of SOT toggle 872, OVFL toggle 898 shown in Fig. 20, register toggles 874, 876, 878 and 880 shown in Figs. 19 and 20, resetting these toggles to normal and clearing the registration contained therein.

In the event that one or more of the check circuits 882, 884, 886 and 888 determine that the code recorded in its associated register toggles 874, 876, 878 and 880 respectively is implausible, OR gate 889 shown in Fig. 21 will be actuated. For example, if check circuit 882 determines that the line equipment number registered in associated toggles 874 was implausible, check circuit 882 will apply a negative signal pulse over the LEN–NG lead. This negative signal pulse will cause the actuation of OR gate 889 shown in Fig. 21. The actuation of OR gate 889 will in turn cause the operation of TRBL trouble toggle 894. The operation of TRBL toggle 894 will apply a positive signal pulse through an OR gate to the AND gate connected to the writing amplifier circuit associated with the TRBL channel on Register Drum 20 to cause a mark to be written in the TRBL channel. The positive signal pulse from the output of TRBL toggle 894 is also applied through an inverter to the resetting input of the register toggles 874, 876, 878 and 880 shown in Figs. 19 and 20. It will be noted that OR gate 889 will be actuated by a negative signal pulse over any of the NG leads from check circuits 882, 884, 886 and 888. After completing its function as described above, TRBL toggle 894 is reset by a reset sync pulse on the RS–SY lead from sync circuit 839.

As described hereinbefore under the heading "Register Selector," if Register Selector 820 determines that there is no register slot available on Register Drum 20 for the processing of a calling subscriber's call, the line equipment number of the calling subscriber's line will be recorded in an overflow register slot on Register Drum 20 and a mark will be written in the SOT channel on Register Drum 20. The detection of a mark in both the SOT channel and the OVFL MARKS channel on Register Drum 20 by Dialed Information Dispatcher 860 gives an indication that an Overflow Tone Trunk should be connected to the calling subscriber's line to return an overflow tone to the calling subscriber. In Dialed Information Dispatcher 860, AND gate 870 shown in Fig.

21 will be actuated as described above when a mark is read in the SOT channel, when there is an absence of a mark in the TRBL channel and when SOT toggle 872 is normal. The presence of a mark in the OVFL MARKS channel will cause a negative signal pulse to be applied to the lower input of AND gate 897. When a negative signal pulse is applied to the DID lead by the operation of DID toggle 871 as described above, AND gate 897 will be actuated and in turn operate OVFL toggle 898. The operation of OVFL toggle 898 causes a positive signal voltage to be applied to the OVFL lead extending to an input of AND gates 883, 885, and 887 associated respectively with check circuits 884, 886 and 888. The calling subscriber has not been permitted to dial and therefore there is no called office code or dialed directory number digit recorded in the overflow register slot on Register Drum 20. The positive signal voltage on lead OVFL will disable the AND gates in the input to the check circuits associated with these channels and will thus prevent an attempt to check the plausibility of the numbers recorded in the CS class of service channels, the COC called office code channels, and the dialed directory number channels on Register Drum 20. The negative signal pulse on lead DID will as described above enable AND gates 873, 875, 877 and 879 and cause the operation of register toggles 874 and 876 to register the line equipment number and class of service number of the calling subscriber's line. Register toggles 878 and 880 will not be operated because there is no called office code or dialed directory number digit recorded in the overflow register slot on Register Drum 20. When a check of the line equipment number has been completed in check circuit 882 a negative signal pulse is applied over the LEN–OK lead to input A of AND gate 892. The operation of OVFL toggle 898 as described above also provides an enabling signal voltage for inputs B, C and D of AND gate 892. As shown in Fig. 21 the positive signal voltage applied to lead OVFL when OVFL toggle 898 is operated is inverted and applied to an input of OR gates 895, 890 and 891. The actuation of these OR gates in turn applies a negative signal voltage to inputs B, C and D of AND gate 892. The actuation of AND gate 892 will in turn cause the operation of SOT toggle 872 which in turn will send a negative signal pulse over the SOT lead to Out Trunk Selector 900. At the same time a positive signal voltage will be transmitted to Out Trunk Selector 900 from Dialed Information Dispatcher 860 over the OVFL lead. As shown in Fig. 21 and as described above this positive signal voltage is applied to the OVFL lead when OVFL toggle 898 operates in response to the reading of marks in the OVFL MARKS channel and SOT channel on Register Drum 20. In response to the negative signal pulse on the SOT lead and the positive signal voltage on the OVFL lead, Out Trunk Selector 900 will select an idle Overflow Tone Trunk on Trunk Drum 50 which will subsequently transmit an overflow tone to the calling subscriber. When the Overflow Tone Trunk has been selected, Out Trunk Selector 900 will apply a positive signal pulse to the TA lead which as described above will cause the resetting of OVFL toggle 898, SOT toggle 872 and register toggles 874 and 876.

In the event that the calling subscriber dials a single digit "0" for an operator, Dialing Assembler 850 will detect the end of dialing after this single digit and will apply a positive signal pulse to the OP lead. This positive signal pulse is applied to an input of AND gate 885 and AND gate 887 which will in effect disable check circuits 886 and 888. Because a single digit has been dialed, there is no information recorded in the B and C called office code channels nor in the dialed directory number channels on Register Drum 20. The operation of the circuits is similar to that described above. The actuation of AND gate 870 in turn will cause the actuation of DID toggle 871 which in turn will apply a negative signal pulse over the DID lead to enable AND gates 873 associated with the line equipment number channels, AND gates 875 associated with the class of service channels, and AND gates 877 associated with the A digit called office code channel. The enablement of these AND gates will cause the operation of the associated toggles 874, 876 and 878 to register the line equipment number, the class of service number, and the single digit dialed by the calling subscriber. This information is checked in check circuits 882 and 884 as described above, and when a check is obtained a negative signal pulse on the LEN–OK lead is applied to input A of AND gate 892. The negative signal pulse on the CSA–OK lead is applied to OR gate 895 and the actuation of OR gate 895 in turn causes a negative signal pulse to be applied to input B of AND gate 892. The positive signal pulse applied over the OP lead from Dialing Assembler 850 is inverted in an inverter and applied to OR gates 890 and 891. The actuation of these OR gates in turn applies negative signal pulses to inputs C and D of AND gate 892. The operation of the remaining circuits of Dialed Information Dispatcher 860 are identical to that described hereinbefore.

In the event that dialing is completed after a three digit code, for example an information code 411, Dialing Assembler 850 will apply a positive signal pulse over the 3D lead to Dialed Information Dispatcher 860. The circuits described hereinbefore operate in the same fashion except that in addition to checking the line equipment number and class of service number the three called office code digits A, B, and C, are also checked. When a valid check is obtained from the check circuits associated therewith, the negative signal pulses on the LEN–OK, the CSA–OK and the BC–OK leads will cause negative signal pulses to be applied to the A, B and C inputs of AND gate 892. The positive signal pulse on lead 3D from Dialing Assembler 850 is inverted in an inverter and applied to OR gate 891. The actuation of OR gate 891 in turn applies a negative signal pulse to input D of AND gate 892, and the actuation of AND gate 892 in turn causes the operation of the subsequent circuits in the same manner as described hereinbefore.

*Out trunk selector*

One specific illustrative embodiment of an Out Trunk Selector 900 employable in the combination of this invention is depicted in Figs. 22 through 24 when arranged as shown in Fig. 49 to which reference will now be made for a more detailed description of the circuit.

As indicated hereinbefore, Dialed Information Dispatcher 860 dispatches the class of service number and the line equipment number of a calling subscriber's line, the called office code number and the dialed directory number dialed by the calling subscriber, to Out Trunk Selector 900. This information is utilized by Out Trunk Selector 900 when a negative signal voltage is applied over the SOT lead to select an appropriate out trunk on Trunk Drum 50 in accordance with the called office code dialed by the calling subscriber. As shown in Fig. 24, the negative signal voltage on the SOT lead is applied to input B of AND gate (185) and to the input of RC Monopulser (191). RC Monopulser (190) is of the MPC type and will remain operated for one complete revolution of Trunk Drum 50 after it is triggered. During the interval that RC Monopulser (191) is in its operated condition, Out Trunk Selector 900 will attempt to locate and select an idle out trunk slot on Truck Drum 50 corresponding to the called office code dialed by the calling subscriber. If during the interval that RC Monopulser (191) is in its operated condition an idle out trunk to the called office is not available, Out Trunk Selector 900 will then proceed to connect the calling subscriber's line to an overflow tone trunk as will be described.

Out Trunk Selector 900 located an appropriate out trunk by matching the class of service and called office code information dispatched from Dialed Information Dispatcher 860 with the class of service numbers and called office codes recorded in successive out-trunk slots on Trunk Drum 50. Successive office codes are read from Trunk Drum 50 and are applied to the right-hand terminals of match circuits (175) and (176) shown in Fig. 22. The class of service of the calling subscriber's line and the called office code dialed by the calling subscriber are applied to the left-hand terminals of match circuits (175) and (176) through AND gates (178) shown in Fig. 22. AND gates (178) are in an enabled condition as long as TAT toggle (194) shown in Fig. 24 is normal. With TAT toggle (194) normal, a positive signal voltage is applied over the TAT lead to the lower input of each of AND gates (178).

When an office code read from Trunk Drum 50 matches the called office code dialed by the calling subscriber, match circuits (175) and (176) will apply a negative signal pulse to inputs A and C respectively of AND gate (185) shown in Fig. 24. If the called office code read from Trunk Drum 50 is in an out-trunk slot, a mark will be present in the OTM out-trunk marks channel on Trunk Drum 50. The presence of the mark in the OTM channel will cause a negative signal pulse to be applied to input D of AND gate (185). Furthermore, if the selected out-trunk slot on Trunk Drum 50 is idle, there will be no mark in its TRK BUSY trunk busy channel on Trunk Drum 50, and accordingly a negative signal voltage will be applied to input E of AND gate (185). Therefore, with enabling signal voltages on all of the inputs of AND gate (185), this AND gate will be actuated to in turn trigger TB Monopulser (187).

The actuation of TB Monopulser (187) applies a positive signal voltage through an OR gate to the upper input of an AND gate connected to the writing amplifier associated with the TRK BUSY channel on Trunk Drum 50 to cause a mark to be written therein. The positive signal voltage from the output of TB Monopulser (187) is also applied over the TA lead to AND gates (189) shown in Fig. 23. This signal will enable these AND gates and cause the line equipment number of the calling subscriber's line and the dialed directory number dialed by the calling subscriber to be recorded in the appropriate channels on Trunk Drum 50.

The positive signal voltage from the output of TB Monopulser (187) is also applied through an OR gate to the upper input of an AND gate connected to the writing amplifier associated with the DIAL'G COMP dialing complete channel on Trunk Drum 50 to cause a mark to be written in the selected out-trunk slot on Trunk Drum 50. The mark written in the DIAL'G COMP channel on Trunk Drum 50 gives an indication to Switching Information Dispatcher 910 to proceed with the establishment of a connection between the calling subscriber's line and the selected out trunk in a manner to be described hereinafter.

The positive signal voltage on the TA lead is also applied back to Dialed Information Dispatcher 860 which as described hereinbefore gives an indication to that circuit that an out trunk has been selected for this call and that the register toggles in which the line equipment number, class of service number, called office code and dialed directory numbers were recorded, may be released. The positive signal voltage from the output of TB Monopulser (187) is also applied through RRC cathode follower (192) to the resetting input of RC Monopulser (191), thus causing this monopulser to return to its normal condition. The positive signal voltage from the output of TB Monopulser (187) is also applied to the lower input of TAT AND gate (193). This positive signal voltage will disable this AND gate and prevent its operation by the negative signal pulse applied to its upper input when RC Monopulser (191) returns to normal. The positive signal voltage from the output of TB Monopulser (187) is also inverted and applied to the resetting input of TAT toggle (194) to reset this toggle if it is operated as will be described hereafter.

In the manner described in detail in the above-cited Malthaner-Vaughan patent, after the calling subscriber and the called subscriber have terminated their call and have hung up, Trunk Condition Information Assembler (383) will recognize this hangup condition and will apply a positive signal pulse to the EE lead which is connected respectively through associated AND gates to the writing amplifiers associated with the DIAL'G COMP channel, the TRK BUSY channel, the LEN line equipment number channels and the DDN dialed directory number channels. The positive signal on lead EE will cause the erasure of the marks present in these channels and will in this fashion make the out trunk associated with the out-trunk channel on Trunk Drum 50 available for a succeeding call.

In the event that Out Trunk Selector 900 was unable to locate an idle out trunk corresponding to the called office code dialed by the calling subscriber during the time that RC Monopulser (191) was in its operated condition, Out Trunk Selector 900 will establish a connection between the calling subscriber's line and an overflow tone trunk. When RC Monopulser (191) returns to normal, a negative signal pulse will be applied to the upper input of AND gate (193) shown in Fig. 24. The lower input of AND gate (193) will have a negative signal potential applied thereto because TB Monopulser (187) is in its normal condition. The actuation of TAT AND gate (193) in turn causes the actuation of OR gate 902 which will in turn apply the negative signal pulse to the input of TAT toggle (194). The operation of TAT toggle (194) will cause a negative signal voltage to be applied over the TAT lead to the AND gates (178) shown in Fig. 22. This negative signal will disable AND gates (178) and prevent the class of service number and called office code number from being transmitted to match circuits (175) and (176). The operation of TAT toggle (194) also applies a positive signal voltage over lead OB to an input of OR gates (196) shown in Fig. 22. The actuation of OR gates (196) applies an input over the B2, B4 and B7 inputs to match circuit (176). These signals represent an artificial code associated with an overflow trunk. When an out-trunk slot on Trunk Drum 50, associated with an overflow tone trunk, is read by the circuits associated with Out Trunk Selector 900, a match will be obtained in the B2, B4 and B7 channels between the signals from the output of OR gates (196) and the marks recorded in the B2, B4 and B7 channels in Trunk Drum 50. The remaining channels in the overflow tone trunk slot on Trunk Drum 50 will have no marks recorded therein and accordingly a match is obtained in match circuits (175) and (176). The output of match circuits (175) and (176) is applied to inputs A and C of AND gate (185) which are combined with the negative signal pulse on the SOT lead, the negative signal voltage from the OTM channel on the D input and the negative signal voltage on the E input from the TRK BUSY channel if the selected overflow tone trunk is idle. AND gate (185) will be actuated in the manner described hereinbefore and will cause the actuation of TB Monopulser (187). The actuation of TB Monopulser (187) will cause the line equipment number of the calling subscriber's line to be recorded on Trunk Drum 50 in the selected overflow tone trunk slot, and the Switching Information Dispatcher 910 will subsequently establish a connection to the selected overflow tone trunk to return an overflow tone to the calling subscriber. The operation of TB Monopulser (187) will apply a positive signal voltage which is inverted in an inverter and applied as a negative voltage to the TAT toggle (194) thus resetting this toggle. When the calling subscriber, upon hearing the overflow tone, hangs up, the Trunk Condition Information Assembler (383) will be actuated as described hereinafter to cause the erasure of the marks in the selected overflow tone trunk slot on Trunk Drum 50.

As indicated hereinbefore, when there is no idle register slot on Register Drum 20 to accept the digits to be dialed by a calling subscriber's line, the connection from the calling subscriber is immediately established to an overflow tone trunk. Dialed Information Dispatcher 860 will apply a negative signal pulse over the SOT lead, and a positive signal pulse over the OVFL lead, to Out Trunk Selector 900. The positive signal pulse on the OVFL lead is inverted and applied along with the negative signal pulse on the SOT lead to AND gate 901. The actuation of AND gate 901 in turn causes the actuation of OR gate 902 which in turn causes TAT toggle (194) to operate. The operation of TAT toggle (194), in the manner described hereinbefore, causes the selection of an overflow tone slot on Trunk Drum 50 and the establishment of the connection between the calling subscriber's line and the selected overflow tone trunk. Again, overflow tone is returned to the calling subscriber in the manner indicated above.

*Switching information dispatcher (trunks)*

Switching Information Dispatcher 910 associated with Trunk Drum 50 and employable in the combination of this invention is depicted in Fig. 25 and is essentially the same as Switching Information Dispatcher (Register) 830 described above with reference to Figs. 6 through 8. Switching Information Dispatcher 910 is also similar to Switching Information Dispatcher In (655) and Switching Information Dispatcher Out (248) shown respectively in Fig. (70) and in Figs. (26) through (31) in the above-cited Malthaner-Vaughan patent. A detailed circuit of Switching Information Dispatcher 910 is shown in Fig. 25, the portion of Fig. 6 below and to the right of dotted line 912, and in Figs. 7 and 8, when arranged as shown in Fig. 50, by assuming that Register Drum 20 shown in Fig. 8 is Trunk Drum 50 and that the register equipment number channels thereon are trunk equipment number channels. To further simplify the understanding of this circuit by referring to the description of the circuit of Figs. 6 through 8 given hereinbefore, elements in Fig. 25 having similar functions to elements shown in Fig. 6 are identified by the same number as in Fig. 6 but marked with a prime.

As indicated hereinbefore, Trunk Drum 50 utilized in the combination of the present invention contains both in-trunk and out-trunk slots associated respectively with in trunks and out trunks, and accordingly Switching Information Dispatcher 910 is associated with Trunk Drum 50 to dispatch trunk equipment numbers and line equipment numbers to Switching Number Group Connector (251) for both originating and terminating calls. Out-trunk slots on Trunk Drum 50 are identified by a mark written in the OTM out-trunk marks channel, and in-trunk slots are identified by a mark written in the ITM in-trunk marks channel. Referring to Fig. 25, it will be noted that one channel on Trunk Drum 50 is designated TRANSL MADE or DIAL'G COMP which stand respectively for translation made and dialing complete. In out-trunk slots this channel is designated DIAL'G COMP and in in-trunk slots this channel is designated TRANSL MADE.

As described hereinbefore, a mark is written in the DIAL'G COMP channel of an out-trunk slot on Trunk Drum 50 when the digits dialed by a calling subscriber and the calling subscriber's line equipment number have been recorded in a selected out-trunk slot. As described in detail in the above-cited Malthaner-Vaughan patent, the presence of a mark in the TRANSL MADE channel of an in-trunk slot is an indication to Switching Information Dispatcher 910 that a translation of a called subscriber's directory number has been made to determine the line equipment number of the called subscriber's line and that this line equipment number has been recorded in the appropriate line equipment number channels on Trunk Drum 50. A mark in this channel gives an indication to Switching Information Dispatcher 910 to proceed to dispatch the line equipment number of the subscriber's line and the trunk equipment number of the trunk associated with the selected trunk slot to Switching Number Group Connector (251). The operation of the circuits of Switching Information Dispatcher 910 is similar to that described above with respect to the Switching Information Dispatcher (Register) 830. When a mark is read in the DIAL'G COMP or TRANSL MADE channel, when a mark is read in either the OTM or ITM channels, when there is an absence of a mark in the CONN BLKD channel, when there is an absence of a mark in the TRBL channel, when there is an absence of a mark in the SW NET INF channel, and when the Switching Information Dispatcher 910 is idle, AND gate 831′ shown in Fig. 25 will be actuated as well as AND gate (254) shown in Fig. 8. The operation of the circuits of Figs. 25, 7 and 8 are identical to that described hereinbefore for the dispatching of the trunk equipment number and the line equipment number to Switching Number Group Connector (251).

Returning again to Figs. 2A and 2B, when a connection is established through Switching Network (49) between the calling subscriber's line and a selected out trunk such as out trunk (380) shown in Fig. 2B, out trunk (380) will return a signal by way of Scanner 25 when the connection has been established. Scanner 25 in response to this signal will in turn apply a signal to Trunk Condition Information Assembler (383) which in turn causes a mark to be written in the out-trunk slot on Trunk Drum 50 associated with the selected out trunk (380). Transmitter (394) will be seized when this mark is read in the out-trunk slot on Trunk Drum 50 and will in turn utilize the trunk equipment number of the selected out trunk to establish a connection between Transmitter (394) and the selected out trunk. When this connection is established Transmitter (394) will transmit the dialed directory number of the called subscriber to the called office and the connection is established therein to the called subscriber in the manner described in the Malthaner-Vaughan patent referred to hereinbefore. The circuits for out trunk (380), Trunk Condition Information Assembler (383), Transmitter (394), and the circuits of the terminating office, are disclosed and described in detail in the Malthaner-Vaughan patent.

When the conversation is terminated and hangup occurs the open loop condition will cause a signal to be applied to Trunk Condition Information Assembler (383) by Scanner 25 when it scans out trunk (380). In the manner described hereinbefore and described in detail in the aforementioned Malthaner-Vaughan patent, the detection of this hangup condition by Trunk Condition Information Assembler (383) will cause the release of the circuits and the erasure of all marks written on the magnetic drums in the illustrative embodiment of the present invention.

*Detailed description—repertory call*

As indicated hereinbefore, repertory dialing subscribers may establish calls to parties in their individual repertories by dialing a two digit repertory code associated with the particular party desired. The circuits described hereinbefore for a nonrepertory call operate in the same manner for a repertory call as far as the detection of the request for service, and the selection of an idle slot on Register Drum 20, are concerned. A calling subscriber's request for service is detected by a Service Request Detector 800 which in turn transmits a signal to Service Request Dispatcher 810 indicating that a particular calling subscriber desires to establish a call. Service Request Dispatcher 810 then signals Register Selector 820 that an idle register slot on Register Drum 20 is required and transmits the line equipment number and class of service number of the calling subscriber's line through Lockout Connector 819 to Register Selector 820. When Register Selector 820 locates an idle register slot on Register Drum 20, it records the line equipment number and class of service number of the calling subscriber's line in the selected register slot.

Switching Information Dispatcher 830 then establishes a connection between the calling subscriber's line and the Dial Repeating Circuit 21 associated with the selected register slot on Register Drum 20 through Switching Network (49). Dial Repeating Circuit 21 transmits dial tone to the calling subscriber who thereupon may dial the desired two digit repertory code. The openings and closures of the calling subscriber's line loop are detected by scanner 24 and are accumulated and recorded in the selected register slot on Register Drum 20 by Dialing Assembler 850.

When the dialing of the two digit repertory code has been completed, Dialing Assembler 850 checks to determine if the calling subscriber is entitled to repertory dialing service. This is accomplished by checking the class of service number recorded in the selected register slot on Register Drum 20. If it is determined that the calling subscriber is entitled to repertory dialing service, Dialing Assembler 850 causes a mark to be written in SRT start repertory translation channel on Register Drum 20 in the manner described hereinbefore. The mark present in the SRT start repertory translation channel of the selected register slot on Register Drum 20 is an indication that the calling subscriber has placed a repertory call and that the Repertory Drum 30 must be consulted to determine the directory number the calling subscriber has assigned to the dialed repertory code.

Repertory Translation Consulter 915 will be activated in response to he reading of the mark in the SRT channel in Register Drum 20, and this circuit will read and dispatch the line equipment number of the calling subscriber's line and the dialed repertory code through Lockout Connector 955 to Repertory Translation Dispatcher 960. As will be described hereinafter, after the directory number assigned to the dialed repertory code has been determined by Repertory Translation Dispatcher 960 and dispatched back through Lockout Connector 955 to Repertory Translation Consulter 915, the latter circuit records the directory number in the selected register slot on Register Drum 20. When this is completed, Repertory Translation Consulter 915 causes a mark to be placed in the REG'N COMP channel on the Register Drum 20 to indicate that the complete directory number of the called subscriber has been recorded in the selected register slot on Register Drum 20.

In response to the mark in the REG'N COMP channel, Switching Information Dispatcher 830 will effect the disconnection of the established path through Switching Network (49) between the calling subscriber's line and the selected Dial Repeating Circuit 21 as described hereinbefore and will also place a mark in the SOT select out-trunk channel on Register Drum 20 to indicate to Dialed Information Dispatcher 860 to proceed with the establishment of the call.

*Repertory translation consulter*

One specific illustrative embodiment of a Repertory Translation Consulter 915 employable in the combination of this invention is depicted in Figs. 26 through 29 when arranged as shown in Fig. 51 to which reference will now be made for a more detailed description of the circuit.

Figure 26:
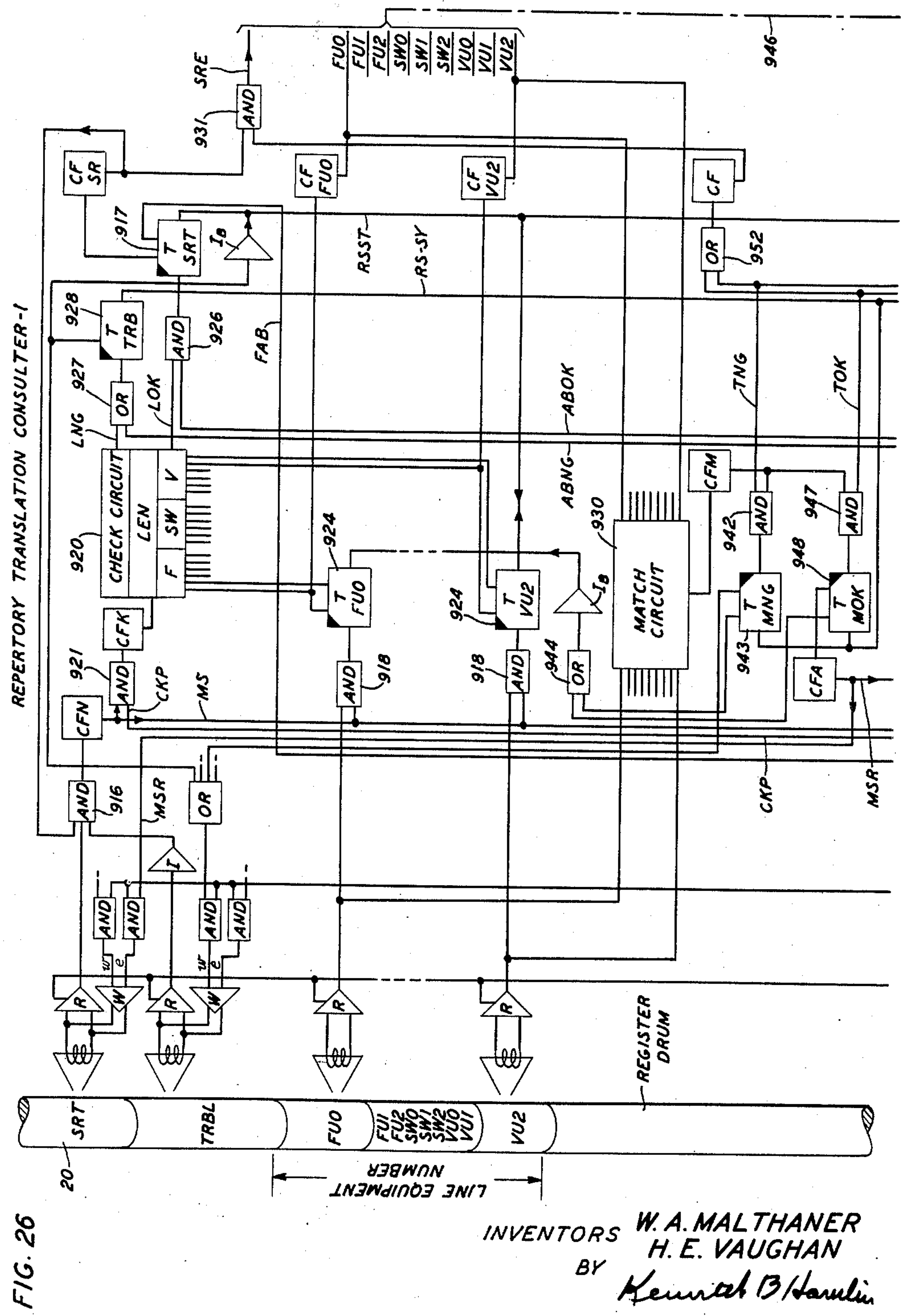

As described hereinbefore, when Dialing Assembler 850 recognizes the end of dialing after two digits have been dialed by a calling subscriber and these digits have been recorded in a selected register slot on Register Drum 20, and when Dialing Assembler 850 determines that the class of service of the calling subscriber entitles the subscriber to repertory dialing service, a mark is written in the SRT start repertory translation channel on Register Drum 20. The mark present in this channel is an indication to Repertory Translation Consulter 915 that the calling subscriber is making a repertory call and that the Repertory Drum 30 must be consulted to determine the directory number associated with the two digit repertory code dialed by the calling subscriber. When a mark is detected in the SRT channel of a selected register slot and there is an absence of a mark in the TRBL channel on Register Drum 20 and the SRT toggle 917 shown in Fig. 26 is normal, AND gate 916 shown in Fig. 26 will be actuated. The actuation of AND gate 916 will in turn apply a negative signal pulse to lead MS which extends to an input of each of the AND gates 918 associated with the line equipment number toggles 924 shown in Fig. 26 and to each of AND gates 919 associated with the repertory code toggles 925 shown in Fig. 27. The negative signal pulse on the lead MS will enable AND gates 918 so that the read pulses in the LEN line equipment number cells cause the line equipment number toggles 924 shown in Fig. 26 to operate. In this manner the line equipment number recorded in the selected register slot on Register Drum 20 is recorded in the associated line equipment number toggles 924. Similarly, the negative signal pulse on lead MS enables AND gates 919 shown in Fig. 27 so that the read pulses in the COC called office code channels for the A and B digit cause the repertory code toggles 925 shown in Fig. 27 to operate. In this manner the two digit repertory code dialed by the calling subscriber and recorded in the selected register slot on Register Drum 20 is recorded in the associated toggles 925.

Figure 27:
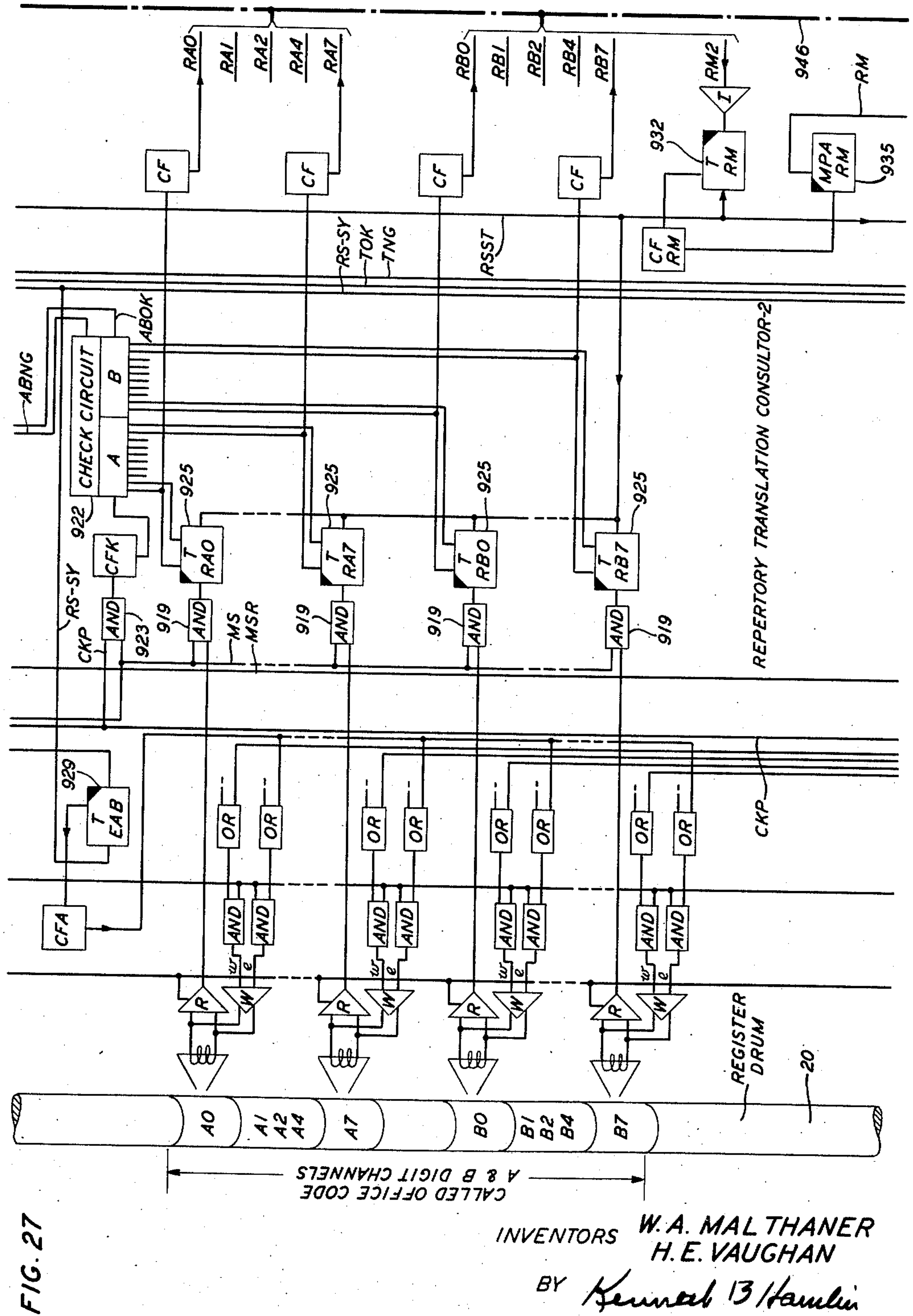

The negative signal pulse on lead MS from AND gate 916 is also applied to an input of AND gate 921 shown in Fig. 26 and AND gate 923 shown in Fig. 27. A short time thereafter when a check pulse on the CKP lead occurs, AND gate 921 and AND gate 923 will be actuated to in turn control the checking of the line equipment number registered in toggles 924 and the repertory code registered in toggles 925 in check circuit 920 and check circuit 922 respectively. Check circuit 920 and check circuit 922 will in a manner similar to that described hereinbefore check the plausibility of the line equipment number recorded in toggles 924 and the plausibility of the repertory code recorded in toggles 925. If the line equipment number does not check, a negative signal pulse will be applied over the LNG lead to an input of OR gate 927 and the actuation of OR gate 927 in turn operates TRB toggle 928 shown in Fig. 26. Similarly, if the repertory code does not check, check circuit 922 will apply a negative signal pulse over the ABNG lead to an input of OR gate 927. It will therefore be noted that if either check circuit 920 or check circuit 922 determines that an incorrect code is registered in toggles 924 and 925, OR gate 927 will be actuated to in turn actuate TRB toggle 928. The operation of TRB toggle 928 causes a positive signal voltage to be applied through an OR gate to the AND gate connected to the writing amplifier associated with the TRBL channel on Register Drum 20 and causes a mark to be written in this channel. A short time thereafter, TRB toggle 928 is reset to normal by the reset sync pulse over the RS-SY lead. When TRB toggle 928 is reset, a negative signal pulse is applied through an inverter of the $I_B$ type to the RSST lead. The negative signal pulse on the RSST lead will at this time reset the line equipment number toggles 924 shown in Fig. 26 and the repertory code toggles 925 shown in Fig. 27.

Should check circuit 920 and check circuit 922 determine that the line equipment number and the repertory code recorded respectively in toggles 924 and 925 are plausible codes, a negative signal pulse on the LOK lead from check circuit 920 and a negative signal pulse on the ABOK lead from check circuit 922 are combined in AND gate 926 shown in Fig. 26. The actuation of AND gate 926 in turn will apply a negative signal pulse to operate SRT toggle 917. The operation of SRT toggle 917 applies a positive signal voltage through the SR cathode follower to the upper input of AND gate 916. This positive signal voltage will disable AND gate 916 and prevent its actuation in response to the reading of a mark in the SRT channel of a subsequent register slot on Register Drum 20. The positive signal from the output of SRT toggle 917 through cathode follower SR is also applied to the upper input of AND gate 931 shown in Fig. 26. The lower input of AND gate 931 is connected through a cathode follower to the output of OR gate 952. The inputs to OR gate 952 are connected to the TNG and TOK leads which extend respectively to the output of TNG toggle 941 and TOK toggle 945 shown in Fig. 28. With these toggles normal as shown, both leads TNG and TOK will be at a positive potential and accordingly the output lead from OR gate 952 will be at a positive potential. Accordingly, when SRT toggle 917 is actuated and applies a positive signal potential to the upper input of AND gate 931 this AND gate will be actuated. The actuation of AND gate 931 applies a positive signal voltage over the SRE lead which extends via cable 946 to Lockout Connector 951. This positive signal voltage will cause Lockout Connector 951 to establish a connection between Repertory Translation Consulter 916 and Repertory Translation Dispatcher 960. When this connection is established through Lockout Connector 951, the line equipment number recorded in toggles 924 shown in Fig. 26 is dispatched via leads FU0, FU1, FU2, SW0, SW1, SW2, VU0, VU1 and VU2 in cable 946 to Repertory Translation Dispatcher 960. At the same time the repertory code recorded in toggles 925 shown in Fig. 27 is dispatched via leads RA0, RA1, RA2, RA4, RA7, RB0, RB1, RB2, RB4 and RB7 in cable 946 to Repertory Translation Dispatcher 960.

The operation of SRT toggle 917 also causes a negative signal voltage to be applied over the EAB lead which extends to the input of EAB toggle 929 shown in Fig. 27. EAB toggle 929 will be operated in response to this negative signal voltage and will cause a positive signal voltage to be applied through OR gates to the AND gates connected to the writing amplifiers associated with the A and B digit called office code channels on Register Drum 20. This positive signal voltage will cause the erasure of the repertory code dialed by the calling subscriber and recorded in these channels.

As will be described in detail hereinafter, when the line equipment number of a calling subscriber's line and a repertory code dialed by the calling subscriber are dispatched to Repertory Translation Dispatcher 960, this circuit will match the line equipment number received from the Repertory Translation Consulter 915 with the successive line equipment numbers recorded on Repertory Drum 30 to locate the calling subscriber's individual repertory area on Repertory Drum 30. When a match is obtained, Repertory Translation Dispatcher 960 will then match the repertory code dialed by the calling subscriber and received from Repertory Translation Consulter 915 with the repertory codes recorded on Repertory Drum 30 in the calling subscriber's individual repertory area. When a match is obtained Repertory Translation Dispatcher 960 will read the directory number recorded on Repertory Drum 30 which the calling subscriber has assigned to the dialed repertory code and dispatch this number via Lockout Connector 955 to Repertory Translation Consulter 915 over leads in cable 946. The called office code portion of this number is recorded in the toggles 933 shown in Fig. 28 and the number portion of this directory number is recorded in the thousands, hundreds, tens and units toggles 934 shown in Fig. 29.

At the same time, Repertory Translation Dispatcher 960 dispatches a positive signal voltage over the RM2 lead in cable 946. This positive signal voltage is inverted in an inverter and applied to the RM toggle 932 shown in Fig. 27. The operation of RM toggle 932 applies a negative signal voltage through a catrode follower to operate RM monopulser 935. When RM monopulser 935 restores to normal after a predetermined interval of approximately 0.7 μsecond a negative signal pulse is applied to the RM lead. This negative signal pulse is applied to the input of check circuit 938 shown in Fig. 28 and to the input of AND gate 936 shown in Fig. 29. The occurrence of the negative signal pulse on the RM lead will actuate check circuit 938 which will check the plausibility of the registration of the three called office code digits registered in toggles 933. Similarly, AND gate 936 will be actuated by the negative signal pulse on the RM lead provided there is a registration of a directory number recorded in toggles 934. As shown in Fig. 29, the output of each of the toggles 934 is applied to an input of OR gate 937. Accordingly, as long as at least one of these toggles contains a registration, OR gate 937 will be actuated to in turn cause the enablement of AND gate 936. The actuation of AND gate 936 will in turn cause the operation of check circuit 939 to check the plausibility of the dialed directory number of digits recorded in toggles 934. As indicated hereinbefore and as will be described in detail hereinafter, when a repertory dialing calling subscriber dials a special repertory change code or a special repertory verification code, a three digit code is transmitted from the Repertory Drum 30 to the Repertory Translation Consulter 915 and is recorded in the A, B and C called office channels on Register Drum 20. If this occurs there will be no dialed directory number digits recorded in the toggles 934 shown in Fig. 29, and accordingly no necessity for checking the plausibility of a dialed directory number. In this eventuality OR gate 937 will not be actuated nor will AND gate 936 be actuated. In the event that a full seven digit number including three called office code digits and four dialed directory number digits are recorded in toggles 933 and 934, check circuits 938 and 939 will check the plausibility of these codes. If either the called office code digits or the dialed directory number digits fail to check, OR gate 940 shown in Fig. 28 will be actuated. If check circuit 939 determines that the dialed directory number digits are incorrect, a negative signal pulse will be applied from check circuit 939 over the DNNG lead to actuate OR gate 940, or if check circuit 938 determines that the called office code digits registered in toggles 933 are incorrect a negative signal pulse will be applied over the ABCNG lead to actuate OR gate 940. The actuation of OR gate 940 causes the operation of TNG toggle 941. The operation of TNG toggle 941 applies a negative signal voltage over the TNG lead to the upper input of AND gate 942 shown in Fig. 26 to partially enable this AND gate. The negative signal voltage on lead TNG is also applied to OR gate 952 shown in Fig. 26. The actuation of OR gate 952 applies a negative signal voltage to the lower input of AND gate 931 thus disabling this AND gate. The disablement of AND gate 931 causes the removal of the positive signal voltage from the SRE lead in cable 946 to Lockout Connector 955. The removal of this signal voltage from the SRE lead causes Lockout Connector 955 to release the established connection between Repertory Translation Consulter 915 and Repertory Translation Dispatcher 960.

Concurrent with the removal of the positive signal voltage from the SRE lead, a positive signal pulse from the right-hand output of TNG toggle 941 is applied through a cathode follower to the CNG lead extending in cable 946 to Lockout Connector 955 when TNG toggle 941 operates. As described above TNG toggle 941 operates when check circuit 938 or 939 determines that the directory number registered in toggles 933 and 934 is incorrect. This indicates that the source of the error may be in the codes originally recorded on Repertory Drum 30. Accordingly a positive signal pulse is transmitted over the CNG lead in cable 946 through Lockout Connector 955 to Repertory Translation Dispatcher 960 which in the manner to be described hereinafter writes a mark in the TRBL trouble channel of the slot on Repertory Drum 30 from which the directory number was read.

After the called office code digits and the dialed directory number digits recorded in the calling subscriber's repertory on Repertory Drum 30 have been dispatched to Repertory Translation Consulter 915 and recorded in the associated toggles 933 and 934 and checked by check circuits 938 and 939 respectively as described above, Repertory Translation Consulter 915 now relocates the original register slot on Register Drum 20 seized for the calling subscriber. This is accomplished by matching the line equipment number of the calling subscriber's line recorded in toggles 924 shown in Fig. 26 with the line equipment numbers successively read from Register Drum 20. This matching takes place in match circuit 930, and when a match is obtained a negative signal pulse will be applied from the output of match circuit 930 to an input of AND gate 942 and AND gate 947. As indicated hereinbefore, a negative signal voltage is applied over the TNG lead to the upper input of AND gate 942 when the called office code digits and dialed directory number digits read from Repertory Drum 30 are incorrectly recorded in toggles 933 and 934. In this eventuality, AND gate 942 will be actuated when match circuit 930 locates the original rgeister slot on Register Drum 20 seized for the calling subscriber's line. The actuation of AND gate 942 causes a negative signal pulse to be applied to MNG toggle 943 shown in Fig. 26. The operation of MNG toggle 943 causes a positive signal pulse to be applied through an OR gate to the AND gate connected to the writing amplifier associated with the TRBL channel on Register Drum 20, and this signal will cause a mark to be written in this channel indicating a trouble condition. When MNG toggle 943 is reset by the sync pulse on the RS–SY lead, a positive signal pulse will be applied from its output to the lower input of OR gate 944 shown in Fig. 26. The positive signal pulse from the output of OR gate 944 is inverted in an $I_B$ type inverter, and a negative signal pulse is applied to the RSST lead to cause the resetting of toggles 924 and toggle 917 shown in Fig. 26, toggles 933 and toggle 932 shown in Fig. 27, toggles 933 and toggle 941 shown in Fig. 28 and toggle 934 shown in Fig. 29. In this manner the toggles and circuits of Repertory Translation Consulter 915 are restored to normal and the circuit is available to handle a subsequent repertory dialing subscriber's call.

Figure 28:
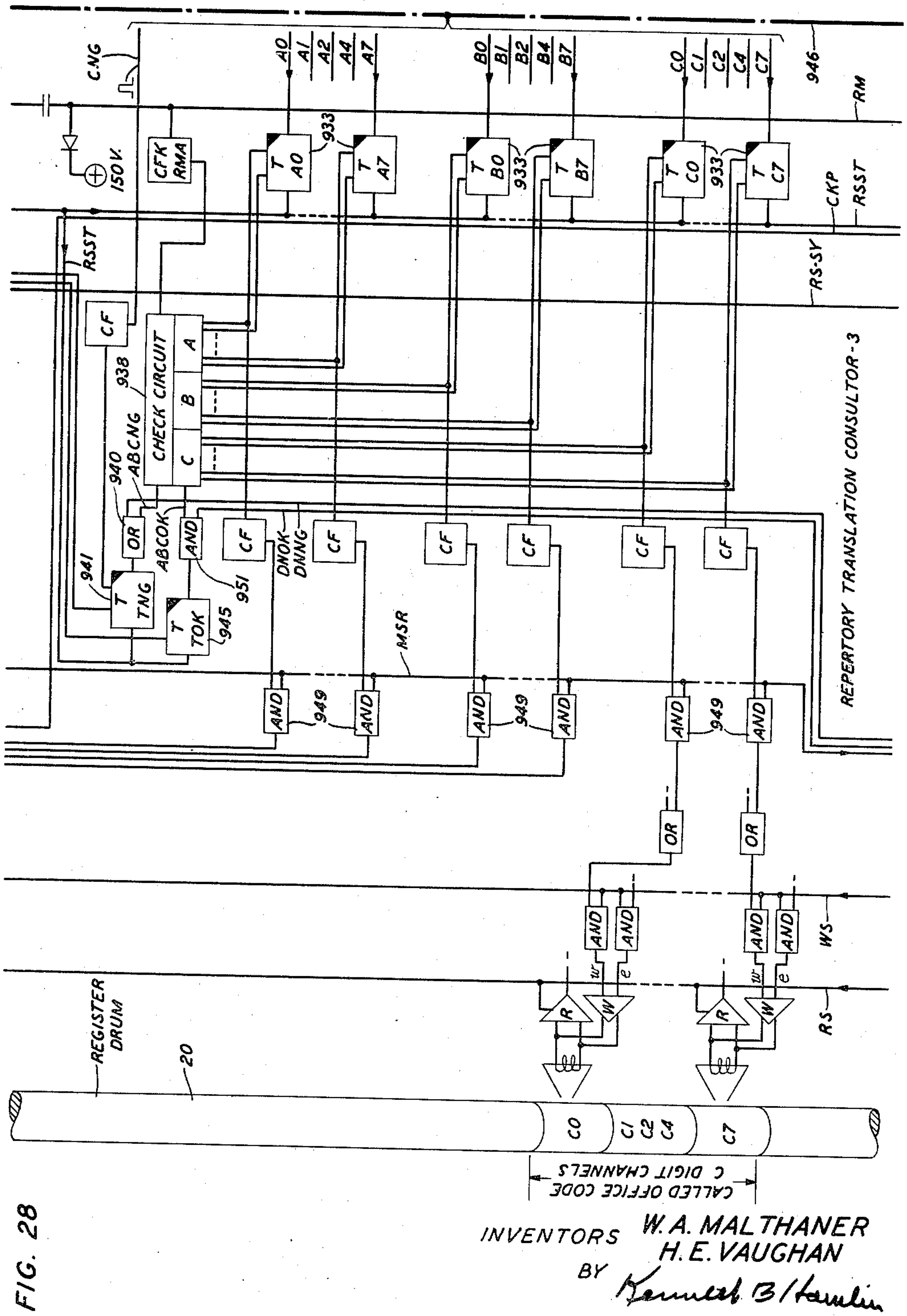
Figure 29:
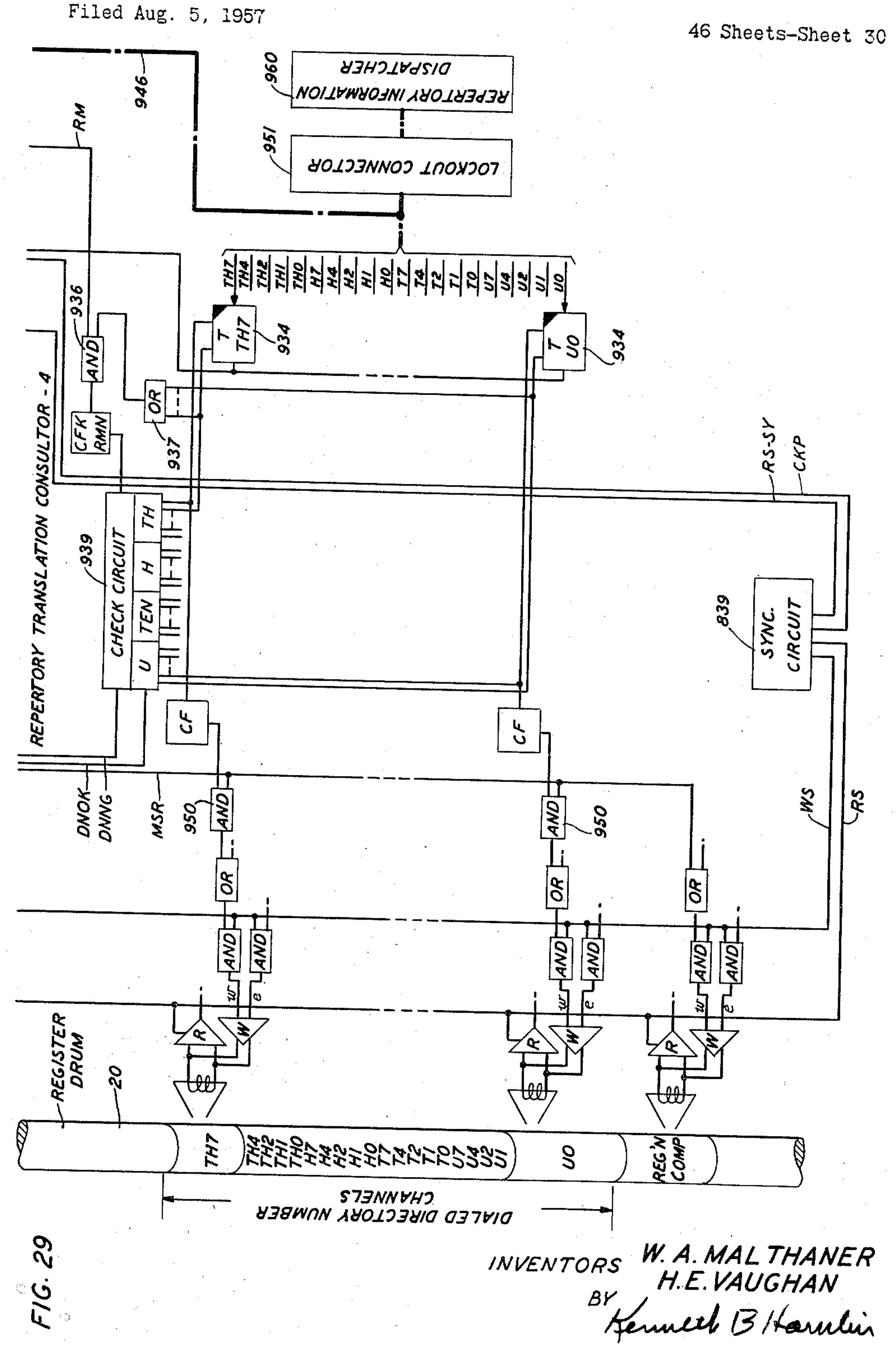

If the called office code digits and the dialed directory number digits registered respectively in toggles 933 and 934 are found to be OK by check circuits 938 and 939 respectively, a negative signal pulse on the DNOK lead from the output of check circuit 939 and a negative signal pulse on the ABCOK lead from the output of check circuit 938 are combined in AND gate 951 shown in Fig. 28. The actuation of AND gate 951 in turn causes the operation of TOK toggle 945. The operation of TOK toggle 945 causes a negative signal voltage to be applied over the TOK lead to the lower input of AND gate 947 shown in Fig. 26 thus partially enabling this AND gate. The negative signal voltage on lead TOK is also applied to OR gate 952 shown in Fig. 26. The actuation of OR gate 952 will, as described above, apply a negative signal voltage to the lower input of AND gate 931 to disable this AND gate. The disablement of AND gate 931 causes the removal of the positive signal voltage from the SRE lead in cable 946 to Lockout Connector 955 to cause the release of the established connection between Repertory Translation Consulter 915 and Repertory Translation Dispatcher 960.

When an output is obtained from match circuit 930 indicating that the register slot on Register Drum 20 originally seized for the calling subscriber's line has been located, AND gate 947 will be actuated to in turn cause the operation of MOK toggle 948 shown in Fig. 26. The operation of MOK toggle 948 causes a positive signal pulse to be applied through a cathode follower to the MSR lead. This pulse on the MSR lead is applied to the AND gate connected to the writing amplifier associated with the SRT channel on Register Drum 20 and will cause the mark recorded in the SRT channel to be erased. The positive signal pulse on the MSR lead is also applied to an input of each of AND gates 949 shown in Fig. 28 and each of AND gates 950 shown in Fig. 29. The operation of AND gates 949 and 950 by the positive signal pulse on the MSR lead will cause the registration of the called office code digits and the dialed directory number digits recorded in toggles 933 and 934 respectively to be written in the associated channels on Register Drum 20. In addition, the positive signal pulse on the MSR lead is applied via an OR gate to the AND gate connected to the writing amplifier associated with the REG'N COMP channel on Register Drum 20 and will cause a mark to be written in this channel. As described hereinbefore, when a mark is written in the REG'N COMP channel on Register Drum 20 an indication is given to Switching Information Dispatcher 830 that dialing is completed and this circuit controls the disconnection of the path through Switching Network (49) between the calling subscriber's line and the selected Dial Repeating Circuit 21. Switching Information Dispatcher 830 in the manner described hereinbefore causes a mark to be written in the SOT select out-trunk channel on Register Drum 20 which gives an indication to Dialed Information Dispatcher 860 to proceed with the establishment of the call to the called party.

When the reset sync pulse occurs on the RS–SY lead, the MOK toggle 948 is reset. When this toggle is reset a positive signal pulse is applied to the upper input of OR gate 944 actuating this OR gate. The positive output pulse from OR gate 944 is inverted in an inverter of the $I_B$ type, and a negative signal pulse is applied over the RSST lead which in turn resets toggles 934, toggle 917 shown in Fig. 26, toggles 925 and toggle 932 shown in Fig. 27, toggle 945 and toggles 933 shown in Fig. 28 and toggles 934 shown in Fig. 29, and thus the circuit is available to handle a subsequent repertory dialing subscriber's call.

As shown in Figs. 2A and 2B, Repertory Translation Consulter 915 is connected to an input of Lockout Connector 955. Other inputs of Lockout Connector 955 are connected to Repertory Verification Register Trunks 23. The output of Lockout Connector 955 is connected to Repertory Translation Dispatcher 960. Lockout Connector 955 is similar to Lockout Connector 819 described hereinbefore in that it enables a plurality of input circuits such as Repertory Translation Consulter 915 and Repertory Verification Register Trunks 23 to utilize a single Repertory Translation Dispatcher 960. As will be described hereinafter, Repertory Translation Consulter 915 or Repertory Verification Register Trunk 23 dispatch through Lockout Connector 955 to Repertory Translation Dispatcher 960 the line equipment number of a calling subscriber's line and a dialed two digit repertory code. Repertory Translation Dispatcher 960 utilizes this information to locate the repertory area on Repertory Drum 30 assigned to the particular calling subscriber and then the particular slot on Repertory Drum 30 in which the dialed repertory code is recorded. Repertory Translation Dispatcher 960 then reads the number associated with the dialed repertory code in this slot on Repertory Drum 30 and dispatches the same through Lockout Connector 955 back to the Repertory Translation Consulter 915 or a Repertory Verification Register Trunk 23 as the case may be.

*Repertory translation dispatcher*

One specific illustrative embodiment of a Repertory Translation Dispatcher 960 employable in the combination of this invention is depicted in Figs. 30 and 31 when arranged as shown in Fig. 52 to which reference will now be made for a more detailed description of the circuit.

The primary function of Repertory Translation Dispatcher 960 is to locate the individual repertory area on Repertory Drum 30 assigned to a calling repertory dialing subscriber and to then locate and determine the directory number assigned to the particular repertory code dialed by the calling subscriber. As described hereinbefore under the heading Repertory Translation Consulter and as will be described hereinafter under the heading Repertory Verification Register Trunk, when a repertory call is being made Repertory Drum 30 must be consulted to determine a directory number associated with a dialed repertory code. If the call is a regular repertory call, Repertory Translation Dispatcher 960 is connected to Repertory Translation Consulter 915 through Lockout Connector 955. As will be described hereinafter, if the call is a repertory verification call, Repertory Translation Dispatcher 960 will be connected to Repertory Verification Register Trunk 23 through Lockout Connector 955.

When either connection has been established a positive signal voltage is applied over the ERE lead to Repertory Translation Dispatcher 960. At the same time the line equipment number of the calling subscriber's line and the dialed repertory code are also dispatched through Lockout Connector 955 to Repertory Translation Dispatcher 960.

The first function performed by Repertory Translation Dispatcher 960 is to locate the calling subscriber's repertory area on Repertory Drum 30. This is accomplished by matching the line equipment number received from Lockout Connector 955 with the successive line equipment numbers read from Repertory Drum 30. As shown in Fig. 30 the line equipment number received from Lockout Connector 955 is applied to the left inputs of LEN match circuit 965 and the right inputs of this match circuit are connected to the output of shift register circuit 961. The input of shift register 961 is connected to the LEN channel on Repertory Drum 30. The line equipment number of each repertory dialing subscriber's line is recorded serially in the LEN channel on Repertory Drum 30, and as Repertory Drum 30 rotates the signals are read and applied to the input of shift register 961.

Referring to Fig. 30 it will be observed that shift register 961 comprises a plurality of toggles 962, a plurality of clip and delay circuits 963 and a plurality of cathode follower circuits. When a mark is read in the LEN channel of Repertory Drum 30, E1 toggle 962 will be operated. This will cause a positive signal voltage to be applied to the clip and delay circuit 963 connected to its output. A detailed circuit schematic of one clip and delay circuit 963 is shown in Fig. 32. The positive signal voltage is applied through condenser C1 to the upper terminal of diode D. The lower terminal of diode D is connected to +150 volts and thus the upper terminal of diode D or the output of condenser C1 can not become more positive than +150 volts, and the positive signal voltage from the output of E1 toggle 962 is ineffective. The write sync pulse on the WS lead is inverted and a negative signal pulse is applied to the resetting input of toggles 962 in shift register 961. When E1 toggle 962 is reset a negative signal pulse is applied from its right-hand output to the input of the clip and delay circuit 963 connected thereto. Because the diode D is in its high impedance condition to a negative signal pulse, the pulse will be applied through the inductance L, shunt capacitance C2 and terminating resistance R, which comprise a delay circuit, and the delayed negative signal pulse is then applied to operate the succeeding toggle 962 in shift register 961. The reason for introducing the delay between the resetting of the shift register toggles and their subsequent setting is to prevent the resetting pulse at a toggle from interfering with a setting pulse originated by the resetting action of the preceding toggle. The first digit of the line equipment numbers recorded in the LEN channel on Repertory Drum 30 is read and applied to the E1 toggle and then shifted from stage to stage in shift register circuit 961 until it is recorded in the E9 toggle 962, the last stage of the shift register. When the entire line equipment number has been serially read from the LEN channel on Repertory Drum 30, the settings of the E1 through E9 toggles 962 will correspond to the frame, switch and vertical codes of the line equipment number. Each of the E1 through E9 toggles 962 has its left output connected through a cathode follower to the respective leads FU0, FU1, FU2, SW0, SW1, SW2, VU0, VU1 and VU2 as shown in Fig. 30. These leads are applied to the right inputs of match circuit 965. When match circuit 965 determines that the line equipment number stored in shift register 961 corresponds to the line equipment number received through the Lockout Connector 955, match circuit 965 operates and applies a negative signal pulse to an input of AND gate 964.

The positive signal voltage applied over lead ERE from Lockout Connector 955 is inverted and also applied to an input of AND gate 964, thus two of the inputs of AND gate 964 have enabling voltages when a match signal is received from match circuit 965. When a complete line equipment number has been stored in shift register 961, a mark will be present in the STM start marks channel on Repertory Drum 30, and the reading of this mark will causes a negative signal pulse to be applied to an input of AND gate 964. Therefore, AND gate 964 will be actuated to in turn operate EM toggle 966. The operation of AND gate 964 indicates that the repertory area on Repertory Drum 30 associated with the calling subscriber has been located. The operation of EM toggle 966 applies a negative signal voltage through a cathode follower to the left-hand input of AND gate 967.

A pictorial representation of a portion of Repertory Drum 30 is shown in Fig. 33. In Fig. 33 the repertory areas on Repertory Drum 30 associated respectively with subscriber B and subscriber C are shown in detail whereas a portion of the repertory areas associated respectively with subscriber A and subscriber D are also shown. Each repertory area on Repertory Drum 30 comprises a plurality of slots and the number of slots in an individual subscriber's repertory on Repertory Drum 30 may be assigned in accordance with the number of telephone directory numbers the subscriber desires in his repertory. The line equipment number recorded in the LEN channel on Repertory Drum 30 in each repertory corresponds to the line equipment number of the subscriber whose repertory area is the next to be read by the magnetic heads on Repertory Drum 30. For example, the line equipment number serially recorded in the repertory area of subscriber C corresponds to the line equipment number of subscriber B whose repertory area will pass next under the magnetic heads on Repertory Drum 30. Similarly, the line equipment number recorded in the LEN channel on Repertory Drum 30 in the repertory area of subscriber D corresponds to the line equipment number of subscriber C.

Due to the direction of rotation of Repertory Drum 30 as shown in Fig. 33, when the line equipment number serially read from the repertory area of subscriber C on Repertory Drum 30, for example, has been stored in shift register 961 and when the mark in the STM start marks channel is read, AND gate 964 seen in Fig. 30 will be operated if subscriber B is initiating a repertory call and if there is a positive voltage applied to lead ERE from Lockout Connector 955. As Repertory Drum 30 continues to rotate it will be observed that the next slot to pass under the magnetic heads will be the first slot in the repertory area assigned to subscriber B.

The next function to be performed by Repertory Translation Dispatcher 960 is to locate the dialed repertory code in the calling subscriber's repertory area on Repertory Drum 30. Referring to Fig. 33, it will be observed that the RA and RB digits of the repertory codes for each subscriber are recorded in parallel fashion, and in the same slot associated with each repertory code is recorded the directory number assigned thereto by the repertory subscriber. For example, in Fig. 33 the repertory code 36 for subscriber B has been assigned the directory number CH 3–1579. Similarly, the repertory code 44 for subscriber B has been assigned the directory number ME 5–3440.

If subscriber B is placing a repertory call and has dialed, for example, the two digit code 36, after a match has been obtained between the line equipment number serially read from Repertory Drum 30 and the line equipment number of the calling subscriber's line (in this case subscriber B) in LEN match circuit 965, the operation of AND gate 964 indicates to the Repertory Translation Dispatcher 960 to proceed to locate the repertory code dialed by the calling subscriber. As Repertory Drum 30 continues to rotate, the repertory codes recorded in the area associated with subscriber B are matched with the repertory code dialed by subscriber B (in this case 36). This matching takes place in the RA match circuit 968 and the RB match circuit 969 shown in Fig. 30. When a match is obtained in both of these circuits indicating that the particular repertory code dialed by the calling subscriber has been located in his repertory area, AND gate 967 will be actuated to in turn actuate RM toggle 970. The operation of AND gate 967 and RM toggle 970 indicates that the repertory code dialed by the calling subscriber has been located in the calling subscriber's repertory area on Repertory Drum 30. RM toggle 970 in operating applies a positive signal voltage through a cathode follower to the RM2 lead which extends back to Lockout Connector 955. The voltage on the RM2 lead will perform the functions described hereinbefore in the Repertory Translation Consulter 915 if this circuit is connected to Repertory Translation Dispatcher 960 and will perform the functions to be described hereinafter in Repertory Verification Register Trunk 23 if this circuit is connected to Repertory Translation Dispatcher 960. A negative signal voltage is applied from the right output of operated RM toggle 970 through a cathode follower to the RM1 lead which extends to the resetting input of EM toggle 966 resetting this toggle to normal. The negative signal voltage on the RM1 lead is also applied to an input of AND gates 972 shown in Fig. 31.

The enablement of AND gates 972 in this manner causes the office code digits and the directory number digits (CH 3–1579) recorded in the slot on Repertory Drum 30 associated with the dialed repertory code 36 to be read and passed through associated cathode followers over leads extending to Lockout Connector 955. In this manner a translation of the dialed repertory code for the particular calling subscriber is made and the directory number which has been assigned to this code by the calling subscriber is dispatched back through Lockout Connector 955 to the Repertory Verification Register Trunk 23 or to Repertory Translation Consulter 915 which then is connected to Repertory Translation Dispatcher 960. RM toggle 970 is reset upon the occurrence of the reset sync pulse on the RS–SY lead from the output of sync circuit 975.

As described hereinbefore, when the office code and directory number digits dispatched from Repertory Drum 30 to Repertory Translation Consulter 915 are checked and found implausible, or as will be described hereinafter when the office code and directory number digits dispatched from Repertory Drum 30 to Repertory Verification Register Trunk 23 are checked and found implausible, a positive signal voltage is applied through Lockout Connector 955 over the CNG lead to Repertory Translation Dispatcher 960. As shown in Fig. 31 the positive signal voltage on the CNG lead is inverted and applied to WT toggle 971. The operation of this toggle causes a positive signal voltage to be applied to an AND gate connected to the writing amplifier associated with the TRBL channel on Repertory Drum 30 and in this manner causes a mark to be written in the trouble channel. The mark written in the trouble channel is read by the reading amplifier associated with this channel and causes the operation of the Trouble Indicator 973. WT toggle 971 is reset upon the next reset sync pulse applied over the RS–SY lead from sync circuit 975.

As indicated hereinbefore, when the office code and directory number digits dispatched through Lockout Connector 955 to the Repertory Translation Consulter 915 have been recorded and checked or when the office code and directory number digits dispatched through Lockout Connector 955 to Repertory Verification Register Trunk 23 have been recorded and checked, Lockout Connector 955 will be signaled to release the connection and thus restore Repertory Translation Dispatcher 960 to normal and available for use on a subsequent repertory dialing call.

After the directory number which the repertory dialing subscriber has assigned to a particular dialed repertory code has been read from Repertory Drum 30 and recorded in the selected register slot on Register Drum 20 as described hereinbefore, and after the connection between the calling subscriber's line and the Dial Repeating Circuit 21 associated with the selected register slot on Register Drum 20 has been disconnected by Switching Information Dispatcher 830 as described hereinbefore, and after Switching Information Dispatcher 830 has placed a mark in the SOT select out-trunk channel on Register Drum 20, Dialed Information Dispatcher 860 responds to this mark as described hereinbefore and dispatches the class of service number and the line equipment number of the calling subscriber's line and the digits of the called directory number to out-trunk selector 910. The operation of the remaining circuits in the embodiment of the present invention to complete and establish the call to the called subscriber is identical to that described hereinbefore.

*Detailed description—repertory change call*

One of the important aspects of the present invention is the provision of circuits and facilities which enable repertory dialing subscribers to establish and to make changes in their individual repertories recorded on Repertory Drum 30. A special repertory change code which, for example, may be the two digits 98, is reserved in each repertory dialing subscriber's repertory. To make changes in or additions to his individual repertory a subscriber dials this two digit repertory change code and then dials the repertory code he desires to change and the new directory number to be associated therewith.

Referring to Figs. 2A and 2B, the circuits described hereinbefore for a repertory call operate in the same manner for a repertory change call as far as the detection of the request for service, the selection of an idle slot on the Register Drum 20, the transmission of the line equipment number of the calling subscriber's line and the dialed repertory code to the Repertory Drum 30, and the return of the number recorded in the subscriber's repertory area on Repertory Drum 30 to Register Drum 20.

The calling subscriber's request for service is detected by Service Request Detector 800 which in turn transmits a signal to Service Request Dispatcher 810 indicating that a particular calling subscriber desires to establish a call. Service Request Dispatcher 810 then signals Register Selector 820 that an idle register slot on Register Drum 20 is required, and transmits the line equipment number and class of service number of the calling subscriber's line through Lockout Connector 819 to Register Selector 820. When Register Selector 820 locates an idle register slot on Register Drum 20, it records the line equipment number and the class of service number of the calling subscriber's line in the selected register slot.

Switching Information Dispatcher 830 then establishes a connection between the calling subscriber's line and the Dial Repeating Circuit 21 associated with the selected register slot on Register Drum 20 through Switching Network (49). Dial Repeating Circuit 21 transmits dial tone to the calling subscriber who thereupon may dial the two digit repertory change code. The openings and closures of the calling subscriber's line loop are detected by scanner 24 and are accumulated and recorded in the selected register slot on Register Drum 20 by Dialing Assembler 850.

When the dialing of the two digit repertory change code has been completed, Dialing Assembler 850 checks to determine if the calling subscriber is entitled to repertory dialing service. If so, Dialing Assembler 850 causes a mark to be written in the SRT start repertory translation channel on Register Drum 20 in the manner described hereinbefore. The mark present in the SRT start repertory translation channel on Register Drum 20 causes Repertory Translation Consulter 915 to dispatch the line equipment number of the calling subscriber's line and the two digit repertory change code through Lockout Connector 955 to Repertory Translation Dispatcher 960. Repertory Translation Dispatcher 960 locates the repertory area on Repertory Drum 30 assigned to the calling subscriber and then locates the slot in this area in which the repertory change code is recorded.

Instead of transmitting a seven digit directory number back to Repertory Translation Consulter 915, Repertory Translation Dispatcher 960 will transmit a three digit trunk code such as 998. Repertory Translation Consulter 915 records this three digit code in the selected register slot on Register Drum 20 and places a mark in the REG'N COMP channel of the selected register slot. Switching Information Dispatcher 830 thereupon effects the disconnection of the established path through Switching Network (49) between the calling subscriber's line and the Dial Repeating Circuit 21 associated with the selected register slot and places a mark in the SOT select out-trunk channel of the selected register slot on Register Drum 20. In response to this mark in the select out-trunk channel on Register Drum 20, Dialed Information Dispatcher 860 dispatches the three digit trunk code recorded in the selected register slot along with the line equipment number and the class of service number of the calling subscriber's line to Out-Trunk Selector 900. Out-Trunk Selector 900 selects a slot on Trunk Drum 50 associated with an idle Repertory Change Register Trunk 22 and records the line equipment number and class of service number of the calling subscriber's line in the selected trunk slot on Trunk Drum 50. Switching Information Dispatcher 910 transmits the trunk equipment number of the selected Repertory Change Register Trunk 22 (which is recorded in the trunk slot on Trunk Drum 50) and the line equipment number of the calling subscriber's line through Switching Number Group connector (251) to Switching Control and Number Group circuit (250) which in turn establishes a connection through Switching Network (49) between the calling subscriber's line and the selected Repertory Change Register Trunk 22.

When this connection is established, Repertory Change Register Trunk 22 will return a special dial tone to the calling subscriber to indicate that he may proceed to make the desired change in his repertory. The calling subscriber will dial the two digit repertory code which he desires to change and follow this immediately by the new seven digit directory number which he desires to be associated with the dialed repertory code. The dialed repertory code and the new directory number to be associated therewith are accumulated and registered in Repertory Change Register Trunk 22. When this is completed Repertory Change Register Trunk 22 then utilizes its own trunk equipment number to locate the slot on Trunk Drum 50 associated therewith. When the associated slot on Trunk Drum 50 is located the line equipment number of the calling subscriber's line recorded therein is dispatched back to Repertory Change Register Trunk 22 and this circuit in turn dispatches the line equipment number of the calling subscriber's line, the two digit repertory code and the new directory number to be associated therewith through Lockout Connector 1025 to Repetory Administrator 1030.

Repertory Administrator 1030 locates the calling subscriber's individual repertory area on Repertory Drum 30 and then locates the particular slot in the subscriber's repertory area in which the dialed repertory code is recorded. When this slot is located, Repertory Administrator 1030 then records the new directory number to be associated therewith in this slot on Repertory Drum 30. When this entry has been made on Repertory Drum 30, Repertory Change Register Trunk 22 will return a new dial tone to the calling subscriber to indicate that subsequent changes may be made if desired. If no additional changes are desired, the calling subscriber may hang up and the connection will be released and the information recorded on the line and trunk magnetic drums will be erased.

*Repertory change register trunk*

One specific illustrative embodiment of a Repertory Change Register Trunk 22 employable in the combination of this invention is depicted in Figs. 34 through 38 when arranged as shown in Fig. 53 of the drawing to which reference will now be made for a more detailed description of the circuit.

As indicated hereinbefore, Repertory Change Register Trunk 22 detects and accumulates the degits dialed by a repertory subscriber when this subscriber desires to make a change in his repertory recorded on Repertory Drum 30 and dispatches the line equipment number of the calling subscriber's line, the dialed repertory code and new directory number to be associated therewith to Repertory Administrator 1030. The trunk includes circuits shown in Fig. 34 for reading and checking the line equipment number of the calling subscriber and a match circuit for locating the slot on Trunk Drum 50 associated with the particular Repertory Change Register Trunk 22 seized on any call. The circuits shown in Fig. 34 include circuits for transmitting dial tone to the calling subscriber to signal the calling subscriber to proceed with the dialing of his repertory change and circuits for detecting the individual dial pulses of each digit and the interdigital intervals between dialed digits. The circuit shown in Fig. 36 comprises a dial pulse accumulator which accumulates the successive dial pulses of each digit dialed by a subscriber and translates these digits into a two-out-of-five code. In Figs. 37 and 38 a group of register toggles is provided for registering the successive digits dialed by the subscriber. The RA–toggles RA0, RA1, RA2, RA4, and RA7 shown in Fig. 37 are utilized to register the first digit of the dialed repertory code. Similarly, the corresponding RB–toggles shown or indicated in Fig. 37 are utilized to register the second digit of the dialed repertory code. A corresponding group of toggles is provided in Figs. 37 and 38 to register the A, B, C, thousands, hundreds, tens and units digits of the directory number which the repertory dialing subscriber wishes to be associated with the dialed repertory code.

Figure 35:
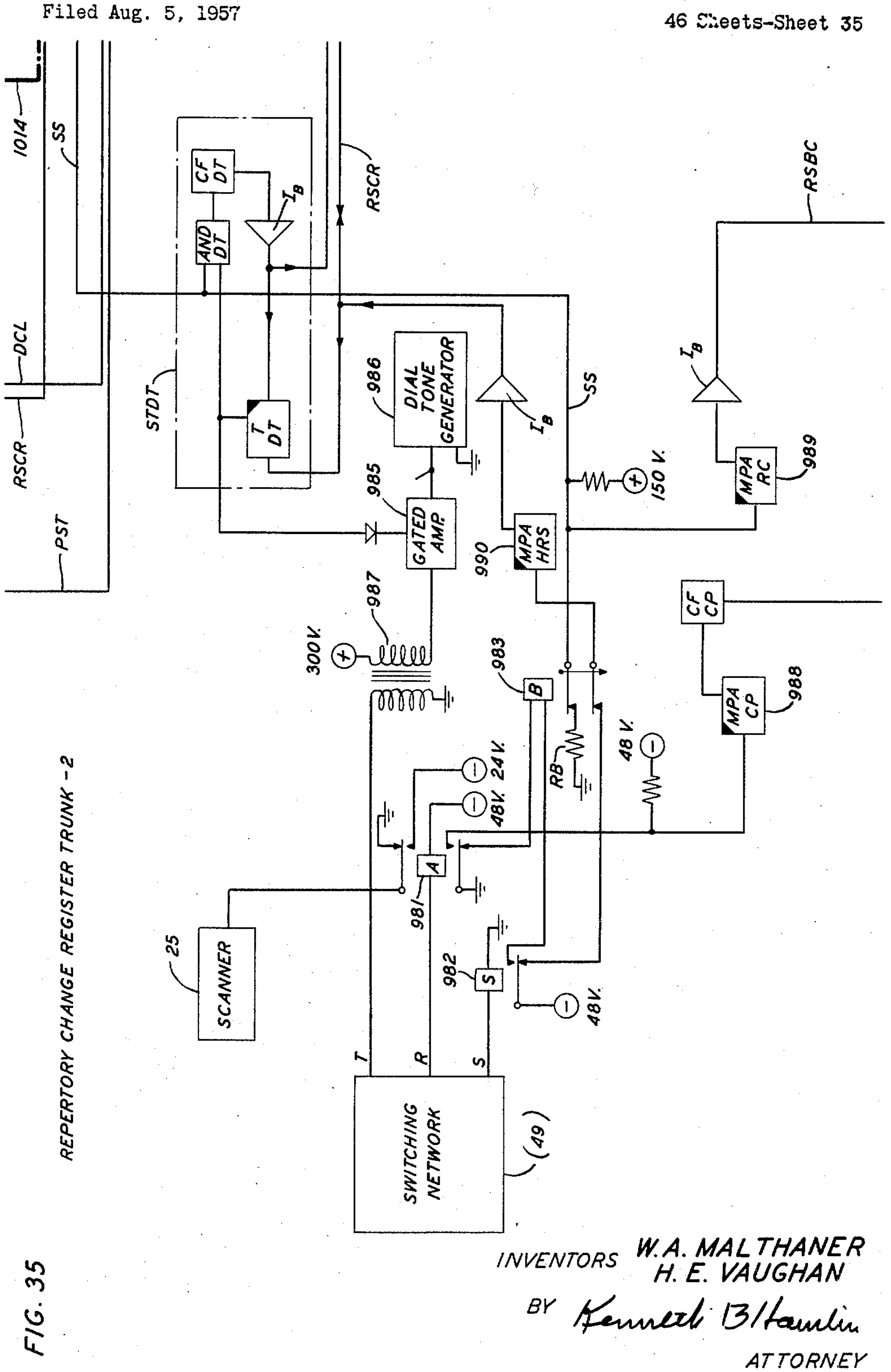
Figure 36:
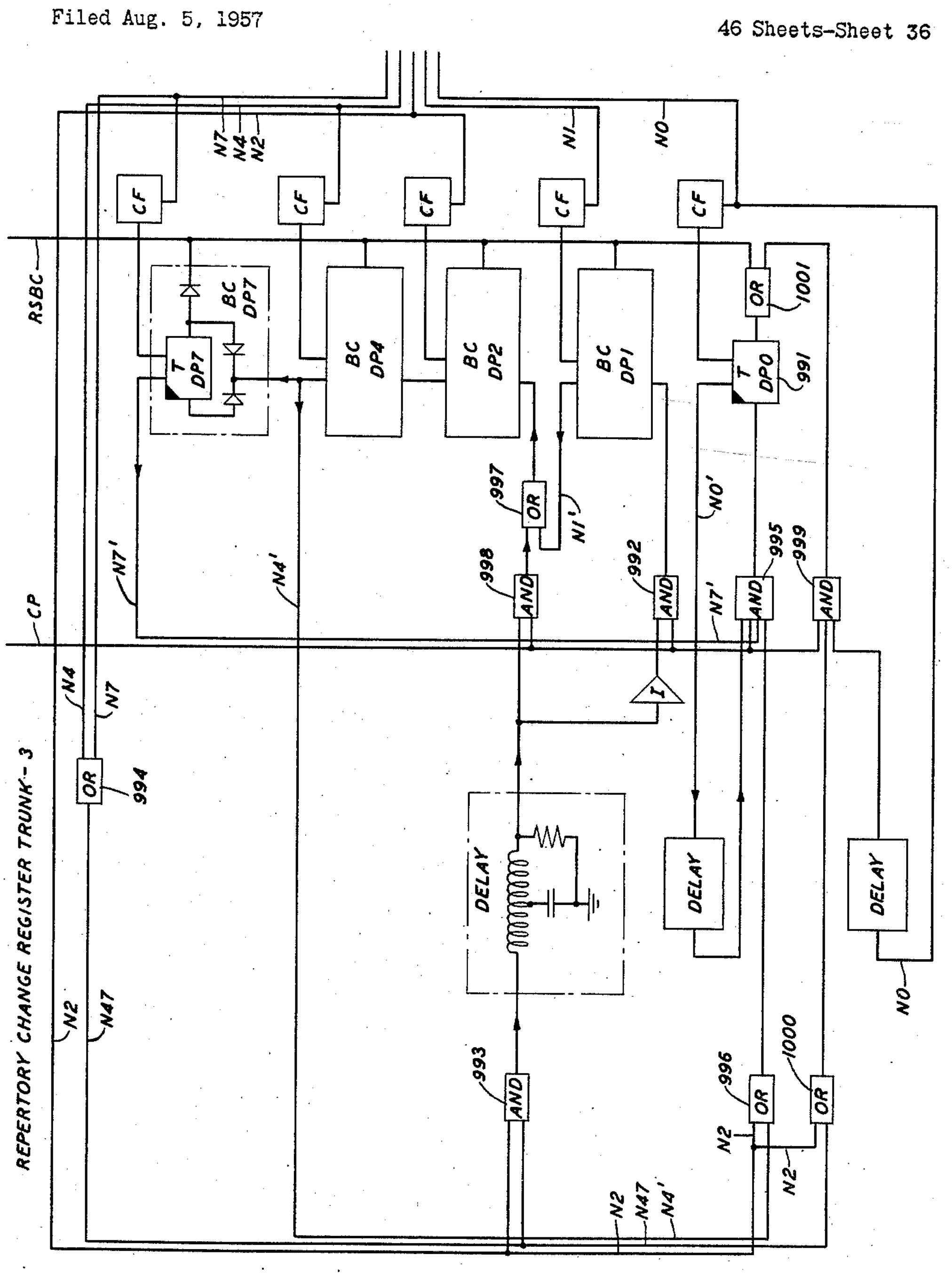
Figure 37:
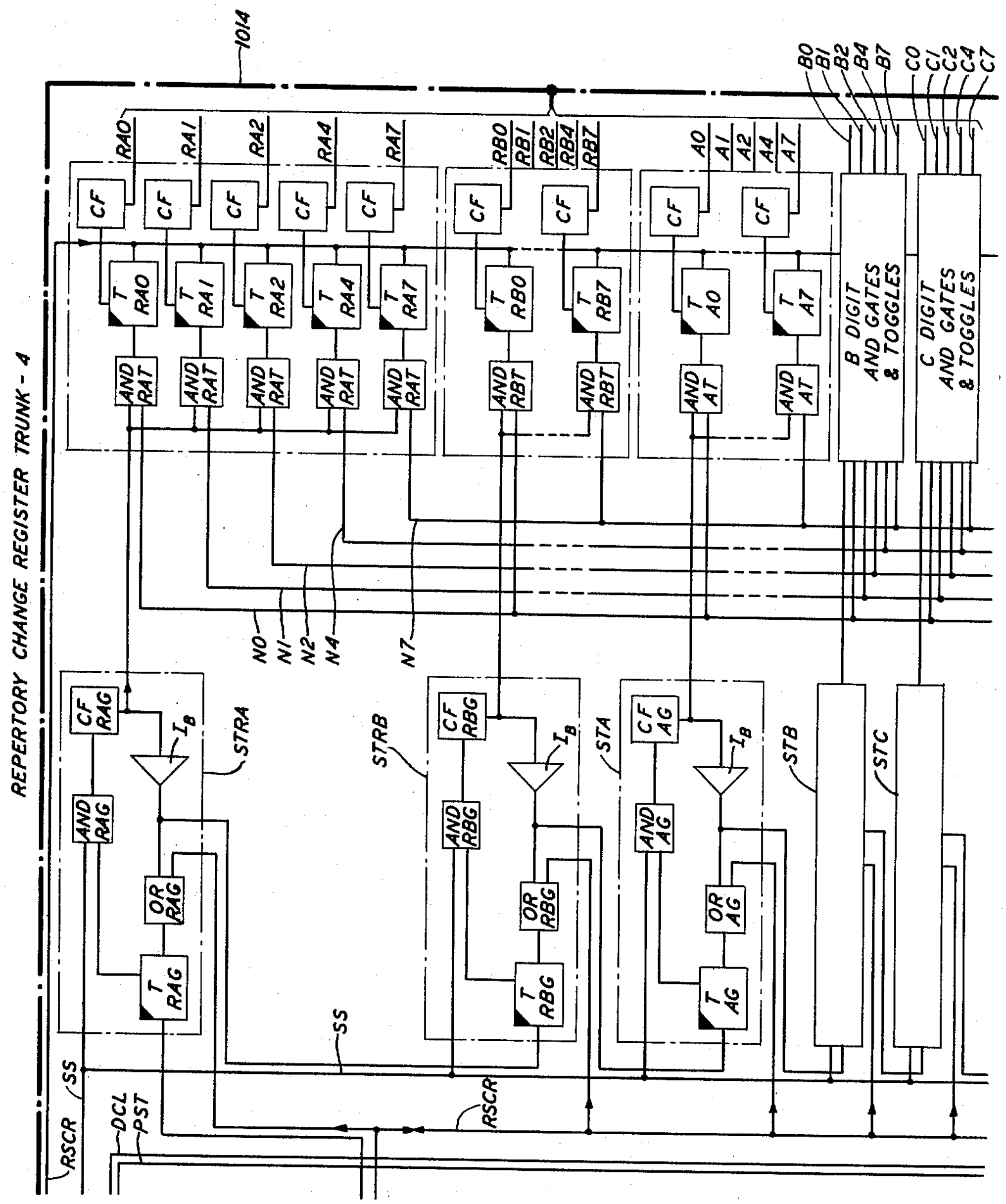
Figure 38:
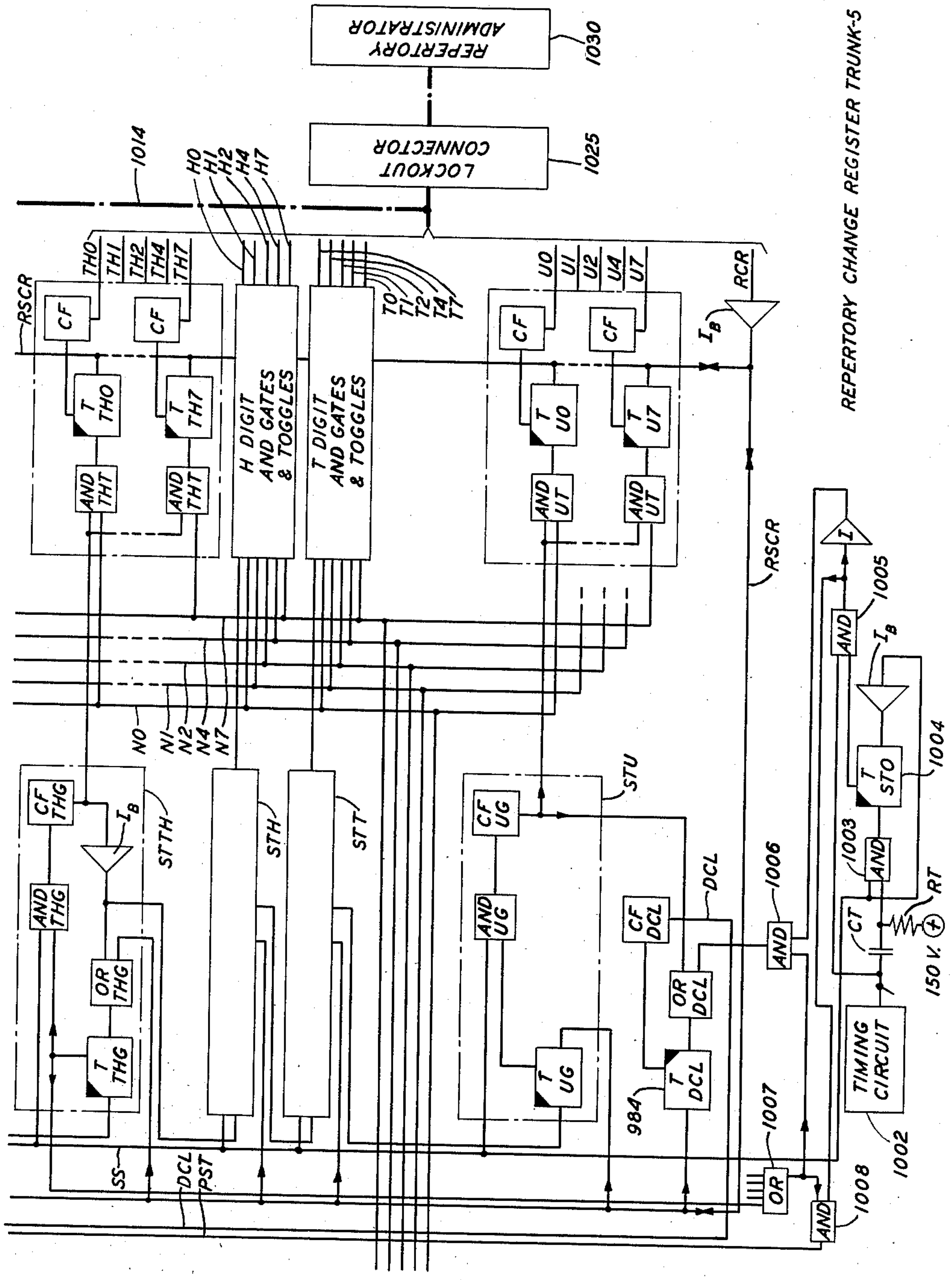

A steering circuit is provided in Figs. 37 and 38 which is controlled by the circuits shown in Figs. 35 to steer the successive digits accumulated in the dial pulse accumulating circuit of Fig. 36 into the corresponding register toggles of Figs. 37 and 38. This steering circuit comprises a plurality of stages, STRA, STRB, STA, STB, STC, STTH, STH, STT and STU. The STRA stage, for example, is actuated to enable the RA-group of toggles in Fig. 37 so that the first digit of the dialed repertory code accumulated by the dial pulse accumulating circuit of Fig. 36 may be registered in the RA-group of toggles. Similarly, the STRB stage of the steering circuit will enable the RB-group of toggles. Likewise, the STA stage of the steering circuit will enable the A group of toggles, the STB stage of the steering circuit will enable the B group of toggles, and so on through the STU stage of the steering circuit which when operated will enable the U group of toggles in Fig. 38. A separate stage of the steering circuit designated STDT and shown in Fig. 35 is utilized to control the transmission of dial tone to a calling repertory subscriber.

As shown in Fig. 35, when a connection is made through Switching Network (49) between a calling subscriber's line and a Repertory Change Register Trunk 22, the A relay 981 therein will operate over the loop through the calling subscriber's station. When the Switching Control and Number Group Circuit (250) shown in Fig. 2A removes its marking voltage from the trunk appearance in Switching Network (49) in the manner described in the above-cited Malthaner-Vaughan patent, the S relay 982 shown in Fig. 35 will operate over the sleeve lead in the holding path of Switching Network (49). Because A relay 981 is already operated at this time, B relay 983 remains normal or released. When Repertory Change Register Trunk 22 is normal, DT toggle in the STDT stage of the steering circuit, and the RAG, RBG, AG, BG, CG, and THG through UG toggles in the respective stages of the steering circuit shown in Figs. 37 and 38 as well as the DCL toggle 984 shown in Fig. 38, are normal. With DT toggle in the STDT stage of the steering circuit normal, the lower input of the associated DT AND gate in this stage of the steering circuit is at a negative signal voltage whereas the lower input of the RAG AND gate associated with RAG toggle in the STRA stage of the steering circuit shown in Fig. 37 is at a positive signal voltage. Similarly, the lower input of the RBG AND gate in the STRB stage of the steering circuit, the lower input of the AG AND gate in the STA stage of the steering circuit, etc., through the UG AND gate in the STU stage of the steering circuit, are each at a positive signal voltage. The DT AND gate and the RAG, RBG, AG, BG, THG, HG, TG and UG AND gates in each of the respective stages of the steering circuit are negative AND gates or positive OR gates. Consequently, a negative signal voltage must be applied to both inputs of these AND gates for a negative signal voltage to be applied from their respective outputs. On the other hand, if a positive signal voltage is applied to one or both of the inputs of these AND gates, their respective outputs will provide a positive signal voltage. Accordingly, under normal conditions, that is when the Repertory Change Register Trunk 22 has not been seized, B relay 983 shown in Fig. 35 is normal and a negative signal voltage is applied to the SS set steering lead. Under this condition both inputs of DT AND gate in the STDT stage of the steering circuit are negative and accordingly its output is at a negative signal voltage. On the other hand, the positive signal voltage applied to the lower input of each of the AND gates in the remaining stages of the steering circuit is at a positive signal voltage and the output therefrom is a positive signal voltage.

With DT toggle in the STDT stage of the steering circuit normal when the Repertory Change Register Trunk 22 is seized, a negative signal voltage is applied through a diode to gated amplifier 985. This amplifier may advantageously be a vacuum tube triode in which the negative signal voltage is applied through the diode to the cathode circuit thus maintaining the tube in a conducting condition. Dial Tone Generator 986 supplies dial tone through gated amplifier 985 to the primary of transformer 987, and in this manner dial tone is transmitted over the line loop to the calling subscriber. The reception of this dial tone gives an indication to the subscriber that he may proceed to make the desired change in his repertory. To make this change he will first dial the two digit repertory code for which he desires to make the change and then immediately follow this by the new directory number which he desires to be associated with the dialed repertory code.

When the subscriber's loop opens in response to the first break of the calling subscriber's dial contacts, A relay 981 releases and in releasing operates B relay 983. Upon the operation of B relay 983 a positive signal voltage is applied to the SS lead. This positive signal voltage on the SS lead causes the output of DT AND gate in the STDT stage of the steering circuit to be a positive signal voltage, and this is inverted in an inverter of the $I_B$ type and applied as a negative signal voltage to the input of the DT toggle in the STDT stage of the steering circuit. The operation of the DT toggle at this time disables gated amplifier 985 and in this manner removes dial tone from the subscriber's line loop.

The negative signal voltage from the $I_B$ type inverter in the output of DT AND gate in the STDT stage of the steering circuit is also applied to the input of the RAG toggle in the STRA stage of the steering circuit. The operation of the RAG toggle applies a negative signal voltage to the lower input of the RAG AND gate in this stage of the steering circuit. However, because the SS lead is applying a positive signal voltage to the upper input of the RAG AND gate, the output of the RAG AND gate is still maintained at a positive signal voltage.

Upon the release of A relay 981 in response to the first break of the dial contacts of the calling subscriber's dial, a negative signal voltage is applied to the input of CP Monopulser 988 shown in Fig. 35. The operation of this monopulser applies a short negative signal pulse through a cathode follower to the CP lead. The CP lead extends to a dial pulse accumulator circuit shown in Fig. 36. The A relay 981 will release on each line opening produced by the dial contacts and will reoperate on each dial closure. B relay 983 is a slow release relay and will remain operated during each train of dial pulses representing each digit dialed by the subscriber, and will release only in the longer line closure between dialed digits. In other words, B relay 983 releases during the interdigital interval between dialed digits. Each time B relay 983 operates a positive signal voltage is applied to the SS set steering lead, and each time B relay 983 releases a negative signal voltage is applied to the SS set steering lead. The alternate positive and negative signal voltages applied to the SS lead control the operation of the successive stages of the steering circuit so that the digits dialed by the calling subscriber are registered in their respective groups of register toggles shown in Figs. 37 and 38.

The negative signal pulses applied to lead CP by the operation and release of A relay 981 are accumulated and converted into a two-out-of-five code by the dial pulse accumulator circuit shown in Fig. 36. As shown, this circuit comprises four binary counter stages DP7, DP4, DP2, DP1, and DP0 toggle 991. A detailed circuit schematic of the binary counter stage DP7 is shown in Fig. 36. The remaining stages DP4, DP2, DP1, are identical. It will be noted that a negative signal applied to the input lead at its base will cause the DP7 toggle in the counter stage to reverse its condition. If the DP7 toggle is normal or unoperated, a negative signal pulse applied to the single input will cause it to be operated. The next negative signal pulse applied to the single input will in turn reset the DP7 toggle. Each of the counter stages also has an adidtional reset lead applied from the RSBC lead extending from Fig. 35.

The first negative signal pulse of the CP lead will cause the actuation of AND gate 992 and the operation of the DP1 binary counter stage. As shown in Fig. 36, the upper input of AND gate 992 is connected through an inverter and a delay circuit to the output of AND gate 993. The upper input of AND gate 993 is connected to the N2 lead which is positive when binary counter stage DP2 is normal. The lower input of AND gate 993 is connected to the N47 lead which in turn is connected to the output of OR gate 994 whose inputs are connected respectively to the N4 and N7 leads. With all binary counter stages normal, leads N4 and N7 are positive and accordingly lead N47 is positive. Therefore both inputs of AND gate 993 are positive making its output positive. Under this condition the positive signal voltage from the output of the delay circuit is inverted in the inverter and applied as a negative signal voltage to the upper input of AND gate 992. AND gate 992 will therefore be actuated when a negative signal pulse is applied over the CP lead, and the actuation of AND gate 992 will in turn cause a reversal of the condition of the DP1 binary counter stage. It will be noted that the output of AND gate 993 will be positive when either the N2 lead or both the N7 and the N4 leads are positive. AND gate 993 is therefore a negative AND gate or a positive OR gate and its output will be negative only when both its inputs are negative. When the first negative signal pulse is received over the CP lead, AND gate 995 will also be actuated by the negative signal voltage on the N0′ lead through a delay circuit applied to the upper input of AND gate 995, the negative signal pulse applied over the CP lead, the negative signal voltage over the N7′ lead, and a negative signal voltage from the output of OR gate 996. The inputs of OR gate 996 are connected to the N2 and N4′ leads, and accordingly the N4′ lead will be negative causing a negative signal voltage to be applied from the output of OR gate 996 to the lower input of AND gate 995. The actuation of AND gate 995 in this manner causes the operation of the DP0 toggle 991. It will be noted that in response to the first CP pulse, DP0 toggle 991 and the DP1 binary counter stage were operated. This will cause a negative signal voltage to be applied over the N0 and N1 leads which extend to the register toggles shown in Figs. 37 and 38.

When the second negative signal pulse is received over the CP lead, AND gate 992 is actuated as described above and causes the DP1 binary counter stage to be reset. The resetting of the DP1 binary counter stages causes a negative signal voltage to be applied through OR gate 997 to the input of the DP2 binary counter stage thus operating the DP2 binary counter stage. DP0 toggle 991 remains operated and accordingly at the end of the second negative signal pulse on the CP lead binary counter stage DP2 and the DP0 toggle 991 are operated.

When the third negative signal pulse is received over the CP lead, AND gate 999 shown in Fig. 36 is actuated by the negative signal voltage on the N0 lead through a delay circuit, the negative signal voltage on the N2 lead which actuates OR gate 1000 and applies a negative signal voltage to the center input of AND gate 999, and the negative signal on the CP lead. The actuation of AND gate 999 in turn actuates OR gate 1001 and resets DP0 toggle 991 to normal. The third negative signal pulse received over the CP lead also causes the actuation of AND gate 992 as described above and in turn causes the operation of the DP1 binary counter stage. Binary counter stage DP2 remains operated, and accordingly after the third CP pulse is received binary counter stages DP1 and DP2 are operated.

The fourth negative signal pulse received over the CP lead actuates AND gate 992 as described above and resets binary counter stage DP1. When binary counter stage DP1 is reset a negative signal voltage is applied through OR gate 997 to the input of binary counter stage DP2 and this stage is reset. The resetting of binary counter stage DP2 in turn causes the operation of the DP4 binary counter stage. AND gate 995 will be actuated in the manner described above to cause the operation of the DP0 toggle, and accordingly after the fourth negative signal pulse is received on the CP lead, DP4 binary counter stage and DP0 toggle 991 are operated.

In a similar manner the fifth negative signal pulse received over the CP lead will cause the operation of DP1 binary counter stage while DP4 binary counter stage remains operated. This pulse will also cause the resetting of the DP0 toggle 991 to normal. When the sixth pulse is received, DP1 binary counter stage is reset and DP2 binary counter stage is operated while binary counter stage DP4 remains operated. When the seventh negative signal pulse is received over the CP lead, AND gate 998 will be actuated. With binary counter stages DP2 and DP4 operated, leads N2 and N47 are both at a negative signal voltage. Accordingly AND gate 993 will be actuated to apply a negative signal voltage through a delay circuit to AND gate 998. The actuation of AND gate 998 in turn actuates OR gate 997 which in turn causes binary counter stage DP2 to be reset. When binary counter stage DP2 is reset, a negative signal voltage is applied to binary counter stage DP4 which is also reset. The resetting of binary counter stage DP4 causes the operation of binary counter stage DP7. In the manner described above, AND gate 995 is actuated and causes the operation of DP0 toggle 991. When the eighth negative signal pulse is received over the CP lead, DP1 binary counter stage operates and DP0 toggle 991 is reset while binary counter stage DP7 remains operated. When the ninth pulse is received over the CP lead, DP1 binary counter stage is reset and causes the operation of DP2 binary counter stage while binary counter stage DP7 remains operated. When the tenth pulse is received over the CP lead, AND gate 998 is actuated and actuates OR gate 991 which resets DP2 binary counter stage. When DP2 binary counter stage is reset, binary counter stage DP4 operates. Binary counter DP7 remains operated.

The purpose of the delay circuits, the details of one of which are shown in Fig. 36 in the output of AND gate 993, is to delay the signal voltage applied to the inputs of the AND gate logic circuitry by somewhat more than the duration of the negative signal pulse applied to the CP lead so that any changes in the feedback from the operated binary counter stages and operated DP0 toggle 991 will not affect the actions taken until the next negative signal pulse received on the CP lead. Each negative signal pulse on the CP lead results in new states (operated or released) for the binary counter stages DP7, DP4, DP2, DP1, and toggle DP0 991 and will set up the logical conditions for the changes which are to occur for the next negative signal pulse received over the CP lead for the accumulation of the pulses to take place in a two-out-of-five code. At the end of each pulse, signal voltage conditions are applied to leads N0, N1, N2, N4 and N7 extending to the register toggle shown in Figs. 37 and 38 to correspond to the two-out-of-five code for the accumulated count of the pulses received thus far. For example, at the end of the fifth pulse received over the CP lead, binary counter stages DP1 and DP4 are operated and negative signal voltages are applied to leads N1 and N4. When the interdigital interval between digits is detected as will be described the binary counter stages DP1, DP2, DP4 and DP7 and the DP0 toggle 991 are reset to normal by a negative signal pulse applied over lead RSBC from Fig. 35.

When B relay 983 shown in Fig. 35 releases in the interdigital interval following the first dialed digit, the resulting negative signal voltage on the SS lead together with the negative signal voltage from the output of the operated RAG toggle in the STRA stage of the steering circuit shown in Fig. 37, are combined in the RAG AND gate in the STRA stage of the steering circuit. The actuation of RAG AND gate produces a negative signal voltage which is applied through a cathode follower to the RA– AND gates associated with the RA– toggles RA0, RA1, RA2, RA4 and RA7 shown in Fig. 37 which are utilized to register the two-out-of-five code for the first digit of the dialed repertory code. The enablement of these AND gates will cause the two-out-of-five code for the first digit accumulated by the dial pulse accumulator circuit shown in Fig. 36 to be recorded in the RA toggles.

The negative signal voltage on the SS lead when B relay 983 releases also causes the operation of the RC Mono-pulser 989 shown in Fig. 35. When sufficient time for the operation of the RA toggles of Fig. 37 has elapsed, RC Mono-pulser 989 restores thereby producing a positive signal pulse which is inverted in an inverter of the $I_B$ type and applies a reset negative signal pulse over the RSBC lead to reset the binary counter stages and DP0 toggle 989 of Fig. 36 to normal so that these circuits are ready to accumulate the next digit dialed by the calling subscriber.

When relay B operates at the first break of the second dialed digit, the resulting positive voltage on lead SS causes the output of the RAG AND gate in the STRA stage of the steering circuit to go positive. This positive signal voltage is inverted and is applied through an OR gate to reset the RAG toggle. The negative signal voltage is also applied to operate the RBG toggle in the STRB stage (the second stage) of the steering circuit. The second digit dialed by the calling subscriber is accumulated in the dial pulse accumulator circuit of Fig. 36 in the manner described above. The subsequent release of the B relay completes the enablement of the RBG AND gate in the STRB stage of the steering circuit thereby enabling this AND gate. The actuation of the RBG AND gate in turn enables the RB– AND gates associated with the RB toggles RB0, RB1, RB2, RB4 and RB7 indicated in Fig. 37 so that the second digit accumulated in the dial pulse accumulator of Fig. 36 is registered in the RB toggles. RC Monopulser 989 shown in Fig. 35 operates as before and restores the binary counter stages DP1, DP2, DP4 and DP7 and the DP0 toggle 991 of Fig. 36 to normal. At the end of the interdigital interval the reoperation of B relay 983 causes the release of the RBG toggle in the STRB stage of the steering circuit and the operation of the AG toggle in the third stage (stage STA) of the steering circuit. Subsequent digits are accumulated in the dial pulse accumulating circuit of Fig. 36 and registered in the appropriate individual groups of register toggles A, B, C, TH, T and H in the same manner. When B relay 983 releases after the subscriber has finished dialing the seventh digit of the directory number he desires to be associated with the dialed repertory code, the digits accumulated in the dial pulse accumulator circuit of Fig. 36 will be registered in the U toggles U0, U1, U2, U4 and U7 indicated in Fig. 38. Simultaneously, DCL toggle 984 shown in Fig. 38 will be operated indicating that dialing is completed.

The DCL toggle 984 can also be operated on a time-out basis after the dialing of certain selected numbers of digits less than nine (i.e., two repertory code digits plus seven directory number digits). For example, assume that the embodiment of the present invention described herein is expanded so that repertory subscribers may record eleven digtis required for nationwide dialing. It will be advantageous, therefore, for subscribers to be able to in some instances complete eleven digit calls from their repertory and in other cases to originate seven digit calls. Accordingly it is advantageous to provide for recognizing an end of dialing before the complete maximum number of digits has been dialed. This is accomplished in the embodiment of the present invention by a separate time-out circuit.

As shown in Fig. 38, a timing circuit 1002 provides a positive signal voltage which lasts for one complete revolution of Trunk Drum 50. Thereafter the output lead from timing circuit 1002 provides a negative signal voltage approximately 0.15 second. At the end of each timing circuit 1002 enablement a negative signal pulse is produced by the differentiation of the trailing edge of the enablement pulse from timing circuit 1002 by condenser CT and resistor RT and thus a negative signal pulse is applied to the lower input of AND gate 1003. AND gate 1003 is a negative AND gate and accordingly if at this time B relay 983 seen in Fig. 35 is released due to the detection of the completion of the dialing of a digit, the SS lead is negative, AND gate 1003 will be actuated to operate the STO toggle 1004. The STO toggle 1004 in operating starts a timeout condition. If the B relay 983 is reoperated when the start of dialing of an additional digit occurs, the positive signal voltage on the SS lead is applied through an inverter of the $I_B$ type to reset STO toggle 1004 to normal. However, if no such dialing occurs, the start of the next timing circuit enablement pulse which will occur approximately 0.15 second later will produce a positive output voltage which is applied to the upper input of AND gate 1005. A positive signal voltage is applied to the lower input of AND gate 1005 from the output of operated STO toggle 1004. The actuation of AND gate 1005 will cause a positive signal voltage to an inverter which in turn applies a negative signal voltage to the right-hand input of AND gate 1006. The left-hand input of AND gate 1006 is connected to the output of OR gate 1007. As shown in Fig. 38, one input of OR gate 1007 is connected to the THG toggle in the STTH stage of the steering circuit. For purposes of illustration a subscriber is permitted to have a three digit code recorded in his repertory and the THG toggle will be operated after the pulses of the third digit have been dialed, accumulated and registered in the C digit toggles indicated in Fig. 37. The operation of THG toggle will apply a negative signal voltage to OR gate 1007 which in turn will cause enablement of AND gate 1006. The actuation of AND gate 1006 in turn causes the operation of DCL toggle 984 to indicate that an allowable end of dialing has been detected. If, however, an allowable end of dialing condition does not exist, OR gate 1007 will not be actuated and accordingly will apply a positive signal voltage to the upper input of AND gate 1008. The positive signal voltage from the output of AND gate 1005 is also applied to the lower input of AND gate 1008. The actuation of AND gate 1008 in turn applies a positive signal voltage over the PST lead which is inverted, and a negative signal voltage is applied to operate the PST toggle 1009 shown in Fig. 34. The operation of the PST toggle 1009 provides an enabling voltage to the lower input of AND gate 1010 so that when the slot on Trunk Drum 50 associated with the particular Repertory Change Register Trunk 22 is located by matching the trunk equipment number recorded in this slot with a fixed trunk equipment number applied to match circuit 1015, as will be described, AND gate 1010 will be enabled which in turn will actuate OR gate 1011 and operate TRB toggle 1012. The operation of TRB toggle 1012 causes the writing of a mark in the trouble channel of the slot on Trunk Drum 50 associated with the particular Repertory Change Register Trunk 22 used on this call.

The above-described detection, accumulation and registration of the repertory code and directory number to be associated therewith dialed by the subscriber is made independently of the rotation of Trunk Drum 50. When end of dialing has been detected a positive signal voltage is applied from the output of DCL toggle 984 shown in Fig. 38 over the DCL lead which extends to the input of AND gate 1013. The digits dialed by the subscriber are registered in the associated toggles shown in Figs. 37 and 38, and the voltages from their outputs are applied to the respective leads in cable 1014 through Lockout Connector 1025 when actuated to Repertory Administrator 1030.

Repertory Change Register Trunk 22 now must locate the slot on Trunk Drum 50 associated therewith and read out the line equipment number of the calling subscriber's line. The slot on Trunk Drum 50 is located by matching the successive trunk equipment numbers read from Trunk Drum 50 with fixed voltages which represent the trunk equipment number of this particular Repertory Change Register Trunk 22. This matching is accomplished in the trunk equipment number match circuit 1015. When a match is obtained a negative signal voltage from the output of match circuit 1015 is applied to the lower input of AND gate 1016. The upper input of AND gate 1016 is connected to the left output of LOK toggle 1017 which in its normal condition is supplying a negative signal voltage to the upper input of AND gate 1016. The center input of AND gate 1016 is connected through an inverter to the DCL lead. Therefore, when an end of dialing is detected and a positive signal voltage is applied to lead DCL a negative signal voltage will be applied to AND gate 1016. The actuation of AND gate 1016 in turn actuates AND gates 1018 associated with the line equipment number toggles 1019 shown in Fig. 37. In this manner the line equipment number of the calling subscriber's line is registered in these toggles. The actuation of AND gate 1016 also causes the operation of CKT toggle 1020 which upon operating applies a negative signal voltage to the input of AND gate 1021. When a check pulse occurs on the CKP lead from sync circuit 903 AND gate 1021 will be actuated to in turn cause the actuation of check circuit 1022. Check circuit 1022 will check the plausibility of the line equipment number registered in the line equipment number toggles 1019. CKT toggle 1020 is reset on the next occurrence of the reset sync pulse on the RS–SY lead from sync circuit 903. If check circuit 1022 determines that the registered line equipment number is implausible, a negative signal pulse is provided from the output of check circuit 1022 on the LNG lead. This actuates OR gate 1011 and in turn operates TRB toggle 1012. The operation of TRB toggle 1012 will in the manner described hereinbefore cause the writing of a mark in the trouble channel of the selected trunk slot on Trunk Drum 50. The operation of TRB toggle 1012 also applies a positive signal voltage to an inverter of the $I_B$ type which in turn applies a negative signal voltage to the RSLT lead. The negative signal voltage on the RSLT lead resets the line equipment number toggles 1019 and the PST toggle 1009 shown in Fig. 34. TRB toggle 1012 is reset by the next reset sync pulse on the RS–SY lead from sync circuit 903.

If the check of the line equipment number of the calling subscriber's line is determined to be OK by check circuit 1022, a negative signal pulse on the LOK lead will operate LOK toggle 1017. The operation of this toggle applies a positive signal voltage to the upper input of AND gate 1013. This positive signal voltage is also applied to the upper input of AND gate 1016 which disables this AND gate and prevents its actuation on subsequent reading of the trunk equipment number in the slot associated with the particular Repertory Change Register Trunk 22 used on this call. The positive signal voltage applied to the upper input of AND gate 1013 is combined with the positive signal voltage applied over the DCL lead. The actuation of AND gate 1013 in turn applies a positive signal voltage to the SRC lead in cable 1014 which extends to Lockout Connector 1025.

The positive signal voltage on the SRC lead causes the operation of Lockout Connector 1025 so that a start signal is passed to the Repertory Administrator 1030 along with the line equipment number voltages and the voltages for the repertory code and directory number dialed by the repertory dialing subscriber.

Figure 34:
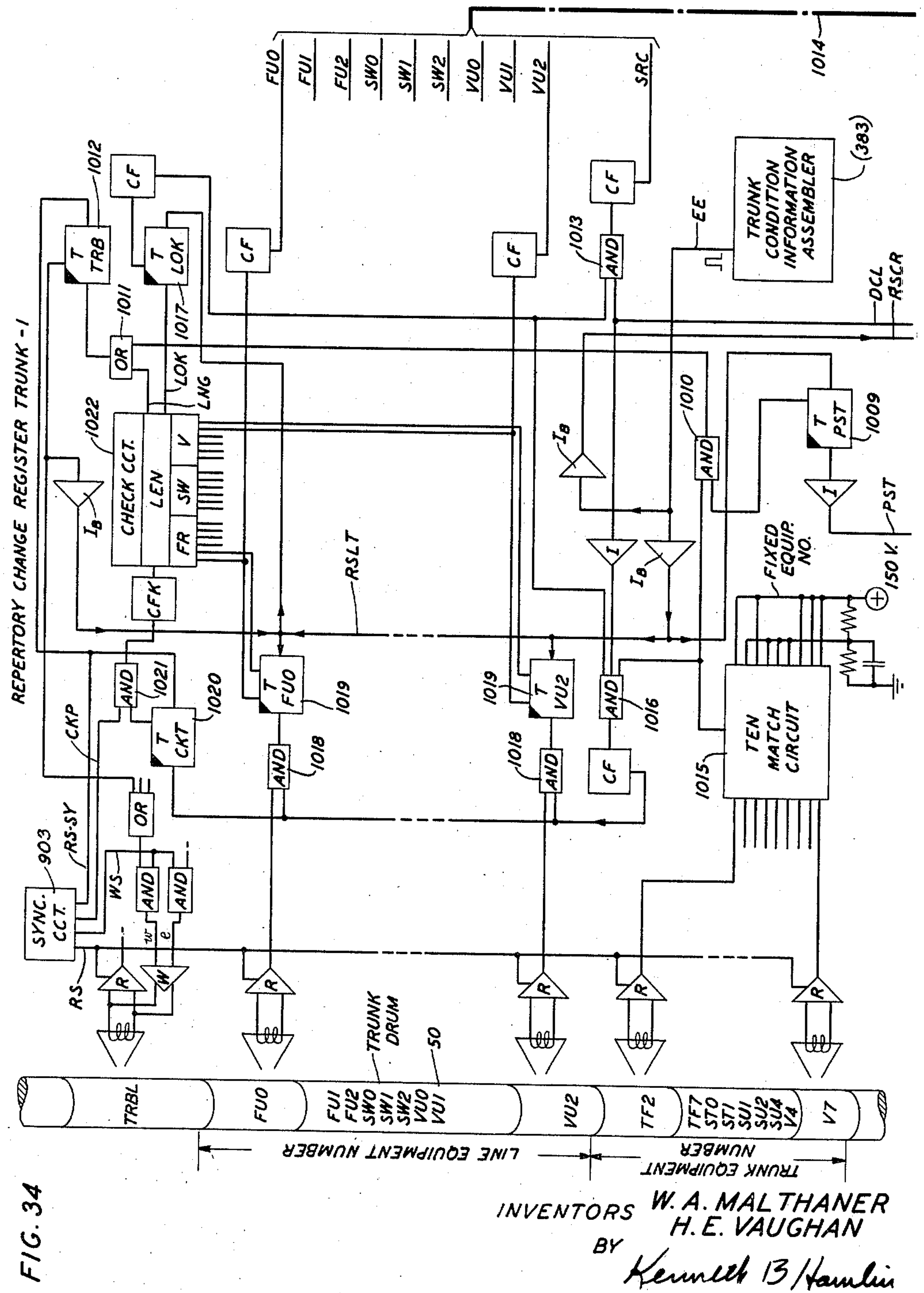

When the Repertory Administrator 1030 has entered this change on Repertory Drum 30 in the manner to be described hereinafter, this circuit sends a positive signal voltage over the RCR reset lead in cable 1014 to Repertory Change Register Trunk 980. This positive signal voltage is inverted in an inverter of the $I_B$ type and applied to the RSCR reset lead. In this manner the repertory code toggle RA– and RB– and the directory number toggles A–, B–, C–, TH–, H–, T–, and U–, of Figs. 37 and 38 are reset. In addition, DCL toggle 984 and the toggle in each stage of the steering circuit are reset to normal. The negative signal voltage on the RSCR lead is also applied to the DT toggle in the STDT stage of the steering circuit thus resetting this toggle to normal. With the DCL toggle 984 reset the positive signal voltage is removed from the DCL lead and AND gate 1013 shown in Fig. 34 is disabled and the positive signal voltage applied over the SRC leadin cable 1014 to Lockout Connector 1025 is removed. Lockout Connector 1025 will then break the connection between Repertory Change Register Trunk 22 and the Repertory Administrator 1030.

With the DT toggle in the STDT stage of the steering circuit shown in Fig. 35 reset, the disabling voltage from gated amplifier 985 is removed and dial tone from Dial Tone Generator 986 is again applied over the subscriber's loop to the calling subscriber. If the repertory subscriber desires he may again make an additional change in his repertory code or he may hang up the connection. The setting of the line equipment number toggles 1019 shown in Fig. 34, however, is retained for use on possible additional repertory changes.

When a subscriber hangs up at any point in the process of making a repertory change, relay A will release and the hang-up will be recognized by Trunk Condition Information Assembler (383) through the use of the connection from A relay 981 shown in Fig. 35 to the Scanner 25 in the manner described in detail in the above-cited Malthaner-Vaughan patent. After a hang-up timeout Trunk Condition Information Assembler (383) will transmit a positive signal pulse over the EE lead to Repertory Change Register Trunk 22. The positive signal pulse on the EE lead is inverted in an inverter of the $I_B$ type which causes the resetting of the line equipment number toggles 1019, LOK toggle 1017 and the PST toggle 1009 shown in Fig. 34. The positive signal pulse on the EE lead is also inverted in an additional inverter of the $I_B$ type and a negative signal pulse is applied to the RSCR lead which resets the repertory code toggles RA– and RB– and the directory number toggles A–, B–, C–, TH–, H–, T–, and U– shown in Figs. 37 and 38, the DCL toggle 984, the toggle in each stage of the steering circuit shown in Figs. 37 and 38, and the DT toggle in the STDT stage of the steering circuit shown in Fig. 35. When the connection through the switching network is released S relay 982 will release and in turn release B relay 983. The release of the B relay 983 will apply a negative signal voltage to the SS lead. This negative signal voltage will cause the actuation of the DT AND gate in the STDT stage of the steering circuit shown in Fig. 35 as described above and the operation of the RAG toggle in the STRA stage of the steering circuit shown in Fig. 37. To insure that the DT toggle and all toggles of the steering circuit are normal and in readiness for the next repertory change call, the release of S relay 982 and B relay 983 causes the operation of HRS Monopulser 990. When this monopulser restores to normal a positive signal pulse is applied to an inverter of the $I_B$ type which in turn applies a negative signal pulse to the RSCR lead to reset any operated toggles of the steering circuit.

*Repertory administrator*

One specific illustrative embodiment of a Repertory Administrator 1030 employable in the combination of this invention is depicted in Fig. 39 to which reference will now be made for a more detailed description of the circuit.

The function of Repertory Administrator 1030 is to receive repertory change information from Repertory Change Register Trunk 22 and to make the directed changes on Repertory Drum 30. As described hereinbefore under the heading Repertory Change Register Trunk, when a calling subscriber desires to make a change in his repertory, his line is connected to a Repertory Change Register Trunk 22 which in turn detects, accumulates and registers the two digit repertory code and the new directory number to be associated therewith dialed by the subscriber. This information is dispatched via Lockout Connector 1025 to Repertory Administrator 1030.

When Lockout Connector 1025 is seized by the positive signal voltage on the SRC lead from Repertory Change Register Trunk 22, a positive signal voltage is also applied over the SRC lead to Repertory Administrator 1030. At the same time the line equipment number of the calling subscriber's line, the dialed repertory code, and the new directory number to be associated therewith, are dispatched through Lockout Connector 1025 to Repertory Administrator 1030.

The first function performed by Repertory Administrator 1030 is to locate the calling subscriber's repertory on Repertory Drum 30. This is accomplished by matching the line equipment number received from Lockout Connector 1025 with the successive line equipment numbers read from Repertory Drum 30. As shown in Fig. 39, the line equipment number received from Lockout Connector 1025 is applied to the left inputs of LEN match circuit 1032, and the right inputs of match circuit 1032 are connected to the output of shift register 961. Shift register 961 is the same shift register disclosed in detail in Fig. 30 and described hereinbefore under the heading Repertory Translation Dispatcher. Shift register 961 serves both the Repertory Translation Dispatcher 960 and Repertory Administrator 1030, and as described hereinbefore reads the line equipment numbers recorded in a serial fashion in the LEN channel on Repertory Drum 30 and provides a parallel output of the line equipment numbers over the FU0, FU1, FU2, SW0, SW1, SW2, VU0, VU1, VU2 leads to the right input of match circuit 1032.

The positive signal voltage applied over the SRC lead from Lockout Connector 1025 is inverted and applied to an input of AND gate 1031. When a match is obtained between a calling subscriber's line equipment number and a line equipment number read from Repertory Drum 30, match circuit 1032 will provide a negative signal voltage to the center input of AND gate 1031. When a complete line equipment number has been stored in shift register 961 in the manner described hereinbefore, a mark will be present in the STM start marks channel on Repertory Drum 30, and the reading of this mark will cause a negative signal pulse to be applied to the right input of AND gate 1031. AND gate 1031 will therefore be actuated and in turn actuate EM toggle 1033. The operation of AND gate 1031 and EM toggle 1033 indicates that the repertory area on Repertory Drum 30 associated with the calling subscriber has been located. The operation of EM toggle 1033 applies a negative signal voltage through a cathode follower to the left input of AND gate 1036.

The next function to be performed by Repertory Administrator 1030 is to locate the dialed repertory code in the calling subscriber's repertory area on Repertory Drum 30. This is accomplished by matching the A and B digits of the repertory code dialed by the calling subscriber with the A and B digits successively read from the calling subscriber's repertory area on Repertory Drum 30 in match circuits 1034 and 1035. When a match is obtained in the RA match circuit 1034 and the RB match circuit 1035, negative signal voltages are applied to the center and right inputs of AND gate 1036 respectively, and AND gate 1036 will be actuated to in turn operate RM toggle 1037. The operation of AND gate 1036 and RM toggle 1037 indicates that the slot on Repertory Drum 30 in which the repertory code for which the calling subscriber desires to make a change has been located.

The operation of RM toggle 1037 causes a positive signal voltage to be applied to the upper input of AND gate 1038. Upon the occurrence of the next write sync pulse on the WS lead from sync circuit 975, AND gate 1038 will be actuated and apply a positive signal enabling voltage to an input of each of AND gates 1039 associated respectively with the writing amplifiers of the A, B, C, TH, H, T and U digit channels on Repertory Drum 30. As described hereinbefore under the heading Repertory Change Register Trunk, voltages representing the new directory number to be associated with the dialed repertory code are supplied to Repertory Administrator 1030 through Lockout Connector 1025 over the A(0–7), B(0–7), C(0–7), TH(0–7), H(0–7), J(0–7), U(0–7) leads. As shown in Fig. 39 each of these leads is connected to an input of a respective one of the AND gates 1039. Each of these leads is also connected to an inverter which provides the prime of the lead, for example A0′, A1′, A2′ . . . B1′ et cetera, which are in turn connected to an input of a respective one of the AND gates 1039. When AND gate 1038 is actuated as described above, the respective ones of AND gate 1039 to which a positive signal voltage is applied will be actuated to in turn cause marks to be written in the appropriate channels on Repertory Drum 30 to record the new directory number the calling subscriber desires to be associated with the dialed repertory code. For example, assume that the thousands digit of the new directory number is 3, then a positive signal voltage will be applied to the TH1 and TH2 leads and a negative signal voltage will be applied to the TH0, TH4 and TH7 leads. The negative signal voltage applied to the latter lead will be inverted in associated inverters to apply a positive signal voltage to leads TH0′, TH4′, and TH7′. The positive signal voltage on the TH1 and TH2 leads will cause the actuation of the associated AND gates 1039 to cause a mark to be written in the TH1 and TH2 channels on Repertory Drum 30. Similarly, the positive signal voltage on the TH0′, TH4′, and TH7′ will cause the actuation of the associated AND gates to cause the erasure of any marks previously written in the TH0, TH4, and TH7 channels on Repertory Drum 30. The operation of the circuit is the same for the other digit channels and in this manner the old directory number is erased and the new number recorded in the slot on Repertory Drum 30 associated with the dialed repertory code.

RM toggle 1037 will be reset on the next occurrence of the reset sync pulse on the RS–SY lead from sync circuit 975. When RM toggle 1037 is reset a positive signal pulse is applied through a cathode follower and inverted in an inverter of the $I_B$ type. A negative signal pulse is therefore applied to reset EM toggle 1033. The positive signal pulse from the output of RM toggle 1037 is also applied over the RCR lead which extends through Lockout Connector 1025 to Repertory Change Register Trunk 22 which in the manner described hereinbefore causes the release thereof.

*Detailed description—repertory verification call*

Another of the important aspects of the present invention is the provision of circuits and facilities which enable repertory dialing subscribers to receive an audible verification of the directory numbers recorded in their respective repertories on Repertory Drum 30. A special verification code which, for example, may be the two digits 99, is reserved in each repertory dialing subscriber's repertory. To receive an audible verification of a directory number in his individual repertory a subscriber dials this two digit repertory verification code and then the repertory code he desires to verify.

Referring to Figs. 2A and 2B, the circuits described hereinbefore for a repertory change call operate in the same manner for a repertory verification call as far as the detection of the request for service, the selection of an idle slot on Register Drum 20, the transmission of the line equipment number of the calling subscriber's line and the dialed repertory code to Repertory Drum 30, and the return of the number recorded in the subscriber's repertory area on Repertory Drum 30 to Register Drum 20.

The calling subscriber's request for service is detected by Service Request Detector 800 which in turn transmits a signal to Service Request Dispatcher 810 indicating that a particular calling subscriber desires to establish a call. Service Request Dispatcher 810 then signals Register Selector 820 that an idle register slot on Register Drum 20 is required and transmits the line equipment number and class of service number of the calling subscriber's line through Lockout Connector 819 to Register Selector 820. When Register Selector 820 locates an idle register slot on Register Drum 20 it records the line equipment number and class of service number of the calling subscriber's line in the selected register slot.

Switching Information Dispatcher 830 then establishes a connection between the calling subscriber's line and the Dial Repeating Circuit 21 associated with the selected register slot on Register Drum 20 through Switching Network (49). Dial Repeating Circuit 21 then transmits dial tone to the calling subscriber who thereupon may dial the two digit repertory change code. The openings and closures of the calling subscriber's line loop are detected by scanner 24 and they are accumulated and recorded in the selected register slot on Register Drum 20 by Dialing Assembler 850.

When the dialing of the two digit repertory verification code has been completed, Dialing Assembler 850 checks to determine if the calling subscriber is entitled to repertory dialing service. If so, Dialing Assembler 850 causes a mark to be written in the SRT start repertory translation channel on Register Drum 20 in the manner described hereinbefore. In response to this mark, Repertory Translation Consulter 915 dispatches the line equipment number of the calling subscriber's line and the two digit repertory verification code through Lockout Connector 955 to Repertory Translation Dispatcher 960. Repertory Translation Dispatcher 960 then locates the repertory area on Repertory Drum 30 assigned to the calling subscriber and then the slot in this particular area in which the repertory verification code is recorded.

Instead of transmitting a seven digit directory number back to the Repertory Translation Consulter 915, Repertory Translation Dispatcher 960 will transmit a three digit trunk code such as 999. Repertory Translation Consulter 915 records this three digit code in the selected register slot on Register Drum 20 and places a mark in the REG'N COMP channel of the selected register slot. Switching Information Dispatcher 830 thereupon effects the disconnection of the established path through Switching Network (49) between the calling subscriber's line and the Dial Repeating Circuit 21 associated with the selected register slot and places a mark in the SOT select out-trunk channel of the selected register slot on Register Drum 20. In response to this mark in the select out-trunk channel on Register Drum 20, Dialed Information Dispatcher 860 dispatches the three digit trunk code recorded in the selected register slot along with the line equipment number and class of service number of the calling subscriber's line to Out Trunk Selector 900. Out Trunk Selector 900 selects a slot on Trunk Drum 50 associated with an idle Repertory Verification Register Trunk 23 and records the line equipment number and class of service number of the calling subscriber's line in the selected trunk slot on Trunk Drum 50. Switching Information Dispatcher 910 transmits the trunk equipment number of the selected Repertory Verification Register Trunk 23 (which is recorded in the trunk slot on Trunk Drum 50) and the line equipment number of the calling subscriber's line through Switching Number Group Connector (251) to Switching Control and Number Group Circuit (250) which in turn establishes a connection through Switching Network (49) between the calling subscriber's line and the selected Repertory Verification Register Trunk 23.

When this connection is established Repertory Verification Register Trunk 23 will return a special dial tone to the calling subscriber to indicate that he may proceed to make the desired verification of his individual repertory. The calling subscriber will dial the two digit repertory code which he desires to verify. This code is accumulated and registered in Repertory Verification Register Trunk 23. When this is completed, Repertory Verification Register Trunk 23 then utilizes its own trunk equipment number to locate the slot on Trunk Drum 50 associated therewith. When the associated slot on Trunk Drum 50 is located, the line equipment number of the calling subscriber's line recorded therein is dispatched back to Repertory Verification Register Trunk 23, and this circuit in turn dispatches the line equipment number of the calling subscriber's line and the two digit repertory code which the subscriber desires to verify through Lockout Connector 955 to Repertory Translation Dispatcher 960.

Repertory Translation Dispatcher 960 then locates the calling subscriber's individual repertory recorded on Repertory Drum 30 in the manner described hereinbefore and then the particular two digit repertory code which the subscriber desires to verify. When the slot in the calling subscriber's repertory which contains the repertory code to be verified is located, Repertory Translation Dispatcher 960 reads the directory number recorded therein and dispatches the same back through Lockout Connector 955 to Repertory Verification Register Trunk 23.

This number is registered in Repertory Verification Register Trunk 23 and is utilized to control gate circuits associated with Voice Recorded Announcement Drum 60 so that an audible announcement of the directory number for which the calling subscriber desired the verification is transmitted to the subscriber. After the complete directory number has been audibly transmitted to the calling subscriber, Repertory Verification Register Trunk 23 will return a new dial tone to the calling subscriber to indicate that a subsequent verification may be made if desired. If no subsequent verification is desired by the subscriber, the subscriber may hang up and the connection will be released and the information recorded on the line and trunk magnetic drums will be erased.

*Repertory verification register trunk*

One specific illustrative embodiment of a Repertory Verification Register Trunk 23 employable in the combination of this invention is depicted in Figs. 40 through 44 of the drawing when arranged as shown in Fig. 54 to which reference will now be made for a more detailed description of the circuit.

Figure 40:
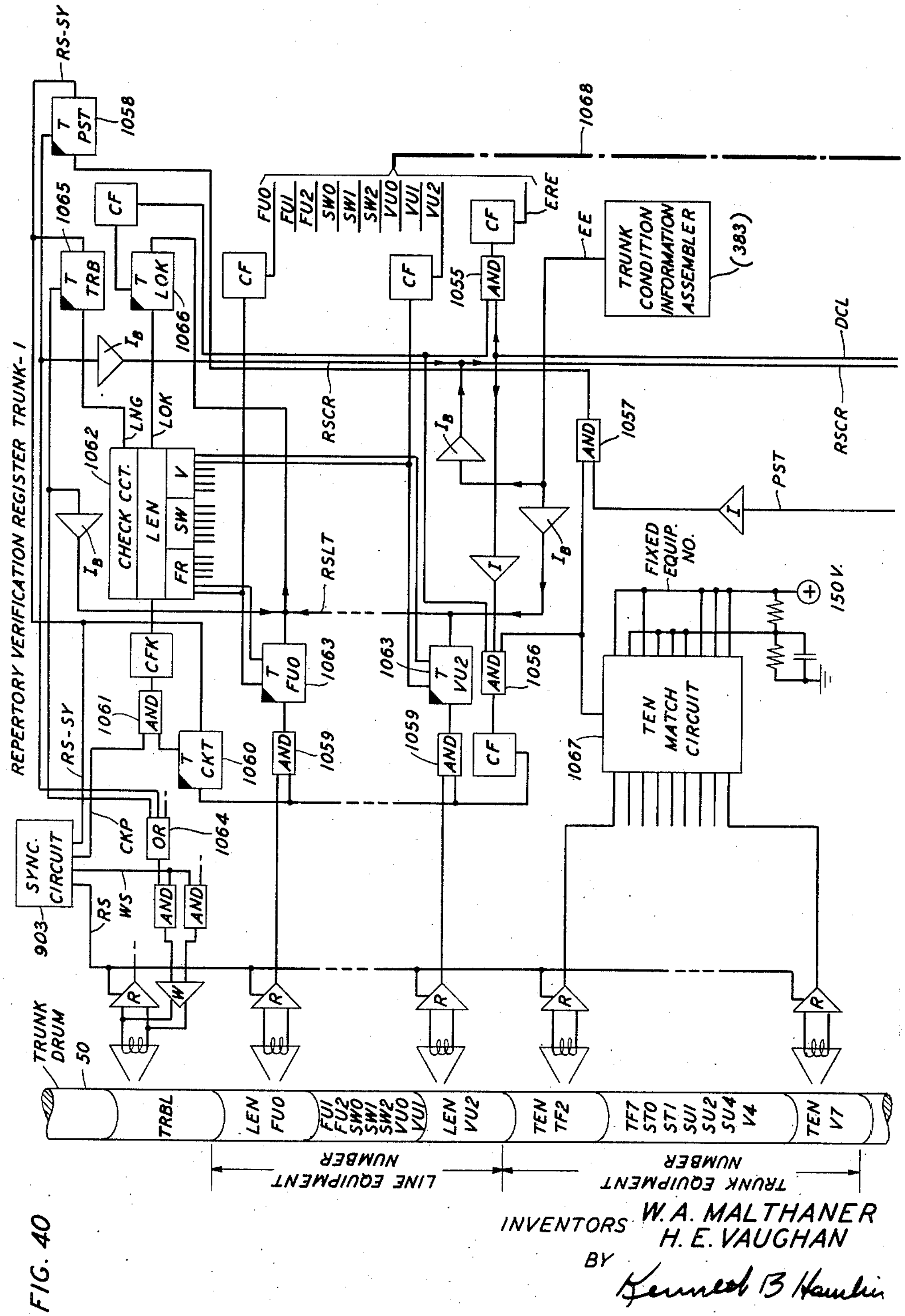
Figure 41:
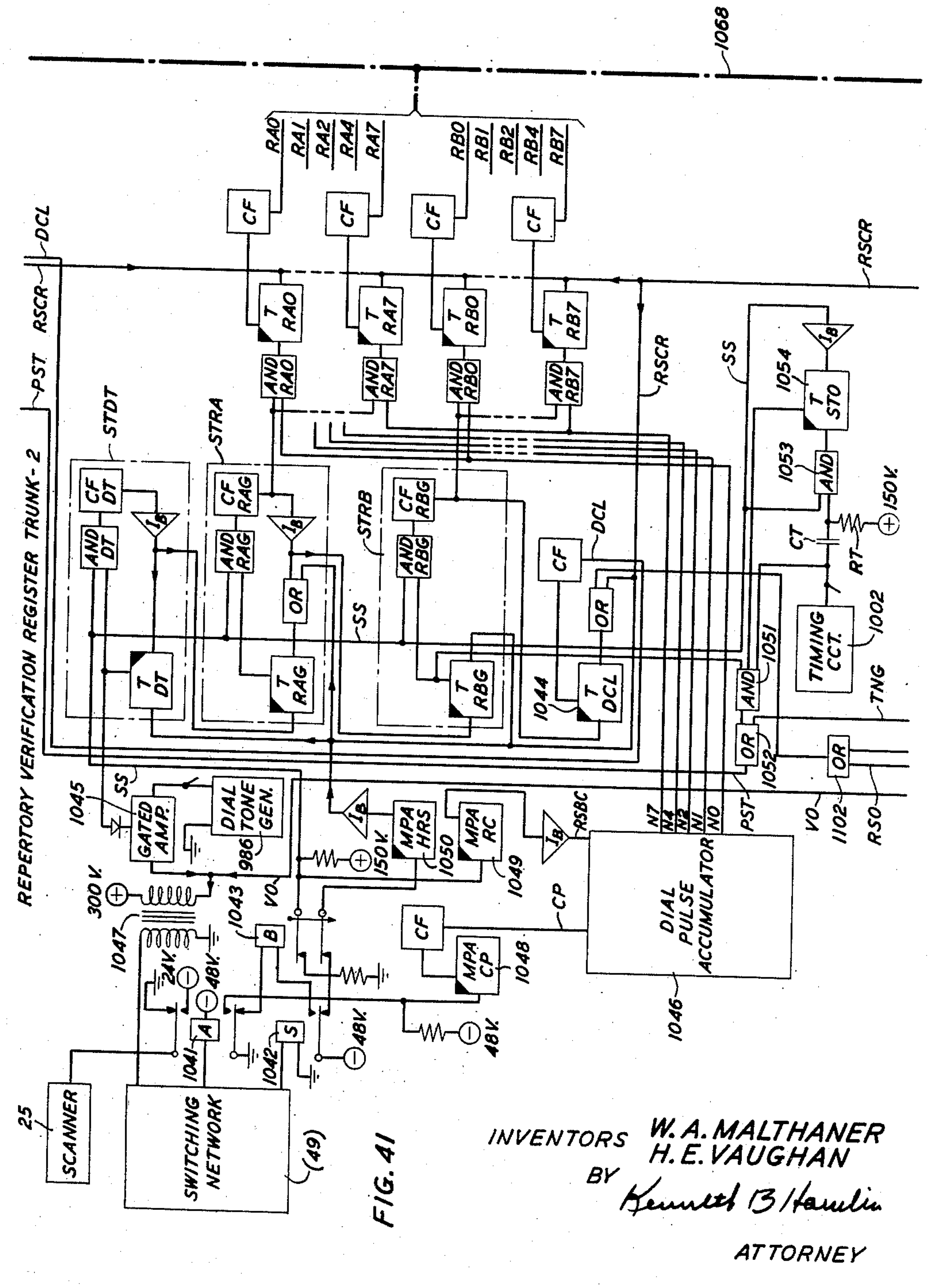

As described hereinbefore, a Repertory Verification Register Trunk 23 will be connected to a repertory dialing subscriber's line when the subscriber has dialed a special two digit repertory verification code indicating that he desired to verify or to determine the directory number he has assigned to a particular repertory code. This trunk transmits a special dial tone to the subscriber notifying him to dial the repertory code he wishes to verify and the trunk then detects, accumulates and registers this two digit repertory code dialed by the subscriber. Repertory Verification Register Trunk 23 then dispatches the dialed repertory code and the line equipment number of the calling subscriber's line to Repertory Translation Dispatcher 960 through Lockout Connector 955. The trunk includes circuits which operate in a manner similar to the circuits of the Repertory Change Register Trunk 22 described hereinbefore. The circuits shown in Fig. 41 includes circuits for transmitting dial tone to the calling subscriber to signal the subscriber to proceed with the dialing of the repertory code which he desires to verify. Repertory Verification Register Trunk 23 includes a dial pulse accumulator 1046 shown in Fig. 41, the circuit of which is identical to that disclosed in Fig. 36 of the Repertory Change Register Trunk 22. The two digit repertory code dialed by the subscriber is detected and accumulated by the circuits shown in Fig. 41 and registered in associated register toggles. The RA– toggles, RA0, RA1, RA2, RA4, and RA7, and the RB– toggles, RB1, RB2, RB4, and RB7, shown or indicated in Fig. 41, are utilized to register the first and second digits respectively of the dialed repertory code. The digits of the repertory code dialed by the calling subscriber and accumulated in dial pulse accumulator 1046 are steered into the appropriate RA– and RB– register toggles by a steering circuit which includes the STDT stage, and STRA and STRB stages shown in Fig. 41. The A relay 1041, the S relay 1042, and the B relay 1043 shown in Fig. 41, operate in the same manner as the corresponding relays of the Repertory Change Register Trunk 22 described hereinbefore. When a connection is made through Switching Network (49) to Repertory Verification Register Trunk 23, the A relay 1041 will operate over the loop through the calling subscriber station and the S relay 1042 will operate when the Switching Network Control and Number Group Circuit (250) removes its marking voltage from the trunk appearance in Switching Network (49) in the manner described in the above-cited Malthaner-Vaughan patent. The B relay 1043 operates on the first release of A relay 1041 after operation of S relay 1042. The A relay 1041 operates and releases respectively on each closure and opening of the subscriber's loop, and the B relay 1043, a slow operate relay, releases during the interdigital interval between digits. Each time A relay 1041 releases in response to the opening of the subscriber's loop, CP Monopulser 1048 is actuated to apply a negative signal pulse over the CP lead to dial pulse accumulator 1046. When B relay 1043 releases during an interdigital interval between digits, RC Monopulser 1049 is actuated to in turn apply a negative signal pulse over the RSBC lead to reset dial pulse accumulator 1046. With DT toggle in the STDT stage of the steering circuit shown in Fig. 41 normal, when Repertory Verification Register Trunk 23 is seized a negative signal voltage is applied through a diode to gated amplifier 1045. This amplifier is the same type utlized in the Repertory Change Register Trunk 22 and may comprise a vacuum tube triode in which a negative signal voltage is applied through the diode to the cathode circuit thus maintaining the tube in a conduction condition. Dial tone generator 986 supplies dial tone through gated amplifier 1045 to the primary of transformer 1047, and in this manner dial tone is transmitted over the line loop to the calling subscriber. Reception of dial tone gives an indication to the subscriber that he may proceed to verify the desired repertory codes. To verify any particular repertory code it is necessary only that the subscriber dial the two digit code he wishes to verify. In a manner similar to that described hereinbefore the dial pulses of the two successive digits are detected by the A relay 1041 and B relay 1043, are accumulated in dial pulse accumulator 1046 and are registered in the appropriate RA– and RB– toggles shown in Fig. 41 under the control of steering circuit stages STDT, STRA, and STRB. When the final pulse of the second digit is detected and the final digit is registered in the RB– toggles of Fig. 41, DCL toggle 1044 is actuated to apply a positive signal voltage over the DCL lead to the lower input of AND gate 1055 shown in Fig. 40. The positive signal voltage on the DCL lead is an indication that the subscriber has completed dialing the two digit repertory code for which he wishes a verification.

In the event that the calling subscriber does not complete the dialing of the two digit code, the circuitry at the bottom of Fig. 41 provides a timeout condition to detect an incomplete dialing of a repertory code. Timing circuit 1002 provides a positive signal voltage which lasts for one complete revolution of Trunk Drum 50. Thereafter the output lead from timing circuit 1002 provides a negative signal voltage for approximately 0.15 second. At the end of each timing circuit 1002 enablement, a negative signal pulse is produced by the differentiation of the trailing edge of the enablement pulse from timing circuit 1002 by condenser CT and resistor RT and thus a negative signal pulse is applied to the lower input of AND gate 1053. AND gate 1053 is a negative AND gate, and accordingly if at this time B relay 1043 is released due to the completion of dialing or the interruption of dialing the SS lead is negative and AND gate 1053 will be actuated to operate STO toggle 1054. The STO toggle 1054 starts a timeout condition. If B relay 1043 is reoperated when the start of dialing of an additional digit occurs, the positive signal voltage on the SS lead is applied through an inverter of the $I_B$ type to reset STO toggle 1054 to normal. However, if no such dialing occurs the start of the next timing circuit enablement pulse which will occur approximately 0.15 second later will produce a positive signal output voltage which is applied to the lower input of AND gate 1051. The center input of AND gate 1051 is connected to the output of STO toggle 1054, and if this toggle is in its operated condition a positive signal voltage will be applied to this input of AND gate 1051. The upper input of AND gate 1051 is connected to the output of the RBG toggle in the STRB stage of the steering circuit. If the RBG toggle is normal indicating that the subscriber has not begun the dialing of the second digit of a repertory code, the right output lead from RBG toggle in the STRB stage of the steering circuit will be positive. Accordingly AND gate 1051 will be actuated which in turn will apply a positive signal voltage through OR gate 1052 to the PST lead. This positive signal is inverted in an inverter shown in Fig. 40 and applied to the lower input of AND gate 1057. In the manner described hereinbefore, when the slot on Trunk Drum 50 associated with the particular Repertory Verification Register Trunk 23 is located by matching the trunk equipment number recorded in this slot with a fixed trunk equipment number applied to match circuit 1067, a negative signal voltage will be applied to the upper input of AND gate 1057 shown in Fig. 40. The actuation of AND gate 1057 will in turn apply a negative signal voltage to PST toggle 1058 operating this toggle. The operation of PST toggle 1058 will apply a positive signal voltage through OR gate 1064 whose output is applied to the AND gate connected to the writing amplifier associated with the TRBL trouble channel on Trunk Drum 50 and will cause the writing of a mark in the trouble channel of the slot on Trunk Drum 50 associated with the particular Repertory Verification Register Trunk 23 used on this call. The positive output voltage from PST toggle 1058 is also applied through an inverter of the $I_B$ type which in turn applies a negative single voltage to the RSCR lead which extends to Fig. 41 and resets the RA– and RB– toggles in which a portion of the dialed repertory code may be registered. PST toggle 1058 is reset by the next reset sync pulse occurring on the RS–SY lead from sync circuit 903.

The above-described detection, accumulation and registration of the two digit repertory code dialed by the calling subscriber is made independently of the rotation of Trunk Drum 50. When the end of dialing has been detected a positive signal voltage is applied, as indicated above, from the output of DCL toggle 1044 to the DCL lead. This positive signal voltage is applied to an inverter shown in Fig. 40 which in turn applies a negative signal voltage to the center input of AND gate 1056 shown in Fig. 40. The two digit repertory code dialed by the subscriber is registered in the associated RA– and RB– toggles shown in Fig. 41, and voltages from the outputs of these toggles are applied to the respective leads in cable 1068 which extends through Lockout Connector 955 when actuated to Repertory Translation Dispatcher 960.

Repertory Verification Register Trunk 23 must now locate the slot on Trunk Drum 50 associated therewith and read out the line equipment number of the calling subscriber's line recorded therein. The slot on Trunk Drum 50 is located by matching the successive trunk equipment numbers read from Trunk Drum 50 with fixed voltages which represent the trunk equipment number of this particular Repertory Verification Register Trunk 23. This matching is accomplished in trunk equipment number match circuit 1067 shown in Fig. 40. When a match is obtained a negative signal voltage from the output of match circuit 1067 is applied to the lower input of AND gate 1056. The upper input of AND gate 1056 is connected to the output of LOK toggle 1066 which in its normal condition is supplying a negative signal voltage to the upper input of AND gate 1056. Therefore when an end of dialing is detected and a negative signal voltage is obtained from the output of the inverter connected to the DCL lead, and applied to the center input of AND gate 1056, and when a match is obtained in match circuit 1067, AND gate 1056 will be actuated. The actuation of AND gate 1056 in turn actuates AND gates 1059 associated with the line equipment number toggles 1063 shown in Fig. 40. In this manner the line equipment number of the calling subscriber's line is registered in these toggles. The actuation of AND gate 1056 also causes the actuation of CKT toggle 1060 which upon operating applies a negative signal voltage to the lower input of AND gate 1061. When a check pulse occurs on the CKP lead from sync circuit 903, AND gate 1061 will be actuated to in turn cause the actuation of check circuit 1062. Check circuit 1062 will check the plausibility of the line equipment number registered in line equipment number toggles 1063. CKT toggle 1060 is reset on the next occurrence of the reset sync pulse on the RS–SY lead from sync circuit 903. If check circuit 1062 determines that the registered line equipment number is implausible a negative signal pulse is provided from the output of check circuit 1062 on the LNG lead to operate TRB toggle 1065. The operation of TRB toggle 1065 applies a positive signal voltage through OR gate 1064 to the AND gate connected to the writing amplifier associated with the TRBL trouble channel on Trunk Drum 50, and as described hereinbefore will cause the writing of a mark in the trouble channel of the selected trunk slot of Trunk Drum 50. The operation of TRB toggle 1065 also applies a positive signal voltage to an inverter of the $I_B$ type which in turn applies a negative signal volt- to the RSLT lead. The negative signal voltage on the RSLT lead resets the line equipment number toggles 1063 shown in Fig. 40. TRB toggle 1065 is reset by the next reset sync pulse on the RS–SY lead from sync circuit 903.

If a check of the line equipment number of the calling subscriber's line is determined to be OK by check circuit 1062, a negative signal voltage on the LOK lead will operate LOK toggle 1066. The operation of this toggle applies a positive signal voltage to the upper input of AND gate 1055 and a positive signal voltage to the upper input of AND gate 1056. The positive signal voltage on the upper input of AND gate 1056 disables this AND gate and prevents its actuation on subsequent readings of the trunk equipment number in the slot associated with the particular Repertory Verification Register Trunk 23 used on this call. The positive signal voltage on the upper input of AND gate 1055 is combined therein with the positive signal voltage on the DCL lead obtained when the end of dialing was detected. The actuation of AND gate 1055 applies a positive signal voltage to the ERE lead which extends in cable 1068 through Lockout Connector 955 to Repertory Translation Dispatcher 960.

The positive signal voltage on the ERE lead causes the operation of Lockout Connector 955 so that a start signal is passed to Repertory Translation Dispatcher 960 along with the line equipment number voltages and the voltages representing the repertory code dialed by the calling subscriber.

As described hereinbefore, when the line equipment number of the calling subscriber's line and the repertory code dialed by the calling subscriber are dispatched to Repertory Translation Dispatcher 960, this circuit will match the line equipment number received from Repertory Verification Register Trunk 23 with the successive line equipment numbers recorded on Repertory Drum 30 to locate the calling subscriber's individual repertory area on Repertory Drum 30. When a match is obtained Repertory Translation Dispatcher 960 will then match the repertory code dialed by the calling subscriber and received from Repertory Verification Register Trunk 23 with the repertory codes recorded on Repertory Drum 30 in the calling subscriber's individual repertory area. When a match is obtained Repertory Translation Dispatcher 960 will read the directory number recorded on Repertory Drum 30 which the calling subscriber has assigned to the dialed repertory code and will dispatch this number via Lockout Connector 955 to Repertory Verification Register Trunk 23 over leads in cable 1068. The voltages representing the directory number associated with the dialed repertory code are recorded in the A–, B–, C–, TH–, H–, T–, and U– register toggles shown in Figs. 42 and 43.

Figure 42:
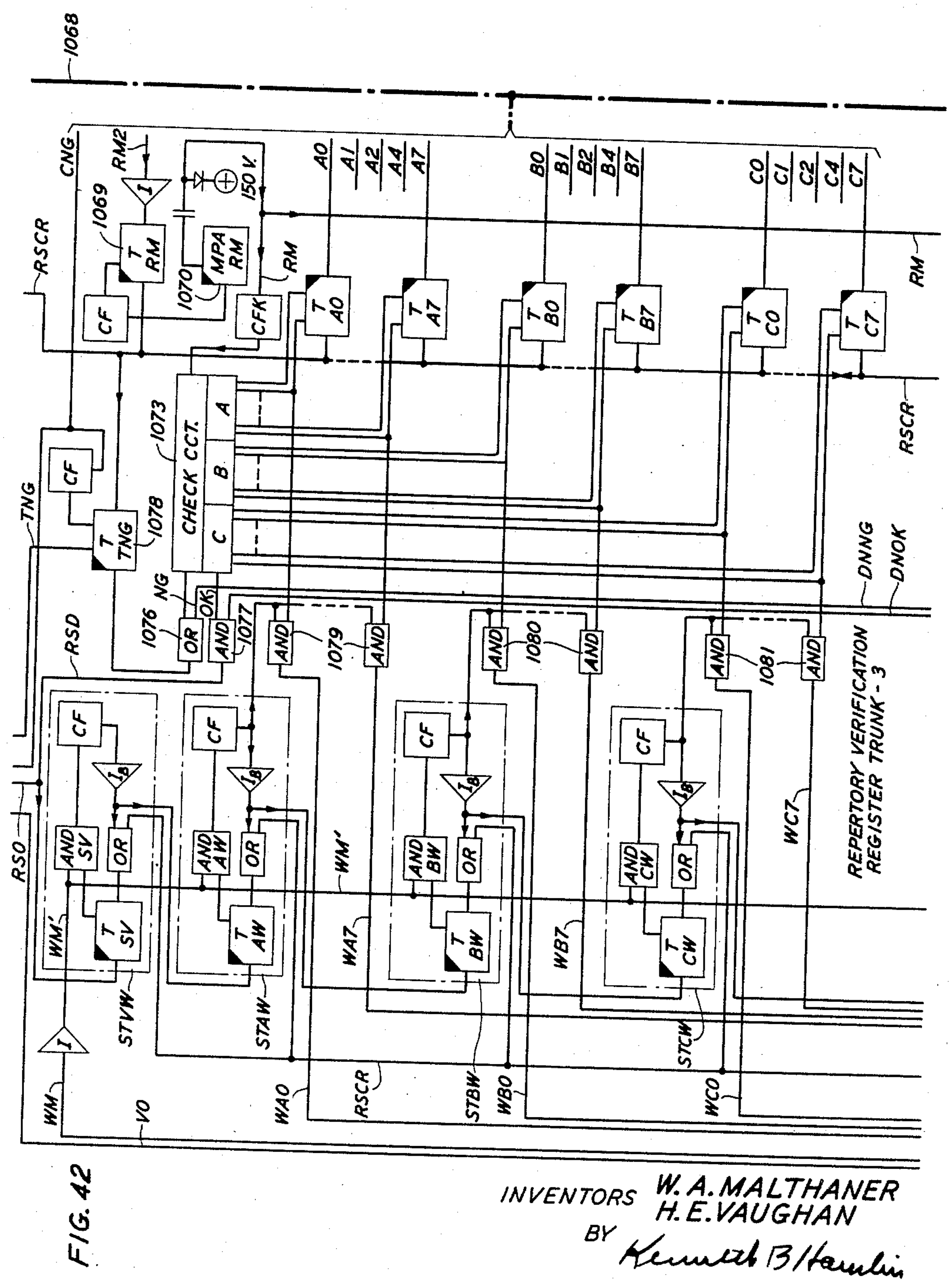
Figure 43:
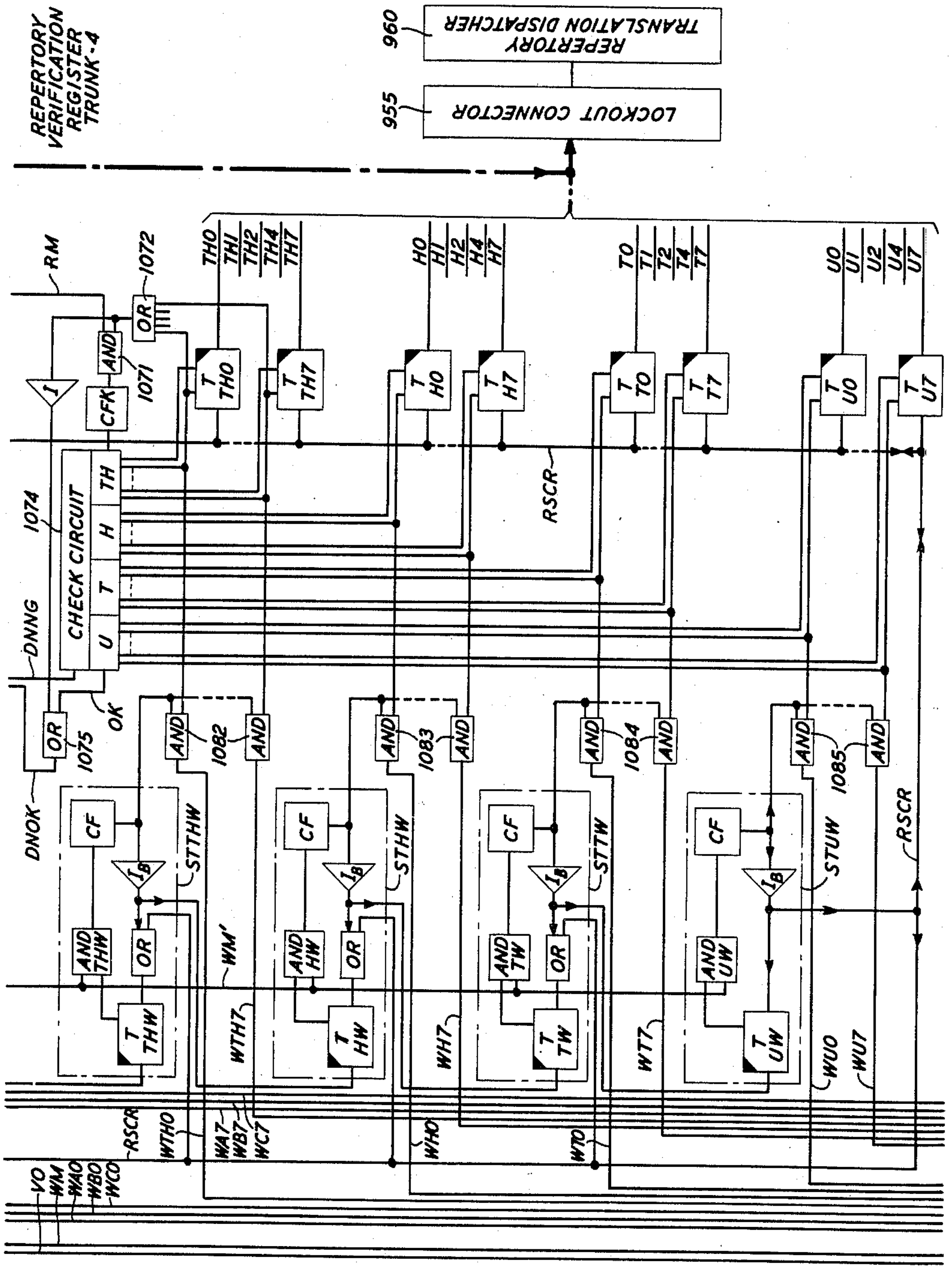

At the same time Repertory Translation Dispatcher 960 dispatches a positive signal voltage over the RM2 lead in cable 1068, this positive signal voltage is applied to an inverter and a negative signal voltage is applied therefrom to operate RM toggle 1069 shown in Fig. 42. The operation of RM toggle 1069 applies a negative signal voltage through a cathode follower to operate RM monopulser 1070. When RM monopulser 1070 restores to normal after a predetermined interval of approximately 0.7 μsecond, a negative signal pulse is applied to the RM lead. The negative signal pulse on the RM lead is applied to the input of check circuit 1073 in Fig. 42 and to the upper input of AND gate 1071 shown in Fig. 43. The occurrence of the negative signal pulse on RM lead will actuate check circuit 1073 which will check the plausibility of the registration of the office code digits A, B, and C registered in the A–, B–, and C– toggles shown in Fig. 42. Similarly, AND gate 1071 shown in Fig. 43 will be actuated by the negative signal pulse on the RM lead provided there is a registration of a directory number in the TH0– thousands digit toggles shown in Fig. 43. As shown in Fig. 43 the output of each of the TH– thousands digit toggles is applied to an input of OR gate 1072, and accordingly if there is a registration contained in these toggles, OR gate 1072 will be actuated to apply a negative signal voltage to the lower input of AND gate 1071. The actuation of AND gate 1071 will in turn cause the operation of check circuit 1074 which will check the plausibility of the thousands, hundreds, tens and units digits of the directory number recorded in the associated toggles shown in Fig. 43. In the event that the calling subscriber has a number recorded in his repertory area on Repertory Drum 30 associated with the dialed repertory code which is not a complete seven digit number, for example a three digit code, there is no necessity for checking the plausibility of the thousands, hundreds, tens and units digits as there will be no registration contained in the corresponding toggles of Fig. 43. In this event all of the inputs of OR gate 1072 will be positive and accordingly its output will be positive. This positive voltage is inverted in an inverter and a negative signal voltage is applied through OR gate 1075 over the DNOK lead which extends to the lower input of AND gate 1077 shown in Fig. 42.

In the event that check circuit 1073 shown in Fig. 42 determines that the A, B or C digit recorded in the corresponding toggles shown in Fig. 42 is implausible, or in the event that check circuit 1074 shown in Fig. 43 determines that the thousands, hundreds, tens or units digits recorded in the corresponding toggles of Fig. 43 are implausible, the negative signal voltage on the DNNG lead from the output of check circuit 1074 or the negative signal voltage on the NG lead from the output of check circuit 1073 will cause the actuation of OR gate 1076. The actuation of OR gate 1076 in turn applies a negative signal voltage to operate TNG toggle 1078.

The operation of TNG toggle 1078 applies a positive signal voltage to the TNG lead which extends to the lower input of OR gate 1052 shown in Fig. 41. The actuation of OR gate 1052 will in turn apply a positive signal to the PST lead which as described hereinbefore is inverted in an inverter shown in Fig. 40, and a negative signal voltage is applied to the lower input of AND gate 1057. When AND gate 1057 is actuated as described hereinbefore by the negative signal pulse from the output of match circuit 1067, PST toggle 1058 will in turn be operated and will cause a mark to be written in the TRBL trouble channel in the selected slot on Trunk Drum 50.

Concurrent with the application of the positive signal voltage to the TNG lead, the operation of TNG toggle 1078 also applies a negative signal voltage to the CNG lead. This negative signal voltage will cause the actuation of OR gate 1102 which in turn will apply a negative signal voltage through an OR gate to reset DCL toggle 1044. When DCL toggle 1044 is reset the positive signal voltage is removed from the DCL lead. This will cause the disablement of AND gate 1055 shown in Fig. 40 which will result in removal of the positive signal voltage being applied over the ERE lead in cable 1068 to Lockout Connector 955. This removal of positive signal voltage on the ERE lead causes Lockout Connector 955 to release the established connection between Repertory Verification Register Trunk 23 and Repertory Translation Dispatcher 960.

Concurrent with the removal of positive signal voltage to the ERE lead, a positive signal voltage is also applied over the CNG lead in cable 1068 to Lockout Connector. As described above TNG toggle 1078 operates when check circuits 1073 or 1074 determine that the directory number registered in the directory number toggle A–, B–, C–, TH–, H–, T–, and U– shown in Figs. 42 and 43 is incorrect. This indicates that the source of the error may be in the code originally recorded on Repertory Drum 30. Accordingly, a positive signal voltage is transmitted over the CNG lead in cable 1068 through Lockout Connector 955 to Repertory Translation Displatcher 960 which in the manner described hereinbefore causes a mark to be written in the TRBL trouble channel of the slot on Repertory Drum 30 from which the directory number was read.

If the directory number registered in the register toggles shown in Figs. 42 and 43 is found to be OK by check circuits 1073 and 1074, a negative signal pulse on the DNOK lead from the output of OR gate 1075 and a negative signal pulse on the OK lead from the output of check circuit 1073 are applied to AND gate 1077 shown in Fig. 42. The actuation of AND gate 1077 applies a negative signal voltage over the RSO lead to the input of OR gate 1102 shown in Fig. 41. The actuation of OR gate 1102 in turn applies a negative signal voltage through an OR gate to the resetting input of DCL toggle 1044. With DCL toggle 1044 reset, the positive signal voltage applied to the DCL lead is replaced by a negative signal voltage, and the negative signal voltage on the DCL lead will disable AND gate 1055 shown in Fig. 40, and a negative signal voltage will be applied to the ERE lead in cable 1068 to the Lockout Connector. Lockout Connector 955 will release the connection between Repertory Verification Register Trunk 23 and Repertory Translation Dispatcher 960 as described above.

After the directory number associated with the repertory code dialed by the calling subscriber is registered in the register toggles shown in Figs. 42 and 43 as described above, and after this number has been checked and found to be plausible as described above, the next function performed by Repertory Verification Register Trunk 23 is to control the audible transmission of the registered directory number to the calling subscriber. This is accomplished by utilizing Voice Recorded Announcement Drum 60 shown in Fig. 44. This drum contains a number of channels, one for each of the ten digits, and one channel designated WORD MARKS. Each of the digit channels contains successive voice recordings of one of the ten digits. For example, the zeros digit channel contains successive voice recordings of the word "zero." Similarly, the fives digit channel contains successive voice recordings of the word "five" and the ones digit channel contains successive voice recordings of the word "one," etc. To index or identify when the successive voice recordings in the various digit channels start and end a WORD MARKS channel is provided which contains successive magnetic marks recorded therein. These magnetic "word marks" are recorded on Voice Recorded Announcement Drum 60 in the WORD MARKS channel so as to occur between the end of each voice recorded digit word and the start of the next voice recorded digit word in the various digit channels. The magnetic marks in the WORD MARKS channel are read by reading amplifier 1104 which may advantageously be the same type utilized to read magnetic marks on the other magnetic drums in the present invention. Accordingly, during the interval between the reading of the word marks a positive signal voltage is applied to the WM lead, and during reading of a word mark reading amplifier 1104 will apply a negative voltage pulse to the WM lead. The audible word announcements, "one" . . . "one," "five" . . . "five," . . . "zero" . . . "zero," etc., are read from the respective channels on Voice Recorded Announcement Drum 60 by magnetic pickup heads 1105 and amplifier 1103. These magnetic pickup heads and amplifiers are of the type well known in the sound recording and reproducing art and, for example, may be of the type utilized to reproduce sound recordings made on magnetic tape or time of day announcement drums, etc. The audible word announcements read from Voice Recorded Announcement Drum 60 are applied to the input of associated gated amplifiers 1101. These amplifiers may advantageously be a vacuum tube triode in which a negative signal voltage is applied to the cathode to control the conduction through the amplifier. The voice recorded digit words are applied to the grid of the triode and the amplified gated output is obtained from the anode circuit. The output of these gated amplifiers are connected in common to lead VO which extends to the primary winding of transformer 1047 shown in Fig. 41.

The individual digits of the directory number recorded in the register toggles shown in Figs. 42 and 43 are utilized to control the audible transmission of the corresponding voice recorded digit words to the calling subscriber. A steering circuit comprising stages STVW, STAW, STBW, STCW, STTHW, STHW, STTW and STUW shown in Figs. 42 and 43 steer the respective digits recorded in the register toggles to a group of OR gates 1086 through 1090 and a group of AND gates designated 1091 through 1100 which, in turn, control the transmission of the audible voice recorded words to the calling subscriber. The various stages of this steering circuit operate in essentially the same manner as the steering circuit disclosed in Fig. 41 which is utilized to control the registration of the accumulating A and B digits of the dialed repertory code in the RA– and RB– toggles respectively. The signal voltages applied to the WM lead from the output of read amplifier 1104 associated with the WORD MARKS channel on Voice Recorded Announcement Drum 60 are inverted in an inverter shown in Fig. 42 and applied to the WM′ lead. With the steering circuit stages normal, a positive signal voltage is applied from the output of the SV toggle in the STVW stage of the steering circuit to the lower input of the SV AND gate associated therewith. Between word marks a negative signal voltage is applied to the upper input of the SV AND gate in the STVW stage of the steering circuit from lead WM'. During the reading of a word mark in the WORD MARKS channel on Voice Recorded Announcement Drum 60 a positive signal voltage is applied to the upper input of the SV AND gate from the WM' lead. SV AND gate is a negative AND gate or a positive OR gate and, accordingly, a positive signal voltage is obtained from its output under the conditions above described. When AND gate 1077 is actuated as described hereinbefore, upon a successful check of the directory number recorded in the register toggles of Figs. 42 and 43, the negative signal voltage applied to the RSO lead will cause the operation of the SV toggle in the STVW stage of the steering circuit. The SV toggle in operating applies a negative signal voltage to the lower input of its associated SV AND gate. As indicated above, a negative signal voltage will be applied to the upper input of SV AND gate from the WM' lead during the interval between the reading of successive word marks in the WORD MARKS channel and Voice Recorded Announcement Drum 60. Because both inputs of SV AND gate are negative a negative signal voltage will be applied from its output. No further action takes place until the reading of the next word mark occurs whereupon a positive voltage pulse will be applied to the WM' lead. This positive voltage pulse is applied to the upper input of SV AND gate which in turn furnishes a positive voltage pulse at its output. This positive voltage pulse from the output of SV AND gate is applied to an inverter of the $I_B$ type which in turn provides a negative voltage pulse to reset the SV toggle and to operate the AW toggle in the STAW stage of the steering circuit.

Figure 44:
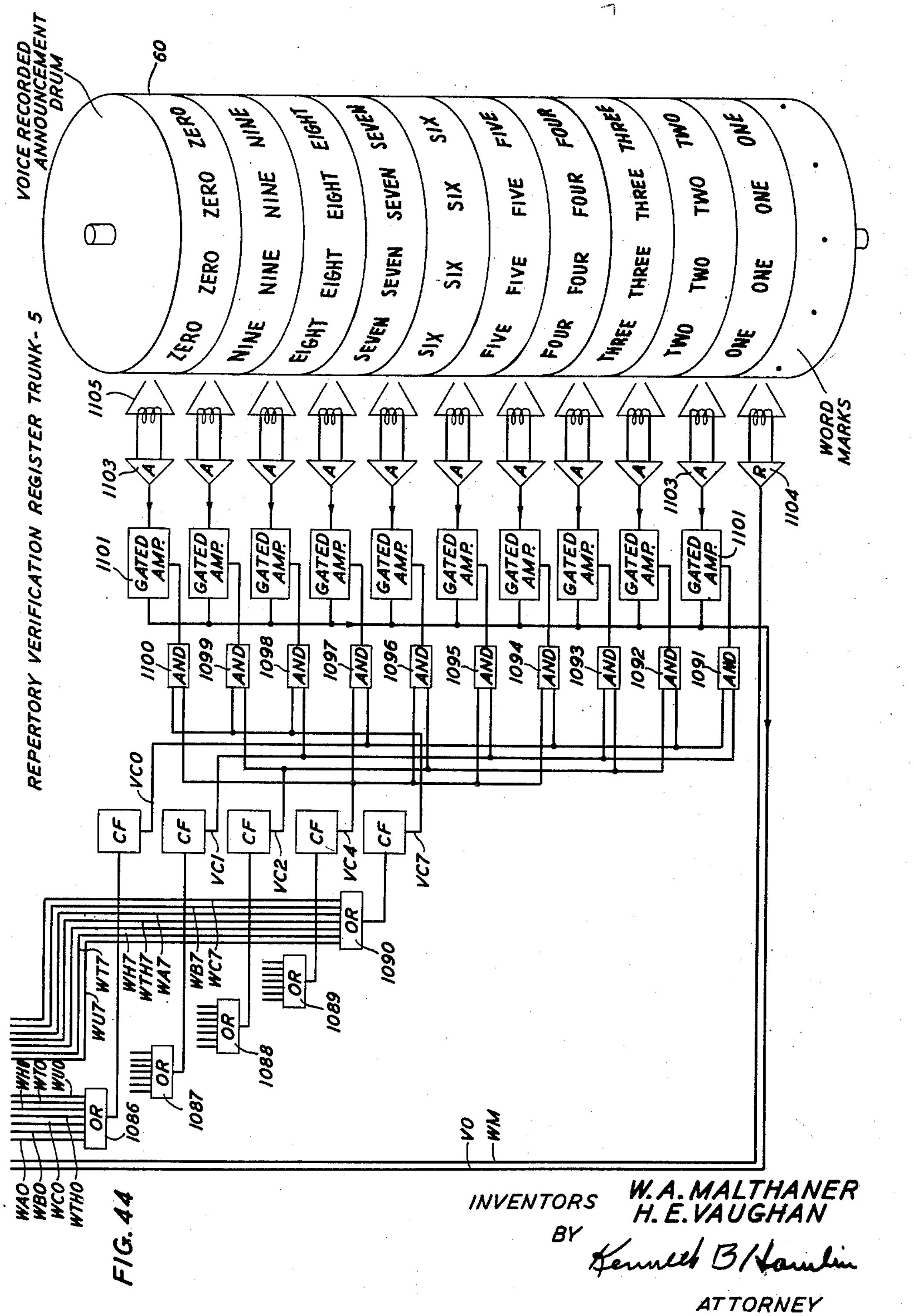

The operation of the AW toggle in the STAW stage of the steering circuit applies a negative signal voltage to the lower input of the associated AW AND gate. The upper input of the AW AND gate has a positive voltage pulse applied thereto until the completion of the reading of the word mark in the WORD MARKS channel on Voice Recorded Announcement Drum 60. When the word mark has passed the reading head of Voice Recorded Announcement Drum 60 a negative signal voltage is applied to the WM' lead as indicated above. Accordingly, both inputs of the AW AND gate are negative and this AND gate will in turn apply a negative signal voltage from its output to the inputs of AND gates 1079 associated with the A– toggles, A0, A1, A2, A4 and A7, shown or indicated in Fig. 42 in which the A digit of the directory number is recorded. The enablement of AND gates 1079 by the negative signal voltage from the output of the AW AND gate will cause negative signal voltages to be applied to the WA0, WA1, WA2, WA4 and WA7 leads, respectively, in accordance with the operated ones of the associated A– toggles. These leads extend to associated OR gates 1086 through 1090 shown in Fig. 44 and the negative signal voltages on the particular two of these five leads will cause the actuation of the two OR gates connected thereto. The actuation of these OR gates will in turn apply negative signal voltages to two of the five leads VC0, VC1, VC2, VC4 and VC7 shown in Fig. 44. The A– digit recorded in the A– toggles of Fig. 42 and transmitted through the OR gates 1086 through 1090 shown in Fig. 44 is translated into a one-out-of-ten code in a respective one of the ten AND gates 1091 through 1100 shown in Fig. 44. For example, assume that the digit registered in the A– toggles of Fig. 42 is the digit seven. Accordingly, negative signal voltages will be applied through AND gates 1079 to the WA0 and WA7 leads. These voltages will cause the actuation of OR gates 1086 and 1090 which in turn will apply a negative signal voltage to leads VC0 and VC7. The negative signal voltages on leads VC0 and VC7 are combined in AND gate 1097 shown in Fig. 44 which in turn will apply a negative signal voltage to the input of the gated amplifier 1101, the input of which is connected to the reading amplifier which reads the voice recorded word "seven" in the seven digit channel on Voice Recorded Announcement Drum 60. This negative signal voltage will control the gated amplifier and cause the transmission of the voice announcement of the word "seven" through the gated amplifier 1101 to lead V0 which extends to the primary winding of transformer 1047 shown in Fig. 41. In this manner the voice announcement of the word "seven" is transmitted to the calling subscriber.

When the next word mark is read in the WORD MARKS channel on Voice Recorded Announcement Drum 60, a positive voltage pulse will be applied to the upper input of the AW AND gate in the STAW stage of the steering circuit which as described above will furnish a positive voltage pulse at its output. This positive voltage pulse will be inverted in an $I_B$ type inverter and a negative voltage pulse will be applied through an OR gate to reset the AW toggle in STAW stage of the steering circuit. At the same time the negative voltage pulse from the inverter is applied to the BW toggle in the STBW stage of the steering circuit. The operation of the BW toggle in this manner causes a negative signal voltage to be applied to the lower input of the associated BW AND gate and when the word mark positive voltage pulse is removed from the WM' lead the output of the BW AND gate will be a negative signal voltage which will enable AND gates 1080 connected to the output of the B– register toggles B0, B1, B2, B4 and B7 shown or indicated in Fig. 42 in which the B digit of the directory number is recorded. In a manner similar to that described above, voltages representing in two-out-of-five code the B digit registered in the B– toggles are transmitted over leads WB0, WB1, WB2, WB4 and WB7 shown or indicated in Fig. 42 to corresponding OR gates 1086 through 1090 shown in Fig. 44. The actuation of two of these five OR gates will in turn apply a negative signal voltage to two of the leads VC0, VC1, VC2, VC4 and VC7. These negative signal voltages are in turn translated into a one-out-of-ten code by the enablement of one of the AND gates 1091 through 1100 and will enable an associated gated amplifier 1101 for the transmission of the voice recorded word representing the digit registered in the B digit toggles of Fig. 42.

The operation of the steering circuit and of the translating and logic gates of Fig. 44 is the same for succeeding digits, and the complete seven digit directory number is audibly transmitted to the calling subscriber over the subscriber loop. At the completion of the transmission of the last digit of the directory number, that is, the U digit, and upon the application of the next succeeding word mark positive voltage pulse to the WM' lead, the UW AND gate in the STUW stage of the steering circuit shown in Fig. 43 will apply a positive voltage pulse from its output. This voltage is inverted in an $I_B$ type inverter and a negative voltage pulse is applied to the resetting input of the UW toggle in the STUW stage of the steering circuit. This negative voltage pulse is also applied to the RSCR reset lead which resets the directory number register toggles shown in Figs. 42 and 43, resets the toggles in each of the stages of the steering circuit, resets the repertory code register toggles RA– and RB– shown in Fig. 41, the toggles in the STDA and STRA stages of the steering circuit shown in Fig. 41, the DCL toggle 1044 shown in Fig. 41. The resetting of the DT toggle in the STDT stage of the steering circuit shown in Fig. 41 removes the disabling voltage from gated amplifier 1045 and dial tone from dial tone generator 986 is again applied over the subscriber's loop to the calling subscriber. If the repertory subscriber desires to verify an additional repertory code, he may do so by immediately dialing the desired repertory code. This additional repertory code dialed by the subscriber will be detected, accumulated and registered in the repertory code register toggles RA– and RB– shown in Fig. 41 in the manner described hereinbefore and the operation of the circuits of Repertory Verification Register Trunk 23 are repeated. The setting of the line equipment number toggles 1063 shown in Fig. 40 is retained in the event that the repertory subscriber desires to verify additional repertory codes.

When a subscriber hangs up at any point in the process of verifying a repertory code, the hang up will be recognized by Trunk Condition Information Assembler (383) through the use of the connection between the A relay 1041 and scanner 25 in the manner described in detail in the above Malthaner-Vaughan patent. After a hang up timeout, Trunk Condition Information Assembler (383) will transmit a positive signal pulse over the EE lead to Repertory Verification Register Trunk 23. This positive signal pulse is inverted in an inverter of the $I_B$ type which in turn applies a negative signal pulse to the RSCR reset lead which causes the resetting of the repertory code toggles RA– and RB– shown in Fig. 41, the directory number toggles A–, B–, C–, TH–, H–, T– and U– shown in Figs. 42 and 43, the DCL toggle 1044 shown in Fig. 41, and each of the toggles in the STDT, STRA and STRB stages of the steering circuit shown in Fig. 41 and the toggles in the STVW, STAW, STBW, STCW, STTHW, STHW, STTW and STUW stages of the steering circuit shown in Figs. 42 and 43. The positive signal voltage of the EE lead is also inverted in another $I_B$ type inverter shown in Fig. 40 and a negative signal voltage pulse is applied to the RSLT lead which causes the resetting of the line equipment number toggles 1063 and the LOK toggle 1066 shown in Fig. 40. When the connection through Switching Network (49) is released, S relay 1042 will release and in turn release B relay 1043.

The release of B relay 1043 will apply a negative signal voltage to the SS lead. This negative signal voltage will cause the actuation of the DT AND gate in the STDT stage of the steering circuit shown in Fig. 41 in the manner described above and the operation of the RAG toggle in the STRA stage of the steering circuit. To insure that the DT toggle and all toggles of the steering circuit are normal and in readiness for the next repertory verification call, the release of the S relay 1042 and the B relay 1043 causes the operation of the HRS monopulser 1050. When this monopulser restores to normal a positive signal voltage is applied to an inverter of the $I_B$ type which in turn applies a negative signal voltage to the RSCR lead to reset any operated toggles of the steering circuit.

It is to be understood that Voice Recorded Announcement Drum 60 utilized in the illustrative embodiment of the present invention may advantageously include voice recorded "letter" announcements such as "A," "B," "C," etc., as well as voice recorded number word announcements. These audible letter announcements may advantageously be gated and transmitted to a repertory dialing subscriber who desires a verification of a telephone directory number in his repertory in a manner similar to that described hereinbefore. The translation from a numerical office code designation of the type utilized in the illustrative embodiment, for example 273, to a corresponding letter and digit office code designation, for example Cr. –3, conventionally used in many telephone offices may be accomplished in a manner well known in the art.

*Conclusion*

Although the above description has been concerned with the establishment of a single call through a common control telephone system, it is to be understood that different functions from a single drum are carried out in parallel times by separate control units, thus permitting several calls that are at different stages of progress to be served simultaneously without mutual interference. For example, several nonrepertory calls and several repertory calls as well as several repertory vertification and several repertory change calls may be carried out simultaneously without interference.

While certain translating and registration functions have been particular to certain magnetic drums in the above-described embodiment, it is to be understood that this invention is not to be considered as limited to the particular embodiment described. Thus the particular magnetic drums depicted in the above-described arrangements may be combined into a fewer number of drums. For example, the in-trunk and out-trunk slots on Trunk Drum 50 may be combined with the register slots on Register Drum 20 on a single trunk and register drum. Furthermore, the provision of registers in the Repertory Vertification Register Trunks 23 and Repertory Change Register Trunks 22 as described above may be eliminated by the provision of a separate unit similar to Dialing Assembler 850 so that the repertory codes and directory numbers formerly accumulated in Repertory Change Register Trunk and repertory codes accumulated in the Repertory Verification Register Trunk may be accumulated and recorded in slots on Trunk Drum 50.

Thus it is to be understood that the above-described arrangements are illustrative of the applications of the principles of the present invention. Numerous other arrangements may be devised by those skilled in the art without departing from the spirit and scope of the invention.

What is claimed is:

1. In an automatic telephone system arranged for repertory dialing, the combination comprising a switching network, a plurality of subscriber's lines connected to said network, common repertory memory means for storing predetermined telephone directory numbers comprising individual repertories of said subscribers, and means responsive to the dialing of predetermined repertory codes by said subscribers for establishing desired connections through said network under control of said repertory memory means.

2. The combination defined in claim 1 wherein said repertory memory means comprises a magnetic storage medium and means for recording predetermined telephone directory numbers in and reading said predetermined telephone directory numbers from said medium.

3. The combination defined in claim 2 wherein said magnetic storage medium comprises a surface of magnetizable material and wherein said means for recording telephone directory numbers in and reading telephone directory numbers from said medium comprises a plurality of magnetic heads.

4. In an automatic telephone system, the combination of a switching network, a subscriber line connected to said network, storage means for storing a plurality of predetermined telephone directory numbers, register means, means for recognizing distinct coded signals on said line, means responsive to said distinct coded signals for reading a particular directory number stored in said storage means and recording the directory number read thereby in said register means, and means controlled by said register means for establishing a connection through said network.

5. In an automatic telephone system arranged for repertory dialing, the combination comprising a switching network, a plurality of subscriber's lines connected to said network, common repertory memory means for storing predetermined telephone directory numbers comprising individual repertories of certain of said subscribers, each telephone directory number in the individual repertory of each of said certain of said subscribers being associated with a predetermined repertory code, determining means connected to said repertory memory means and responsive to the dialing of a repertory code by any of said certain of said subscribers for determining the telephone directory number associated with the dialed repertory code and means controlled by said determining means for establishing a desired connection through said network in accordance with the telephone directory number determined thereby.

6. The combination defined in claim 5 wherein said repertory memory means comprises a continuously rotating surface of a magnetizable material and wherein said determining means includes a plurality of magnetic heads for reading telephone directory number manifestations recorded on said surface.

7. In an automatic telephone system arranged for repertory dialing, the combination comprising a switching network, a plurality of subscriber's lines connected to said network, common repertory memory means for storing telephone directory numbers comprising individual repertories of said subscribers, each telephone directory number in the individual repertory of each subscriber being associated with a predetermined repertory code, means for recognizing the repertory codes dialed by said subscribers, determining means connected to said repertory memory means and controlled by said recognizing means for determining the telephone directory numbers associated with dialed repertory codes, register means, means for registering in said register means said telephone directory numbers determined by said determining means and means controlled by said register means for establishing connections through said network.

8. The combination defined in claim 7 wherein said common repertory memory means comprises a continuously rotating magnetic drum, wherein said determining means includes a plurality of magnetic heads associated with said drum, and wherein said register means comprises a second continuously rotating magnetic drum.

9. In an automatic telephone system arranged for repertory dialing, the combination comprising a switching network, a plurality of subscriber's lines connected to said network, the subscribers of certain of said lines being repertory dialing subscribers, common repertory memory means for storing the telephone directory numbers comprising the individual repertories of said repertory dialing subscribers, each telephone directory number in the individual repertory of each repertory dialing subscriber being associated with a predetermined repertory code, register means for receiving, accumulating and registering signal pulses representing digits dialed by said subscribers, detecting means connected to said register means and operative when the digits registered therein correspond to a repertory code, determining means connected to said repertory memory means and controlled by said detecting means and said register means for determining the telephone directory numbers associated with dialed repertory codes, means controlled by said determining means for registering the telephone directory numbers determined thereby in said register means, and means controlled by said register means for establishing a connection through said network.

10. In an automatic telephone system arranged for repertory dialing, the combination comprising a switching network, a plurality of subscriber's lines connected to said network, the subscribers of certain of said lines being repertory dialing subscribers, common repertory memory means for storing the telephone directory numbers comprising the individual repertories of all of said repertory dialing subscribers, each telephone directory number in the individual repertory of each repertory dialing subscriber being associated with a predetermined repertory code, register means for receiving, accumulating and registering signal pulses representing digits dialed by said subscribers, detecting means connected to said register means and operative when the digits registered therein correspond to a repertory code, checking means controlled by said detecting means to determine that said repertory code registered in said register means was received over a subscriber line entitled to repertory dialing service, determining means connected to said repertory memory means and controlled by said checking means and said register means for determining the telephone directory numbers associated with dialed repertory codes, means controlled by said determining means for registering the telephone directory numbers determined thereby in said register means and means controlled by said register means for establishing a connection through said network.

11. In an automatic telephone system, the combination comprising a plurality of subscriber's lines connected to said system, each of said lines characterized by a distinct directory number, detecting means for detecting coded signal pulses on said lines, certain of said coded signal pulses representing directory numbers of called ones of said lines, a storage medium for storing directory numbers of predetermined ones of said lines, control means responsive to coded signals for establishing a connection through said system between a calling one of said lines and a called one of said lines, means controlled by said detecting means for transmitting coded signals representing directory numbers detected thereby to said control means, and means controlled by said detecting means and responsive to distinct coded signal pulses detected thereby for selectively transmitting to said control means coded signals representing said directory numbers stored in said storage medium.

12. In an automatic telephone system arranged for repertory dialing, the combination of a switching network, a subscriber line connected to said network, said subscriber line characterized by a distinctive equipment number, first register means for registering said equipment number, storage means for storing predetermined telephone directory numbers, a second register means, reading means responsive to distinct coded signals on said line and controlled by said equipment number registered in said first register means for reading a particular one of said directory numbers stored in said storage medium, means controlled by said reading means for recording the directory number read thereby in said second register means, and means controlled by said second register means for establishing a connection through said network.

13. In an automatic telephone system arranged for repertory dialing, the combination comprising a switching network, a plurality of subscriber's lines connected to said network, each of said lines characterized by a distinctive line equipment number and a distinctive telephone directory number, storage means for storing the equipment numbers of said lines, a common repertory memory medium for storing telephone directory numbers comprising the individual repertories of said subscribers, each telephone directory number in the repertories of said subscribers being associated with a predetermined digital repertory code, said medium divided into a plurality of areas and each of said areas individually assigned to a respective one of said subscribers, register means for registering digit signals applied to said lines by calling subscribers, first determining means connected to said storage means for determining the equipment number of a calling subscriber's line, detecting means connected to said register means and operative when the digit signals registered therein correspond to a repertory code, means controlled by said first determining means and said detecting means for locating the particular area in said medium assigned to a calling subscriber's line, second determining means controlled by said detecting means and said register means for determining from the particular repertory area in said medium assigned to said calling subscriber's line the telephone directory number associated with the repertory code registered in said register means, and means controlled by said second determining means for establishing a connection through said switching network.

14. In an automatic telephone system arranged for repertory dialing, the combination comprising a switching network, a plurality of subscriber's lines connected to said network, each of said lines characterized by a distinctive equipment number and a distinctive telephone directory number, certain of said lines assigned to repertory dialing subscribers, storage means for storing the equipment numbers of said lines, a common repertory memory medium for storing telephone directory numbers comprising the individual repertories of said repertory dialing subscribers, each telephone directory number in the repertories of said repertory dialing subscribers being associated with a predetermined digital repertory code, said medium divided into a plurality of areas, each of said areas identified by the equipment number of one of said certain of said lines stored therein and individually assigned to a respective one of said repertory dialing subscribers, register means, means for registering digit signals applied to said lines by calling subscribers in said register means, first determining means connected to said storage means for determining the equipment number of a calling subscriber's line, means controlled by said first determining means for recording the equipment number determined thereby in said register means, detecting means connected to said register means and operative when the digit signals registered therein correspond to a repertory code, means controlled by said register means for locating the particular area in said medium assigned to a calling repertory dialing subscriber, second determining means controlled by said detecting means and said register means for determining from the particular repertory area in said medium assigned to a calling repertory dialing subscriber the telephone directory number associated with the repertory code registered in said register means, means controlled by said second determining means for recording the telephone directory number determined thereby in said register means, and means controlled by said register means for establishing a connection through said switching network.

15. The combination defined in claim 14 wherein said common repertory memory medium comprises a continuously rotating magnetic drum, wherein said plurality of areas on said medium comprises a plurality of areas on the surface of said magnetic drum, and wherein each of said areas comprises a plurality of slots on said drum, each of said slots adapted to register a telephone directory number and its associated repertory code.

16. The combination defined in claim 15 wherein said means controlled by said register means for locating the particular area on said drum assigned to a calling repertory dialing subscriber comprises means for matching the equipment number of said calling repertory dialing subscriber's line registered in said register means with equipment numbers recorded in the individual areas on said magnetic drum, said means operative when a match is obtained, and wherein said second determining means controlled by said detecting means and said register means for determining from the particular area on said drum assigned to a calling repertory dialing subscriber the telephone directory number associated with the repertory code registered in said register means comprises means for matching the repertory code registered in said register means with the repertory codes recorded in the area on said magnetic drum assigned to said calling repertory dialing subscriber, said means operative when a match is obtained to read the recorded telephone directory number associated therewith.

17. In an automatic telephone system arranged for repertory dialing, the combination comprising a switching network, a plurality of subscriber's lines connected to said network, common repertory memory means for storing predetermined telephone directory numbers comprising individual repertories of said subscribers, each of said predetermined telephone directory numbers being stored in said repertory memory means in association with a predetermined repertory code stored therein, means responsive to the dialing of said predetermined repertory codes by said subscribers for establishing desired connections through said network under control of said repertory memory means, and means for changing said predetermined telephone directory numbers stored in said repertory memory means, said last-named means comprising register means, means responsive to the dialing of a predetermined repertory change code by any of said subscribers for temporarily connecting said register means to the line serving said one of said subscribers, means operative thereafter in response to the dialing by said one of said subscribers of a repertory code for which a change is desired and a new telephone directory number to be associated therewith for registering the dialed repertory code and the new telephone directory number in said register means, and means controlled by said register means for storing said new telephone directory number in said common repertory memory means.

18. The combination defined in claim 17 wherein said last-named means comprises means for matching said dialed repertory code registered in said register means with said repertory codes stored in said common repertory memory means, means operative when a match is detected and means controlled thereby for storing said new telephone directory number registered in said register means in an area of said common repertory memory means associated with said dialed repertory code.

19. The combination defined in claim 17 wherein said common repertory memory means comprises a continuously rotating surface of a magnetizable material and wherein said means for changing said predetermined telephone directory numbers stored in said repertory memory means includes a plurality of magnetic heads for recording telephone directory numbers on said surface.

20. In an automatic telephone system, the combination of a switching network, a subscriber line connected to said network, storage means for storing a plurality of predetermined telephone directory numbers, detecting means for recognizing coded signals on said line, means controlled by said detecting means and responsive to coded signals of a first type on said line for selectively establishing connections through said network under control of said directory numbers stored in said storage means, and means controlled by said detecting means and responsive to coded signals of a second type on said line for storing predetermined telephone directory numbers in said storage means.

21. In an automatic telephone system arranged for repertory dialing, the combination of a switching network, a subscriber line connected to said network, said subscriber line characterized by a distinctive equipment number, first register means for registering said equipment number, storage means for storing predetermined telephone directory numbers, second register means, detecting means responsive to distinct coded signals on said line for connecting said second register means thereto, means controlled by said detecting means and responsive to coded signals representing a telephone directory number on said line for registering said telephone directory number in said second register means, and means controlled by said second register means and said equipment number registered in said first register means for storing said telephone directory number registered in said second register means in said storage means.

22. In an automatic telephone system arranged for repertory dialing, the combination comprising a plurality of subscriber's lines, common repertory memory means for storing telephone directory numbers comprising the individual repertories of said subscribers, each telephone directory number stored in said repertory memory means being associated with a predetermined repertory code stored therein, and means responsive to dialing by said subscribers over said lines for changing the telephone directory numbers associated with said repertory codes stored in said repertory memory means.

23. The combination defined in claim 22 wherein said last-named means comprises detecting means for detecting predetermined signal pulses on any of said lines indicating that a repertory change is desired by a subscriber, register means controlled by said detecting means when operated for receiving, accumulating and temporarily registering the successive signal pulses representing the repertory code for which a change is desired and the new telephone directory number to be associated therewith when dialed by said subscriber, and means controlled by said register means for storing said new telephone directory number in said repertory memory means.

24. The combination defined in claim 22 wherein said common repertory memory means comprises a continuously rotating magnetic drum.

25. In an automatic telephone system arranged for repertory dialing, the combination comprising a plurality of subscriber's lines, a common repertory memory medium for storing predetermined telephone directory numbers comprising individual repertories of said subscribers, said medium divided into a plurality of areas individually assigned to a respective one of said subscribers, each of said subscribers assigned a plurality of predetermined repertory codes to be individually associated with the respective telephone directory numbers in the individual repertory thereof, each of said repertory codes for each of said subscribers recorded in the area of said medium assigned thereto in association with the predetermined telephone directory number assigned thereto by said subscribers, means controlled by said subscribers for storing said predetermined telephone directory numbers in the area of said medium individually assigned thereto, said last-named means comprising detecting means for detecting predetermined signal pulses on any of said lines indicating that the one of said subscribers served thereby desires to store a telephone directory number in the area on said medium assigned thereto, register means, means controlled by said detecting means for connecting said register means to the line serving said one of said subscribers, means responsive to successive dialed signal pulses representing said repertory code and said telephone directory number to be associated therewith for registering the dialed repertory code and the dialed telephone directory number in said register means, means controlled by said detecting means for locating the particular area in said common repertory memory medium assigned to said one of said subscribers, and means controlled by said register means for storing said telephone directory number registered therein in said repertory memory medium.

26. In an automatic telephone system arranged for repertory dialing, the combination comprising a plurality of subscriber's lines, each of said lines characterized by a distinctive equipment number and a distinctive telephone directory number, certain of said lines assigned to repertory dialing subscribers, storage means for storing the equipment numbers of said lines, a common repertory memory medium for storing predetermined telephone directory numbers comprising the individual repertories of said repertory dialing subscribers, each telephone directory number in the repertories of said repertory dialing subscribers being associated with a predetermined digital repertory code recorded in said repertory memory medium, said medium divided into a plurality of areas, each of said areas identified by the equipment number stored therein of one of said certain of said lines and individually assigned to a respective one of said repertory dialing subscribers, first register means, means for registering certain digit signals applied to said lines by calling subscribers in said first register means, first determining means connected to said storage means for determining the equipment number of a calling subscriber's line, means controlled by said first determining means for recording the equipment number determined thereby in said first register means, detecting means connected to said first register means and operative when the digit signals registered therein correspond to a predetermined repertory change code dialed by one of said repertory dialing subscribers, second register means, means controlled by said detecting means for connecting said second register means to the line serving said one of said repertory dialing subscribers, means for receiving, accumulating and registering in said second register means the successive signal pulses representing a repertory code and a predetermined telephone directory number to be associated therewith dialed thereafter by said one of said repertory dialing subscribers, means controlled by said first register means for locating the particular area in said medium assigned to said one of said repertory dialing subscribers, and means controlled by said second register means for recording the telephone directory number registered therein in the particular area of said repertory memory medium assigned to said one of said repertory dialing subscribers in association with the particular repertory code dialed by said one of said repertory dialing subscribers.

27. The combination defined in claim 26 wherein said means controlled by said detecting means also includes means for transmitting a signal tone to said one of said repertory dialing subscribers over the line assigned thereto to indicate that the subscriber may proceed to dial a repertory code and a telephone directory number to be associated therewith.

28. The combination defined in claim 27 wherein said common repertory memory medium comprises a continuously rotating magnetic drum, wherein said plurality of areas in said medium comprise a plurality of areas on the surface of said magnetic drum, and wherein each of said areas comprises a plurality of slots on said drum, each of said slots adapted to register a telephone directory number and its associated repertory code.

29. The combination defined in claim 28 wherein said means controlled by said first register means for locating the particular area on said magnetic drum assigned to said one of said repertory dialing subscribers comprises means for matching the equipment number of the line assigned to said one of said repertory dialing subscribers with the equipment numbers recorded in the individual areas on said magnetic drum, said means operating when a match is detected, and wherein said means controlled by said second register means for recording the telephone directory number registered therein in the particular area on said magnetic drum assigned to said one of said repertory dialing subscribers in association with the particular repertory code dialed by said one of said repertory dialing subscribers comprises means for matching the repertory code registered in said second register means with the repertory codes recorded in the individual slots of the area on said magnetic drum assigned to said one of said repertory dialing subscribers, and means operative when a match is detected for recording the telephone directory number registered in said second register means in the slot on said drum in which the dialed repertory code is recorded.

30. In an automatic telephone system arranged for repertory dialing, the combination comprising a switching network, a plurality of subscriber's lines connected to said network, common repertory memory means for storing predetermined telephone directory numbers comprising individual repertories of said subscribers, each of said predetermined telephone directory numbers being stored in said repertory memory means in association with a predetermined repertory code stored therein, means responsive to the dialing of said predetermined repertory codes by said subscribers for establishing desired connections through said network under control of said repertory memory means, and means for verifying said predetermined telephone directory numbers stored in said repertory memory means, said last-named means comprising register means, means responsive to the dialing of a predetermined repertory verification code by any one of said subscribers for temporarily connecting said register means to the line serving said one of said subscribers, means operative thereafter in response to the dialing by said one of said subscribers of a repertory code for which a verification is desired for registering said repertory code in said register means, and verification means controlled by said register means for transmitting to said one of said subscribers a verification of the telephone directory number stored in said common repertory memory means in association with the dialed repertory code.

31. The combination defined in claim 30 wherein said verification means comprises means for matching the dialed repertory code registered in said register means with said repertory codes stored in said common repertory memory means, means operative when a match is detected, and means controlled thereby for transmitting to said one of said subscribers an audible announcement of the telephone directory number stored in said common repertory memory means in association with said dialed repertory code.

32. The combination defined in claim 30 wherein said common repertory memory means comprises a continuously rotating surface of a magnetizable material and wherein said means for verifying said predetermined telephone directory numbers stored in said repertory memory means includes a plurality of magnetic heads for reading said telephone directory numbers recorded on said surface.

33. In an automatic telephone system arranged for repertory dialing, the combination of a switching network, a subscriber line connected to said network, said subscriber line characterized by a distinctive equipment number, first register means for registering said equipment number, storage means for storing predetermined telephone directory numbers, second register means, means responsive to distinct coded signals on said line and controlled by said equipment number registered in said first register means for selectively registering in said second register means predetermined telephone directory numbers stored in said storage means, and means controlled by said second register means for applying an audible announcement of the directory numbers registered in said second register means to said line.

34. In an automatic telephone system arranged for repertory dialing, the combination comprising a plurality of subscriber's lines, common repertory memory means for storing telephone directory numbers comprising the individual repertories of said subscribers, each telephone directory number stored in said repertory memory means being associated with a predetermined repertory code stored therein, and determining means responsive to dialing by said subscribers over said lines for determining the telephone directory numbers associated with said repertory codes stored in said repertory memory means.

35. The combination defined in claim 34 wherein said determining means includes announcement means for transmitting audible announcements of said telephone directory numbers over said lines.

36. The combination defined in claim 34 wherein said determining means comprises detecting means for detecting predetermined signal pulses on any of said lines indicating that the subscriber served thereby desires to determine the telephone directory number stored in said common repertory memory means in association with a particular repertory code, register means controlled by said detecting means when operated for receiving, accumulating, and temporarily registering signal pulses representing said particular repertory code when dialed by said subscriber, an announcement means controlled by said register means and said common repertory memory means for transmitting an audible announcement of the telephone directory number associated with said particular repertory code to said subscriber.

37. The combination defined in claim 36 wherein said announcement means includes a surface of magnetizable material, a plurality of magnetic pickup heads, and means producing relative motion between said surface and said heads.

38. The combination defined in claim 36 wherein said announcement means includes a continuously rotating surface of magnetizable material and a plurality of magnetic pickup heads.

39. The combination defined in claim 38 wherein said surface of magnetizable material comprises a continuously rotating magnetic drum.

40. In an automatic telephone system arranged for repertory dialing, the combination comprising a plurality of subscriber's lines, a common repertory memory medium for storing predetermined telephone directory numbers comprising individual repertories of said subscribers, said medium divided into a plurality of areas individually assigned to a respective one of said subscribers, each of said subscribers assigned a plurality of predetermined repertory codes associated with the respective telephone directory numbers in the individual repertory thereof, each of said repertory codes of each of said subscribers recorded in the area of said medium assigned thereto in association with the predetermined telephone directory number assigned thereto by said subscribers, means controlled by said subscribers for determining the telephone directory numbers associated with any particular repertory code in their respective repertories, said last-named means comprising detecting means for detecting predetermined signal pulses on any of said lines indicating that the one of said subscribers served thereby desires to determine a telephone directory number assigned to a particular repertory code in his repertory, register means, means controlled by said detecting means for connecting said register means to the line serving said one of said subscribers, means responsive to dialed signal pulses representing the repertory code which said one of said subscribers desires to determine for registering the dialed repertory code in said register means, means controlled by said detecting means for locating the particular area in said common repertory memory medium assigned to said one of said subscribers, means controlled by said register means for determining the telephone directory number stored in said repertory memory medium in association with said dialed repertory code, and announcement means controlled by said determining means for transmitting an audible announcement of said telephone directory number determined by said determining means to said one of said subscribers over the line assigned thereto.

41. The combination defined in claim 40 wherein said common repertory memory means comprises a continuously rotating magnetic drum and a plurality of magnetic heads.

42. The combination defined in claim 41 wherein said announcement means comprises a continuously rotating voice recorded announcement drum and a plurality of magnetic pickup heads.

43. In an automatic telephone system arranged for repertory dialing, the combination comprising a plurality of subscriber's lines, each of said lines characterized by a distinctive equipment number and a distinctive telephone directory number, certain of said lines assigned to repertory dialing subscribers, storage means for storing the equipment numbers of said lines, a common repertory memory medium for storing predetermined telephone directory numbers comprising the individual repertories of said repertory dialing subscribers, each telephone directory number in the repertories of said repertory dialing subscribers being associated with a predetermined digital repertory code recorded in said repertory medium, said medium divided into a plurality of areas, each of said areas identified by the equipment number stored therein of one of said certain of said lines and individually assigned to a respective one of said repertory dialing subscribers, first register means, means for registering certain digit signals applied to said lines by calling subscribers in said first register means, first determining means connected to said storage means for determining the equipment number of a calling subscriber's line, means controlled by said first determining means for recording the equipment number determined thereby in said first register means, detecting means connected to said first register means and operative when the digit signals registered therein correspond to a predetermined repertory verification code dialed by one of said repertory dialing subscribers, second register means, means controlled by said detecting means for connecting said second register means to the line serving said one of said repertory dialing subscribers, means for receiving, accumulating and registering in said second register means the signal pulses representing a repertory code when dialed thereafter by said one of said repertory dialing subscribers, means controlled by said first register means for locating the particular area in said medium assigned to said one of said repertory dialing subscribers, second determining means controlled by said second register means for determining the particular telephone directory number recorded in the area of said repertory memory medium assigned to said one of said repertory dialing subscribers in association with the particular repertory code dialed thereby, and means controlled by said second determining means for transmitting an audible announcement of said telephone directory number determined thereby to said one of said repertory dialing subscribers over the line assigned thereto.

44. The combination defined in claim 43 wherein said means controlled by said detecting means also includes means for transmitting a signal tone to said one of said repertory dialing subscribers over the line assigned thereto to indicate that the subscriber may proceed to dial the repertory code for which an audible announcement of the telephone directory number assigned thereto is desired.

45. The combination defined in claim 43 wherein said common repertory memory medium comprises a continuously rotating magnetic drum, wherein said plurality of areas in said medium comprises a plurality of areas on the surface of said magnetic drum, and wherein each of said areas comprises a plurality of slots on said drum, each of said slots adapted to register a telephone directory number and its associated repertory code.

46. The combination defined in claim 45 wherein said means controlled by said first register means for locating the particular area on said magnetic drum assigned to said one of said repertory dialing subscribers comprises means for matching the equipment number of the line assigned to said one of said repertory dialing subscribers with the equipment numbers recorded in the individual areas on said magnetic drum, said means operating when a match is detected, and wherein said second determining means controlled by said second register means for determining the particular telephone directory number recorded in the area on said magnetic drum assigned to said one of said repertory dialing subscribers in association with the particular repertory code dialed thereby comprises means for matching the repertory code registered in said second register means with the repertory codes recorded in the individual slots of the area on said magnetic drum assigned to said one of said repertory dialing subscribers, and reading means operative when a match is detected for reading the telephone directory number associated with the particular repertory code dialed by said one of said repertory dialing subscribers and recorded in the slot assigned thereto on said magnetic drum, and further wherein said means controlled by said second determining means for transmitting an audible announcement of said telephone directory number determined thereby to said one of said repertory dialing subscribers over the line assigned thereto comprises means for registering said telephone directory number read by said reading means in said second register means, a continuously rotating voice-recorded announcement drum containing a plurality of recorded audible word announcements, means connected to said register means and said announcement drum for selectively transmitting audible word announcements of the telephone directory number registered in said second register means to said one of said repertory dialing subscribers over the line assigned thereto.

47. In an automatic telephone system arranged for repertory dialing, the combination comprising a switching network, a plurality of subscriber's lines connected to said network, common repertory memory means for storing predetermined telephone directory numbers comprising individual repertories of said subscribers, each telephone directory number in the repertories of said subscribers being associated with a predetermined repertory code, switching means for completing connections through said network, means responsive to the dialing of telephone directory numbers by said subscribers for controlling said switching means to complete desired connections through said network, and means responsive to the dialing of said predetermined repertory codes by said subscribers and controlled by said common repertory memory means for controlling said switching means to complete desired connections through said network.

48. The combination defined in claim 47 wherein said common repertory memory means comprises a surface of magnetizable material, a plurality of magnetic heads, and means producing relative motion between said surface and said heads.

49. The combination defined in claim 47 in combination with repertory change means operative to change said telephone directory numbers stored in said common repertory memory means in association with said repertory codes, said repertory change means comprising first means operative in response to the dialing of a predetermined repertory change code by any one of said subscribers, second means controlled by said first means and operative in response to the successive dialing of a repertory code for which a change is desired and a telephone directory number to be associated therewith by said one of said subscribers for storing the dialed telephone directory number in said common repertory memory means in association with the dialed repertory code.

50. The combination defined in claim 49 wherein said repertory change means also comprises means controlled by said first means when operated for transmitting a signal tone to said one of said subscribers to indicate that a repertory change may be made, and means controlled by said second means and operative when a repertory change has been completed for transmitting a signal tone to said one of said subscribers to indicate that an additional repertory change may be made.

51. The combination defined in claim 49 in combination with repertory verification means operative to transmit an audible announcement of said telephone directory numbers stored in said common repertory memory means in association with said repertory codes to said subscribers, said repertory verification means comprising first means operative in response to the dialing of a predetermined repertory verification code by any one of said subscribers, second means controlled by said first means and operative in response to the dialing of a repertory code for which a verification is desired for determining from said common repertory memory means the telephone directory number associated therewith, and announcement means controlled by said second means for transmitting an audible announcement of the telephone directory number determined thereby.

52. The combination defined in claim 51 wherein said repertory verification means also comprises means controlled by said first means when operated for transmitting a signal tone to said one of said subscribers to indicate that a repertory verification may be made, and means controlled by said second means and operative when a repertory verification has been completed for transmitting a signal tone to said one of said subscribers to indicate that an additional repertory verification may be made.

53. The combination defined in claim 52 wherein said announcement means comprises a continuously rotating voice recorded announcement drum having a plurality of channels, each of said channels containing a plurality of voice announcements recorded therein, a plurality of pickup devices each associated with a respective one of said channels on said drum, and means connected to said pickup devices and controlled by said second means for selectively transmitting said voice announcements to said one of said subscribers.

54. The combination defined in claim 53 wherein said voice announcements in said channels comprise voice recorded numerical word announcemets and wherein said numerical word announcements recorded in each of said channels are separated by distinctive start indicia recorded therein and wherein said means controlled by said second means also includes means responsive to said start indicia.

References Cited in the file of this patent

UNITED STATES PATENTS

| | | |
|---|---|---|
| 1,738,624 | Wicks | Dec. 10, 1929 |
| 2,564,441 | McKim et al. | Aug. 14, 1951 |